(12) United States Patent
Bowman-Amuah

(10) Patent No.: US 6,345,239 B1
(45) Date of Patent: Feb. 5, 2002

(54) REMOTE DEMONSTRATION OF BUSINESS CAPABILITIES IN AN E-COMMERCE ENVIRONMENT

(75) Inventor: Michel K. Bowman-Amuah, Colorado Springs, CO (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/388,026

(22) Filed: Aug. 31, 1999

(51) Int. Cl.[7] ................................................. G06G 7/48
(52) U.S. Cl. ............................... 703/6; 705/26; 705/39
(58) Field of Search ............................. 703/1, 2, 6, 13, 703/23; 705/26, 27, 39

(56) References Cited

U.S. PATENT DOCUMENTS

| | | | |
|---|---|---|---|
| 5,295,244 A | 3/1994 | Dev et al. ................... 395/161 |
| 5,461,611 A | 10/1995 | Drake, Jr. et al. ............ 370/54 |
| 5,652,787 A | 7/1997 | O'Kelly ....................... 379/112 |
| 5,694,548 A | 12/1997 | Baugher et al. ............ 395/200 |
| 5,864,823 A | 1/1999 | Levitan ....................... 105/14 |
| 5,944,795 A | 8/1999 | Civanlar ..................... 709/227 |
| 6,026,376 A | * | 2/2000 | Kenney ....................... 705/27 |
| 6,052,670 A | * | 4/2000 | Johnson ....................... 705/27 |
| 6,070,149 A | * | 5/2000 | Tavor et al. ................. 705/26 |

FOREIGN PATENT DOCUMENTS

| | | |
|---|---|---|
| EP | 0941010 A2 | 9/1999 |
| EP | 0944209 A2 | 9/1999 |
| WO | WO 98/18237 | 4/1998 |
| WO | WO 99/34587 | 7/1999 |

OTHER PUBLICATIONS

Parker et al, "An Internet–Mediated Business Simulation: Developing and Using TRECS", Simulation & Gaming, vol. 30 No. 1, pp. 51–69, Mar. 1999.*
Zack, "An MIS Course Integrating Information Technology and Organizational Issues", Database for Advances in Information Systems, pp. 73–87 (Spring 1998).*
Paul et al, "Simulation of Business Processes", American Behavioral Scientist, pp. 1551–1576, Aug. 1999.*
Maren S. Leizaola, Tuning IP Performance: The Right Tools for the Task, May 1998 URL: http://data.com/tutorials/tuning.html, Viewed Oct. 15,1999.
Mick Seaman et al., Going the Distance with QOS, Feb. 1999, URL: http://data.com/issue/990207/distance.html, Viewed Oct. 15, 1999.
Stephen Saunders, The Policy Makers, May 1999, URL, http://data.com/issue/990507/policy.html, Viewed Oct. 15, 1999.

* cited by examiner

*Primary Examiner*—Kevin J. Teska
*Assistant Examiner*—Samuel Broda
(74) *Attorney, Agent, or Firm*—Daphne Burton; Oppenheimer Wolff & Donnelly LLP

(57) ABSTRACT

A system, method and article of manufacture are provided for demonstrating business capabilities in an e-commerce environment. Data connectivity is first provided between a plurality of sites on a network, which are located in distinct geographic locations. Demonstration data, which illustrates business capabilities of one of the sites, is then received from one of the sites. Thereafter, the demonstration data is organized in a demonstration format and transmitted over the network in the demonstration format to another of the sites.

18 Claims, 101 Drawing Sheets

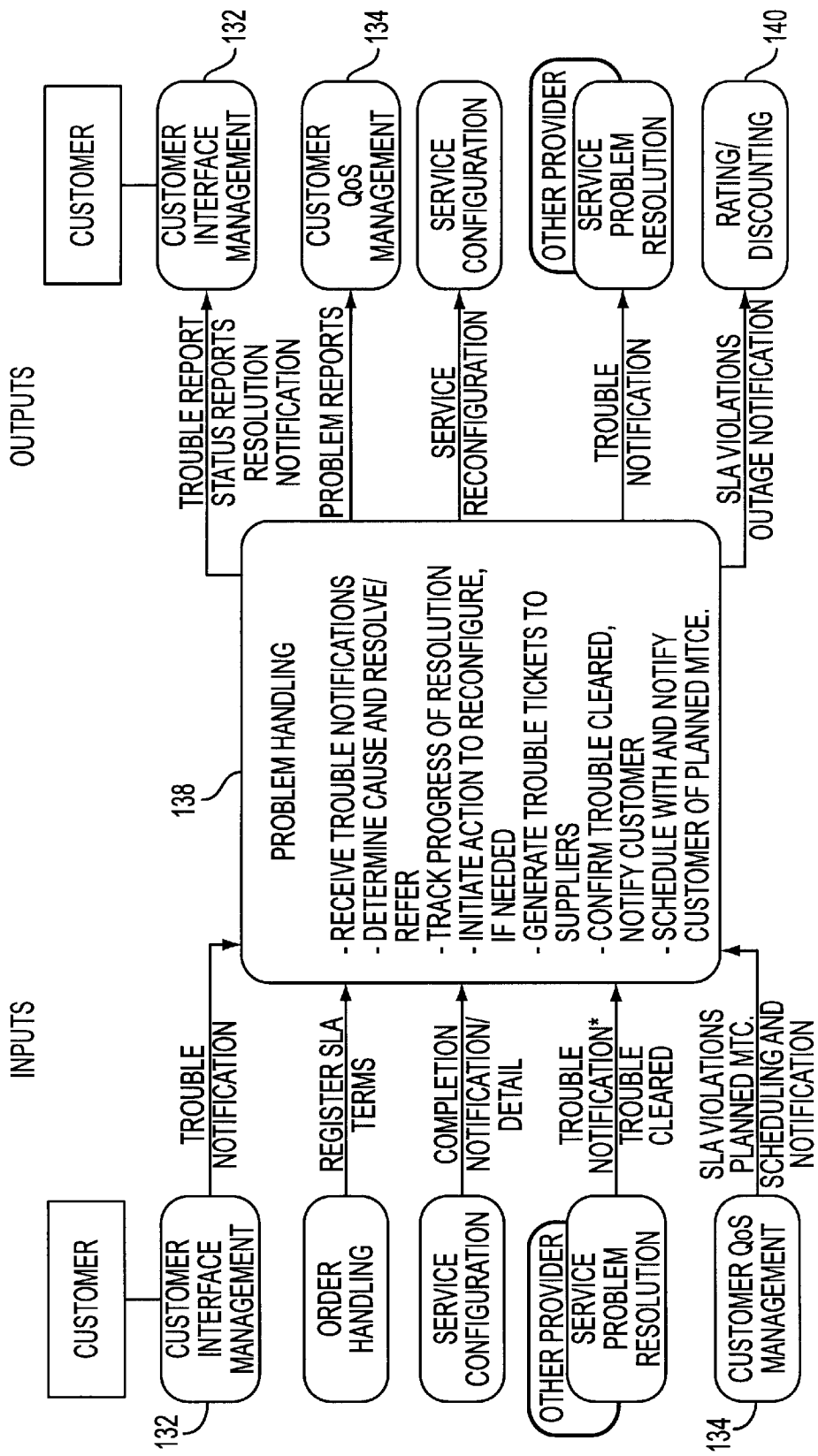

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | CR ID ||||||| CD ID |||||||||
| 01 | TP1 BITS 0-15 ||||||||||||||||
| 02 | TP1 BITS 16-31 ||||||||||||||||
| 03 | TP3 BITS 0-12 ||||||||||||| TP6 0-2 |||
| 04 | TP6 BITS 3-12 |||||||||| TP7 BITS 0-5 ||||||
| 05 | TP7 BITS 6-21 ||||||||||||||||
| 06 | OPL. ORIGINATING PORT 0-15 ||||||||||||||||
| 07 | OP | TPL. TERMINATING PORT 0-14 |||||||||||||||
| 08 | TP || OTG. ORIGINATING TRUNK GROUP ||||||||||||| TT ||
| 09 | TERMINATING TRUNK GROUP (1-12) |||||||||||| TP3Q ||||
| 10 | TP6Q ||| ACTION CODE ||||| OTC |||||| TTC |||
| 11 | ID1 |||| ID2 |||| ANI INDEX ||||||||
| 12 | CLI 1 |||| CLI 2 |||| CLI 3 |||| CLI 4 ||||
| 13 | CLI 5 |||| CLI 6 |||| CLI 7 |||| CLI 8 ||||
| 14 | CLI 9 |||| CLI 10 |||| A1 |||| A2 ||||
| 15 | A3 |||| A4 |||| A5 |||| A6 ||||
| 16 | A7 |||| A8 |||| A9 |||| A10 ||||
| 17 | A11 |||| A12 |||| A13 |||| A14 ||||
| 18 | A15 |||| A16 |||| A17 |||| A18 ||||
| 19 | A19 |||| A20 |||| A21 |||| A22 ||||
| 20 | D1 |||| D2 |||| D3 |||| D4 ||||
| 21 | D5 |||| D6 |||| D7 |||| D8 ||||
| 22 | D9 |||| D10 |||| D11 |||| D12 ||||
| 23 | D13 |||| D14 |||| D15 |||| D16 ||||
| 24 | D17 |||| PTD1 |||| PTD2 |||| PTD3 ||||
| 25 | PTD4 |||| PTD5 |||| PTD6 |||| PTD7 ||||
| 26 | PTD8 |||| PTD9 |||| PTD10 |||| ||||
| 27 | FC |||| TMC |||| KAT |||| TP7Q ||||
| 28 | EC, ENTRY CODE ||||||| PD ||| ND ID |||| DIVID |||
| 29 | D0 ||| CC || IN || SC | CD | DE | DT || SA || NOCLI |||
| 30 | CN1 |||| CN2 |||| CN3 |||| CN4 ||||
| 31 | ACIF |||| SS7 RELEASE CODE |||||||| NCIDSEQ ||| NL | RS |
| BIT | 00 | 01 | 02 | 03 | 04 | 05 | 06 | 07 | 08 | 09 | 10 | 11 | 12 | 13 | 14 | 15 |

FIG. 3

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | \multicolumn{6}{l}{CR ID} | | | | | CD ID | | | | | | |
| 01 | \multicolumn{16}{l}{TP1 BITS 0-15} | | | | | | | | | | | | | | | |
| 02 | \multicolumn{16}{l}{TP1 BITS 16-31} | | | | | | | | | | | | | | | |
| 03 | \multicolumn{13}{l}{TP3 BITS 0-12} | | | | TP6 0-2 | | | |
| 04 | \multicolumn{10}{l}{TP6 BITS 3-12} | | | | | | | TP7 BITS 0-5 | | | | | |
| 05 | \multicolumn{16}{l}{TP7 BITS 6-21} | | | | | | | | | | | | | | | |
| 06 | \multicolumn{16}{l}{OPL. ORIGINATING PORT 0-15} | | | | | | | | | | | | | | | |
| 07 | OP | \multicolumn{15}{l}{TPL. TERMINATING PORT 0-14} | | | | | | | | | | | | | | |
| 08 | TP | \multicolumn{13}{l}{OTG. ORIGINATING TRUNK GROUP} | | | | | | | | | | | | | TT | |
| 09 | \multicolumn{12}{l}{TERMINATING TRUNK GROUP (1-12)} | | | | | | | | | | | | TP3Q | | | |
| 10 | TP6Q | | \multicolumn{6}{l}{ACTION CODE} | | | | | | | OTC | | | | TTC | |
| 11 | \multicolumn{4}{l}{ID1} | | | | | ID2 | | | | \multicolumn{8}{l}{ANI INDEX} | | | | | | | | |
| 12 | \multicolumn{4}{l}{CLI 1} | | | | | CLI 2 | | | | CLI 3 | | | | CLI 4 | | | |
| 13 | \multicolumn{4}{l}{CLI 5} | | | | | CLI 6 | | | | CLI 7 | | | | CLI 8 | | | |
| 14 | \multicolumn{4}{l}{CLI 9} | | | | | CLI 10 | | | | CLI 11 | | | | CLI 12 | | | |
| 15 | \multicolumn{4}{l}{CLI 13} | | | | | CLI 14 | | | | CLI 15 | | | | A1 | | | |
| 16 | A2 | | | | A3 | | | | A4 | | | | A5 | | | |
| 17 | A6 | | | | A7 | | | | A8 | | | | A9 | | | |
| 18 | A10 | | | | A11 | | | | A12 | | | | A13 | | | |
| 19 | A14 | | | | A15 | | | | A16 | | | | A17 | | | |
| 20 | A18 | | | | A19 | | | | A20 | | | | A21 | | | |
| 21 | A22 | | | | A23 | | | | A24 | | | | A25 | | | |
| 22 | A26 | | | | A27 | | | | A28 | | | | A29 | | | |
| 23 | A30 | | | | A31 | | | | A32 | | | | A33 | | | |
| 24 | A34 | | | | A35 | | | | A36 | | | | A37 | | | |
| 25 | A38 | | | | A39 | | | | A40 | | | | A41 | | | |
| 26 | A42 | | | | A43 | | | | A44 | | | | A45 | | | |
| 27 | FC | | | | TMC | | | | KAT | | | | TP7Q | | | |
| 28 | \multicolumn{8}{l}{EC, ENTRY CODE} | | | | | | | | PD | | | | ND ID | | | DIVID | |
| 29 | D0 | MN | CC | | IN | | | SC | CD | DE | DT | | | SA | \multicolumn{4}{l}{NOCLI} | | | |
| 30 | CN1 | | | | CN2 | | | | CN3 | | | | CN4 | | | |
| 31 | ACIF | | | | \multicolumn{8}{l}{SS7 RELEASE CODE} | | | | | | | | NCIDSEQ | | | NL | RS |
| BIT | 00 | 01 | 02 | 03 | 04 | 05 | 06 | 07 | 08 | 09 | 10 | 11 | 12 | 13 | 14 | 15 |

FIG. 4A

| WORD | BITS 00-03 | 04-07 | 08-11 | 12-14 | 15 |
|---|---|---|---|---|---|
| 32 | | | | | |
| 33 | | | | | |
| 34 | ID1 | ID2 | ID3 | ID4 | |
| 35 | ID5 | ID6 | ID7 | ID8 | |
| 36 | ID9 | ID10 | ID11 | ID12 | |
| 37 | ID13 | ID14 | ID15 | ID16 | |
| 38 | ID17 | ID18 | ID19 | ID20 | |
| 39 | ID21 | ID22 | ID23 | ID24 | |
| 40 | ID25 | PTD1 | PTD2 | PTD3 | |
| 41 | PTD4 | PTD5 | PTD6 | PTD7 | |
| 42 | PTD8 | PTD9 | PTD10 | PTD11 | |
| 43 | PTD12 | PTD13 | PTD14 | PTD15 | |
| 44 | EIR CALL TYPE | | OVFAL | | CB |
| 45 | OVFCL | DTA 1 | DTA 2 | DTA 3 | |
| 46 | DTA 4 | DTA 5 | DTA 6 | DTA 7 | |
| 47 | DTA 8 | DTA 9 | DTA 10 | DTA 11 | |
| 48 | DTA 12 | DTA 13 | DTA 14 | DTA 15 | |
| 49 | OVFC | | DTAC | NCID | |
| 50 | NETWORK CALL IDENTIFIER (NCID) | | | | |
| 51 | NETWORK CALL IDENTIFIER (NCID) | | | | |
| 52 | NETWORK CALL IDENTIFIER (NCID) | | | | |
| 53 | NETWORK CALL IDENTIFIER (NCID) | | | | |
| 54 | NETWORK CALL IDENTIFIER (NCID) | | | | |
| 55 | | | | | |
| 56 | | | | | |
| 57 | | | | | |
| 58 | | | | | |
| 59 | | | OUS TYPE | OUIE | |
| 60 | OUIE COUNT CONT. | | | OVFCS | |
| 61 | ORIGINATING NX64 BITMAP (1-16) | | | | |
| 62 | ORIG NX64 BITMAP (17-24) | | TERM NX64 BITMAP (17-24) | | |
| 63 | TERMINATING NX64 BITMAP (9-24) | | | | |

FIG. 4B

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | \multicolumn{6}{c}{CR ID} | | | | | \multicolumn{8}{c}{CD ID} | | | | | | | |
| 01 | \multicolumn{16}{c}{TP1 BITS 0-15} | | | | | | | | | | | | | | | |
| 02 | \multicolumn{16}{c}{TP1 BITS 16-31} | | | | | | | | | | | | | | | |
| 03 | \multicolumn{13}{c}{TP4 BITS 0-12} | | | | | | | | | | | | | \multicolumn{3}{c}{TP6 0-2} | | |
| 04 | \multicolumn{10}{c}{TP6 BITS 3-12} | | | | | | | | | | \multicolumn{6}{c}{TP7 BITS 0-5} | | | | | |
| 05 | \multicolumn{16}{c}{TP7 BITS 6-21} | | | | | | | | | | | | | | | |
| 06 | \multicolumn{16}{c}{OPL. ORIGINATING PORT 0-15} | | | | | | | | | | | | | | | |
| 07 | OP | \multicolumn{15}{c}{TPL. TERMINATING PORT 0-14} | | | | | | | | | | | | | | |
| 08 | \multicolumn{2}{c}{TP} | | \multicolumn{12}{c}{OTG. ORIGINATING TRUNK GROUP} | | | | | | | | | | | | | \multicolumn{2}{c}{TT} | |
| 09 | \multicolumn{12}{c}{TERMINATING TRUNK GROUP (1-12)} | | | | | | | | | | | | \multicolumn{4}{c}{TP3Q} | | | | |
| 10 | \multicolumn{2}{c}{TP6Q} | | \multicolumn{6}{c}{ACTION CODE} | | | | | | | \multicolumn{4}{c}{OTC} | | | | \multicolumn{4}{c}{TTC} | | | |
| 11 | \multicolumn{4}{c}{ID1} | | | | \multicolumn{4}{c}{ID2} | | | | \multicolumn{4}{c}{ONACC} | | | | \multicolumn{4}{c}{TNACC} | | | |
| 12 | \multicolumn{4}{c}{CLI 1} | | | | \multicolumn{4}{c}{CLI 2} | | | | \multicolumn{4}{c}{CLI 3} | | | | \multicolumn{4}{c}{CLI 4} | | | |
| 13 | \multicolumn{4}{c}{CLI 5} | | | | \multicolumn{4}{c}{CLI 6} | | | | \multicolumn{4}{c}{CLI 7} | | | | \multicolumn{4}{c}{CLI 8} | | | |
| 14 | \multicolumn{4}{c}{CLI 9} | | | | \multicolumn{4}{c}{CLI 10} | | | | \multicolumn{4}{c}{A1} | | | | \multicolumn{4}{c}{A2} | | | |
| 15 | \multicolumn{4}{c}{A3} | | | | \multicolumn{4}{c}{A4} | | | | \multicolumn{4}{c}{A5} | | | | \multicolumn{4}{c}{A6} | | | |
| 16 | \multicolumn{4}{c}{A7} | | | | \multicolumn{4}{c}{A8} | | | | \multicolumn{4}{c}{A9} | | | | \multicolumn{4}{c}{A10} | | | |
| 17 | \multicolumn{4}{c}{A11} | | | | \multicolumn{4}{c}{A12} | | | | \multicolumn{4}{c}{A13} | | | | \multicolumn{4}{c}{A14} | | | |
| 18 | \multicolumn{4}{c}{A15} | | | | \multicolumn{4}{c}{A16} | | | | \multicolumn{4}{c}{A17} | | | | \multicolumn{4}{c}{A18} | | | |
| 19 | \multicolumn{4}{c}{A19} | | | | \multicolumn{4}{c}{A20} | | | | \multicolumn{4}{c}{A21} | | | | \multicolumn{4}{c}{A22} | | | |
| 20 | \multicolumn{4}{c}{D1} | | | | \multicolumn{4}{c}{D2} | | | | \multicolumn{4}{c}{D3} | | | | \multicolumn{4}{c}{D4} | | | |
| 21 | \multicolumn{4}{c}{D5} | | | | \multicolumn{4}{c}{D6} | | | | \multicolumn{4}{c}{D7} | | | | \multicolumn{4}{c}{D8} | | | |
| 22 | \multicolumn{4}{c}{D9} | | | | \multicolumn{4}{c}{D10} | | | | \multicolumn{4}{c}{D11} | | | | \multicolumn{4}{c}{D12} | | | |
| 23 | \multicolumn{4}{c}{D13} | | | | \multicolumn{4}{c}{D14} | | | | \multicolumn{4}{c}{D15} | | | | \multicolumn{4}{c}{D16} | | | |
| 24 | \multicolumn{4}{c}{D17} | | | | \multicolumn{12}{c}{OPIN} | | | | | | | | | | | | | |
| 25 | \multicolumn{3}{c}{OPIN} | | | \multicolumn{13}{c}{TPS BITS 0-12} | | | | | | | | | | | | | | | |
| 26 | \multicolumn{4}{c}{RN1} | | | | \multicolumn{4}{c}{RN2} | | | | \multicolumn{4}{c}{RN3} | | | | \multicolumn{4}{c}{RN4} | | | |
| 27 | \multicolumn{4}{c}{FC} | | | | \multicolumn{4}{c}{TMC} | | | | \multicolumn{4}{c}{KAT} | | | | \multicolumn{4}{c}{TP7Q} | | | |
| 28 | \multicolumn{7}{c}{EC, ENTRY CODE} | | | | | | | | \multicolumn{3}{c}{PD} | | | \multicolumn{4}{c}{ND ID} | | | | \multicolumn{2}{c}{DIVID} | |
| 29 | \multicolumn{2}{c}{D0} | | \multicolumn{2}{c}{CC} | | \multicolumn{2}{c}{IN} | | SC | CD | DE | DT | PP | XC | SA | \multicolumn{3}{c}{NOCLI} | | |
| 30 | \multicolumn{3}{c}{CN1} | | | \multicolumn{4}{c}{CN2} | | | | \multicolumn{5}{c}{CN3} | | | | | | \multicolumn{4}{c}{CN4} | | | |
| 31 | \multicolumn{3}{c}{ACIF} | | | \multicolumn{7}{c}{SS7 RELEASE CODE} | | | | | | | | \multicolumn{4}{c}{NCIDSEQ} | | | | NL | RS |
| BITS | 00 | 01 | 02 | 03 | 04 | 05 | 06 | 07 | 08 | 09 | 10 | 11 | 12 | 13 | 14 | 15 |

FIG. 5

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | \multicolumn{6}{c}{CR ID} | | | | | \multicolumn{8}{c}{CD ID} | | | | | | | | |
| 01 | \multicolumn{16}{c}{TP1 BITS 0-15} | | | | | | | | | | | | | | | |
| 02 | \multicolumn{16}{c}{TP1 BITS 16-31} | | | | | | | | | | | | | | | |
| 03 | \multicolumn{13}{c}{TP4 BITS 0-12} | | | | | | | | | | | | | \multicolumn{3}{c}{TP6 0-2} | | |
| 04 | \multicolumn{10}{c}{TP6 BITS 3-12} | | | | | | | | | | \multicolumn{6}{c}{TP7 BITS 0-5} | | | | | |
| 05 | \multicolumn{16}{c}{TP7 BITS 6-21} | | | | | | | | | | | | | | | |
| 06 | \multicolumn{16}{c}{OPL. ORIGINATING PORT 0-15} | | | | | | | | | | | | | | | |
| 07 | OP | \multicolumn{15}{c}{TPL. TERMINATING PORT 0-14} | | | | | | | | | | | | | | |
| 08 | \multicolumn{2}{c}{TP} | \multicolumn{13}{c}{OTG. ORIGINATING TRUNK GROUP} | | | | | | | | | | | | | | TT |
| 09 | \multicolumn{12}{c}{TERMINATING TRUNK GROUP (1-12)} | | | | | | | | | | | | \multicolumn{4}{c}{TP3Q} | | | |
| 10 | \multicolumn{2}{c}{TP6Q} | \multicolumn{4}{c}{ACTION CODE} | | | | | \multicolumn{5}{c}{OTC} | | | | | \multicolumn{5}{c}{TTC} | | | | |
| 11 | \multicolumn{4}{c}{ID1} | | | | \multicolumn{4}{c}{ID2} | | | | \multicolumn{4}{c}{ONACC} | | | | \multicolumn{4}{c}{TNACC} | | | |
| 12 | \multicolumn{4}{c}{CLI 1} | | | | \multicolumn{4}{c}{CLI 2} | | | | \multicolumn{4}{c}{CLI 3} | | | | \multicolumn{4}{c}{CLI 4} | | | |
| 13 | \multicolumn{4}{c}{CLI 5} | | | | \multicolumn{4}{c}{CLI 6} | | | | \multicolumn{4}{c}{CLI 7} | | | | \multicolumn{4}{c}{CLI 8} | | | |
| 14 | \multicolumn{4}{c}{CLI 9} | | | | \multicolumn{4}{c}{CLI 10} | | | | \multicolumn{4}{c}{CLI 11} | | | | \multicolumn{4}{c}{CLI 12} | | | |
| 15 | \multicolumn{4}{c}{CLI 13} | | | | \multicolumn{4}{c}{CLI 14} | | | | \multicolumn{4}{c}{CLI 15} | | | | \multicolumn{4}{c}{A1} | | | |
| 16 | \multicolumn{4}{c}{A2} | | | | \multicolumn{4}{c}{A3} | | | | \multicolumn{4}{c}{A4} | | | | \multicolumn{4}{c}{A5} | | | |
| 17 | \multicolumn{4}{c}{A6} | | | | \multicolumn{4}{c}{A7} | | | | \multicolumn{4}{c}{A8} | | | | \multicolumn{4}{c}{A9} | | | |
| 18 | \multicolumn{4}{c}{A10} | | | | \multicolumn{4}{c}{A11} | | | | \multicolumn{4}{c}{A12} | | | | \multicolumn{4}{c}{A13} | | | |
| 19 | \multicolumn{4}{c}{A14} | | | | \multicolumn{4}{c}{A15} | | | | \multicolumn{4}{c}{A16} | | | | \multicolumn{4}{c}{A17} | | | |
| 20 | \multicolumn{4}{c}{A18} | | | | \multicolumn{4}{c}{A19} | | | | \multicolumn{4}{c}{A20} | | | | \multicolumn{4}{c}{A21} | | | |
| 21 | \multicolumn{4}{c}{A22} | | | | \multicolumn{4}{c}{A23} | | | | \multicolumn{4}{c}{A24} | | | | \multicolumn{4}{c}{A25} | | | |
| 22 | \multicolumn{4}{c}{A26} | | | | \multicolumn{4}{c}{A27} | | | | \multicolumn{4}{c}{A28} | | | | \multicolumn{4}{c}{A29} | | | |
| 23 | \multicolumn{4}{c}{A30} | | | | \multicolumn{4}{c}{A31} | | | | \multicolumn{4}{c}{A32} | | | | \multicolumn{4}{c}{A33} | | | |
| 24 | \multicolumn{4}{c}{A34} | | | | \multicolumn{4}{c}{A35} | | | | \multicolumn{4}{c}{A36} | | | | \multicolumn{4}{c}{A37} | | | |
| 25 | \multicolumn{4}{c}{A38} | | | | \multicolumn{4}{c}{A39} | | | | \multicolumn{4}{c}{A40} | | | | \multicolumn{4}{c}{A41} | | | |
| 26 | \multicolumn{4}{c}{A42} | | | | \multicolumn{4}{c}{A43} | | | | \multicolumn{4}{c}{A44} | | | | \multicolumn{4}{c}{A45} | | | |
| 27 | \multicolumn{4}{c}{FC} | | | | \multicolumn{4}{c}{TNC} | | | | \multicolumn{4}{c}{KAT} | | | | \multicolumn{4}{c}{TF7Q} | | | |
| 28 | \multicolumn{6}{c}{EC, ENTRY CODE} | | | | | | | \multicolumn{3}{c}{PD} | | | \multicolumn{3}{c}{ND ID} | | | \multicolumn{4}{c}{DIVID} | | | |
| 29 | D0 | MM | CC | IN | | | \multicolumn{2}{c}{SC} | | CD | DE | DT | PP | XC | SA | \multicolumn{4}{c}{NOCLI} |
| 30 | \multicolumn{4}{c}{CN1} | | | | \multicolumn{4}{c}{CN2} | | | | \multicolumn{4}{c}{CN3} | | | | \multicolumn{4}{c}{CN4} | | | |
| 31 | \multicolumn{4}{c}{ACIF} | | | | \multicolumn{8}{c}{SS7 RELEASE CODE} | | | | | | | | \multicolumn{2}{c}{NCIDSEQ} | | NL | RS |

BITS  00  01  02  03  04  05  06  07  08  09  10  11  12  13  14  15
EOSR/EPOSR FORMAT

FIG. 6A

| BITS | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| 32 | T&C GUEST 1 ||||||||  T&C GUEST 2 ||||||||
| 33 | T&C GUEST 3 ||||||||  T&C GUEST 4 ||||||||
| 34 | ID1 |||| ID2 |||| ID3 |||| ID4 ||||
| 35 | ID5 |||| ID6 |||| ID7 |||| ID8 ||||
| 36 | ID9 |||| ID10 |||| ID11 |||| ID12 ||||
| 37 | ID13 |||| ID14 |||| ID15 |||| ID16 ||||
| 38 | ID17 |||| ID18 |||| ID19 |||| ID20 ||||
| 39 | ID21 |||| ID22 |||| ID23 |||| ID24 ||||
| 40 | ID25 |||| PTD1 |||| PTD2 |||| PTD3 ||||
| 41 | PTD4 |||| PTD5 |||| PTD6 |||| PTD7 ||||
| 42 | PTD8 |||| PTD9 |||| PTD10 |||| PTD11 ||||
| 43 | PTD12 |||| PTD13 |||| PTD14 |||| PTD15 ||||
| 44 | EIR CALL TYPE |||||||| OVFAL ||||||| CB |
| 45 | OVFCL |||| DTA 1 |||| DTA 2 |||| DTA 3 ||||
| 46 | DTA 4 |||| DTA 5 |||| DTA 6 |||| DTA 7 ||||
| 47 | DTA 8 |||| DTA 9 |||| DTA 10 |||| DTA 11 ||||
| 48 | DTA 12 |||| DTA 13 |||| DTA 14 |||| DTA 15 ||||
| 49 | OVFC |||||||| DTAC ||||||| NCID ||
| 50 | NETWORK CALL IDENTIFIER (NCID) ||||||||||||||||
| 51 | NETWORK CALL IDENTIFIER (NCID) ||||||||||||||||
| 52 | NETWORK CALL IDENTIFIER (NCID) ||||||||||||||||
| 53 | NETWORK CALL IDENTIFIER (NCID) ||||||||||||||||
| 54 | NETWORK CALL IDENTIFIER (NCID) ||||||||||||||||
| 55 | T&C ROOM 1 |||||||| T&C ROOM 2 ||||||||
| 56 | T&C ROOM 3 |||||||| T&C ROOM 4 ||||||||
| 57 | T&C ROOM 5 |||||||| T&C ROOM 6 ||||||||
| 58 | EAC1 |||| EAC2 |||| EAC3 |||| EAC4 ||||
| 59 | EAC5 |||| EAC6 |||| EAC7 |||| EAC8 ||||
| 60 | EAC9 |||| EAC10 |||| EAC11 |||| EAC12 ||||
| 61 | OPIN ||||||||||||| OVFCS |||
| 62 | TP5-OPERATOR RELEASE ||||||||||||| |||
| 63 | RN1 |||| RN2 |||| RN3 |||| RN4 ||||

FIG. 6B

| BIT | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| WORD 00 | \multicolumn{6}{|c|}{CR ID} | | | \multicolumn{8}{|c|}{SYNC WORD (MINUS 2, OCTAL 7776)} | | | | | | | | |

MSB ... LSB

| BIT | 00-05 | 06-15 |
|---|---|---|
| WORD 00 | CR ID | SYNC WORD (MINUS 2, OCTAL 7776) |
| 01 | colspan | CDID, CALL DISCONNECT I.D. NUMBER (0-15) |
| 02 | colspan | CDID, CALL DISCONNECT I.D. NUMBER (16-31) |
| 03 | SWID 1 | SWID 2 / SWID 3 |
| 04 | ST-SWITCH TYPE | EQ-EVENT QUALIFIER |
| 05 | colspan | SERIT-SER EVENT TIME (0-15) |
| 06 | colspan | SERIT-SER EVENT TIME (16-31) |
| 07 | | FCDID-FIRST RECORD CDID (12 LSAs) |
| 08 | | LCDID-LAST RECORD CDID (12 LSAs) |
| 09 | | NCDID-NEXT RECORD CDID (12 LSAs) |
| 10 | colspan | NBSN-NEMAS BLOCK SEQUENCE NUMBER |
| 11 | colspan | PT-PREVIOUS TIME (0-15) |
| 12 | colspan | PT-PREVIOUS TIME (16-31) |
| 13 | SI | TIME OFFSET |
| 14 | | |
| 15 | | |
| 16 | SOFTWARE LOAD ID1 | SOFTWARE LOAD ID2 |
| 17 | SOFTWARE LOAD ID3 | SOFTWARE LOAD ID4 |
| 18 | SOFTWARE LOAD ID5 | SOFTWARE LOAD ID6 |
| 19 | LAST PATCHS/PR RLS1 | LAST PATCHS/PR RLS2 |
| 20 | QCDR | QSCDR |
| 21 | QPMR | QSPMR |
| 22 | QOSR | QSOSR |
| 23 | QPOSR | QSPOSR |
| 24 | QSER | CNPN |
| 25 | colspan | CDR THROTTLE START TIME (0-15) |
| 26 | colspan | CDR THROTTLE START TIME (16-31) |
| 27 | colspan | CDR THROTTLE STOP TIME (0-15) |
| 28 | colspan | CDR THROTTLE STOP TIME (16-31) |
| 29 | | FORMAT VER. |
| 30 | colspan | THROTTLE COUNT (0-15) |
| 31 | colspan | THROTTLE COUNT (16-31) |

FIG. 7

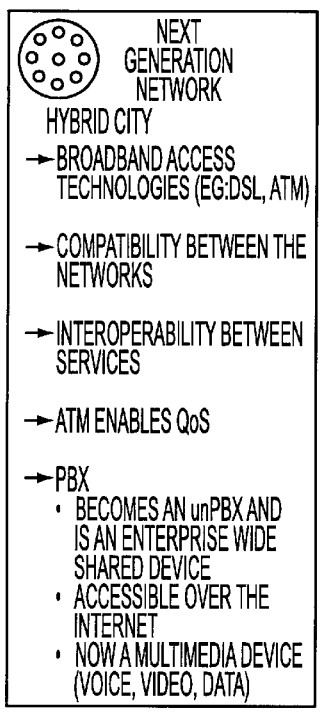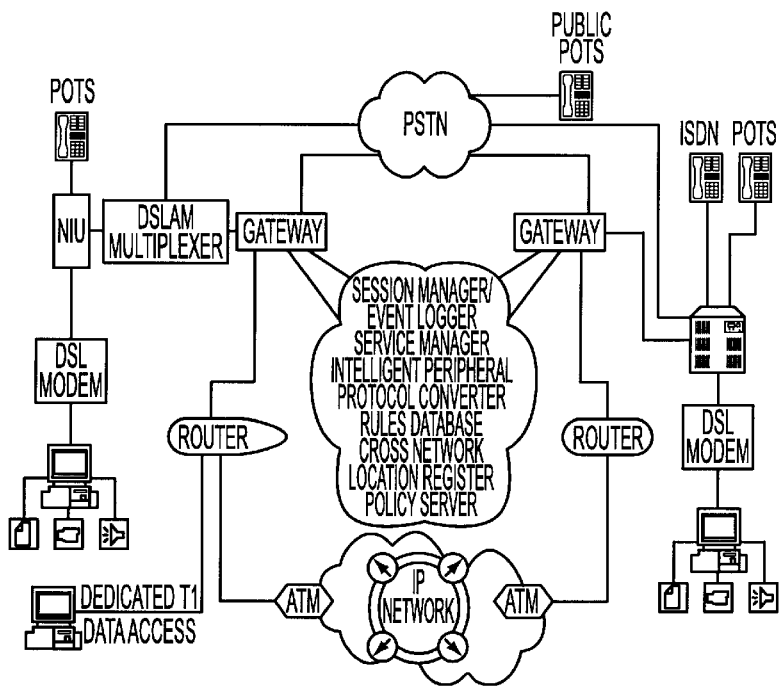
FIG. 51
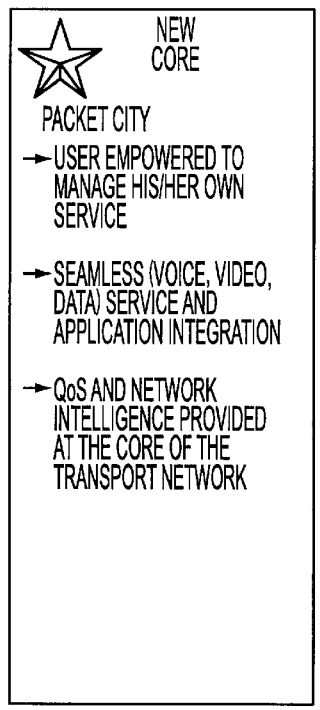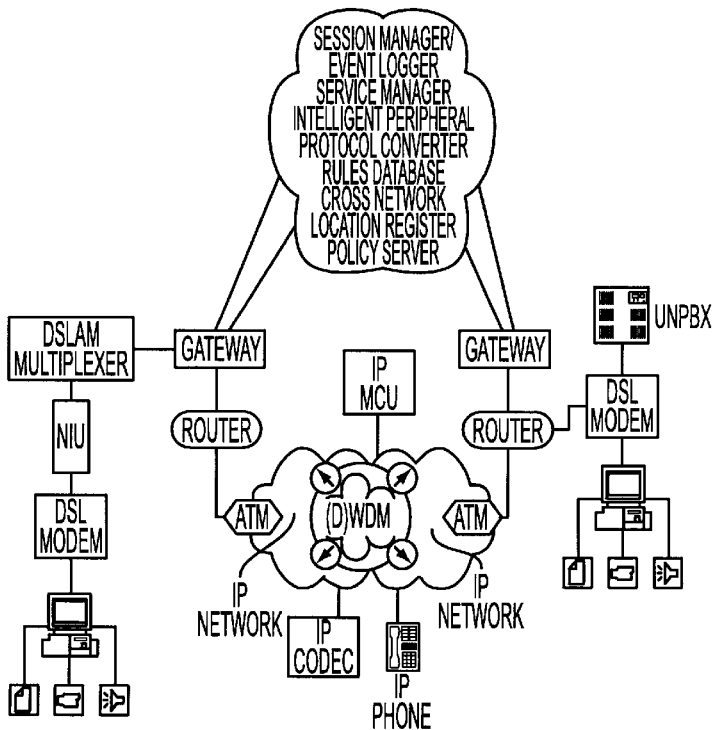
FIG. 52

| eCOMMERCE SERVICES CAPABILITY ||||
|---|---|---|---|
| SERVICE CREATION CAPABILITY | SERVICE PROVISIONING CAPABILITY | SERVICE ASSURANCE CAPABILITY | CHARGING & BILLING CAPABILITY |
| NETWORK CREATION CAPABILITY | NETWORK PROVISIONING CAPABILITY | NETWORK ASSURANCE CAPABILITY | RATING CAPABILITY |
| NETWORK FABRIC ||||

FIG. 69

| | NETWORK COST | IMPLEMENTATION TIME | SECURITY | TRAFFIC MIXING/ BANDWIDTH MANAGEMENT | NETWORK MANAGEMENT | NETWORK MANAGEABILITY | REDUNDANCY | TOTAL |
|---|---|---|---|---|---|---|---|---|
| OPTION 1: TOTAL OWNERSHIP | 1 | 1 | 4 | 4 | 4 | 5 | 3 | 22 |
| OPTION 1 (BIS): TOTAL OWNERSHIP (PARTNERING WITH A TELECOMMUNICATION PROVIDER) | 4 | 2 | 4 | 5 | 4 | 5 | 4 | 28 |
| OPTION 2: VPN OVER PUBLIC INTERNET | 5 | 3 | 1 | 1 | 1 | 1 | 3 | 15 |

1 → VERY POOR    2 → POOR    3 → AVERAGE    4 → GOOD    5 → VERY GOOD

FIG. 72

| 1. SERVICE DESCRIPTION | | | | |
|---|---|---|---|---|
| RELEASE 1 AND II DATA ONLY AND ENHANCED DATA | | RELEASE III DATA AND VOICE | | |
| VIRTUAL PRIVATE NETWORKS (LAN INTERCONNECT) | LEGACY SERVICE SUPPORT | VOICE OVER IP | FAX OVER IP | |
| CLIENT REQUIREMENT | | | | |
| THE VPN LAN INTERCONNECT SERVICE MAY ALLOW THE INTERCONNECTION OF CORPORATE LANs AT DIFFERENT LOCATIONS TO ALLOW THE CREATION OF A COST EFFECTIVE WAN WITHOUT THE NEED FOR MANY PHYSICAL POINT TO POINT LEASED LINES. THIS CONFIGURATION MAY ALSO OFFER THE BENEFIT OF EASIER ADDITIONS OF NEW CUSTOMER SITES AS EACH SITE HAS ONLY ONE (OR TWO IF DIVERSITY REQUIRED) PHYSICAL CONNECTIONS TO THE NETWORK. | AS ANY NEW CORE NETWORK MAY NEED TO SERVE CUSTOMERS OPERATING EXISTING PRIVATE WANs IT IS IMPORTANT THAT SERVICES ARE PROVIDED TO PROVIDE ONGOING SUPPORT PRIOR TO ANY MIGRATION TO A PACKET BASED WAN IMPLEMENTATION.<br><br>THE TWO MOST IMPORTANT LEGACY SERVICES FOR THE BUSINESS SIMULATOR TO SUPPORT ARE:<br>• PRIVATE CIRCUITS - E1/T1 AND E3/T3; AND<br>• FRAME RELAY.<br><br>THESE MAY BE IMPLEMENTED AT THE ATM LEVEL AS MAPPING TO IP IS INEFFICIENT, LIKELY TO BE POOR QUALITY AND IMPRACTICAL. | VOICE OVER IP IS A BASIC SERVICE REQUIREMENT FOR THE BUSINESS SIMULATOR NETWORK BECAUSE:<br>• THE COST BENEFITS OF VoIP UNDERPIN THE BUSINESS CASE FOR THE NETWORK TRANSFORMATION MARKET<br>• IT IS A CORE SERVICE OF POTENTIAL CUSTOMERS OF THE NETWORK;<br>• IT IS A KEY COMPONENT OF POTENTIAL eCOMMERCE APPLICATIONS.<br><br>PROVISION OF VoIP MAY ENABLE THE BUSINESS SIMULATOR TO DEMONSTRATE INTEGRATED VOICE AND DATA SERVICES SUCH AS SUPPORT FOR CALL CENTERS AS WELL AS BASIC PSTN SUBSTITUTION SERVICES. | THE BUSINESS SIMULATOR MAY SUPPORT FAX OVER IP. THIS MAY ALLOW THE CUSTOMER TO SEND FAX DATA ACROSS THE NETWORK VIA A FAX GATEWAY WHICH MAY TRANSLATE THE OUTPUT FROM A GROUP 3 OR 4 FAX MACHINE TO IP BEFORE ONWARD ROUTING ON THE NETWORK. | |

FIG. 75A

| SERVICE FEATURES | | | |
|---|---|---|---|
| VIRTUAL PRIVATE NETWORKS (LAN INTERCONNECT) | LEGACY SERVICE SUPPORT | VOICE OVER IP | FAX OVER IP |
| • A PRIME SERVICE REQUIREMENT MAY BE THE IMPLEMENTATION OF SECURITY FEATURES TO PROTECT THE DATA BEING TRANSFERRED FROM UNAUTHORIZED ACCESS. | THIS SERVICE MAY PROVIDE BOTH LEASED LINE AND EMULATION AND FRAME RELAY SUPPORT FEATURES.<br><br>FOR LEASED LINE EMULATION THE PERFORMANCE MAY BE EQUIVALENT TO THAT OF LEASED LINES PROVIDED BY TRANSPORT OVER TDM NETWORK INFRASTRUCTURE SUCH AS SONET/SDH AND PDH. THIS INCLUDES END-TO-END DELAY, BER PERFORMANCE AND TIMING TRANSPARENCY.<br><br>THE FRAME RELAY LEGACY SERVICE MAY PROVIDE EQUIVALENT FUNCTIONALITY TO A SERVICE OFFERED OVER A DEDICATED FRAME RELAY NETWORK. THIS INCLUDES:<br>• SUPPORT FOR PVCs OFFERED TO THE BUSINESS SIMULATOR FROM A CUSTOMER FRAD OVER A FR UNI;<br>• QoS PRIORITIZATION; AND<br>• APPROPRIATE PERFORMANCE TO SUPPORT VOICE OVER FRAME RELAY. | THE SERVICE MAY OFFER EQUIVALENT BASIC PSTN FUNCTIONALITY E.G. BASIC CALL SET-UP AND CLEAR-DOWN AND EQUIVALENT CLIP SUPPLEMENTARY SERVICES. CALL SETUP MAY BE INITIATED VIA INTERNET BROWSER ON THE USER'S PC. OR VIA PSTN SIGNALING (ISDN/CAS).<br><br>PARTICULAR REGARD MAY BE PAID TO THE DEMONSTRATION OF PRE-SETTABLE NETWORK QoS LEVELS. THIS IS BECAUSE:<br>• DETERMINISTIC QoS IS A WELL KNOWN DESIGN PROBLEM IN PACKET NETWORKS USED TO SUPPORT VOICE TRAFFIC; SERVICE QUALITY DIFFERENTIATION IS LIKELY TO BE A KEY FEATURE IN MANAGING THE PORTFOLIO OF PSTN SERVICES IN A MIXED CCT SWITCHED/PACKET SWITCH ENVIRONMENT. | THE SERVICE MAY SUPPORT BASIC FAX-FAX CONNECTIVITY, FAX-BROADCAST AND FAX-TO-EMAIL. BREAKOUT ONTO THE PSTN MAY BE SUPPORTED WITH FULL SUPPORT FOR E.164 NUMBERING. |

FIG. 75B

| QUALITY OF SERVICE MEASURES | | | |
|---|---|---|---|
| | LEGACY SERVICE SUPPORT | VOICE OVER IP | FAX OVER IP |
| VIRTUAL PRIVATE NETWORKS (LAN INTERCONNECT) | | | |
| MAX END-TO-END TRANSIT DELAY (MAXIMUM AND AVERAGE) MAXIMUM DELAY VARIATION MAXIMUM PERCENTAGE LOST PDU | FOR LEASED LINE EMULATION:<br>• AVERAGE BER < 1 IN $10^8$<br>• MAX END-TO-END DELAY<br>• JITTER/WANDER<br><br>FOR FRAME RELAY SUPPORT:<br>COMMITTED INFORMATION RATE (CIR)<br>MAX END-TO-END TRANSIT DELAY; | THE SERVICE MAY BE OFFERED AT EQUIVALENT PSTN SERVICE LEVELS E.G.<br>99.95% AVAILABILITY,<br>POST DIAL DELAY <500mS<br>END-TO-END DELAY <30mS<br>AUDIO BANDWIDTH 0.3-3.4kHz<br>STABILITY<br>ECHO | THE SERVICE MAY OFFER ERROR RATES AND CALL SET-UP TIMES WHICH ARE COMPARABLE TO GROUP 4 ISDN BASED FAX CONNECTIONS. |
| SERVICE INTERFACE | | | |
| VIRTUAL PRIVATE NETWORKS (LAN INTERCONNECT) | | | |
| THE SERVICE INTERFACE MAY BE A IEEE 802.3 10baseT LAN PRESENTED TO THE EDGE SWITCH OR CUSTOMER ROUTER. | FOR LEASED LINE EMULATION AND FRAME RELAY CONNECTION THE INTERFACES MAY BE COMPLIANT WITH:<br>E1/T1 ITU-T G.703<br>E3/T3 ITU-T G.755<br><br>THE FRAME RELAY PROTOCOL CARRIED OVER THE E1/T1/E3/T3 PHYSICAL INTERFACE MAY BE COMPLIANT WITH ITU-T Q.922, I.233, I.555. | THE SERVICE INTERFACE MAY BE A IEEE 802.3 10baseT LAN PRESENTED TO THE EDGE SWITCH OR CUSTOMER ROUTER. THE SERVICE INTERFACE MAY BE BY EITHER:<br><br>(a) 10baseT LAN FROM A H.323 TERMINAL PRESENTED TO THE H.323 GATEWAY ON THE CARRIER SIDE OF THE NETWORK INTERFACE; OR<br>(b) SPEECH TERMINAL PRESENTED VIA A REAL OR SIMULATED PSTN TO A PSTN GATEWAY EQUIPMENT. | SERVICE INTERFACES SUPPORTED MAY BE:<br>• TWO WIRE ANALOGUE VOICE INTERFACE;<br>• BASIC RATE ISDN ITU-T I.420; AND<br>• 10baseT ETHERNET IEEE 802.3 ETC. |

FIG. 75C

| 2. NETWORK IMPLICATIONS CARRIER GRADE EDGE NETWORK OPTION | | | |
|---|---|---|---|
| VIRTUAL PRIVATE NETWORKS (LAN INTERCONNECT) | LEGACY SERVICE SUPPORT | VOICE OVER IP | FAX OVER IP |
| MANAGEMENT OF LAN ADDRESSING IS A KEY ISSUE TO BE RESOLVED IN THIS SERVICE. LEVEL 3 ROUTING TECHNIQUES SUCH AS CISCO TAG SWITCHING AND NETFLOW, IP SWITCHING OR IETF MPLS (MULTI-PROTOCOL LABEL SWITCHING) COULD PLAY A PART IN ISOLATION OF THE CARRIER NETWORK FROM THE INDIVIDUAL ADDRESSING STRATEGIES OF THE CUSTOMER LANS.<br><br>THE LAN INTERFACE FOR THIS SERVICE MAY BE LOCATED ON THE CARRIER ROUTER LOCATED ON THE CUSTOMER PREMISES WHICH IS FORMS THE BOUNDARY (OR NETWORK TERMINATING POINT (NTP) BETWEEN CUSTOMER AND CARRIER NETWORKS). | LEASED CIRCUIT EMULATION MAY BE BY MAPPING DIRECT TO ATM VIA PREFERABLY THE AAL1 CONSTANT BIT RATE (CBR) ATM ADAPTION LAYER. SUPPORT FOR CBR IN THE C&W PROVIDED CORE SHOULD BE CONFIRMED.<br><br>FRAME RELAY MAY BE MAPPED DIRECT TO ATM. THE FOLLOWING FEATURES MAY BE INCLUDED:<br>• CIRCUIT TRAFFIC PARAMETER MAPPING;<br>• UPPER-LAYER PROTOCOL TRANSLATION;<br>• TRAFFIC SHAPING TO ENSURE TRAFFIC BEHAVIOR IS COMPLIANT WITH THE ATM SERVICE LEVEL CONTRACT;<br>• DE TO CLP MAPPING AND FECN TO EFCI MAPPING - BOTH TO ENSURE TRANSLATION OF CONGESTION MANAGEMENT FEATURES. | AN H.323 GATEWAY MAY BE PROVIDED WITH THE FOLLOWING FUNCTIONAL BLOCKS:<br>ROUTING (INTERFACE TO CLIENT LANS)<br>GATEKEEPER<br>GATEWAY<br>MULTIPOINT CONTROL UNIT<br><br>SELECTABLE QoS MAY BE MET BY ALLOWING THE ATM NETWORK CORE TO MAP IP FLOWS CARRYING VOICE ONTO A SERVICE CATEGORY WHICH ALLOWS SPECIFICATION OF END-TO-END DELAY.<br><br>IP FLOWS CARRYING VOICE CAN BE IDENTIFIED. ONCE IDENTIFIED, ATM SWITCHES FORWARD THESE FLOWS OVER VIRTUAL CIRCUITS WITHIN THE DELAY AND DISCARD PARAMETERS FOR VOICE TRAFFIC. (ACK: CISCO)<br><br>THIS FUNCTIONALITY MAY BE IMPLEMENTED IN THE EDGE SWITCHES OF THE ATM CORE WHICH ARE LIKELY TO BE DIFFERENT NETWORK ELEMENTS TO THOSE HANDLING THE CUSTOMER-CARRIER INTERFACE. | THE FAX GATEWAY MAY BE IMPLEMENTED EITHER:<br>• ON THE CUSTOMER LAN; OR<br>• AS PART OF A PSTN GATEWAY IN THE CARRIER EDGE NODE.<br><br>IF THE FAX GATEWAY IS PROVIDED ON THE CUSTOMER SIDE OF THE NETWORK TERMINATING POINT, APART FOR BASIC SUPPORT FOR UDP/IP OR TCP/IP ROUTING AND LAN INTERCONNECT BY THE CARRIER NETWORK, THERE IS NO OTHER IMPACT. |

FIG. 76

| 3. NETWORK IMPLICATIONS - SIMPLE CONNECTIVITY NETWORK OPTION | | |
|---|---|---|
| THE ISSUES HERE ARE THE SAME AS FOR THE CARRIER GRADE EDGE NETWORK.<br><br>THE LAN INTERFACE FOR THIS SERVICE MAY BE LOCATED ON THE CUSTOMER ROUTER (E.G. CISCO 7500 SERIES). | THE SIMPLE CONNECTIVITY NETWORK SHOULD USE THE SAME SOLUTIONS AS THE CARRIER GRADE EDGE NETWORK EXCEPT THAT THE EDGE-SWITCH FUNCTIONALITY MAY BE IMPLEMENTED IN A CUSTOMER ROUTER (E.G. CISCO) 7500 SERIES RATHER THAN A CARRIER GRADE EDGE SWITCH. THIS MAY LEAD TO DETAILED IMPLEMENTATION DIFFERENCES DUE TO DIFFERENT REALIZATION STRATEGIES IN CUSTOMER AND CARRIER-GRADE NETWORK ELEMENTS. | THE SIMPLE CONNECTIVITY NETWORK SOLUTION MAY USE THE SAME PROTOCOL STRUCTURE AS THE CARRIER GRADE EDGE SOLUTION. THERE MAY, HOWEVER BE IMPLEMENTATION DIFFERENCES:<br>(A) THE ATM EDGE SWITCH MAY BE THE SAME NETWORK ELEMENT AS THE CUSTOMER ROUTER; AND<br>(B) THE QoS MECHANISM MAY BE MORE RESTRICTIVE BECAUSE OF LIMITED ATM IMPLEMENTATIONS IN CUSTOMER ROUTERS WHEN COMPARED WITH CARRIER GRADE EQUIPMENT. | THE FAX GATEWAY MAY MAP THE DIGITIZED FAX DATA INTO EITHER UDP/IP OR TCP/IP FORMAT.<br><br>THE ERROR CORRECTING FEATURES IN TCP/IP ARE PREFERABLE FOR THE STORE AND FORWARD FAX SERVICES. |

FIG. 77

| 4. REALIZATION OPTIONS | | | |
|---|---|---|---|
| VIRTUAL PRIVATE NETWORKS (LAN INTERCONNECT) | LEGACY SERVICE SUPPORT | VOICE OVER IP | FAX OVER IP |
| THERE ARE THREE POSSIBLE PROTOCOL COMBINATIONS FOR CARRYING IP OVER ATM:<br>• CIOA (CLASSICAL IP OVER ATM) IETF RFC 1483, 1577, 1755, 2022;<br>• LANE ATMF; AND<br>• MPOATMF.<br>THESE NEED TO BE CONSIDERED FOR APPLICABILITY DURING DETAILED DESIGN WITH RELATION TO COMPATIBILITY WITH EDGE SWITCH FUNCTIONALITY AND THE ATM TRANSPORT SERVICE PROVIDED BY C & W NETWORK. | LEASED LINE MAPPING TO ATM:<br>ATM ADAPTION LAYER AAL1 CLASS A, ITU-T I.363.1<br><br>FRAME RELAY INTERFACE AND MAPPING TO ATM COMPATIBLE WITH FRAME RELAY FORUM FRF SPECIFICATIONS AND ITU-T Q.922, I.233, I.555 RECOMMENDATIONS. | THE TERMINAL AND GATEWAY FUNCTIONALITY MAY BE COMPLIANT WITH ITU-T H.323.<br><br>THERE ARE THREE POSSIBLE PROTOCOL COMBINATIONS FOR CARRYING IP OVER ATM:<br>• CIOA (CLASSICAL IP OVER ATM) IETF RFC 1483, 1577, 1755, 2022;<br>• LANE ATMF; AND<br>• MPOATMF.<br>THESE NEED TO BE CONSIDERED FOR APPLICABILITY DURING DETAILED DESIGN WITH RELATION TO COMPATIBILITY WITH EDGE SWITCH FUNCTIONALITY AND THE ATM TRANSPORT SERVICE PROVIDED BY C & W (PVC ONLY).<br><br>DECISIONS HAVE TO BE MADE IN DETAILED DESIGN ABOUT THE MECHANISM FOR THE IMPLEMENTATION OF OVERALL QoS FUNCTIONALITY IN THIS NETWORK.<br>THERE ARE APPROACHES AT THE IP LEVEL E.G. RSVP PROTOCOL AS WELL AS THE GENERIC ATM LEVEL QoS FEATURES. IN ADDITION C & W MAY ONLY GUARANTEE SCR (SUSTAINABLE CELL RATE), PCR (PEAK CELL RATE) AND MAXIMUM BURST SIZE (MBS) WITHOUT ANY PARAMETER FOR THE LIMITATION OF DELAY WHICH IS KEY FOR VOICE TRAFFIC. | THE FAX GATEWAY MAY BE EITHER STANDALONE OR COMBINED WITH A VoIP GATEWAY. |

FIG. 78

| LEGEND: OBJECTIVE ◯: FULLY COMPLETE ◉: PARTIALLY COMPLETE ○: NOT ACHIEVED |

| OBJECTIVE | OPTION A | OPTION B | COMMENT |
|---|---|---|---|
| THE NETWORK WILL PROVIDE DATA CONNECTIVITY BETWEEN SITES. IT WILL ENABLE REMOTE DEMOS OF CAPABILITIES THAT ARE LOCATED IN SPECIFIC SITES (E.G. eCOMMERCE IN PALO ALTO, NETWORK CREATION TOOLS IN MINNEAPOLIS AND SOPHIA ANTIPOLIS) | ◯ | ◯ | BOTH OPTIONS FULLY ACHIEVE THIS OBJECTIVE (OPTION B FOR THIS OBJECTIVE IS EVEN OVERSIZED) |
| THE NETWORK WILL BE ABLE TO SUPPORT DEMOS OF A SPECIFIC PORTFOLIO OF ADVANCED IP SERVICES (E.G. VoIP, FAX OVER IP, IPVPN). THE NETWORK SHOULD PROVIDE A CERTAIN LEVEL OF QUALITY OF SERVICES (QOS) TO SUPPORT THESE ADVANCED IP SERVICES. | ◉ | ◯ | OPTION A WILL ONLY BE ABLE TO DEMONSTRATE CERTAIN CATEGORIES OF ADVANCED IP SERVICES (AS THE EDGE PLATFORM - CISCO MGX 8850 IS DESIGNED FOR THIS PURPOSE). THE IMPORTANT POINT IS THAT THIS SOLUTION ENABLES TO SIMULATE WHAT A SERVICE PROVIDER WOULD DO TO PROVIDE THIS TYPE OF SERVICES. THEREFORE IT WOULD DEMONSTRATE MORE CREDIBILITY TO POTENTIAL ANDERSEN CONSULTING CLIENTS. EVEN IF THE QOS OR THE SIGNALING RESTRICTIONS OF THE ATM BACKBONE PROVIDED BY C & W COULD LIMIT THE CAPACITY TO PROPERLY DEMO THOSE SERVICE PROVIDER CAPABILITIES, THE PROPOSITION TO HAVE TWO MGXs 8850 LOCATED IN THE SAME SITE AND INTERCONNECTED WITH OWNED LINKS OVERCOMES THIS LIMITATION (AS IT THEN OFFERS THE POSSIBILITY TO SIMULATE THE CORE NETWORK AND THUS TO CONTROL THE QOS AND TO IMPLEMENT THE SIGNALING FEATURES REQUIRED) |

FIG. 81A

| | | |
|---|---|---|
| THE NETWORK WILL ALLOW THE NETWORK CREATION (NC) CAPABILITY TO BE DEMONSTRATED IN A "LIVE ENVIRONMENT". THAT IS TO SAY THAT THE DATA FOR THE NC DEMONSTRATIONS WILL COME FROM A LIVE NETWORK AND NOT FROM A DATABASE OF DUMMY DATA. | ☺ | IN BOTH CASES, A LIVE ENVIRONMENT WOULD EXIST. THE ONLY IS THAT THE REAL NETWORK INFRASTRUCTURE THE NETWORK CREATION CAPABILITIES WOULD BE USING WOULD BE THE ONE OF A CARRIER GRADE IN CASE OF OPTION B AND JUST THE ONE OF A CORPORATE NETWORK IN CASE OF OPTION A. OPTION B WILL BE FAR MORE EFFECTIVE FOR THE DEMONSTRATION OF THE NETWORK CREATION CAPABILITY FOR SERVICE PROVIDER AND CARRIER CLIENTS. |
| THE NETWORK WILL ALLOW THE NETWORK ASSURANCE (NA) CAPABILITY TO BE DEMONSTRATED IN A "LIVE ENVIRONMENT". | ☺ | SAME REMARKS AS ABOVE, THE NETWORK ASSURANCE CAPABILITY IS MUCH BETTER DEMONSTRATED IN AN ENVIRONMENT THAT IS CARRIER GRADE. EVEN IF IT IS ASSUMED THAT DEMOS OF THIS CAPABILITY COULD BE EXECUTED IN BOTH ENVIRONMENTS. THE ONLY DIFFERENCE IS TO DEVELOP CREDIBILITY IN FRONT OF POTENTIAL CLIENTS. |
| THE NETWORK WILL ALLOW THE NETWORK PROVISIONING (NP) CAPABILITY TO BE DEMONSTRATED IN A "LIVE ENVIRONMENT". | ☺ | IT IS ASSUMED THAT ONLY PART OF THE FUNCTIONALITY OF THE NETWORK PROVISIONING CAPABILITY WOULD BE DEMONSTRATED IN OPTION A. WHEREAS OPTION B SEEMS TO PROVIDE THE KEY FEATURES (E.G. CAPABILITY OF THE EDGE PLATFORMS - MGX 8850) TO DEMONSTRATE THE NETWORK PROVISIONING CAPABILITY IN A REAL ENVIRONMENT. |

FIG. 81B

| Requirement | | Notes |
|---|---|---|
| THE NETWORK MUST RUN IP SESSIONS OVER ATM IN THE BACKBONE. | ⊖ / ⊛ | OPTION A WILL BE USING THE ATM NETWORK OF C & W FOR INTERCONNECTING THE NETWORK FABRIC SITES. BUT NO CONTROL ON THE ATM PART WILL BE ACHIEVED AS IT BELONGS TO C & W NETWORK. THE ACCESS ROUTER WOULD BE EQUIPPED WITH ATM INTERFACE AND THUS THE ONLY BENEFIT OF USING ATM IN THE BACKBONE WOULD BE TO HAVE A SCALABLE SOLUTION IN TERMS OF INTERCONNECTION BANDWIDTH AND WITH CERTAIN RESTRICTIONS A GUARANTEED QOS.  OPTION B WOULD PROVIDE A BETTER COVERAGE OF THE ATM PART SPECIFICALLY BECAUSE THE SOLUTION PROPOSED TO HAVE OWNED LINKS TO CONNECT THE 2 EDGE PLATFORMS (MGX 8850). THIS THEN ENABLES THE RUNNING OF ATM ON THIS LINK AND THUS ENABLES SIMULATION OF MORE ATM FEATURES THAT SERVICE PROVIDERS ARE LIKELY TO REQUIRE.  AS THE ATM CORE IS PROVIDED BY C & W, THIS IS NOT UNDER DIRECT CONTROL OF THE AC NETWORK MANAGEMENT CAPABILITY. |
| THE NETWORK MUST BE ROBUST ENOUGH TO BE USED AS A BEARER OF TELEWORKS SOLUTION CENTER CLIENTS. | ⊖ / ⊖ | BOTH OPTIONS COULD FULFIL THIS OBJECTIVE. THE ONLY RESTRICTION IS THAT ONLY THREE TELEWORKS SOLUTIONS CENTER WOULD BE CONNECTED BY THE NETWORK FABRIC (E.G: MADRID, MINNEAPOLIS AND SAN RAMON). IN SUCH A SITUATION THE NETWORK OPERATIONS (EVEN IF NOT IN THE SCOPE OF THE NETWORK FABRIC) SHOULD ALSO BE RECONSIDERED CAREFULLY AS BUSINESS DATA WOULD BE TRANSPORTED OVER THE NETWORK FABRIC INFRASTRUCTURES. |

FIG. 81C

| | | |
|---|---|---|
| THE NETWORK MUST BE ROBUST ENOUGH TO BE USED AS A BEARER OF "CLIENT MARKET TRIALS" OF NEXT GENERATION SERVICE. | ○ | OPTION A CANNOT BE CONSIDERED AS A BEARER OF "CLIENT MARKET TRIALS" AS IT BASICALLY FORMS A "CORPORATE NETWORK" AND THUS WOULD NOT BRING ANY ADDED VALUE TO THEM. <br><br> WHEREAS OPTION B WILL PROVIDE THE BASIC INFRASTRUCTURE (E.G. SERVICE PROVIDER NETWORK EDGE PLATFORM) TO SUPPORT MANY TYPE OF "CLIENT MARKET TRIALS". THE EDGE PLATFORMS OF OPTION B PROVIDE ENOUGH SERVICE FLEXIBILITY, IN OTHER WORDS IT IS ABLE TO ACCOMMODATE NEW SERVICES WITH SPEED AND HIGH SERVICE QUALITY. IP PLAYS A KEY ROLE IN THIS SERVICE FLEXIBILITY REQUIREMENT. MOST BUSINESS APPLICATIONS THAT DRIVE THE NEED FOR SERVICES ARE USING IP. AS BUSINESSES CONTINUE TO ASK THEIR SERVICE PROVIDERS TO TAKE ON MORE AND MORE "OUTSOURCED" FUNCTIONALITY, THEY LOOKED FOR VALUE ADDED SERVICES THAT COMPLEMENT AND ENHANCE THEIR IP APPLICATIONS. THEREFORE THE STRONG IP SUPPORT AT THE NETWORK EDGE REPRESENTS AN EXCELLENT ENVIRONMENT TO TEST THE NEXT GENERATION SERVICES. |

FIG. 81D

REMOTE DEMONSTRATION OF BUSINESS CAPABILITIES IN AN E-COMMERCE ENVIRONMENT

FIELD OF THE INVENTION

The present invention relates to remote demonstrations and more particularly to permitting remote demonstrations of business capabilities across a network.

BACKGROUND OF INVENTION

The current telecommunication service providers' networks reflect the architecture of the Public Switched Telephone Network (PSTN) network as it has evolved over the last 100 years. This is largely based on circuit switched technologies. Initially, all telecommunication services were offered via a wired infrastructure. As the user-base increased and requirements changed over the last few decades, new types of services were created e.g. wireless PSTN, cable video, multi-service (PSTN, video, satellite). The networks that supported these services were created as parallel networks, along-side the existing PSTN network. As technologies matured, there was some convergence (e.g. they shared the same SONET backbone) in the network architecture. During the late 1980s, with the explosion of data networking and Internet, data networking networks like frame relay and Asynchornous Transfer Mode (ATM) were developed, and later large internet based data networks were constructed in parallel with the existing PSTN infrastructure. These data networks again shared the PSTN infrastructure only at the SONET backbone layer. This state of current networks is called the existing "Core". Thus the "Core" network is a set of parallel networks; PSTN, wireless, satellite, cable, ATM, frame relay, IP. There is some interoperability between the services on these parallel network (e.g. PSTN, and wireless), but generally these networks are vertically integrated to provide distinct set of non-interoperable services.

Exponential growth in demand for Internet access and intranet services is driving the need for a communication infrastructure that can rapidly enable, transport, and guarantee performance for new communications services. This revolution is a result of a dramatic shift of customer preferences from products to services. Whether for financial transactions, home shopping, videoconferencing, phone calls, education or other data intensive applications, business and residential customers look to this "new world" infrastructure—the Next Generation Network—as a primary channel for service delivery.

Indeed, research indicates that data traffic will surpass voice by 10:1 within the next three to five years. Opportunities abound for communication service providers that can either reinvent their business models and service delivery capability or create new business ventures and solutions through alliances with high-tech, media and entertainment companies. Customer demands for new, innovative services, coupled with increasing competition and the blinding growth of the Internet and corporate intranets all create pressure to transform today's telecommunication networks on a global scale.

Communication service providers are favorably positioned to create the infrastructure necessary to support this demand. However, this dramatic convergence of telephony and data-centric technologies calls for radically new strategies to network design and deployment. This "new world" demands that communications companies transform their core network systems from voice-centric circuit-switched platforms to the packet-switched or New World Network.

While the infrastructure alone is essential to enabling this capability, it is also critical for companies to develop products and services that create incremental and sustainable differentiation—differentiation that is recognizable to customers. Just as important as the creation of the differentiation is the ability to convey such differentiation to customers. There is a pending need to present system capabilities to customers for sales purposes.

SUMMARY OF THE INVENTION

A system, method and article of manufacture are provided for demonstrating business capabilities in an e-commerce environment. Data connectivity is first provided between a plurality of sites on a network, which are located in distinct geographic locations. Demonstration data, which illustrates business capabilities of one of the sites, is then received from one of the sites. Thereafter, the demonstration data is organized in a demonstration format and transmitted over the network in the demonstration format to another of the sites.

In one embodiment, the demonstration data may be a business simulation. In another embodiment, the demonstration data may include a demonstration of product/service capabilities offered by one of the sites. Optionally, the demonstration data may be received in real time. Preferably, internet protocol services are supported including streaming audio, streaming video, facsimile transmission and receipt, and/or internet telephony. As an option, data connectivity may be provided between at least eight sites.

BRIEF DESCRIPTION OF THE DRAWINGS

The invention will be better understood when consideration is given to the following detailed description thereof. Such description makes reference to the annexed drawings wherein:

FIG. 1B-1 is a flowchart illustrating a Network Data Management process in accordance with a preferred embodiment of the present invention;

FIG. 1C-1 is a flowchart illustrating a Customer Interface Management Process in accordance with a preferred embodiment of the present invention;

FIG. 1D-1 is a flowchart illustrating a Customer Quality of Service Management Process in accordance with a preferred embodiment of the present invention;

FIG. 1E-1 is a flowchart illustrating a Service Quality Management Process in accordance with a preferred embodiment of the present invention;

FIG. 1F shows a block diagram of the Problem Handling Process in accordance with a preferred embodiment of the present invention;

FIG. 1F-1 is a flowchart illustrating a Problem Handling Management Process in accordance with a preferred embodiment of the present invention;

FIG. 1G-1 is a flowchart illustrating Rating and Discounting Process in accordance with a preferred embodiment of the present invention;

FIG. 1H-1 is a flowchart illustrating an Invoice and Collections Process in accordance with a preferred embodiment of the present invention;

FIGS. 4A and 4B collectively illustrate the Expanded Call Detail Record (ECDR) and Expanded Private Network Record (EPNR) call record formats in accordance with a preferred embodiment of the present invention;

FIG. 5 illustrates the Operator Service Record (OSR) and Private Operator Service Record (POSR) call record formats in accordance with a preferred embodiment of the present invention;

FIGS. 6A and 6B collectively illustrate the Expanded Operator Service Record (EOSR) and Expanded Private Operator Service Record (EPOSR) call record formats in accordance with a preferred embodiment of the present invention;

FIG. 7 illustrates the Switch Event Record (SER) call record format in accordance with a preferred embodiment of the present invention;

FIG. 51 illustrates an exemplary configuration of the Next Generation Network (NGN) Prototype;

FIG. 52 illustrates another exemplary configuration of the NGN Prototype in accordance with a preferred embodiment of the present invention;

FIG. 69 is a chart illustrating components of the NGN Business Simulator of the present invention;

FIG. 72 is a table containing an alternative solution evaluation matrix used to evaluate the pro's and con's of various alternatives at a high level by assigning comparative ratings to each area;

FIG. 75a is a table that illustrates network services based on client requirements;

FIG. 75b is a table that lists features of the network services;

FIG. 75c is a table that illustrates exemplary performance requirements for the services as well as listing exemplary service interfaces;

FIG. 76 is a table that discusses the network implications of selecting the carrier grade edge network option;

FIG. 77 is a table that examines the network implications of selecting the simple connectivity network option;

FIG. 78 is a table that illustrates options for various components of the network;

FIGS. 81a through 81d are tables summarizing the extent to which various objectives are achieved by each of the listed solutions.

DETAILED DESCRIPTION

Figure 1A:
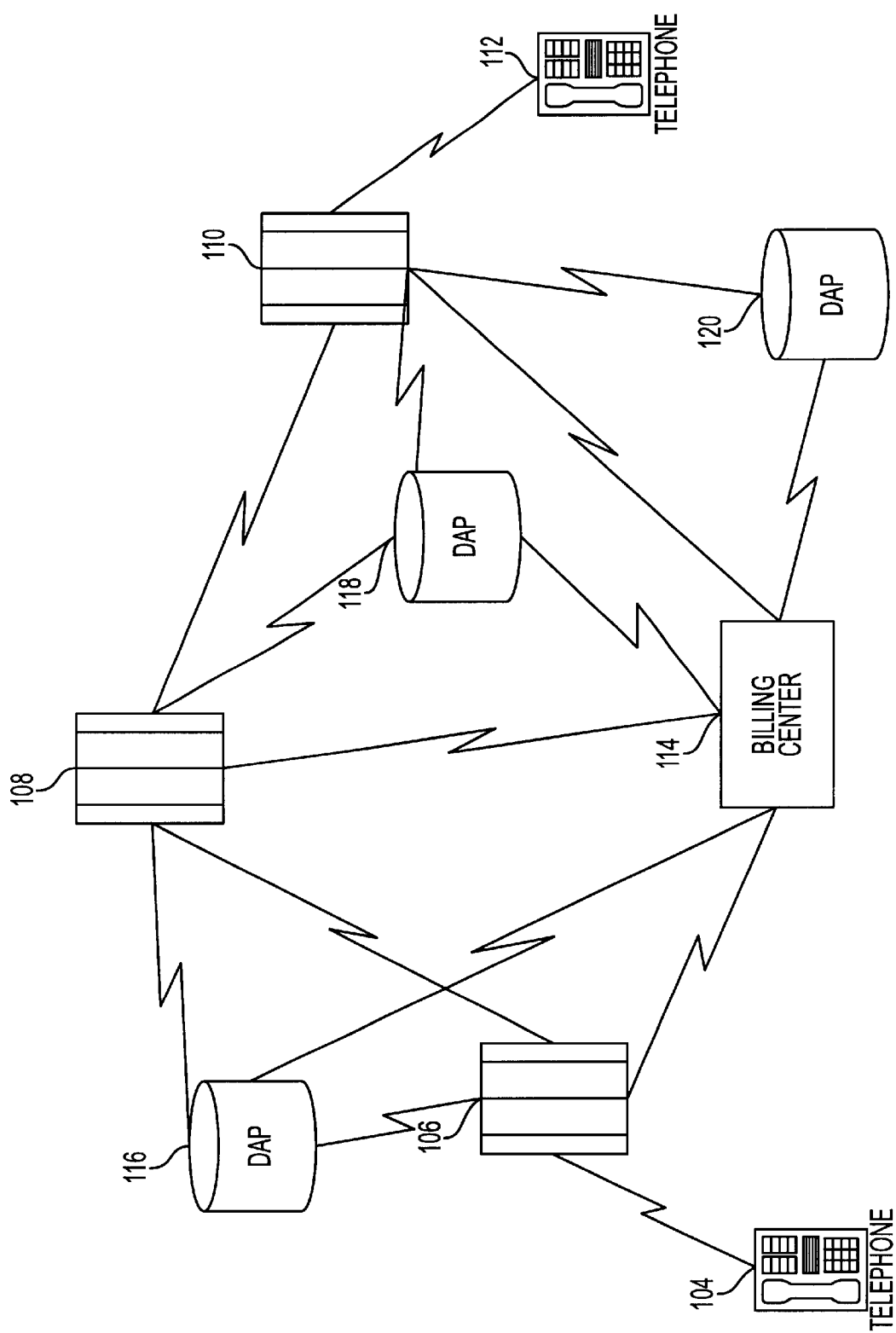
FIG. 1A is a block diagram of an exemplary telecommunications system in accordance with a preferred embodiment of the present invention.

In accordance with at least one embodiment of the present invention, a prototype network system is provided for demonstrating capabilities of a high speed broadband network. A description of the high speed broadband network is provided below, followed by a description of the prototype network, including a hardware implementation. Following discussion of the prototype network is a description of a business simulator especially adapted to illustrate business capabilities of the prototype and/or high speed broadband network.

High Speed Broadband Network

The following table is used to clarify terms used in the detailed description of the invention.

| | |
|---|---|
| AAA | Authentication, Authorization, Addressing |
| ADSL | Asymmetric Digital Subscriber Line |
| AIN | Advanced Intelligent Networks |
| AMA | Automatic Message Accounting |
| ATM | Asynchronous Transfer Mode |
| BIM | Business Integration Methodology |
| BSS | Business Support System |
| CDR | Call Detail Record |
| DTMF | Dual-Tone Multi-Frequency |
| GSM | Global System for Mobile Communications |
| IN | Intelligent Network |
| IP | Internet Protocol |
| JPEP | Joint Picture Expert Group |
| LMDS | Local Multi-Point Distribution Service |
| MPEG | Moving Picture Expert Group |
| NGN | Next Generation Network |
| OSS | Operational Support Systems |
| PCM | Pulse Code Modulation |
| PSTN | Public Switched Telephone Network |
| QoS | Quality of Service |
| RAS | Remote Access Server |
| SCE | Service Creation Environment |
| SCP | Service Control Point |
| SMDS | Switched Multi Megabit Data Service |
| SSP | Service Switching Point |
| SONET | Synchronous Optical Network |
| STP | Service Transfer Point |
| TCP | Transmission Control Protocol |
| xDSL | Generic name for Digital Subscriber Line |
| (D)WDM | (Dense) Wave Division Multiplexing |

In today's competitive communications market, keeping customers satisfied is no longer enough; winning customers away from the competition by offering the latest IP services and the lowest prices is now the name of the game. Communications service providers face two challenges as they prepare to enter the next century: (1) increased competition in their core markets and (2) a growing demand for network resources driven by high bandwidth, IP applications. The first requirement calls for service providers to reduce costs and optimize resources; the second requires them to invest in a new infrastructure and expand their service offerings. Reducing costs and increasing revenues are among the value propositions below that are offered by the Network Transformation market offerings.

Communications service providers can reconcile these seemingly conflicting requirements by transforming their networks into a new broadband, next generation network infrastructure. This intelligent, hybrid architecture which efficiently supports both circuit-switched (voice) and packet-switched (data) traffic enables service providers to launch many new broadband data services. Communications service providers can migrate services off their legacy network and consolidate and optimize these services and network resources onto one single packet-based network, thus lowering their costs and increasing the manageability of their overall network transformation. Network transformation may take on many faces.

Figure 1B:
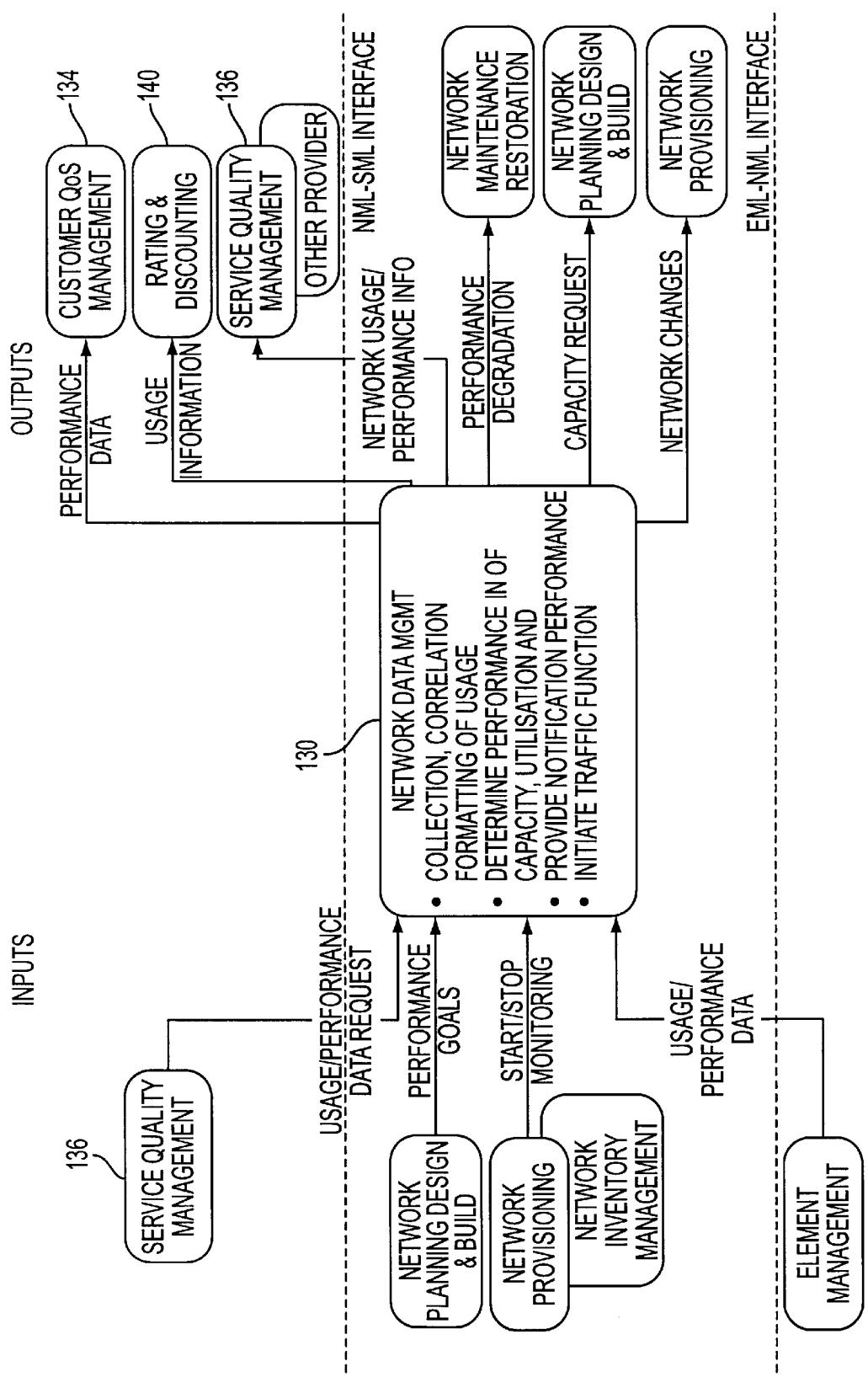
FIG. 1B shows a block diagram of the Network Data Management in accordance with a preferred embodiment of the present invention.
Figures 1, 1B:
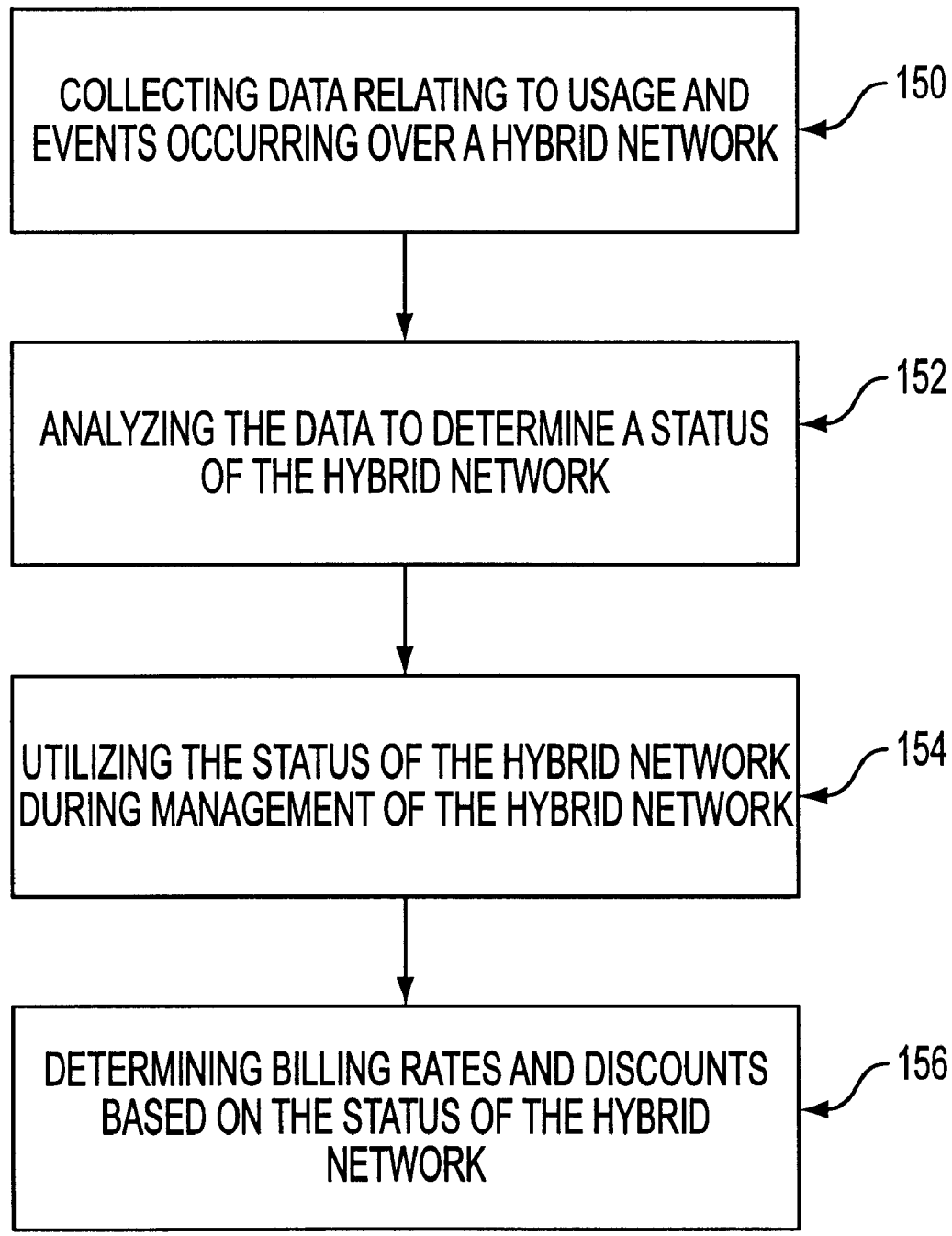

1. migration from a circuit-switched to packet-switched network
2. displacement of revenue generating voice services traditionally provided by wireline access by wireless service providers
3. emergence of new value added services over "application tone" versus today's ubiquitous dial tone
4. dependence of the end-customers' business strategy upon their subscribed network services
5. shift to more intelligent self service processes enabling customers to create and manage their own services FIG. 1 depicts how service providers and businesses can transform to meet these emerging trends in the telecommunications industry.

The telecommunications industry has by and large, proven to be a very profitable market for service providers and high tech vendors. The marketplace is changing. Growing competition and deregulation have broken down barriers and made markets easier to enter, and alternate service providers are emerging globally to take advantage of these lucrative opportunities. Customers' needs are also changing. Worldwide, people are exchanging e-mails, shopping over the Internet, accessing the World Wide Web, conducting video conferences and generally demanding bandwidth-intensive services for their applications. To remain competitive in such an environment, service providers must move away from yesterday's business of selling bandwidth and move towards selling new data services—and at competitive prices.

The change and development in the marketplace is affecting corporate networks as well. Corporations are extending their businesses across the globe using their networks as the vital link between their suppliers, regional offices and customers. Demand for intranets, extranets (intranets extended to privileged suppliers and customers), video conferencing and collaborative computing are pushing them beyond their capacity to manage the growth of their own networks.

Increasingly companies want to concentrate on building their business while letting communications service providers manage the complexities of networking and absorb the short depreciation periods on equipment. Communications service providers are seeing a rapidly growing market for managed network services that meet the enterprises' needs with an attractive price.

Despite the fierce competition and the new breed of customers, communications service providers are understandably determined to maintain significant market share. The traditional network infrastructure has served them well in the past. However, to meet the challenges of today and tomorrow they must transform their network infrastructure to a more robust and service independent broadband architecture. With this Next Generation Network, they will not only be able to offer comprehensive services in a more timely fashion, but they will also cut costs, increase profit margins and offer more competitively priced services to their customers. The value added services model (discussed below) confirms this.

The Network Transformation Implementing IP market offering has been created to aid service providers with the transformation of their network. Through use of the network, communications service providers will be to respond decisively to the new demands of the marketplace.

In fact, forward-looking communications service providers are already in the midst of seeking the network architecture of tomorrow. Traditional network architectures have served them well in the past, but to compete for the customer today—and even more so in the future—communications service providers will need to transform their current network to an intelligent, broadband Next Generation Network infrastructure.

Data networks today rely heavily on shared medium, packet-based LAN technologies for both access and backbone connections. The use of packet switching systems, such as bridges and routers, to connect these LANs into global internets is now widespread. An internet router must be capable of processing packets based on many different protocols, including IP, IPX, DECNET, AppleTALK, OSI, SNA and others. The complexities of building networks capable of switching packets around the world using these different protocols is challenging to both vendors and users.

Standards-based LAN systems work reasonably well at transfer rates up to about 100 Mbps. At transfer rates above 100 Mbps, providing the processing power required by a packet switch interconnecting a group of networks becomes economically unrealistic for the performance levels desired. This inability to economically "scale up" performance is beginning to cause restrictions in some user's planned network expansions. Also, today's data networks do not provide network managers with enough control over bandwidth allocation and user access.

Tomorrow's networks are expected to support "multimedia" applications with their much greater bandwidth and real-time delivery requirements. The next generation networks should also have the ability to dynamically reconfigure the network so that it can guarantee a predetermined amount of bandwidth for the requested quality of service (QOS). This includes providing access, performance, fault tolerance and security between any specified set of end systems as directed by the network's manager. The concept is to provide network managers with complete "command and control" over the entire network's infrastructure—not just tell them when a failure has occurred.

A new set of technologies known as asynchronous transfer mode (ATM) may provide the best, long-term solution for implementing the requirements of both private and public internets. ATM promises to provide a more economical and scalable set of technologies for implementing the ultra-high-performance information networks that will be required to provide the quality of service users will demand. Thus, over the next 20 years, the network infrastructure may change from packet-based standards to one based on ATM cell switching. While changes in the accompanying network will be dramatic, it would be desirable for users making the transition to be able to retain their most recent equipment investment.

Another expected change in tomorrow's networks is a change in data flow. Data flow in today's network typically follows the client-server computing model. This is where many clients are all transferring data into and out of one or more network servers. Clients do not normally talk to each other; they share data by using the server. While this type of data exchange will continue, much more of the information flow in tomorrow's networks will be peer-to-peer. Since the ultimate goal is a truly distributed computing environment where all systems act as both the client and server, more of the data flow will follow a peer-to-peer model. The network will be required to provide more direct access to all peers wishing to use high-performance backbone internets connecting, for example, the desktop computers.

The bulk of information transported in the future will be of digital origin. This digital information will require a great deal more bandwidth than today's separate voice, fax, and SNA networks which operate with acceptable performance using voice grade telephone lines. Voice will shrink as a percentage of total traffic, while other forms of information including image and video will greatly increase. Even when compressing is available, the bandwidth requirements for both inside and outside building networks will need to be greatly expanded.

Text files and images can be sent over existing packet-based networks because the delivery of this information is not time critical. The new traffic (voice and video) is delivery time sensitive—variable or excessive latency will degrade the quality of service and can render this information worthless.

The usefulness of packet switching networks for the transmission of digital information, particularly burst type information, has long been recognized. Such networks are generally point-to-point in nature in that a packet from a single source is directed to a single destination by an address attached to the packet. The network responds to the packet address by connecting the packet to the appropriate destination.

Packet switching networks are also used which combine burst type data with the more continuous types of information such as voice, high quality audio, and motion video. Commercialization of voice, video and audio transmission makes it desirable to be able to connect packets to multiple destinations, called packet broadcasting. For example, a broadcast video service such as pay-per-view television involves a single source of video packets, each of which is directed to multiple video receivers. Similarly, conferencing capabilities for voice communication also require single source to multiple destination transmission.

One prior packet broadcast arrangement comprises a network consisting of a packet duplication arrangement followed by a packet routing arrangement. As a broadcast packet enters this network, packet copies are made in the packet duplicating arrangement until as many copies exist as there are destinations for the packet. A translation table look up is then performed at the duplication arrangement outputs for each of the packet copies to provide a different, single destination address for each copy. All of the packet copies with their new packet addresses are then applied to the packet routing arrangement, which connects them to the appropriate network output ports.

In packet switching networks, packets in the form of units of data are transmitted from a source—such as a user terminal, computer, application program within a computer, or other data handling or data communication device—to a destination, which may be simply another data handling or data communication device of the same character. The devices themselves typically are referred to as users, in the context of the network. Blocks or frames of data are transmitted over a link along a path between nodes of the network. Each block consists of a packet together with control information in the form of a header and a trailer which are added to the packet as it exits the respective node. The header typically contains, in addition to the destination address field, a number of subfields such as operation code, source address, sequence number, and length code. The trailer is typically a technique for generating redundancy checks, such as a cyclic redundancy code for detecting errors. At the other end of the link, the receiving node strips off the control information, performs the required synchronization and error detection, and reinserts the control information onto the departing packet.

Packet switching arose, in part, to fulfill the need for low cost data communications in networks developed to allow access to host computers. Special purpose computers designated as communication processors have been developed to offload the communication handling tasks which were formerly required of the host. The communication processor is adapted to interface with the host and to route packets along the network; consequently, such a processor is often simply called a packet switch. Data concentrators have also been developed to interface with hosts and to route packets along the network. In essence, data concentrators serve to switch a number of lightly used links onto a smaller number of more heavily used links. They are often used in conjunction with, and ahead of, the packet switch.

In virtual circuit (VC) or connection-oriented transmission, packet-switched data transmission is accomplished via predetermined end-to-end paths through the network, in which user packets associated with a great number of users share link and switch facilities as the packets travel over the network. The packets may require storage at nodes between transmission links of the network until they may be forwarded along the respective outgoing link for the overall path. In connectionless transmission, another mode of packet-switched data transmission, no initial connection is required for a data path through the network. In this mode, individual datagrams carrying a destination address are routed through the network from source to destination via intermediate nodes, and do not necessarily arrive in the order in which they were transmitted.

The widely-used Telenet public packet switching network routes data using a two-level hierarchy. The hierarchy comprises a long distance-spanning backbone network with a multiplicity of nodes or hubs, each of which utilizes a cluster of backbone switches; and smaller geographic area networks with backbone trunks, access lines and clustered lower level switches connected to each hub. Packet-switched data is transmitted through the network via VCs, using CCITT (International Telegraph and Telephone Consultative Committee of the International Telecommunications Union) X.75 protocol, which is a compatible enhancement of X.25 protocol.

For a communication session to proceed between the parties to a connection, it is essential that data be presented in a form that can be recognized and manipulated. The sequence of required tasks at each end, such as the format of the data delivered to a party, the rate of delivery of the data, and resequencing of packets received out of order, is generally handled in an organized manner using layered communication architectures. Such architectures address the two portions of the communications problem, one being that the delivery of data by an end user to the communication network should be such that the data arriving at the destination is correct and timely, and the other being that the delivered data must be recognizable and in proper form for use. These two portions are handled by protocols, or standard conventions for communication intelligently, the first by network protocols and the second by higher level protocols. Each of these protocols has a series of layers. Examples of layered architectures include the Systems Network Architecture (SNA) developed by IBM, and the subsequently developed Open Systems Interconnection (OSI) reference model. The latter has seven layers, three of which are network services oriented including physical, data link, and network layers, and the other four providing services to the end user by means of transport, session, presentation, and application layers, from lowest to highest layer.

X.25 is an interface organized as a three-layered architecture for connecting data terminals, computers, and other user systems or devices, generally refereed to as data terminal equipment (DTE), to a packet-switched network through data circuit terminating equipment (DCE) utilized to control the DTE's access to the network. The three layers of the X.25 interface architecture are the physical level, the frame level and the packet level. Although data communication between DCEs of the network is routinely handled by the network operator typically using techniques other than X.25, communication between the individual user system and the respective DCE with which it interfaces to the network is governed by the X.25 or similar protocol. In essence, X.25 establishes procedures for congestion control among users, as well as call setup (or connect) and call clearing (or disconnect) for individual users, handling of errors, and various other packet transmission services within the DTE-DCE interface.

X.25 is employed for virtual circuit (VC) connections, including the call setup, data transfer, and call clearing phases. Call setup between DTEs connected to the network is established by one DTE issuing an X.25 call-request packet to the related DCE, the packet containing the channel number for the logical connections, the calling and called DTE addresses, parameters specifying the call characteristics, and the data. The destination DCE issues an incoming call packet, which is of the same general format as the call-request packet, to the destination DTE, the latter replying with a call-accepted packet. In response, the calling DCE issues a call-connected packet to its related DTE. At that point the call is established and the data transfer phase may begin by delivery of data packets. When the call is compared, i.e., the session is to end, a call-clearing procedure is initiated.

Prospective routing paths in the network are initially determined by a network control center, which then transmits these predetermined paths to the backbone switches as routing tables consisting of primary and secondary choices of available links from each hub. The secondary choices are viable only in the event of primary link failures, and the specific secondary link selection is a local decision at the respective hub based principally on current or recent traffic congestion patterns. The unavailability of an outgoing link from a hub at the time of the call setup effects a clearing back of the VC for the sought call to the preceding hub. An alternative link is then selected by that hub, or, if none is available there, the VC circuit is again cleared back to the next preceding hub, and so forth, until an available path is uncovered from the routing tables. Messages concerning link and/or hub failures are communicated immediately to the network control center, and that information is dispatched to the rest of the network by the center.

In typical present-day concentrators and packet switches, the data processing devices reside in a plurality of cards or boards containing printed circuits or integrated circuits for performing the various functions of the respective device in combination with the system software. Typically, the cards are inserted into designated slots in cages within a console, with backplane access to a data bus for communication with one another or to other devices in the network. The VME bus is presently the most popular $16/32$-bit backplane bus. References from time to time herein to cards or boards will be understood to mean the various devices embodied in such cards or boards.

Many public data networks (PDNs) offer little or no security for communications between users and hosts or other data processing devices within the network, in keeping with the "public purpose" of the network and the desire for accessibility by a large number of actual and prospective users. Where restrictions on access are necessary or desirable, it is customary to assign each authorized user an identification (ID) number or a password, or both, which must be used to gain access to the host. More elaborate security measures are necessary where access may be had to highly confidential data.

Some data communication networks involve a variety of different customers each of whom makes available a host and one or more databases to its users, and may place a level of security on its database which differs from the level placed by other customers on their respective hosts and databases. In those instances, it is customary to make the host responsible for security and access to itself and its associated database. Thus, a user might have access to certain destinations in the network without restriction, but no access to other destinations.

Market Drivers

According to Yankee Group Research, network management costs continue to increase, with network managers spending an average of 45 percent of their budget on ongoing network management, 20 percent on equipment, and 35 percent on network transport services. It is a constant battle to reduce these costs yet somehow improve overall service to their customers. Reducing overall network management costs can be very difficult in today's business environment. Networks continue to become more complex, with more and more demands being placed on the network managers and planners. For example, the exponential growth of remote access has made their jobs more difficult, as the requirement to establish and manage connections for remote offices and telecommuters is often required without additional personnel or budget resources. Unfortunately, network managers and planners spend so much time in "firefighting" mode, trying to support their complex networks, that very little time is actually spent planning for network growth and enhancements. Combined with this is the fact that it is becoming difficult to keep highly skilled employees given the demand for certain skills in the marketplace, and the premiums that will be paid for those skills. So, what is a network manager to do? More and more, they are looking outside for help.

The market for customer network management services is generally referred to as Managed Networked Services (MNS). Yankee Group estimates this market is estimated to grow from $3B to 9B within the next three years. MNS became the focus of service providers in 1995 as they saw revenues for frame relay network services double for two years in a row. What began as a way to boost the popularity of frame relay services by offering to lease and manage routers has blossomed into a diverse set of services that are now closer to those associated with outsourcing. Yankee Group research shows that 37 percent of Fortune 1000 managers are already outsourcing or plan to outsource their ongoing network operations management. In addition, it is the communications provider that is thought of as the most likely provider for one-stop shopping services.

The present invention's overall approach to implementing the NM/MNS market offering is two fold. The current opportunity that presents itself is MNS. While this market opportunity for clients is large, they need assistance in understanding data network management—for years they have been solely focused on voice. Additionally, they need to move into this market quickly in order to maintain and grow revenue. To this end, the present invention includes a set of assets consisting primarily of job aids and software that can greatly reduce the clients' lead time for service implementation.

Secondly, the present invention assists service providers by providing them the tools to better manage their carrier data networks—the packet switched networks of the future. The present invention significantly enhances and scales MNS assets to address carrier network management in a data networking world. This solution template enables the convergence of circuit and packet switching network control centers and workforces.

The present invention's market offering suggests companies take a graduated approach to delivering MNS. One end of the continuum consists of MNS for current network services, including leased lines, frame relay, and X.25. On the far end is outsourced MNS characterized by long-term contracts, involving hundreds of millions of dollars. The NM/MNS market offering is proposing that the companies go beyond the management of the router and the WAN, and into the world of the local area network (LAN), even as far as the desktop and business applications. Service providers have been intimidated by these propositions in the past, since management of the LAN and its equipment and applications has clearly not been their forté.

It is hard to describe a typical MNS engagement because this is such a new. There are three "entry points" in which the present invention can become involved in helping companies to move into the MNS market:

Business Strategy—Companies may look to the present invention for assistance in creating a business strategy for entering the MNS market. Typically, this type of engagement will defines a company's target market for MNS (small, mid-market, large) and defines the service offerings that are best suited for the company to offer. These engagements will be followed by analysis, design and implementation projects.

Requirements Analysis—Companies may already have developed a concrete business strategy that defines which services they will offer within markets. In this case, the present invention's work will begin by helping define the company's network environment requirements. This work will be followed by design and implementation projects.

Design and Implementation—Companies may be ready to move to the design and implementation phases of creating an MNS capability.

Generally, the present invention will confirm that their network meets the requirements to provide the service, then assist the client in the designing and implementing an appropriate solution suite.

In an effort to clearly communicate exactly how to define NM/MNS an online catalog of services has been created. The present invention's solution is a continuous cycle that begins with the four major processes associated with NM/MNS. These processes drive the technology and the people components of the solution. Within each of these processes are a number of core functions and sub-functions. The MNS Online Catalog contains all of this information, including the supporting process, technology and organizational solutions for each function.

One solution is called the Managed Networked Services Integrated Solution (MNSIS) and has been developed using an approach which integrates Process, Technology, and People considerations.
Process
At the highest level, there are four major processes that must be performed to manage any network:
Service Planning
Managing Change
Operations Management
Service Management Each process should be performed in order to provide a complete NM/MNS solution. As mentioned above, each process has a number of associated functions and sub-functions that provide the complete picture of the process. The major functions associated with each process are as follows.
Technology The main goal of the technology solution is to provide access to network information to make informed decisions. The present invention includes three layers of management: element management, information services management and presentation management. Every action starts with an incident. Processing is tailored to handling the incident with technology that responds to the unique characteristics of each incident.

Element Manager

The element manager communicates with the network elements to receive alarms and alerts through trapping and polling techniques. The element manager is the layer where the primary data reduction functions reside. At this layer, events received at the element manager will be filtered, aggregated and correlated to further isolate problems within the network. Information that is deemed critical to monitor and manage the network is translated into a standard object format and forwarded to the Information Services Manager. An element manager can be, but is not necessarily, software which adheres to open standards such as the Simple Network Management Protocol (SNMP) and the Object Management Group's (OMG) Common Object Request Broker Architecture (CORBA).

Information Services Manager

The information services manager provides the data management and data communications between element managers and presentation managers. All information forwarded from the element managers is utilized by the information services manager to provide information to the network operators. The information services manager adheres to CORBA standards to provide ubiquitous information access via an Object Request Broker (ORB). The ORB allows the information services manager to share management information stored in distributed databases.

The information services manager stores critical management information into operational (real-time) and analytical (historical) distributed databases. These databases provide common data storage so that new products can be easily inserted into the management environment. For example, if an event is received at an element manager that is deemed critical to display to a network user, the information services manager will store a copy of the alarm in the operational database and then forward the alarm to the appropriate network operator.

Media and textual databases are also provided by the information services manager. The databases includes online manuals for administrative purposes, as well as for the maintenance specialists to access element specific information. The databases also provide procedures, policies and computer based training to network users.

The information services manager provides requested information (real-time and historical) to the network users via the presentation manager.

Presentation Manager

The presentation manager performs the function its name implies: the presentation of the information to an end user. Because different locations and job functions require access to different types of information, there are at least two types of display methods. The first is for graphic intensive presentations and the second is for nomadic use, such as field technicians. The first environment requires a graphic intensive display, such as those provided by X-Windows/MOTIF. The second environment is potentially bandwidth poor where dial-up or wireless access may be used along with more traditional LAN access. This is also where browser technology is employed.
People The people vision for the NM/MNS include an organization model for customer service support, the corresponding roles and responsibilities for this organization model and a conceptual design for workforce transformation to packet switching.

Customer Service Support

Customer service support provides a single point of contact that is customer focused. This single point of contact provides technical expertise in resolving customer incidents, troubles and requests. Generally a three tiered support structure is optimal for satisfying customer service needs. Each tier, or level, possesses an increasing level of skill, with tasks and responsibilities distributed accordingly. Such a structure is as follows:

Tier 1—typically has a broad set of technical skills and is the first level of support to the customer. Typically this group is responsible for resolving 60–70 percent of the opened problems.

Tier 2—are technical experts and field support personnel who may specialize in specific areas. Typically this group is responsible for resolving 30–40 percent of the opened problems.

Tier 3—are considered solution experts and often consist of hardware vendors, software vendors or custom application development/maintenance teams (in-depth skills needed to investigate and resolve difficult problems within their area of expertise). They are the last resort for solving the most difficult problems. Typically this group is responsible for resolving 5 percent or fewer of the opened problems.

The above model is generally referred to as the Skilled Model because personnel at all three tiers are highly skilled. This model generally creates a high percentage of calls resolved on the first call. Other approaches include:

Functional Model

In this model, users are requested to contact different areas (via VRU) depending on the nature of the incident. Calls are routed to the customer support representative best able to handle the call. This model can easily be coupled with the Skilled Model, and has been at previous client engagements.

Bypass Model

In this model, Tier 1 only logs calls, they do not resolve calls. One advantage of this model is that skilled resources don't have to waste time logging calls.
Software and Assets Managed Networked Services Integrated Solution—The integrated network management solution template consists of a suite of best of breed third party software products that automate problem diagnosis, notification, custom-developed reporting, and IP services monitoring.

Web-Based SLA Reporting Tool—is a browser based tool that provides the personalized SLA reports to customers in both a template and ad-hoc format.

Data Mining Demonstration—Provides the capability to analyze network management data looking for patterns and correlations across multiple dimensions. Build models of the behavior of the data in order to predict future growth or problems and facilitate managing the network in a proactive, yet cost-effective manner.

Customer to Event Mapping Module—Add-on module to the Managed Networked Services Integrated Solution which maps network element events, to service offerings, to customers. This tool allows the Customer Service Representative to proactively address network outages with customers.

Process Definitions and Functions

Service Planning

Service Planning includes both the strategic and tactical planning required to manage distributed environments effectively. Although most planning typically occurs during roll-out of the system, certain planning activities must otherwise take place. Service Planning ensures that change can be successfully controlled and implemented.

Service Management Planning

Operations Management Planning

Managing Change Planning

Strategic Planning

Managing Change

Includes processes and procedures for handling necessary changes to systems or the organization in a distributed environment.

Change Control

Testing

Implementing

Software Distribution

Operations Management

Systems Management consists of the day-to-day operational functions required to maintain the system (e.g. fault detection/correction, security management and performance management).

Production Control

Monitoring and Control

Fault Management

Security Management

Service Management

Service Management controls the overall service to the users of the system. It isolates users from how the system is managed, and ensures that users receive the quality support services they need to carry out their daily business activities.

SLA/OLA Management

Help Desk

Quality Management

Billing and Accounting

The present invention includes a system, method, and article of manufacture for providing a hybrid circuit switched/packet switched network. This hybrid network is used as a transitioning network to transition from old "Core" network architectures to "New Core" networks. In the present description, the details of the NGN transitioning network will first be set forth after which details relating to specific billing aspects of the present invention will be described.

PSTN, wireless, and cable networks have continued to grow at their organic rates determined by the growth of the vertical services they were providing. In the beginning, the data networks used a small portion of the backbone SONET bandwidth, while PSTN was still the dominant bandwidth user. Due to the exponential growth in IP traffic, the IP based data networks are soon slated to utilize more bandwidth than the PSTN. Also huge technical advances in packet technologies have made it possible to carry traditional voice over IP networks. This has started a move towards the "Next Generation Network (NGN)" where there will be more sharing of common network infrastructure to provide services, and these services will start to become more interoperable. The main thrust of technologies in the "NGN" will be to provide interoperability between the new packet based infrastructure and existing legacy infrastructures. Due to the large investments made in the legacy infrastructure, they will continue to exist for some time, but most new innovations will occur on the packet based infrastructure. Slowly, the parallel networks that were created to serve distinct services will merge to use a common packet based backbone and only differ in how access is provided (wire-line, wireless, cable, satellite). The "NGN" is a transition network which will exist during the transformation from the current "Core" to the "New Core".

As packet technologies continue to develop rapidly, it will be possible to support what was once a distinct set of services (voice, video, wireless) on separate parallel networks, on one integrated packet based network. There will still be separate access technologies (wireless, satellite, cable, wire-line) to access these services, but the access networks will all use a common "New Core" network and its capabilities. The services will be interoperable across various access technologies, and users will freely use services that cross many access technologies, e.g. wireless to cable phone services, web browsing from wireless devices etc.

The present invention maps a course for the network evolution from circuit to packet switched technology using a migratory approach in which the network becomes a hybrid circuit and packet topology over a 3 to 7 year period.

Next, the network architecture for the wire-line network as it transforms from "Core" to "NGN" to "New Core" will be described. Followed by architecture for cable, wireless and satellite based access networks.

The Wire-line Network Architecture

"Core" Network Architecture

The current wire-line "Core" network consists of parallel PSTN, SMDS, ATM, Frame-Relay, B/PRI and IP networks. The PSTN network has been evolving over the last century and is a mix of old and new circuit switched technologies. The PSTN network mainly provides point-to-point interactive two-way voice communication services. The service set has evolved to include many intelligent network (IN) service features. During the late 1980s, Advanced Intelligent Networks (AIN) emerged as the architecture to support new voice based services on the PSTN infrastructure.

IN requirements and architecture in the current "Core"

The major IN requirements include session establishment, advanced call processing, call routing and call treatment (network messages and call termination). Examples of applications and features are the CLASS family of services (Call waiting, Call forwarding, Conference calling, Call rejection), enhanced call routing, Number Portability, Calling Card Services, and Audio delivered Information Services (e.g. travel, stocks and weather).

These IN capabilities are enabled by devices such as SCP, STP, SSP and EIP in the AIN environment. These devices participate in the execution and completion of an IN service. In order to develop, test and launch new IN service applications on the above mentioned components, service providers deploy Service Creation Environment (SCE) platforms, which provide an environment to quickly create new IN services. These SCE platforms are closely tied to the runtime environment and therefore with very few exceptions become a major undertaking and a complex coordination effort to launch a new or modified IN service in the "Core" network environment.

Data networks in the "Core"

While the PSTN was growing in feature functionality as well as traffic demand, new data networks have been created to support the inter-networking of computing devices. These data networks provide interconnection to geographically dispersed computing devices at varying levels of transmission bandwidth (e.g. 56/64K, T-1/E-1, T-3/E-3, OC-3/STM-1). The data networks consist of many technologies e.g. SMDS, ATM, frame-relay and IP. In some cases, these data networks themselves are parallel networks, in other cases, they share a common technology in the backbone (e.g. ATM can be the backbone for frame relay and IP data networks). These data networks share the same SONET based backbone with the PSTN network. The services on the PSTN and the data networks are very distinct and non-interoperable (example: voice versus web access).

With the rapid explosion of the Internet, and innovation in packet based technologies, the IP based data network has become the dominant network in terms of user traffic, and its growth is slated to continue exponentially. This phenomenon has created a dilemma for traffic planners and engineers of the Core network. They have seen traffic grow on the access portions of their networks (PSTN) but have realized very little financial benefits from this usage because third party service providers have been the termination point of these internet data users. The incumbents have began to devise intelligent network solutions for this data traffic (example RAS with SS7 gateway) in order to solve two major challenges: 1) off loading data traffic from the voice infrastructure to alleviate the congestion issues that face traditional voice customers and 2) collecting revenues from the third party data services providers (ISP's) for access and routing callers to their Points Of Presence.

Due to the high growth in IP and other data services, many new service providers have emerged that are building only IP based data networks, and provide only IP based data services. Their business strategy is to continue to ride the technological innovation of IP and packet based technologies and build complete suites of services on a packet based infrastructure. Because they are investing in only one form of network (as opposed to many parallel networks ), their unit cost of services is low, they are not encumbered by legacy networks and systems, and they can provide cheaper and better services to customers; hence they pose a significant threat to incumbent telecom service providers.

"Next Generation Network" Architecture

As packet based technologies continue to develop and provide the services that were only available on other networks (e.g. PSTN, cable), and new (green field) service providers continue to exploit their advantage, it has become necessary for many incumbent service providers to transition their "Core" network to the "Next Generation Network", where they can share the rapid technical advantages of packet technologies, and improve their cost structure, and at the same time offer new services on the "Next Generation Network".

New IP based services in the "NGN"

While there are components in the NGN that ensure interoperability between "NGN" and PSTN, there are also a huge new set of new services that are built entirely on the NGN components which is provide feature rich multimedia (voice, video, data) based communication services as well as enabling many eCommerce services enabled by IP technologies. These components (described later in detail) include directories, policies, user authentication, registration, and encryption. These components enable services like integrated messaging, multimedia conversations, on-demand multi-point conference, enhanced security & authentication, various classes of media transport services, numerous automations in electronic internet commerce activities e.g. banking, shopping, customer care, education, etc. As the NGN matures third party value added service providers will develop IP based services that will combine applications such as electronic commerce (procurement, warehousing, distribution and fulfillment) as well as online banking to present the consumer with an integrated boundless shopping experience.

Growth of bandwidth in the "NGN"

In addition to new service features, the NGN also employs the use of new wire-line broadband access technologies, notably xDSL. Traditional wire-line access technologies will continue to be deployed at higher and higher speeds; wire-line access will move from predominantly T-1 speeds to T-3 and OC-n speeds. These new broadband access technologies will increase the need for higher bandwidth in "NGN" core. The "NGN" core continues to use a SONET backbone, but will gradually move to using (D)WDM technologies to provide the bandwidth required to support broadband access.

New and emerging technologies such as Giga-Bit Ethernet and Wire Speed IP may find their way to the network backbone, but not until Giga-bit Ethernet technology matures to handle a wide array of network services such as connection oriented circuit emulation. The use of Wire Speed IP technology is suitable for an enterprise network but lacks the robustness and scalability needed for carrier grade backbones. For this reason, there will always be a need for ATM in the backbone.

The architecture in the "NGN" provides seamless interoperability of services between the packet based network and the traditional PSTN. New "NGN" packet based capabilities will be developed to support AIN type features, while inter-operating with legacy PSTN/ISS7/AIN. Large scale innovation in the IP based IN type capabilities (e.g. global number transparency, utilization of web based information, rich media communications) will create new services for IP enabled communication devices. Innovations on the PSTN will occur slowly, and may be restricted to maintaining interoperability of legacy PSTN with "NGN". In many cases, legacy PSTN components (e.g. SSP, SCP) will continue to evolve so that they can use common IP based packet switching technologies (e.g. IP, TCP, UDP), as opposed to using existing circuit switched technologies (e.g. MTP).

IN requirements and architecture in the Next Generation Network (NGN

Given the huge revenues and global nature of PSTN services, as well as their use of SS7 and AIN technologies, components that allow interoperability between "NGN" and PSTN will need to be developed. These will include IP/PSTN Gateways, IP/PSTN address translators, IP/SS7 Gateways, IP enabled SSP's, and IP based Intelligent Peripherals. In addition to IN enablers, new components (as will be describe later) with features like directories, policies, user authentication, registration, session encryption, etc. will also be developed to enhance the IN capabilities. The NGN-IN enablers will provide the next level of intelligence in order to address communication over mixed media types, control of multiple session characteristics, collaborative communications needs, ubiquitous network access, "any to any" communications, and multimedia delivered information services. Note that these "NGN" components will continue to evolve to provide similar and enhanced capabilities in the "New Core".

The following provides a description of new components in the "NGN" and the "New Core" that provide enhanced IP based services. The Intelligent IP (I²P) Network enablers are categorized as follows:

Session Control (Bandwidth, Switching and Routing)
Media Control (Call Treatment such as media conversion)
Policy Management (Directory, Access control, Security)
Bandwidth Management (Transport and real time restoration)

The components for the "NGN" are described as individual functional units but may be combined for practicality on individual network devices as the requirements dictate. These components have been designed to operate in a distributed network environment to increase the flexibility of the NGN and New Core. The architecture provides a robust, secure and isolated messaging infrastructure for delivering control plane information to these devices.

This infrastructure includes a well defined message set for accessing the functions that are provided by these components and data that resides in the rules database. The control plane architecture is efficient and has a unique mechanism for sharing service, user and control data without duplication. This permits mobile NGN service users to maintain the same experience and have access to the same information regardless of where or how they access the network.

Example: Assuming a US based NGN service user was roaming in Europe and wanted to access the network but has the use of specific calling information stored in his profile database in the US, how would such a challenge be overcome without replicating the user's data onto every rules database on the NGN to ensure that the user would not be denied access to features and services which the user typically subscribed. Obviously, storing or replicating this data and then managing synchronicity over a worldwide network would be process intensive, costly and cumbersome. This intelligent network architecture addresses these issues efficiently with mechanisms that make remote data available locally for the duration of a session and then caches the information in short term non-volatile memory not in the foreign rules database server. In other words although a user's profile may be physically stored in a Rules database in the United States, the user may access the network from Europe and be automatically granted access to the specific services and features that normally would be available during his US service experience. The remote session controller in Europe would communicate with the cross network location register and rules database server to identify the subscriber's "home" rules database in order to collect the policies and profile of the subscriber for use in Europe; this is done by using the inter device message sets (command and control) over the control plane sub network. Unlike other mechanisms often employed, this mechanism does not replicate this information onto the local (European) rules database, making long term control data management predictable. The design is CORBA compliant and therefore can be interconnected with other standards based networks.

Rules Database server
 Determines Subscriber Profile
 Session requirements such as Bandwidth, Quality Of Service, Class Of Service
 Routing preferences based on Priority, Cost, Termination Location
 Media and Application requirements (Voice Telephone to Video Telephone, Multi-point, text to speech, Fax to E-mail etc.)
 Content Separation (Example: Tells the intelligent peripheral and protocol converter to separate the Audio stream from the data and video stream on an H.32x call; It may also instruct the protocol converter to process the stream so as to enable this audio stream to be fed to a destination which supports traditional analog voice hence the G.728/9 content from the H.32x session would be converted first to AD/PCM and then sent to a Class 5 circuit based switch and terminated on a circuit switched SS7 network POTS line)

Access Device (Session Control)
 Provides connectivity and session termination from customer premises to the NGN
 Acts as the hub for the various applications (Video, Voice, Fax, Web Data, Unified Messaging)
 Provides systems management and reporting functions
 May provide application multiplexing (allowing simultaneous multi application access)

Intelligent Peripheral (Media Control)
 Provides services such as DTMF parsing, Voice prompting, Messaging, Speech recognition, Text to Speech, Text to Fax, etc.

Protocol Conversion (Policy Management)
 Receives session requirements from Rules database
 Selects and executes required filters to enable activation, processing and tear-down of sessions
 Interfaces with existing CORE network to process information across NGN/Extended CORE
 Filters and Converts signals from SS7/ISDN to TCP/IP/H.323
 Converts Signaling data from one format to another (example: G.728/9 to AD/PCM or Vocaltec to Vienna Systems, etc.)

Network Access Control Point (Session Control)
 Similar to a switching node on an SS7 circuit switched network.
 First or Last Access Point in the network
 Provides actual call I session handling, routing and processing based on instructions from the Rules Database server Session Manager/Event Logger (Session Control)
 This process or application is critical since it is the "glue" between the end user application and the communications network. It is responsible for collection and distribution of end-user session preferences, application requirements, access device capability and accounting policy information to the required "IN enabling" components. In summary its main functions are to:
 Create the AMA /CDR and other usage records
 Interfaces external $3^{rd}$ party Network Gateways.
 Liase with Clearing Houses and Cross Network Location Registers
 Feeds the Financial Infrastructure Cross Network Roaming) Location Register (Policy Management)
 Similar to the Home location register in the wireless/cellular telephony world. This functional component provides the required policies governing users who access third party networks and cross geographical boundaries. It keeps in constant contact with other cross network location registers of the geographically dispersed but inter-connected networks, exchanging accounting, service feature profile and control data for local and roaming subscribers.

"New Core" Network Architecture

Most of the attributes of the "New Core" will already be in place as part of "NGN". These include all intelligent components of the packet based "NGN" described above. The emergence of "New Core" signals the retirement of legacy PSTN network infrastructure. The traditional PSTN may never get removed from the public network, it may continue to be available as a universally accessible telecommunication service, highly subsidized and regulated by government agencies (AMTRAK model). But for the purposes for business and technical innovation, traditional PSTN network will largely become irrelevant.

As the PSTN based access methods go away, entirely IP based access methods will emerge in the "New Core", where all end devices connected to the "New Core" are IP enabled. All existing methods of wire-line based access (xDSL, T-1, T-3, fiber) will continue to provide access to IP based services over the "New Core". New access technologies (e.g. power-line) will emerge, but will still use the same packet based capabilities in the "New Core".

The trends observed in the "NGN" will continue with increased broadband access. Other access methods (cable, satellite, wireless) will also complete their transformation to the "New Core". These will all become IP enabled access technologies that will use the "New Core" for complete set of services, thus really providing seamless services across many different access technologies.

The Wireless Data Network Architecture

The current wireless "Core" network consists of wireless based access and roaming capabilities that inter-operate with wire-line PSTN "Core" infrastructure to provide interoperable PSTN services. As the PSTN migrates to "NGN" and "New Core", the wireless PSTN access infrastructure will also migrate to connect to "NGN" and "New Core" to provide wireless PSTN access services while utilizing new capabilities in the "NGN" and the "New Core". There will also be innovations in the wireless end-devices such that they will become IP enabled, and will thus allow a broad range of innovations by allowing mobility to the wire-line IP based service capabilities (e.g. web browsing, e-mail etc.). These wireless access methods to the "New Core" will be restricted to lower speeds due to the legacy nature of this wireless infrastructure while new broadband wireless access may emerge to provide a new set of IP enabled wireless devices that can provide broadband services over wireless/mobile devices. In Europe, significant improvements in technologies such as GSM have provided insight into some NGN and New CORE capabilities such as 300 Kilobits of access bandwidth to deliver information to hand-held wireless devices. The potential of such capabilities coupled with the traditional strengths of wireless communications such as roaming and error handling enabled by digitization, at this stage seems limitless when aggregated with the intelligence of the NGN and New CORE backbone.

LMDS is an emerging technology in the local high speed wire-less access, which utilizes the 25–35 GHz microwave spectrum for point to point and point to multi-point communications. The end users either share an antenna connected to a digital receiver which is connected to a channel bank. The application server be it voice (PBX), video (CODEC), or Data (Router or Switch) interfaces with the NGN via the channel bank. A session originates from the application which interacts with the server to request authentication (AAA), then a session is established between originator and destination application by routing the call through the NGN components such as Gateways and Switches.

The Emerging Satellite Data Network Architecture

In addition to the wireless access infrastructure, new service providers have emerged that are trying to use low earth orbiting satellites (LEOS) to build a new access as well as backbone network infrastructure. The earlier version of these networks were built using traditional PSTN service model, hence they lack the bandwidth scalability for data services. In the "New Core", these will migrate to new packet switched based broadband LEO infrastructure, which will provide both high speed access as well as high speed backbone in the packet based "NGN" and "New Core". A satellite based broadband access mechanism will also be very suitable for multi-point services that will be developed on the "New Core".

The Cable Network Architecture

Cable networks were developed for mainly broadband broadcast of analog video entertainment services. The current "Core" cable infrastructure is suitable to serve one way video broadcast. Cable service providers are now upgrading their cable infrastructure to support high speed internet access. Thus in the "NGN" scenario for cable networks, cable will provide a new access mechanism for IP services, while simultaneously transport video content using the current video broadcast technology. Thus the IP enabled devices attached to the "NGN" cable infrastructure can take advantage of all the new components and capabilities described in the wire-line "NGN". This will enable seam-less services between devices that are accessing the "NGN" via a wire-line or cable infrastructures. This "NGN" cable infrastructure can provide IP based telephony services using the same components of the wire-line "NGN" that provide IP telephony to wire-line IP devices.

The digital network segment that interfaces with the "NGN" comprises of a coaxial cable local loop which is connected to a cable data modulator running QAM/DPSK protocols. The coaxial loop is terminated at the customer premise by an Ethernet cable modem which delivers the IP Tone to the applications (Voice, Video, Data) that may reside on a PC or application server. The cable modems used provide users and applications with a wide range of bandwidth options from 2 to 10 Mbits per second depending on configuration and choice of equipment vendor.

With the evolution of the "New Core" in the wire-line, the cable will continue to provide another broadband access mechanism for IP based services. As the "New Core" matures and enhances in capabilities (probably 10 years away), such that it can provide high speed real-time video content (to provide same quality as cable), it can be envisaged that the cable will becomes an entirely IP access mechanism Oust like all wire-line access becomes an IP access mechanism). Then the broadcast video content will be delivered to IP enabled cable attached devices just like any other rich media will be delivered over the IP network. It is even conceivable that video encoding technologies such as MPEG2 and motion JPEG will be further improved to deliver higher resolution digital media over the cable infrastructure using NGN and CORE delivery mechanisms. The network becomes transparent and the applications and content drive the creativity of the service creation process. The PSTN like services will be delivered to devices connected via cable access just like they are delivered to other wire-line connected devices on the "New Core".

NGN Creation Strategy

The network transformation plan comprises of the following phases

Strategy

Market Trial

Service Launch
Consolidation and Optimization
Strategy

Determine where a current network fits in the evolutionary continuum from CORE to NGN or New CORE. Having identified the appropriate positioning of the network, select an architectural scenario that best serves business and technical objectives of the engagement.

Market Trial

Develop and launch a market trial that would measure and assess the viability of the introduction of the proposed service. Additionally, this trial validates the approach to transform specific parts of the infrastructure towards the "NGN" and "New Core". The market trial provides the entry-exit criteria, metrics, Key Performance Indicators etc. to assess the success of the market trial.

Service Launch

Develop, plan and manage the detailed network, systems, process and program management aspects of the launch of a "New Core" that is applicable for the network based on the strategy developed above. This ensures that the network systems planned and developed will be future-ready. The OSS and back-office systems are be able to support the processes required for service creation and management in the "New Core". The network creation processes provides the program management tools to ensure that the launch is successfully executed. These include entry and exit criteria for network creation, KPIs for quality management, program planning and management tool-kits.

Service Consolidation and Optimization

As the network operator moves into operating and maintaining the "NGN", there will be many parallel market driven journeys during which services and capabilities will be developed for the "NGN". The network creation process provides tools to assist the client into improving efficiencies of these parallel journeys. These optimization efforts will include organizational, process and technology driven changes to create efficiency based on consolidation of processes, as well as measurement tools to determine the success of such consolidation. The network architecture roadmap and business blueprint will act as the foundation to ensure that during the consolidation phase the "NGN" maintains the required architecture framework to sustain it for the long term.

Now that the details regarding the NGN have been set forth, information will now be presented concerning billing when the quality of service is degraded.

Degraded Quality of Service and Billing

A typical telecommunication network comprises multiple telecommunication switches located throughout a geographical area. When a user makes a call, the call may be routed through one or more switches before reaching its destination.

FIG. 1A illustrates an exemplary telecommunications system 102 across the United States. For purposes of illustration, a caller 104 places a call from Los Angeles, California to a party 112 located in New York City, N.Y. Such a call is typically transmitted across three (3) switches: the Los Angeles, Calif. switch 106; the Chicago, Ill. switch 108; and the New York City, N.Y. switch 110. In this scenario, the originating switch is the Los Angeles, Calif. switch 106, and the terminating switch is the New York City, N.Y. switch 110.

Each of the switches, 106–110, is connected to two (2) or more Data Access Points (DAP) 116–120, for instance a primary DAP 116–120 and a backup DAP 116–120. A DAP 116–120 is a facility that receives requests for information from the switches 106–110, processes the requests, and returns the requested information back to the requesting switch 106–110. The switches 106–110 use information from the DAPs 116–120 to process calls through the network.

When a call passes through one of the switches, 106–110, that switch creates a call record. The call record contains information on the call, including but not limited to: routing, billing, call features, and trouble shooting information. After the call is terminated, each switch 106–110 that processed the call completes the associated call record. The switches 106–110 combine multiple call records into a billing block.

When a switch 106–110 fills the billing block, the switch 106–110 sends the billing block to a billing center 114. Thus, the billing center 114 receives one billing block from each switch 106–110 that handled the call, which in this case would be three billing blocks. The billing center 114 searches each billing block and retrieves the call record associated with the call, thereby retrieving one call record per switch 106–110 that handled the call. The billing center 114 then uses one or more of the retrieved call records to generate a billing entry. The billing center 114 is also connected to each DAP 116–120 to retrieve information regarding a switch 106–110 or call record. However, billing in the present invention is increased because the hybrid network also contains proxy intelligence.

FIG. 1B shows a block diagram of the Network Data Management 130 in accordance with a preferred embodiment of the present invention. Network Data Management 130 encompasses the collection of usage data and events for the purpose of network performance and traffic analysis. This data may also be an input to Billing (Rating and Discounting) processes at the Service Management Layer, depending on the service and its architecture.

The process provides sufficient and relevant information to verify compliance/non-compliance to Service Level Agreements (SLA). The process provides sufficient usage information for rating and billing.

This process ensures that the Network Performance goals are tracked, and that notification is provided when they are not met (threshold exceeded, performance degradation). This also includes thresholds and specific requirements for billing. This includes information on capacity, utilization, traffic and usage collection. In some cases, changes in traffic conditions may trigger changes to the network for the purpose of traffic control. Reduced levels of network capacity can result in requests to Network Planning for more resources.

FIG. 1B-1 is a flowchart illustrating a network data management process in accordance with a preferred embodiment. First, in step 150, data is collected relating to usage and events occurring over a hybrid network. Next, in step 152, the data is analyzed to determine a status of the hybrid network which in turn, in step 154, is utilized during management of the hybrid network. Further, in step 156, billing rates and discounts are determined based on the status of the hybrid network.

Figure 1C:
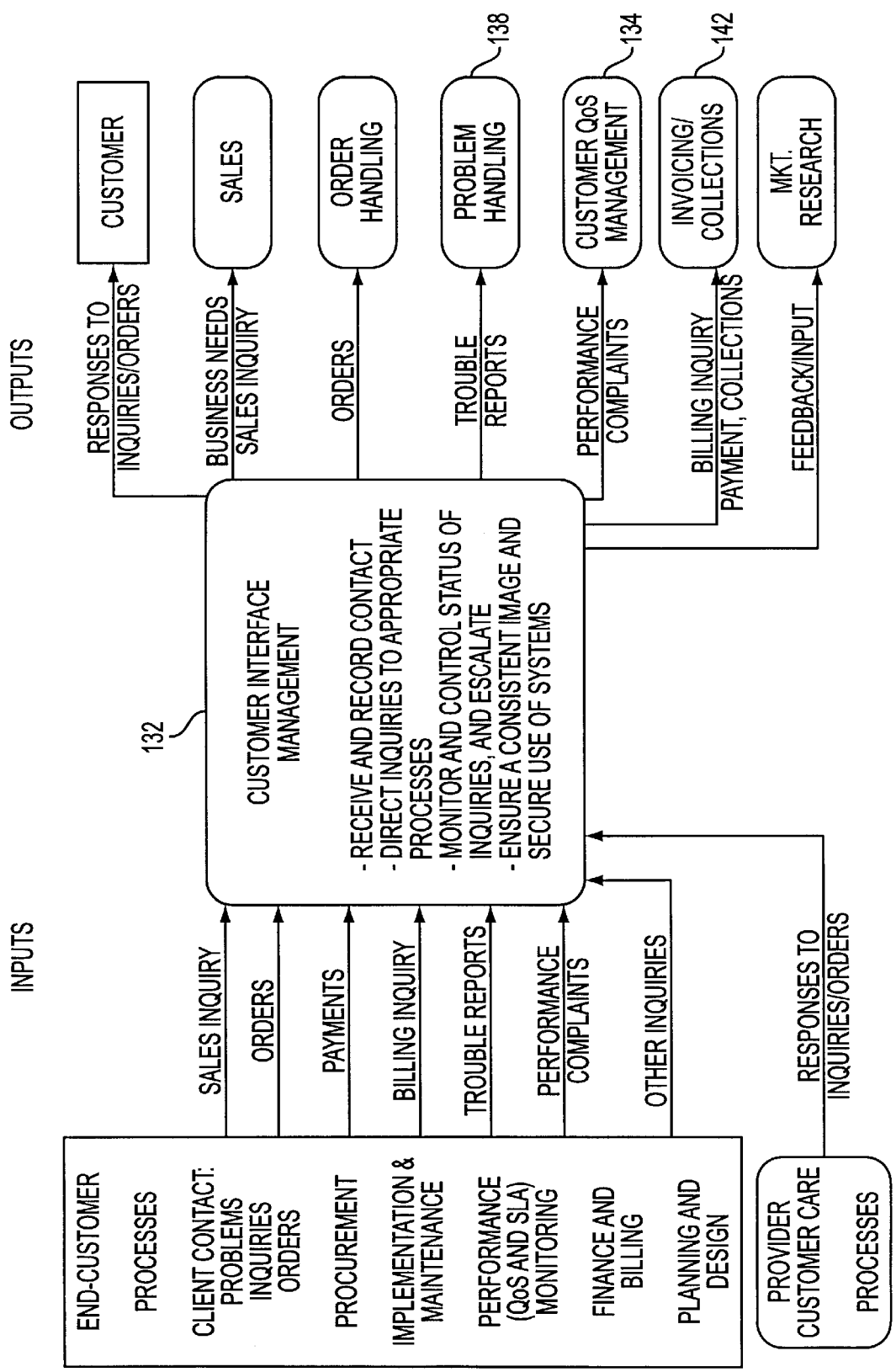
FIG. 1C shows a block diagram of the Customer Interface Management Process in accordance with a preferred embodiment of the present invention.
Figures 1, 1C:
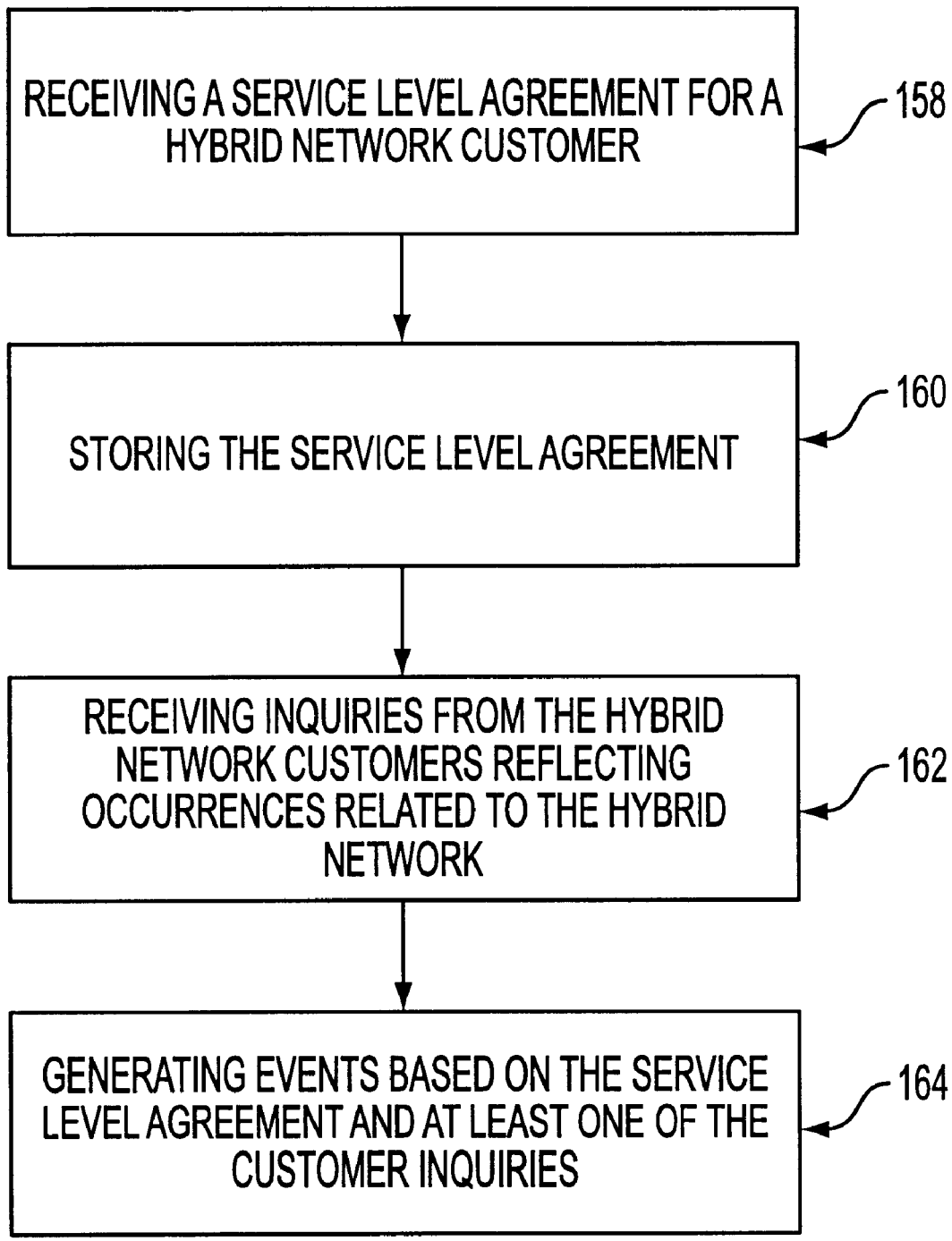

In addition to the Network Data Management 130 generating billing events, the present invention also uses a Customer Interface Management process 132, as shown in FIG. 1C, to directly interact with customers and translate customer requests and inquiries into appropriate "events" such as, the creation of an order or trouble ticket or the adjustment of a bill. This process logs customer contacts, directs inquiries to the appropriate party, and tracks the status to completion. In those cases where customers are given direct access to service management systems, this process assures consistency of image across systems, and security to prevent a customer from harming their network or those of other customers. The aim is to provide meaningful and timely customer contact experiences as frequently as the customer requires.

FIG. 1C-1 is a flowchart illustrating a Customer Interface Management Process in accordance with a preferred embodiment. First, in step 158, a service level agreement is received for a hybrid network customer. Next, in step 160, the service level agreement is stored after which, in step 162, inquiries are received from network customers reflecting occurrences related to the hybrid network. Thereafter, in step 164, events are generated based on the customer inquiries and the service level agreement.

Figure 1D:
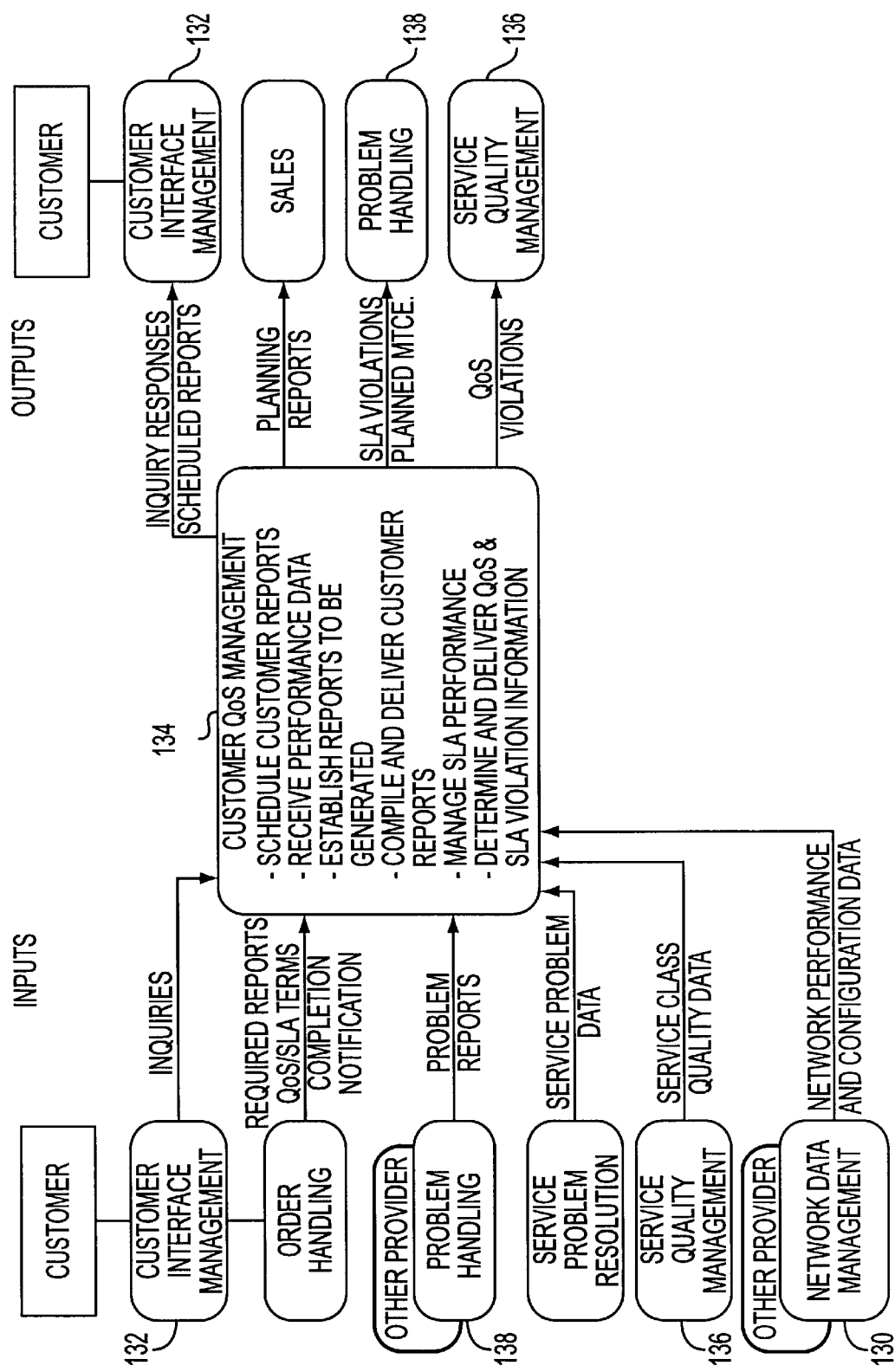
FIG. 1D shows a block diagram of the Customer Quality of Service Management Process in accordance with a preferred embodiment of the present invention.
Figures 1, 1D:
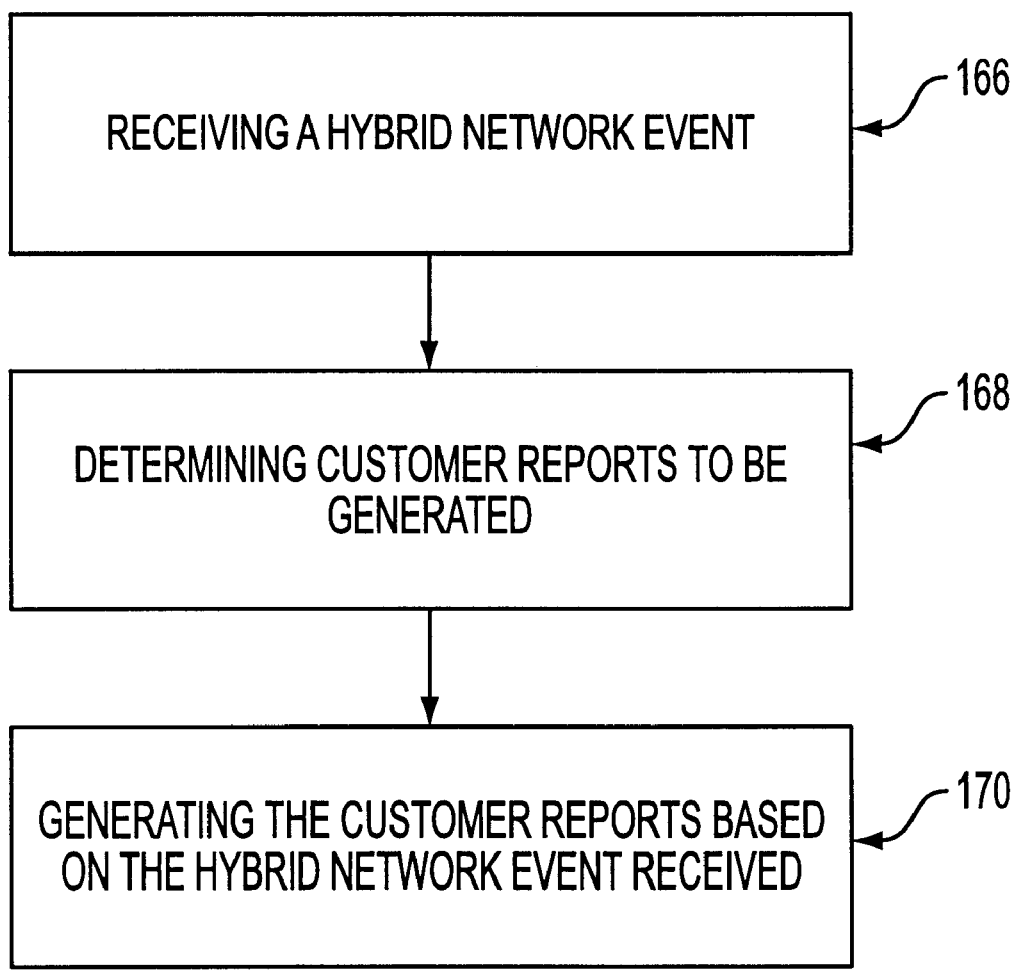

The Network Data Management 130 and Customer Interface Management process 132 are used to give information to the Customer Quality of Service Management Process 134, as shown in FIG. 1D. The Customer Quality of Service Management Process 134 encompasses monitoring, managing and reporting of quality of service as defined in Service Descriptions, Service Level Agreements (SLA), and other service-related documents. It includes network performance, but also performance across all of service parameters, e.g., Orders Completed On Time. Outputs of this process are standard (predefined) and exception reports, including; dashboards, performance of a service against an SLA, reports of any developing capacity problems, reports of customer usage patterns, etc. In addition, this process responds to performance inquiries from the customer. For SLA violations, the process supports notifying Problem Handling and for QoS violations, notifying Service Quality Management 136. The aim is to provide effective monitoring. Monitoring and reporting must provide SP management and customers meaningful and timely performance information across the parameters of the services provided. The aim is also to manage service levels that meet specific SLA commitments and standard service commitments.

FIG. 1D-1 is a flowchart illustrating a Customer Quality of Service Management Process in accordance with a preferred embodiment. First, in step 166, a hybrid network event is received which may include customer inquiries, required reports, completion notification, quality of service terms, service level agreement terms, service problem data, quality data, network performance data, and/or network configuration data. Next, in step 168, the system determines customer reports to be generated and, in step 170, generates the customer reports accordingly based on the event received.

Figure 1E:
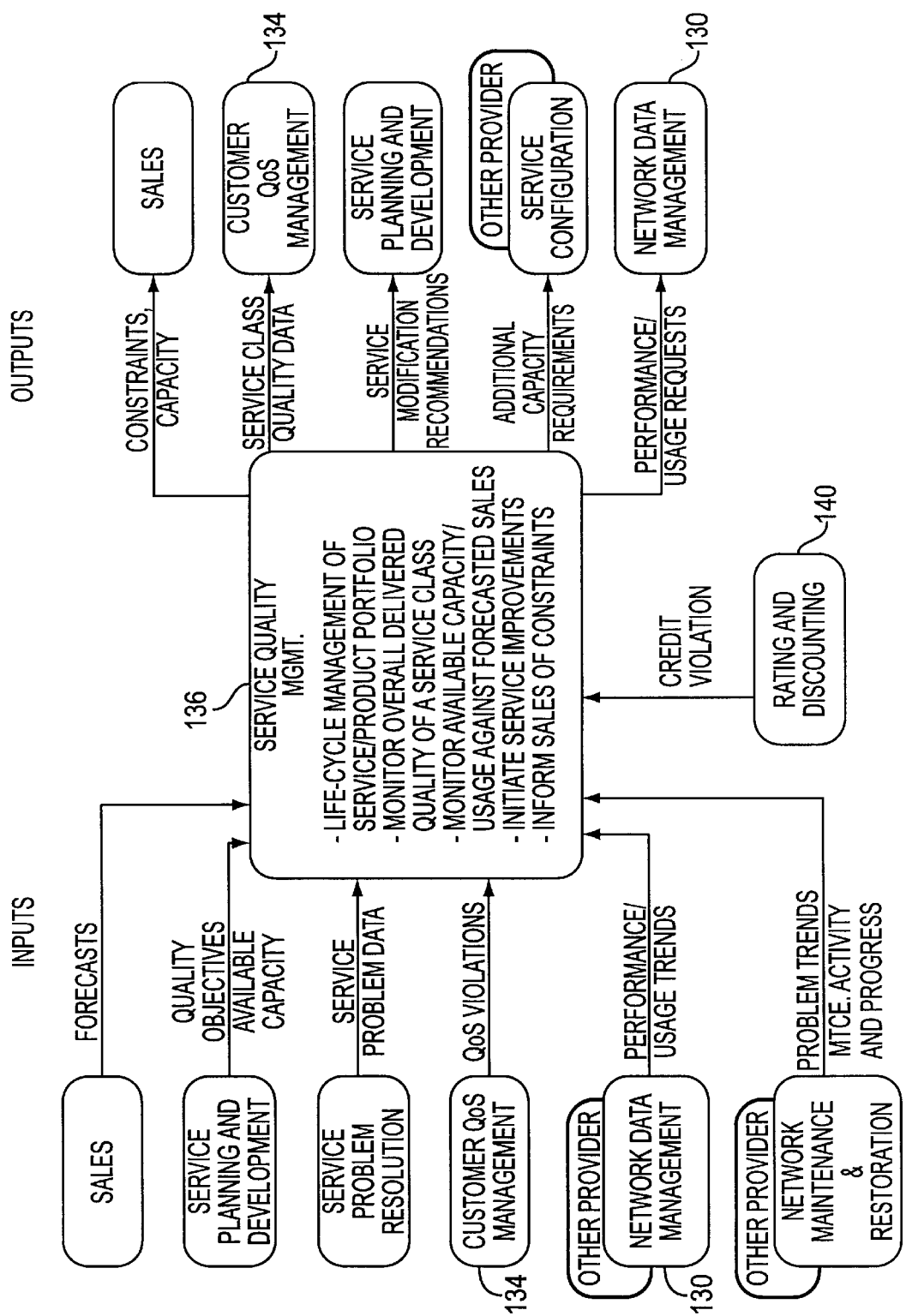
FIG. 1E shows a block diagram of the Service Quality Management in accordance with a preferred embodiment of the present invention.
Figures 1, 1E:
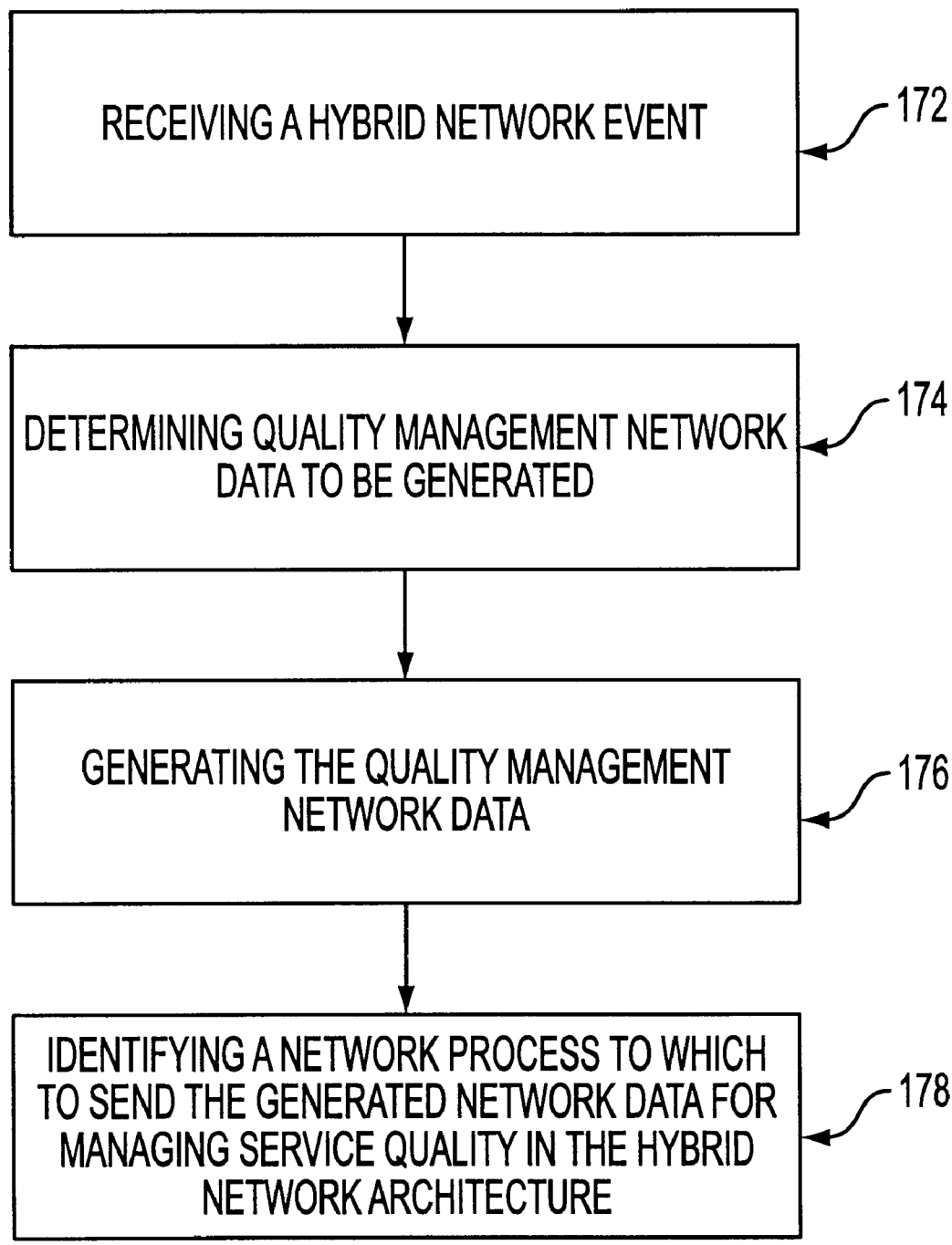

FIG. 1E shows a block diagram of the Service Quality Management 136 in accordance with a preferred embodiment of the present invention. The Service Quality Management Process 136 supports monitoring service or product quality on a service class basis in order to determine Whether service levels are being met consistently Whether there are any general problems with the service or product Whether the sale and use of the service is tracking to forecasts.

This process also encompasses taking appropriate action to keep service levels within agreed targets for each service class and to either keep ahead of demand or alert the sales process to slow sales. The aim is to provide effective service specific monitoring, management and customers meaningful and timely performance information across the parameters of the specific service. The aim is also to manage service levels to meet SLA commitments and standard commitments for the specific service.

FIG. 1E-1 is a flowchart illustrating a Service Quality Management Process in accordance with a preferred embodiment. First, in step 172, a hybrid network event is received that may include forecasts, quality objectives, available capacity, service problem data, quality of service violations, performance trends, usage trends, problem trends, maintenance activity, maintenance progress, and/or credit violations. Next, in step 174, quality management network data is determined and, in step 176, the quality management network data is generated. Such quality management network data may include constraint data, capacity data, service class quality data, service modification recommendations, additional capacity requirements, performance requests, and/or usage requests. Finally, in step 178, a network process to which to send the generated data is identified.

Figures 1, 1F:
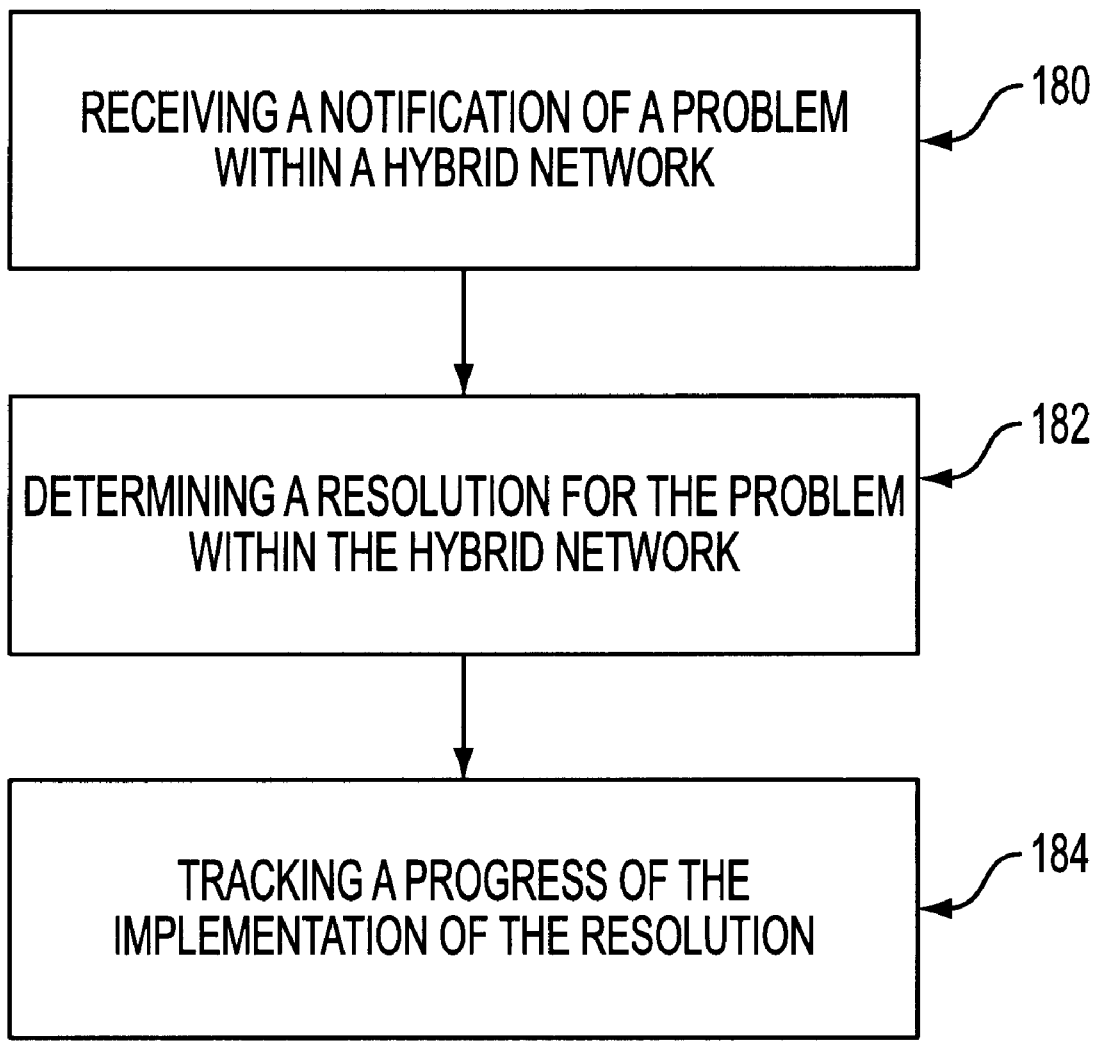

FIG. 1F shows a block diagram of the Problem Handling Process 138. The Problem Handling Process receives information from the Customer Interface Management Process 132 and the Customer Quality of service Management Process 134. It is responsible for receiving service complaints from customers, resolve them to the customer's satisfaction and provide meaningful status on repair or restoration activity. This process is also responsible for any service-affecting problems, including notifying the customer in the event of a disruption (whether reported by the customer or not), resolving the problem to the customer's satisfaction, and providing meaningful status on repair or restoration activity.

This proactive management also includes planned maintenance outages. The aim is to have the largest percentage of problems proactively identified and communicated to the customer, to provide meaningful status and to resolve in the shortest timeframe.

FIG. 1F-1 is a flowchart illustrating a Problem Handling Management Process in accordance with a preferred embodiment. First, in step 180, a notification of a problem within a hybrid network is received by the system. Next, in step 182, a resolution for the problem within the hybrid network is determined. The resolution may include a status report, resolution notification, problem reports, service reconfiguration, trouble notification, service level agreement violations, and/or outage notification. Finally, in step 184, the progress of the implementation of the resolution is tracked.

Figure 1G:
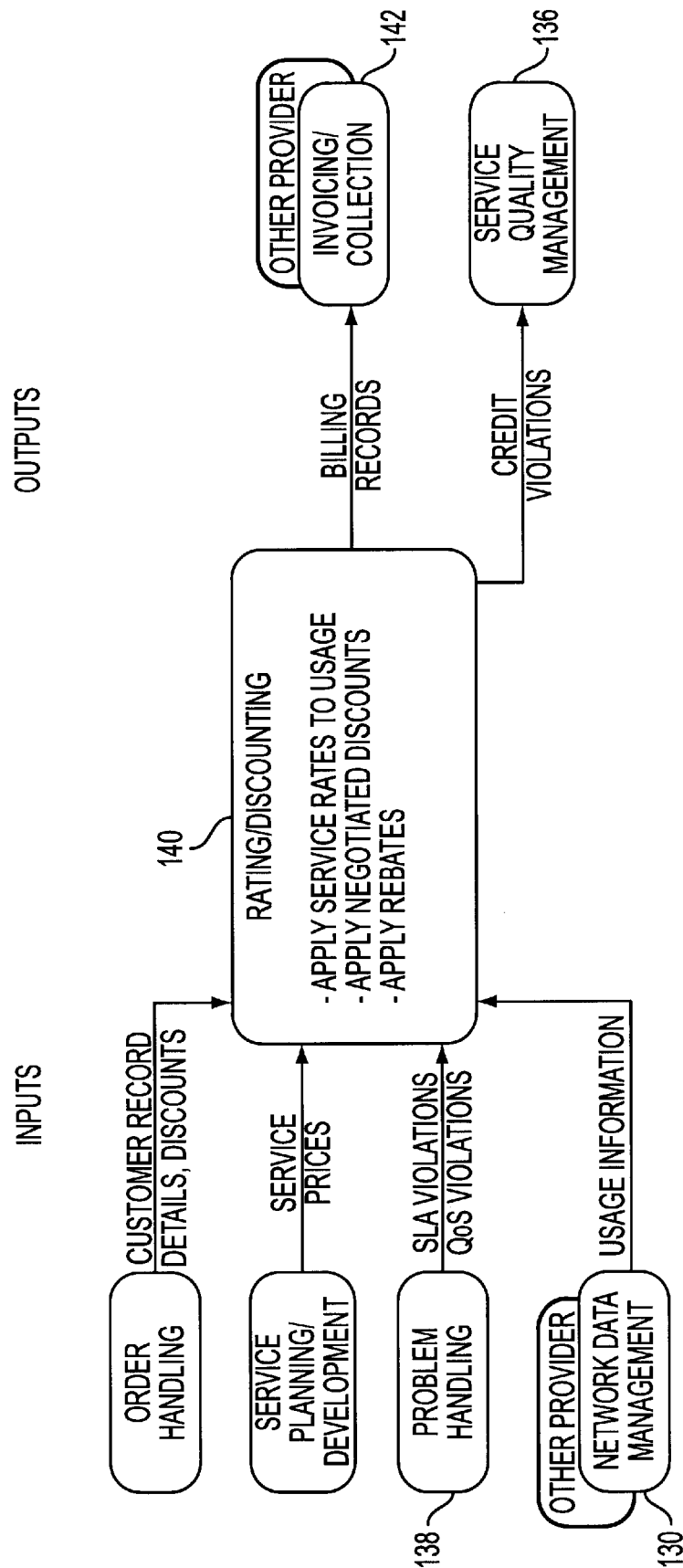
FIG. 1G shows a block diagram of the Rating and Discounting Process in accordance with a preferred embodiment of the present invention.
Figures 1, 1G:
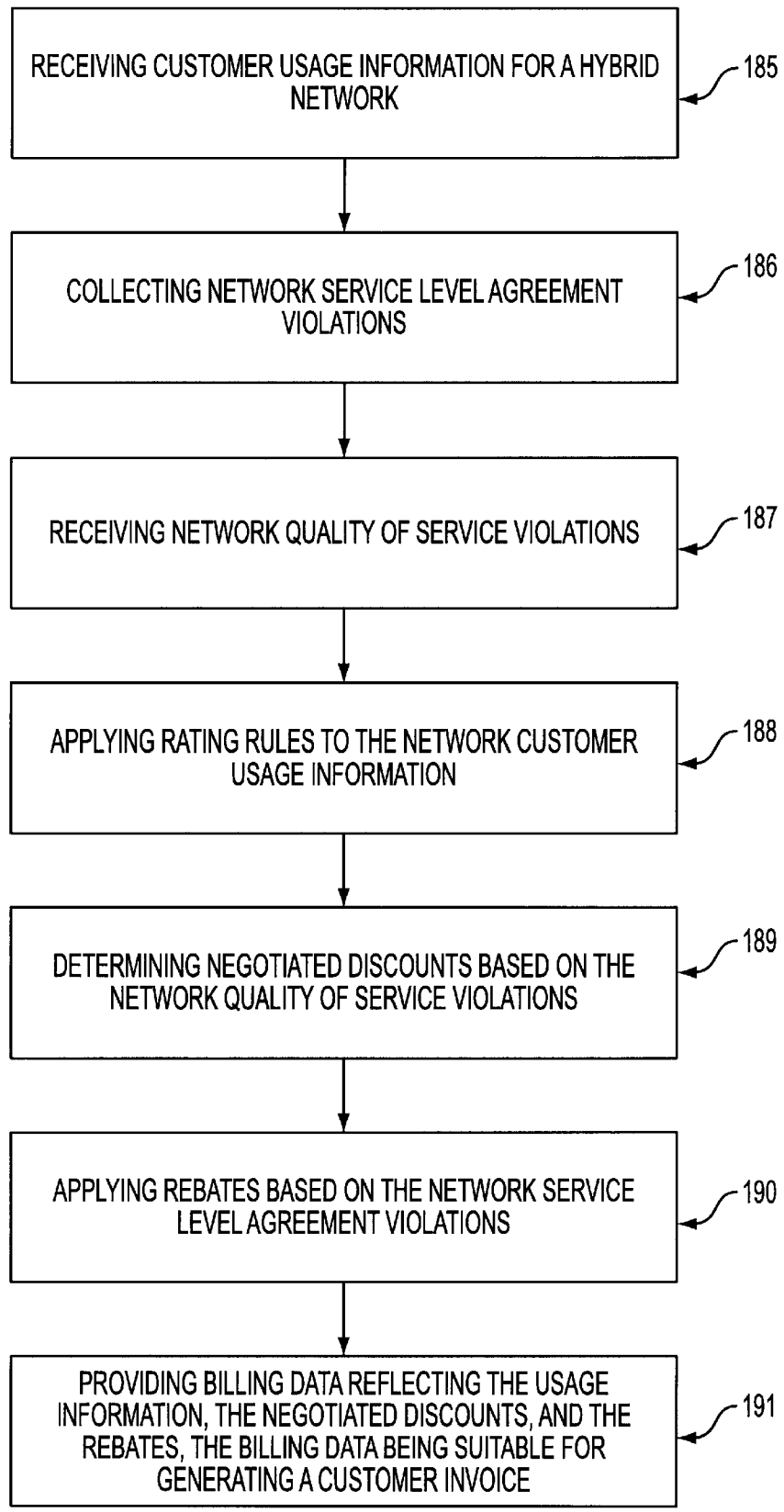

The Problem Handling Process 138 and the Network Data Management 130 feed information to the Rating and Discounting Process 140, as shown in FIG. 1G. This process applies the correct rating rules to usage data on a customer-by-customer basis, as required. It also applies any discounts agreed to as part of the Ordering Process, for promotional discounts and charges, and for outages. In addition, the Rating and Discounting Process 140 applies any rebates due because service level agreements were not met. The aim is to correctly rate usage and to correctly apply discounts, promotions and credits.

FIG. 1G-1 is a flowchart illustrating Rating and Discounting Process in accordance with a preferred embodiment. First, in step 185, hybrid network customer usage information is received. In step 186, network service level agreement violations are collected, and, in step 187, network quality of service violations are received by the Rating and Discounting system. Next, in step 188, rating rules are applied to the network customer usage information. Further, in step 189, negotiated discounts are determined based on the network quality of service violations and, in step 190, rebates are determined based on the network service level agreement violations. Thereafter, in step 191, billing data reflecting the usage information, the negotiated discounts, and the rebates is provided to generate a customer invoice.

Figure 1H:
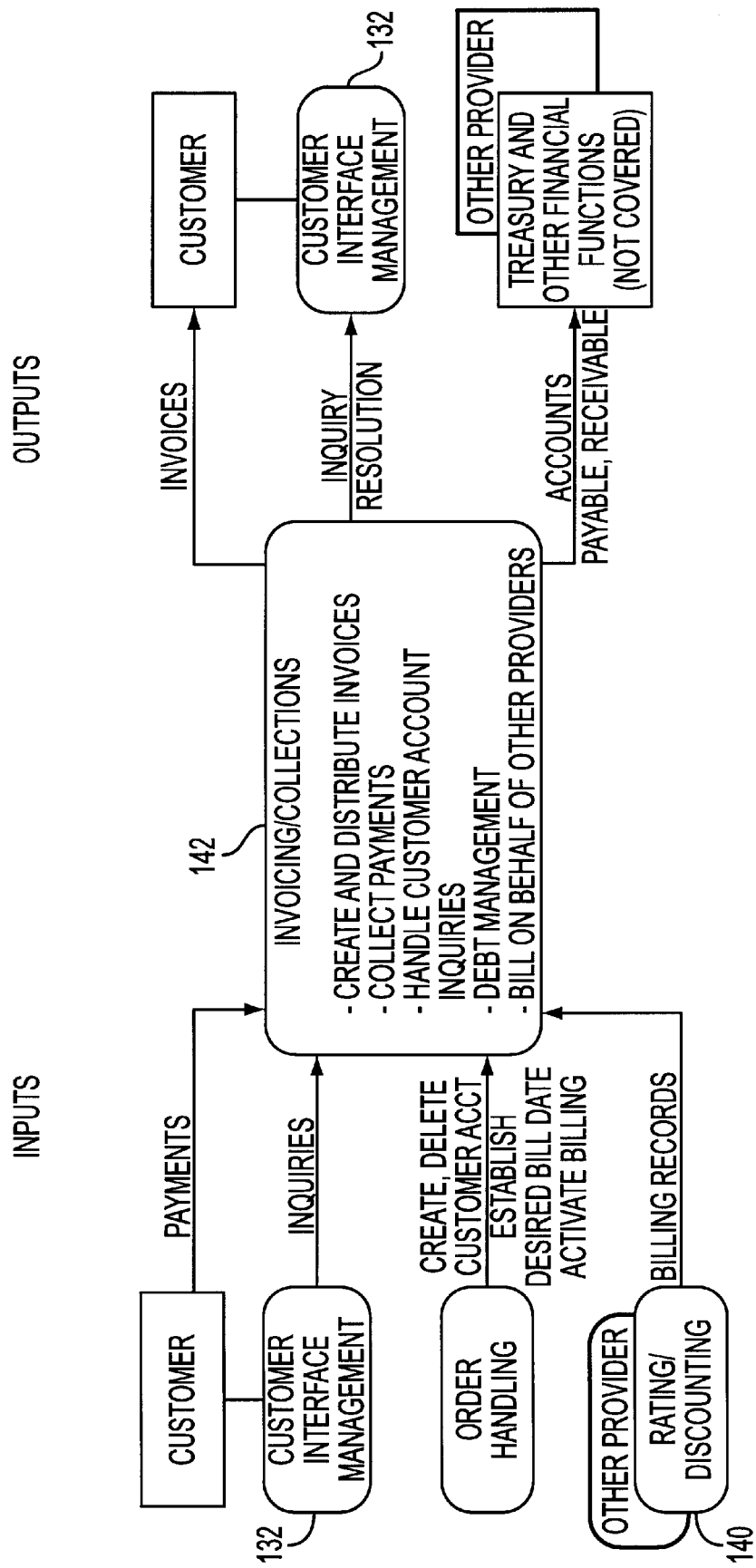
FIG. 1H shows a block diagram of the Invoice and Collections Process in accordance with a preferred embodiment of the present invention.
Figures 1, 1H:
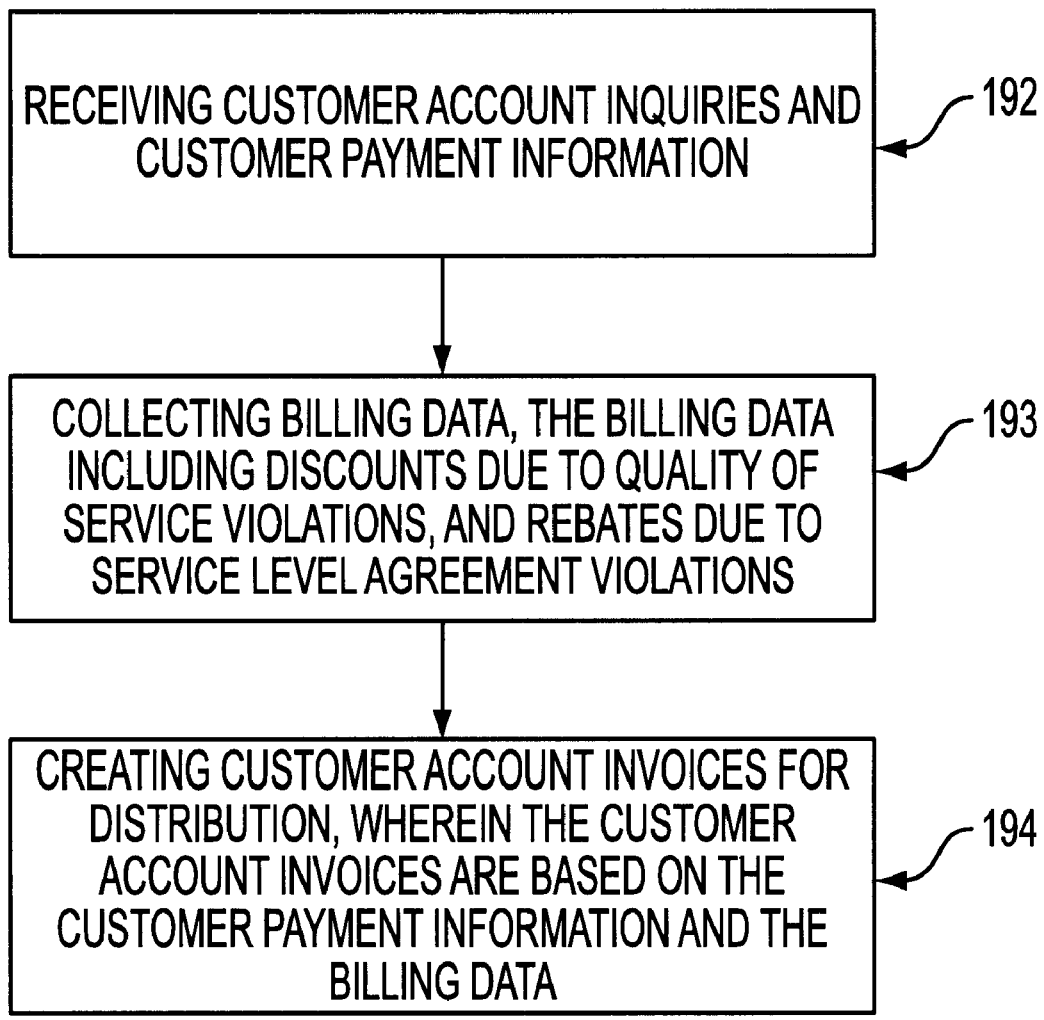

Utilizing information from the Rating and Discounting Process 140, the Invoice and Collections Process 142, as shown in FIG. 1H, creates correct billing information. This process encompasses sending invoices to customers, processing their payments and performing payment collections. In addition, this process handles customer inquiries about bills, and is responsible to resolve billing problems to the customer's satisfaction. The aim is to provide a correct bill and, if there is a billing problem, resolve it quickly with appropriate status to the customer. An additional aim is to collect money due the service provider in a professional and customer supportive manner. FIG. 1H-1 is a flowchart illustrating an Invoice and Collections Process in accordance with a preferred embodiment. First, in step 192, customer account inquiries and customer payment information is received by the system. Next, in step 193, billing data, including discounts due to quality of service violations and rebates due to service level agreement violations, is collected and processed. Thereafter, in step 194, customer account invoices are created for distribution based on the customer payment information and the billing data.

Mediation and activity tracking are provided by the event logger and event manager. The event logger and event manager feed the rating and billing information for degraded service using the personally customized rules database. Utilizing an expert system for the tailored capabilities of each customer, the event driver, collector and manager analyze notification events generated by the system. When a notification event is received the system analyzes the event and uses it to identify the customer. The notification event is also used to credit the customer if they experience a non-impacting event that breaches the customer's contract. In addition to the system itself generating the notification event, the customer is also able to notify the provider directly should such an event occur.

Figure 2A:
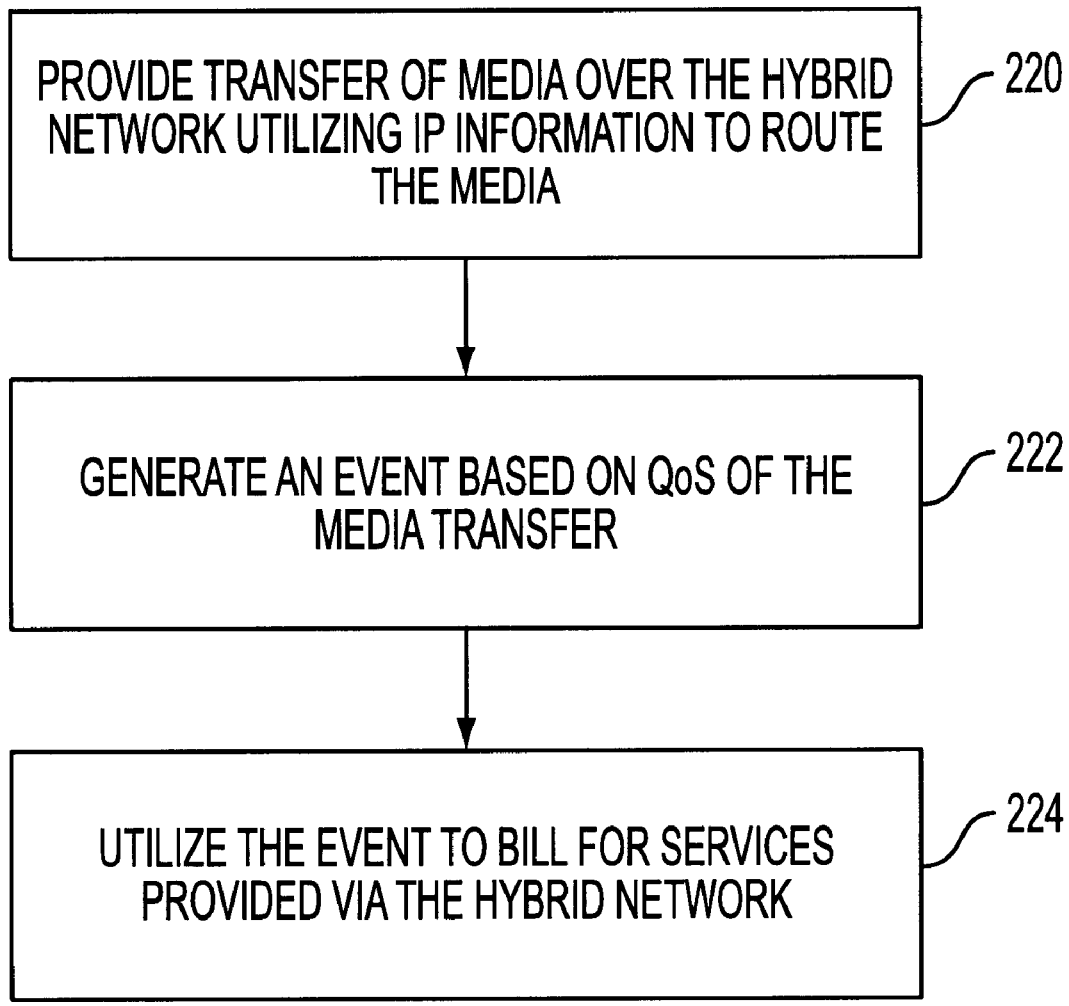
FIG. 2A is a flowchart showing illustrating media communication over a hybrid network in accordance with a preferred embodiment of the present invention.

FIG. 2A is a flowchart illustrating media communication over the hybrid network of the present invention. When a customer initiates a use of the hybrid network, the hybrid network, in a first step 220, transfers the media over the network using IP information to route it to the appropriate destination. The media transferred over the network may be telephony data, image data, or any other data capable of packet switched transmission.

In a second step 222, events are generated based on the quality of service of the media transfer. As discussed above with reference to FIG. 1D and FIG. 1E, these events include performance notifications due to SLA violations, and customer generated events from the Customer Interface Management Process 132.

In a third step 224, the events generated in step 222 are utilized to generate a bill for the customer. In addition to normal billing for service provided via the hybrid network, the bill is modified based on events generated during the media transfer. For example, events representing SLA violations are used to credit customers. As discussed above with reference to FIGS. 1F, 1G, and 1H, the Problem Handling Process 138 is responsible for receiving service complaints and other service-affecting problems. Together with the Network Data Management 130, the Problem Handling Process feeds data to the Discounting Process 140. The Discounting Process 140 applies the correct rating rules on a customer-by-customer basis, and applies discounts for events, such as outages and other SLA violations. Finally, the Invoice and Collections Process 142, utilizes the information from the Discounting Process 140 to create customer billing information.

To better understand the invention, it is useful to describe some additional terminology relating to a telecommunication network. A telephone call comes into a switch on a transmission line referred to as the originating port, or trunk. The originating port is one of many transmission lines coming into the switch from the same location of origin. This group of ports is the originating trunk group. After processing an incoming call, the switch transmits the call to a destination location, which may be another switch, a local exchange carrier, or a private branch exchange. The call is transmitted over a transmission line referred to as the terminating port, or trunk. Similar to the originating port, the terminating port is one of a group of ports going from the switch to the same destination. This group of ports is the terminating trunk group.

Contemporary telecommunication networks provide customers with the capability of using the general public network as well as the capability of defining a custom virtual network (VNet). With a VNet, a customer defines a private dialing plan, including plan telephone numbers. A VNet customer is not limited to the default telephone numbers allocated to a public telecommunication system dedicated to a specific geographic region, but can define custom telephone numbers.

Upon processing a telephone call, a switch must generate a call record large enough to contain all of the needed information on a call. The call record, however, must not be so large that the typical call results in the majority of the record fields in the call record to be unused. In such a case, storing such call records results in large amounts of wasted storage, and transmitting such a call record causes unnecessary transmissions.

One solution for creating and processing call records is to implement a fixed length call record format, such as a 32-word call record. A word is two (2) bytes, or sixteen (16) bits. A fixed length record format, however, cannot expand when new call features are implemented. More importantly, fixed call record formats cannot handle expanded data fields as the telecommunications network becomes more complex with new features and telephone numbers.

Contemporary fixed length record formats include time point fields recording local time in three (3) second increments where local switch time represents the time of day at a switch. The timepoint fields are used by the network switches, billing center, and other network subsystems. Each subsystem, however, may require the time period for a different use and in a different format, such as in an epoch time format. Epoch time is the number of one (1) second increments since a particular date and time in history. For example, the billing center requires epoch time for its billing records whereas switch reports and error logs require local switch time.

A problem also arises when using only local switch time in that there is no accommodation for time changes due to daylight savings time. In addition, each subsystem may require a finer granularity of precision than the current three (3) second increments. By providing only local switch time at three (3) second increments, the switches have passed the burden of translating the time into a usable format to the network subsystems. The fixed record format cannot accommodate the various time period requirements because it only contains the time periods in local switch time at a low level of precision. Because of its fixed nature, the fixed record format cannot expand to include different time formats, nor to include a finer granularity of precision, such as a one (1) second increment.

Therefore, there is a need for switches of a telecommunications network to store call record information in a flexible and expandable format. There is a further need to provide time point fields with one (1) second granularity in a flexible format that easily and efficiently responds to daylight savings time and time zone changes.

There is also a need to match all of the call records associated with a specific telephone call. For example, for proper billing and cost control, it is necessary for the billing center to match the originating switch's call record to the terminating switch's call record. Also, for troubleshooting and security purposes, it may be necessary to trace a specific telephone call through the network with ease in order to isolate problem areas.

Therefore, there is a need for switches of a telecommunications network to uniquely identify each telephone call that traverses the network, thereby uniquely identifying all of the call records associated with a specific telephone call.

An Embodiment

Call Record Format

An embodiment solves the problem of providing a flexible and expandable call record format by implementing both a small and a large call record format. In particular, the embodiment implements a default 32-word call record format, plus an expanded 64-word call record format. An embodiment uses a 32-word call record format for the typical telephone call, which comprises the majority of all telephone calls, and uses a 64-word call record format when additional information is needed regarding the call. This implementation provides the flexibility needed to efficiently manage varying data requirements of a given call record. New call features can be developed and easily incorporated into the variable call record format of the present invention.

This embodiment also records timepoints in the epoch time format. The embodiment records the origination time of a call in epoch time format, and the remaining timepoints are offsets, or the number of seconds, from that origination time. This embodiment solves the problems associated with converting to and from daylight savings time because daylight savings time is a local time offset and does not affect the epoch time. Furthermore, the timepoints in epoch time format require less space in the call record than they do in local switch time format.

The epoch time format may represent coordinated universal time (UTC), as determined at Greenwich, England, which has a time zone of zero (0) local switch time, or any other time. Epoch time is only a format and does not dictate that UTC must be used. The billing time and the local switch time may be in UTC or local time, and the local switch time may not necessarily be the same time that is used for billing. Therefore, the switch must keep billing time and local switch time separate in order to prevent the problems that occur during daylight savings time changes.

Network Call Identifier

This embodiment solves the problem of uniquely identifying each telephone call and all of the call records associated with a specific telephone call by providing a unique identifier to each call record. It generates a network call identifier (NCID) that is assigned to each call record at the point of call origination, that is, the originating switch generates an NCID for each telephone call. The NCID accompanies the associated telephone call through the telecommunications network to the termination point at the terminating switch. Therefore, at any point of a telephone call in the network, the associated NCID identifies the point and time of origin of the telephone call. Each switch through which the telephone call passes records the NCID in the call record associated with the call. The NCID is small enough to fit in a 32-word call record, thereby reducing the data throughput and storage. The NCID provides the billing center and other network subsystems with the ability to match originating and terminating call records for a specific telephone call.

This embodiment also provides the switch capability of discarding a received NCID and generating a new NCID. A switch discards a received NCID if the NCID format is invalid or unreliable, thereby ensuring a valid unique identifier to be associated with each call going through the network. For instance, an NCID may be unreliable if generated by third party switches in the telecommunications network.

This embodiment relates to switches of a telecommunication network that generate call records using a flexible and expandable record format. The call record formats include a small (preferably 32-word) and a large (preferably 64-word) expanded format. It would be readily apparent to one skilled in the relevant art to implement a small and large record format of different sizes.

The embodiment also relates to switches of a telecommunication network that generate a unique NCID for each telephone call traversing the network. The NCID provides a mechanism for matching all of the call records associated with a specific telephone call. It would be readily apparent to one skilled in the relevant art to implement a call record identifier of a different format.

Figure 2B:
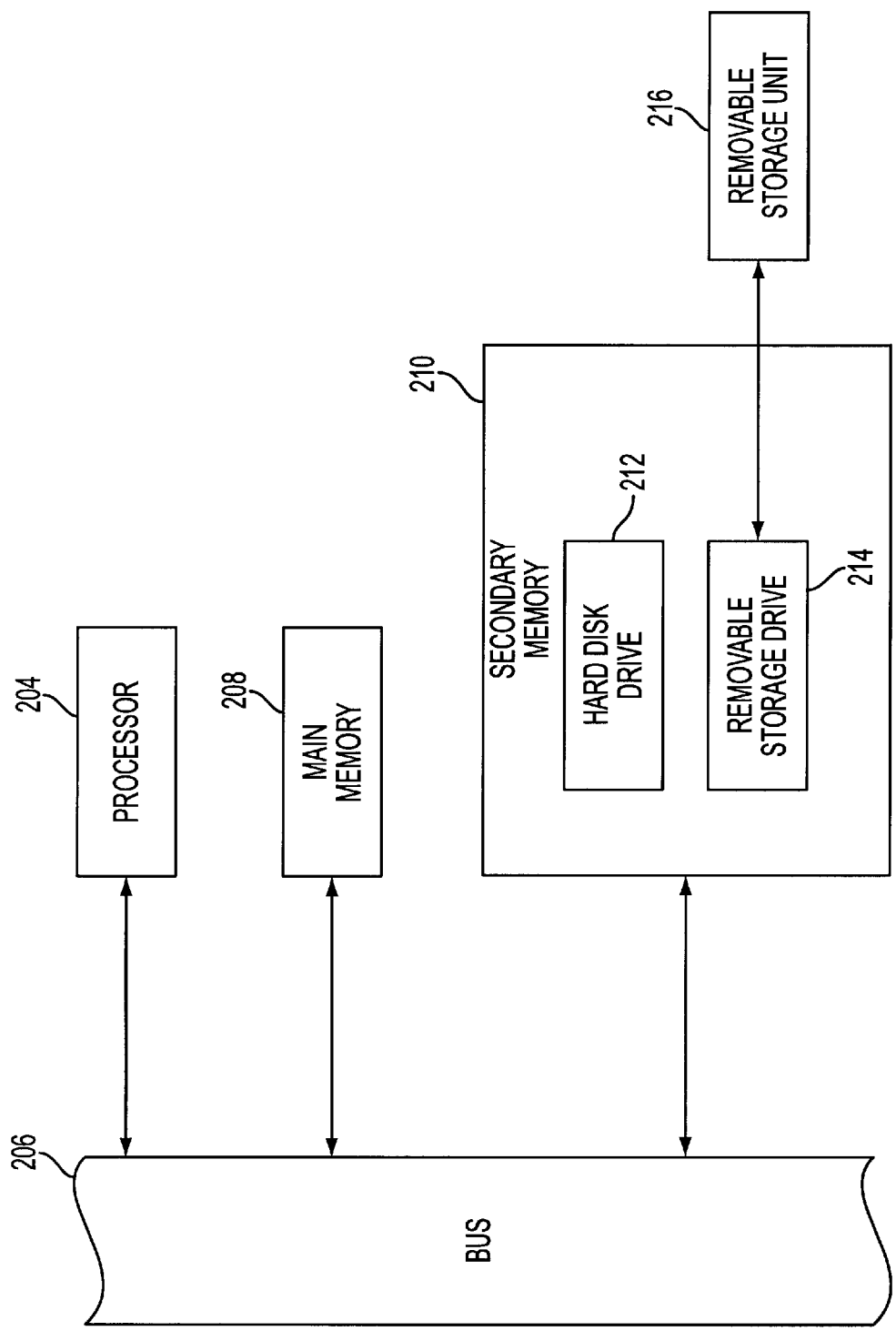
FIG. 2B is a block diagram of an exemplary computer system in accordance with a preferred embodiment of the present invention.

The chosen embodiment is computer software executing within a computer system. FIG. 2B shows an exemplary computer system. The computer system 202 includes one or more processors, such as a processor 204. The processor 204 is connected to a communication bus 206.

The computer system 202 also includes a main memory 208, preferably random access memory (RAM), and a secondary memory 210. The secondary memory 210 includes, for example, a hard disk drive 212 and/or a removable storage drive 214, representing a floppy disk drive, a magnetic tape drive, a compact disk drive, etc. The removable storage drive 214 reads from and/or writes to a removable storage unit 216 in a well known manner.

Removable storage unit 216, also called a program storage device or a computer program product, represents a floppy disk, magnetic tape, compact disk, etc. The removable storage unit 216 includes a computer usable storage medium having therein stored computer software and/or data.

Computer programs (also called computer control logic) are stored in main memory 208 and/or the secondary memory 210. Such computer programs, when executed, enable the computer system 202 to perform the functions of the present invention as discussed herein. In particular, the computer programs, when executed, enable the processor 204 to perform the functions of the present invention. Accordingly, such computer programs represent controllers of the computer system 202.

Another embodiment is directed to a computer program product comprising a computer readable medium having control logic (computer software) stored therein. The control logic, when executed by the processor 204, causes the processor 204 to perform the functions as described herein.

Another embodiment is implemented primarily in hardware using, for example, a hardware state machine. Implementation of the hardware state machine so as to perform the functions described herein will be apparent to persons skilled in the relevant arts.

Call Record Format

This embodiment provides the switches of a telecommunication network with nine (9) different record formats. These records include : Call Detail Record (CDR), Expanded Call Detail Record (ECDR), Private Network Record (PNR), Expanded Private Network Record (EPNR), Operator Service Record (OSR), Expanded Operator Service Record (EOSR), Private Operator Service Record (POSR), Expanded Private Operator Service Record (EPOSR), and Switch Event Record (SER). Each record is 32 words in length, and the expanded version of each record is 64 words in length.

Figure 15A:
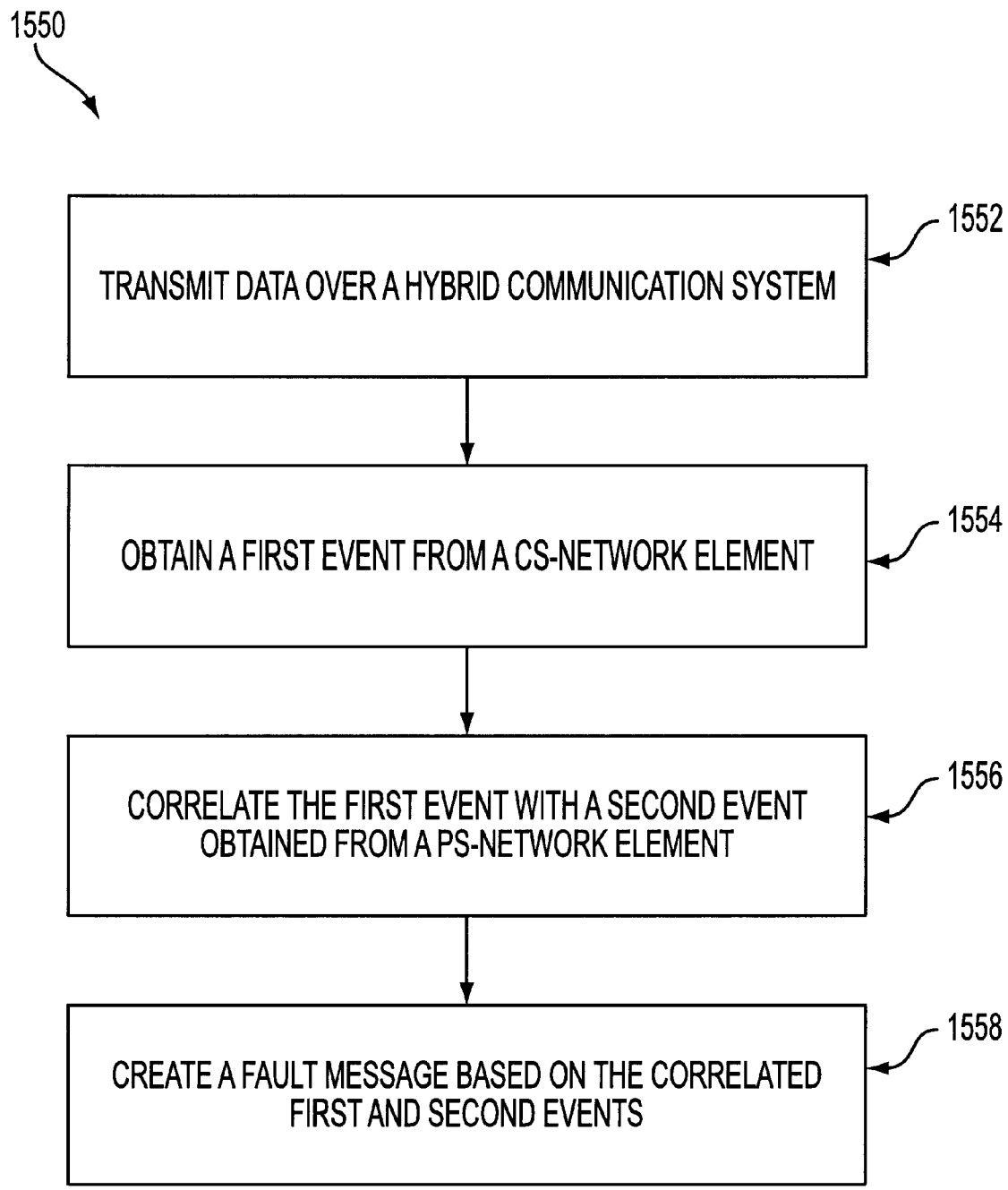
FIG. 15A is a flowchart showing a Fault Management Process in accordance with a preferred embodiment of the present invention.
Figures 1, 15B:
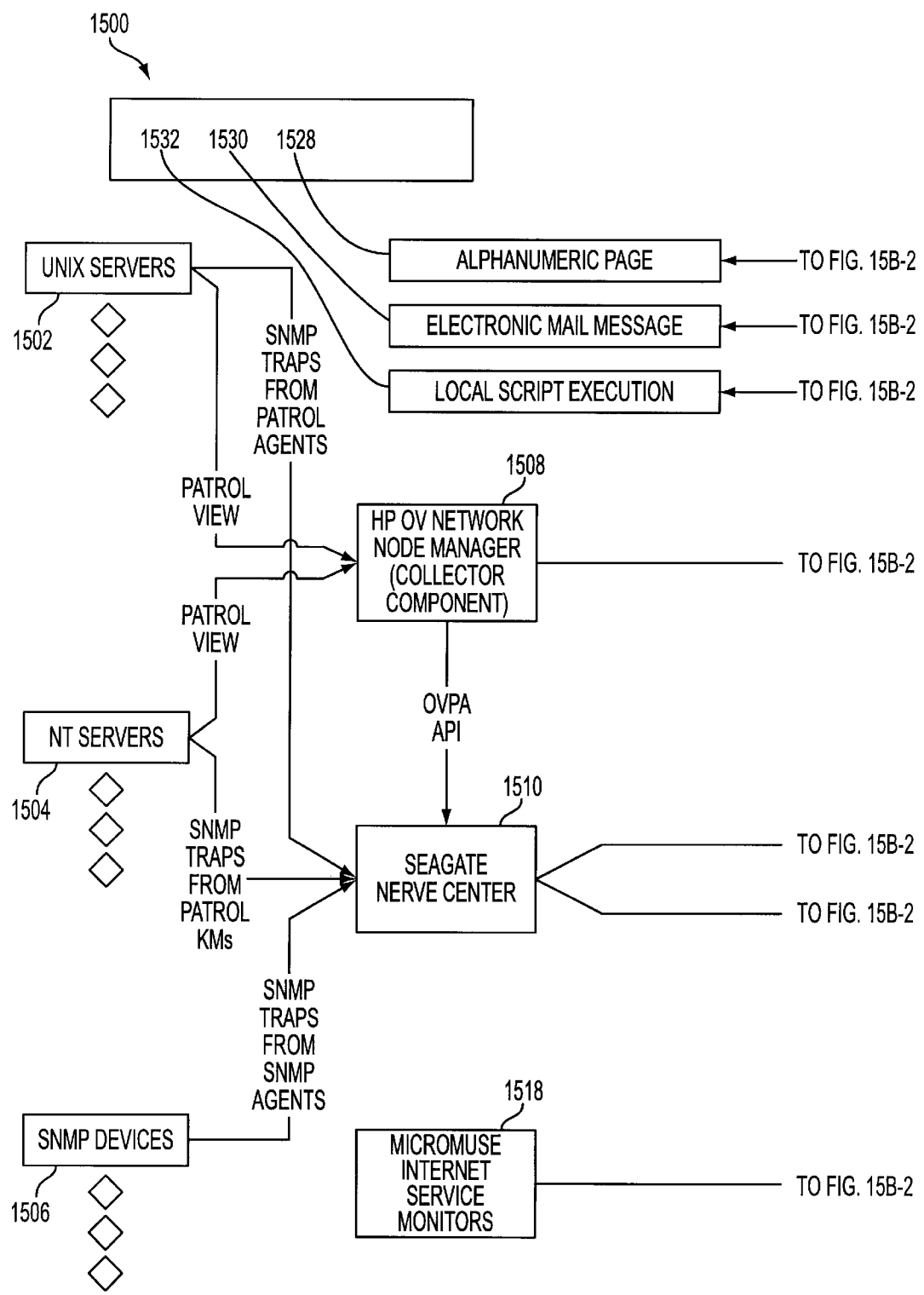
Figures 2, 15B:
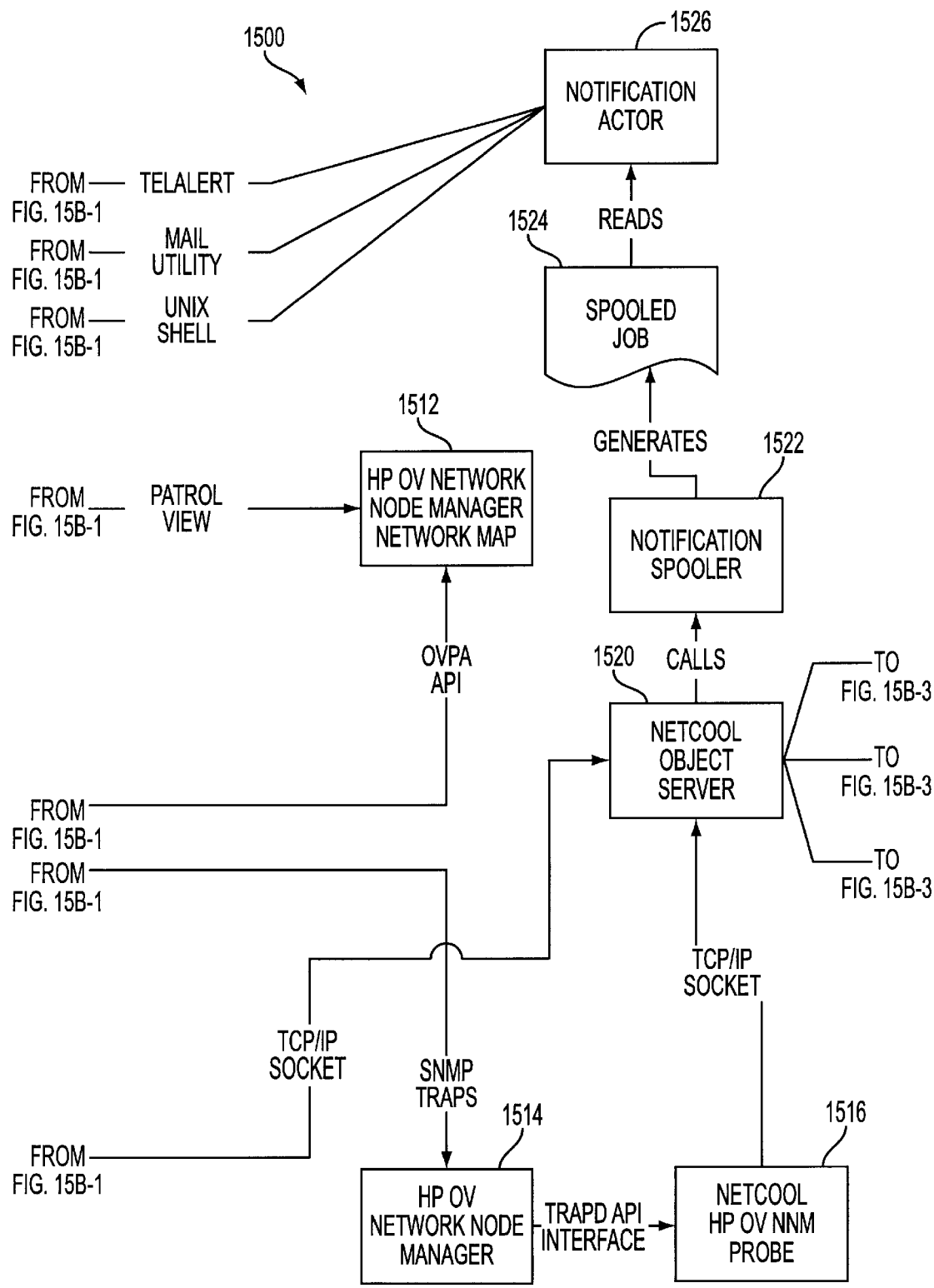
FIG. 15B is a block diagram showing a Fault Management component in accordance with a preferred embodiment of the present invention.
Figures 3, 15B:
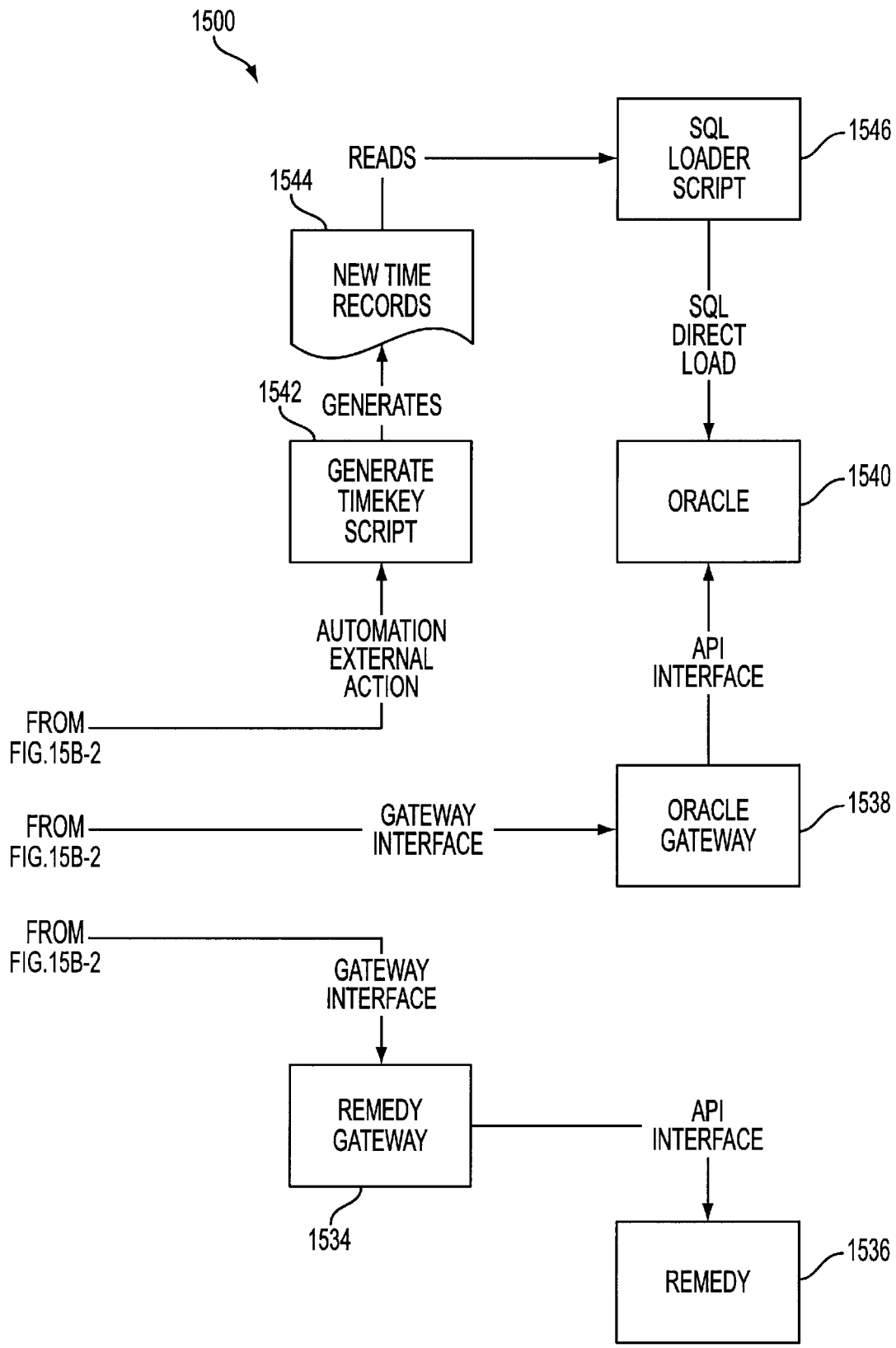
FIG. 3 illustrates the call detail record (CDR) and private network record (PNR) call record formats in accordance with a preferred embodiment of the present invention.

Example embodiments of the nine (9) call record formats discussed herein are further described in FIGS. 1–5. The embodiments of the call records of the present invention comprise both 32-word and 64-word call record formats. It would be apparent to one skilled in the relevant art to develop alternative embodiments for call records comprising a different number of words and different field definitions. FIG. 3 shows a graphical representation of the CDR and PNR call record formats. FIGS. 4A and 4B show a graphical representation of the ECDR and EPNR call record formats. FIG. 5 shows a graphical representation of the OSR and POSR call record format. FIGS. 6A and 6B show a graphical representation of the EOSR and EPOSR call record for mats. FIG. 7 shows a graphical representation of the SER record format.

The CDR and PNR, and thereby the ECDR and EPNR, are standard call record formats and contain information regarding a typical telephone call as it passes through a switch. The CDR is used for a non-VNET customer, whereas the PNR is used for a VNET customer and is generated at switches that originate VNET calls. The fields of these two records are identical except for some field-specific information described below.

The OSR and POSR, and thereby the EOSR and EPOSR, contain information regarding a telephone call requiring operator assistance and are generated at switches or systems actually equipped with operator positions. A switch completes an OSR for a non- VNET customer and completes a POSR for a private VNET customer. These records are only generated at switches or systems that have the capability of performing operator services or network audio response system (NARS) functions. The formats of the two (2) records are identical except for some field-specific information described below.

A SER is reserved for special events such as the passage of each hour mark, time changes, system recoveries, and at the end of a billing block. The SER record format is also described in more detail below.

Figure 8A:
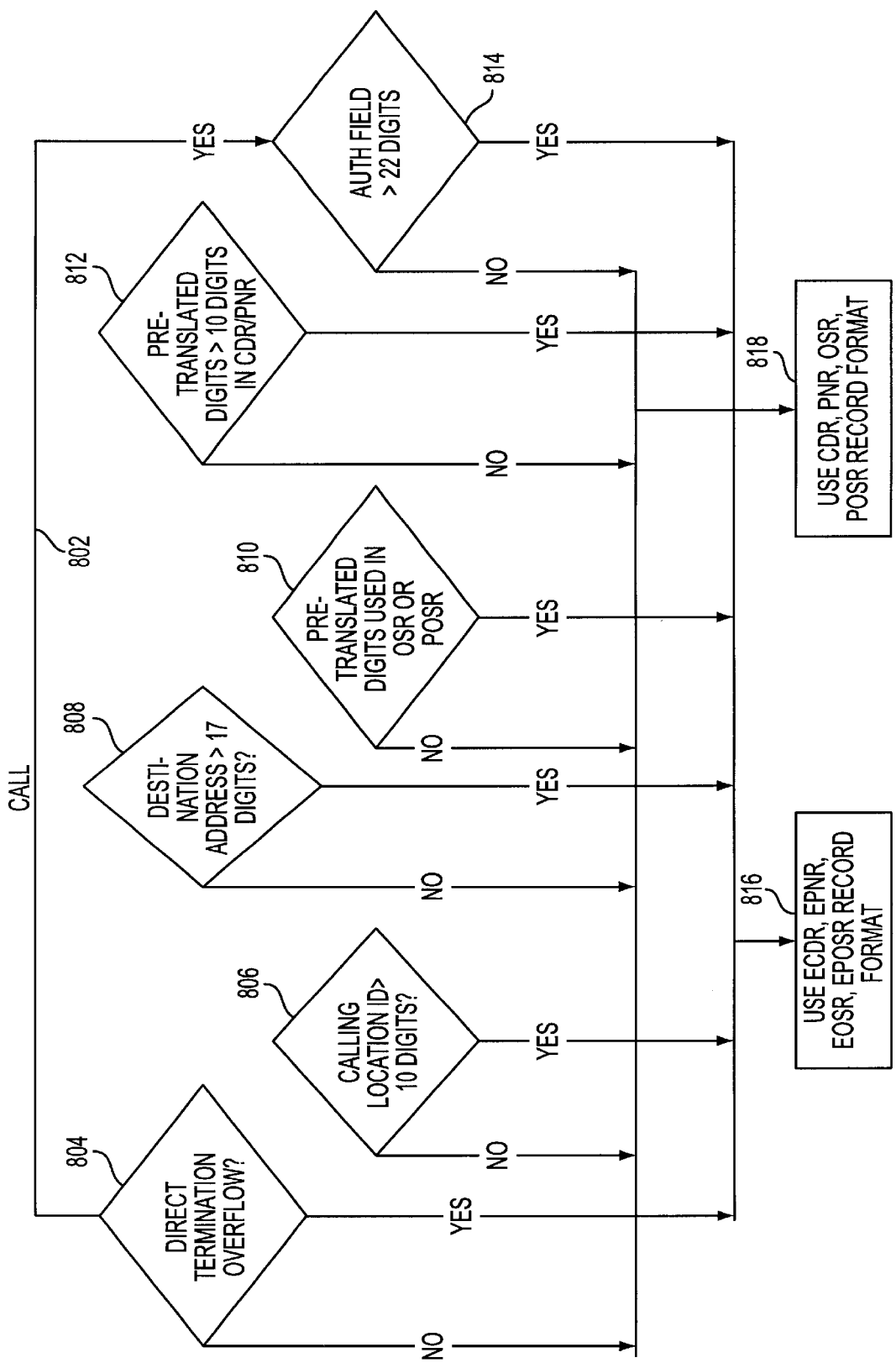
FIGS. 8A and 8B are control flow diagrams illustrating the conditions under which a switch uses the expanded record format in accordance with a preferred embodiment of the present invention.
Figure 8B:
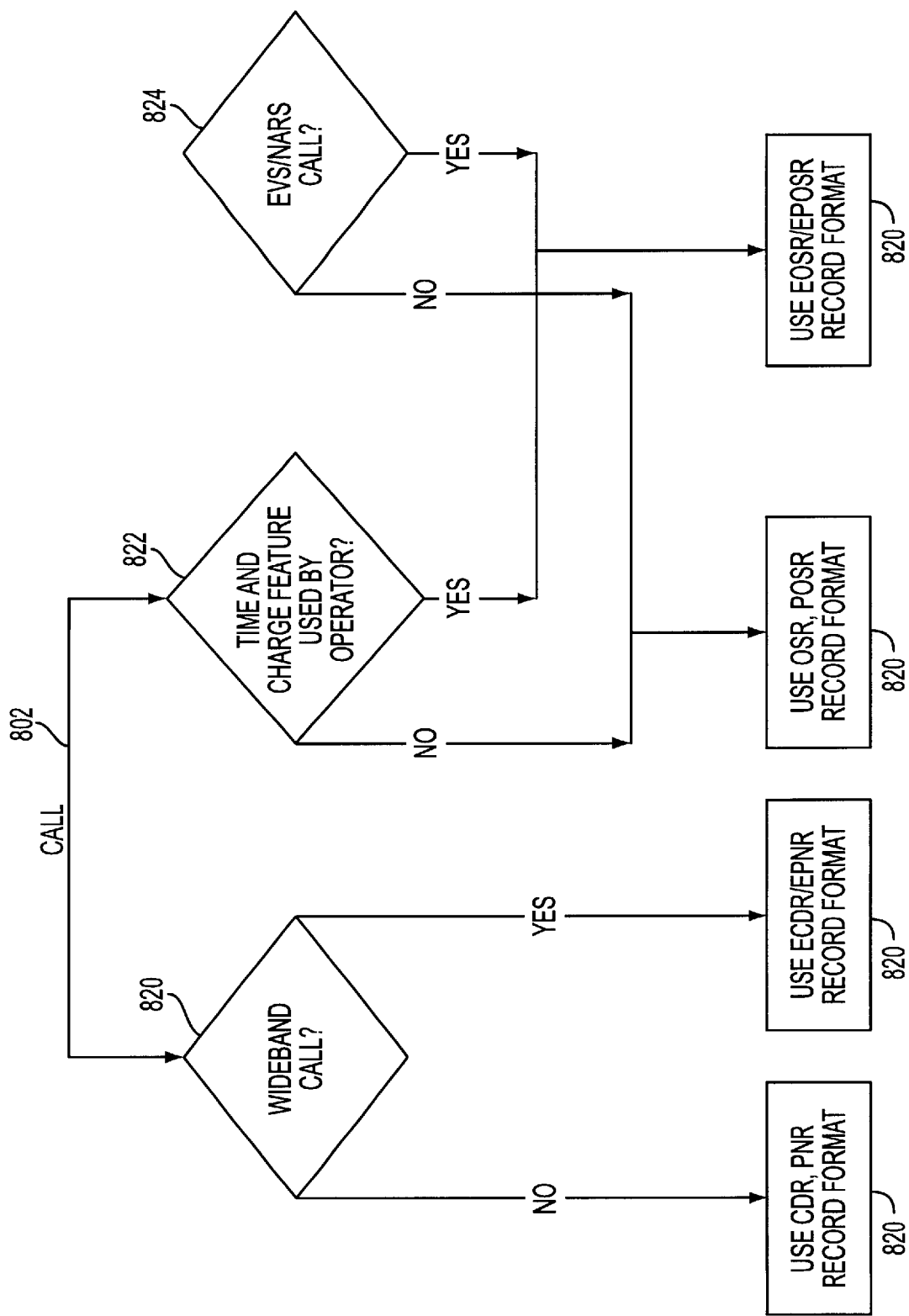

FIGS. 8(A) and 8(B) collectively illustrate the logic that a switch uses to determine when to use an expanded version of a record format. A call 202 comes into a switch 106–110 (called the current switch for reference purposes; the current switch is the switch that is currently processing the call), at which time that switch 106–110 determines what call record and what call record format (small/default or large/expanded) to use for the call's 802 call record. In this regard, the switch 106–110 makes nine (9) checks for each call 802 that it receives. The switch 106–110 uses an expanded record for a call 802 that passes any check as well as for a call 802 that passes any combination of checks.

The first check 804 determines if the call is involved in a direct termination overflow (DTO) at the current switch 106–110. For example, a DTO occurs when a customer makes a telephone call 802 to an 800 number and the original destination of the 800 number is busy. If the original destination is busy, the switch overflows the telephone call 802 to a new destination. In this case, the switch must record the originally attempted destination, the final destination of the telephone call 802, and the number of times of overflow. Therefore, if the call 802 is involved in a DTO, the switch 106–110 must complete an expanded record (ECDR, EPNR, EOSR, EPOSR) 816.

The second check 806 made on a call 802 by a switch 106–110 determines if the calling location of the call 802 is greater than ten (10) digits. The calling location is the telephone number of the location from where the call 802 originated. Such an example is an international call which comprises at least eleven (11) digits. If the calling location is greater than ten (10) digits, the switch records the telephone number of the calling location in an expanded record (ECDR, EPNR, EOSR, EPOSR) 816.

A switch 106–110 makes a third check 808 on a call 802 to determine if the destination address is greater than seventeen (17) digits. The destination address is the number of the called location and may be a telephone number or trunk group. If the destination is greater than seventeen (17) digits, the switch records the destination in an expanded record (ECDR, EPNR, EOSR, EPOSR) 816.

A switch 106–110 makes a fourth check 810 on a call 802 to determine if the pre-translated digits field is used with an operated assisted service call. The pre-translated digits are the numbers of the call 802 as dialed by a caller if the call 202 must be translated to another number within the network. Therefore, when a caller uses an operator service, the switch 106–110 records the dialed numbers in expanded record (EOSR, EPOSR) 816.

In a fifth check 812 on a call 802, a switch 106–110 determines if the pre-translated digits of a call 802 as dialed by a caller without operator assistance has more than ten (10) digits. If there are more than ten (10) pre-translated digits, the switch 106–110 records the dialed numbers in expanded record (ECDR, EPNR) 816.

In a sixth check 814 on a call 802, a switch 106–110 determines if more than twenty-two (22) digits, including supplemental data, are recorded in the Authorization Code field of the call record. The Authorization Code field indicates a party who gets billed for the call, such as the calling location or a credit card call. If the data entry requires more than twenty-two (22) digits, the switch 106–110 records the billing information in an expanded record (ECDR, EPNR, EOSR, EPOSR) 816.

In a seventh check 820 on a call 802, a switch 106–110 determines if the call 802 is a wideband call. A wideband call is one that requires multiple transmission lines, or channels. For example, a typical video call requires six (6) transmission channels: one (1) for voice and five (5) for the video transmission. The more transmission channels used during a wideband call results in a better quality of reception. Contemporary telecommunication systems currently provide up to twenty-four (24) channels. Therefore, to indicate which, and how many, of the twenty-four channels is used during a wideband call, the switch records the channel information in an expanded record (ECDR, EPNR) 828.

In an eighth check 822 on a call 802, a switch 106–110 determines if the time and charges feature was used by an operator. The time and charges feature is typically used in a hotel scenario when a hotel guest makes a telephone call using the operator's assistance and charges the call 802 to her room. After the call 802 has completed, the operator informs the hotel guest of the charge, or cost, of the call 802. If the time and charges feature was used with a call 802, the switch 106–110 records the hotel guest's name and room number in an expanded record (EOSR, EPOSR) 832.

The ninth, and final, check 824 made on a call 802 by a switch 106–110 determines if the call 802 is an enhanced voice service/network audio response system (EVS/NARS) call. An EVS/NARS is an audio menu system in which a customer makes selections in response to an automated menu via her telephone key pad. Such a system includes a NARS switch on which the audio menu system resides. Therefore, during an EVS/NARS call 802, the NARS switch 106–110 records the customer's menu selections in an expanded record (EOSR, EPOSR) 832.

If none of the checks 804–824 return a positive result, then the switch 106–110 uses the default record format (OSR, POSR) 830.

Once the checks have been made on a call, a switch generates and completes the appropriate call record. Call record data is recorded in binary and Telephone Binary Coded Decimal (TBCD) format. TBCD format is illustrated below:

0000=TBCD-Null
    0001=digit 1
    0010=digit 2
    0011=digit 3
    0100=digit 4
    0101=digit 5
    0110=digit 6
    0111=digit 7
    1000=digit 8
    1001=digit 9
    1010=digit 0
    1011=special digit 1 (DTMF digit A)
    1100=special digit 2 (DTMF digit B)
    1101=special digit 3 (DTMF digit C)
    1110=special digit 4 (DTMF digit D)
    1111=special digit 5 (Not Used)

All TBCD digit fields must be filled with TBCD-Null, or zero, prior to data being recorded. Where applicable, dialed digit formats conform to these conventions:
N=digits 2–9
X=digits 0–9
Y=digits 2–8

Thus, if the specification for a call record field contains a N, the valid field values are the digits 2–9.

Each call record, except SER, contains call specific timepoint fields. The timepoint fields are recorded in epoch time format. Epoch time is the number of one second increments from a particular date/time in history. The embodiment of the present invention uses a date/time of midnight (00:00 am UTC) on Jan. 1, 1976, but this serves as an example and is not a limitation. It would be readily apparent to one skilled in the relevant art to implement an epoch time based on another date/time. In the records, Timepoint 1 represents the epoch time that is the origination time of the call 802. The other timepoint stored in the records are the number of seconds after Timepoint 1, that is, they are offsets from Timepoint 1 that a particular timepoint occurred. All of the timepoint fields must be filled in with "0's" prior to any data being recorded. Therefore, if a timepoint occurs, its count is one (1) or greater. Additionally, timepoint counters, not including Timepoint 1, do not rollover their counts, but stay at the maximum count if the time exceeds the limits.

The switch clock reflects local switch time and is used for all times except billing. Billing information is recorded in epoch time, which in this embodiment is UTC. The Time offset is a number reflecting the switch time relative to the UTC, that is, the offset due to time zones and, if appropriate, daylight savings time changes. There are three factors to consider when evaluating time change relative to UTC.

First, there are time zones on both sides of UTC, and therefore there may be both negative and positive offsets. Second, the time zone offsets count down from zero (in Greenwich, England) in an Eastward direction until the International Dateline is reached. At the Dateline, the date changes to the next day, such that the offset becomes positive and starts counting down until the zero offset is reached again at Greenwich. Third, there are many areas of the world that have time zones that are not in exact one-hour increments. For example, Australia has one time zone that has a thirty (30) minute difference from the two time zones on either side of it, and Northern India has a time zone that is fifteen (15) minutes after the one next to it. Therefore, the Time Offset of the call records must account for variations in both negative and positive offsets in fifteen (15) minute increments. The embodiment of the present invention satisfies this requirement by providing a Time Offset representing either positive or negative one minute increments.

There are two formulas used to convert local switch time to epoch time and back.
    i) Epoch Time+(Sign Bit*Time Offset)=Local Switch Time
    ii) Local Switch Time−(Sign Bit*Time Offset)=Epoch Time The switch records the Time Offset in the SER using a value where one (1) equals one (1) minute, and computes the Time Offset in seconds and adds this value to each local Timepoint 1 before the call record is recorded. For example, Central Standard Time is six (6) hours before UTC. In this case, the Sign Bit indicates "1" for negative offset and the Time Offset value recorded in the SER would be 360 (6 hours*60 minutes/hour=360 minutes). See FIG. 5 for more details on the SER record format. When recording Timepoint 1 in the call record, the switch multiplies the Time Offset by 60, because there is 60 seconds in each 1 minute increment, and determines whether the offset is positive or negative by checking the Sign Bit. This example results in a value of −21,600 (−1*360 minutes 60 seconds/minute=−21,600 seconds). Using equation (ii) from above, if the local switch time were midnight, the corresponding epoch time might be, for example, 1,200,000,000. Subtracting the Time Offset of −21,600 results in a corrected epoch time of 1,200,021,600 seconds, which is the epoch time for 6 hours after midnight on the next day in epoch time. This embodiment works equally as well in switches that are positioned on the East side of Greenwich where the Time Offset has a positive value.

Figure 9:
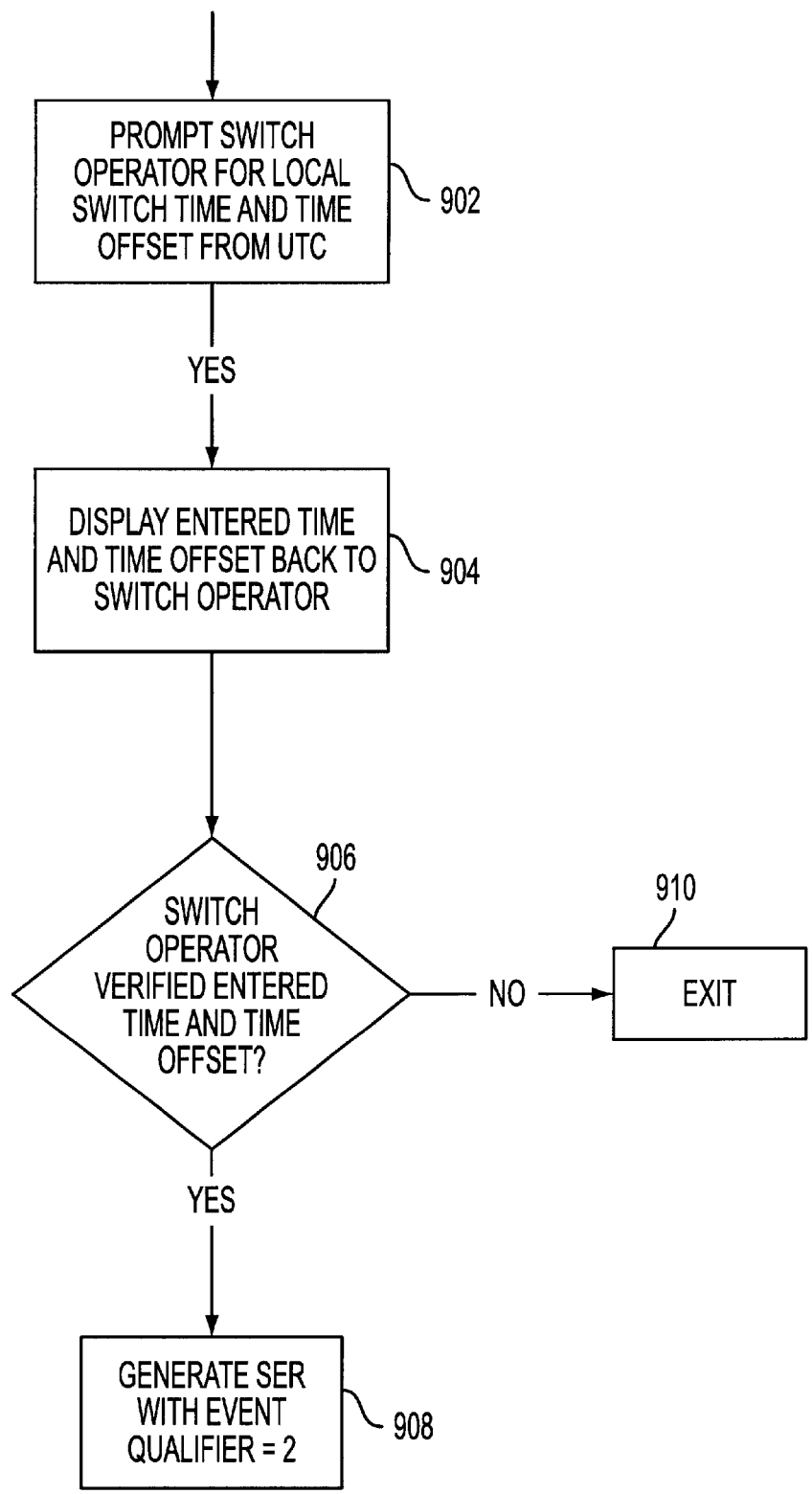
FIG. 9 is a control flow diagram illustrating the Change Time command in accordance with a preferred embodiment of the present invention.

Two commands are used when changing time. First, FIG. 9 illustrates the control flow of the Change Time command 900, which changes the Local Switch Time and the Time Offset. In FIG. 9, after a switch operator enters the Change Time command, the switch enters step 902 and prompts the switch operator for the Local Switch Time and Time Offset from UTC. In step 902 the switch operator enters a new Local Switch Time and Time Offset. Continuing to step 904, the new time and Time Offset are displayed back to the switch operator. Continuing to step 906, the switch operator must verify the entered time and Time Offset before the actual time and offset are changed on the switch. If in step 906 the switch operator verifies the changes, the switch proceeds to step 908 and generates a SER with an Event Qualifier equal to two which identifies that the change was made to the Local Switch Time and Time Offset of the switch. The billing center uses the SER for its bill processing. The switch proceeds to step 910 and exits the command. Referring back to step 906, if the switch operator does not verify the changes, the switch proceeds to step 910 and exits the command without updating the Local Switch Time and Time Offset. For more information on SER, see FIG. 5.

Figure 10:
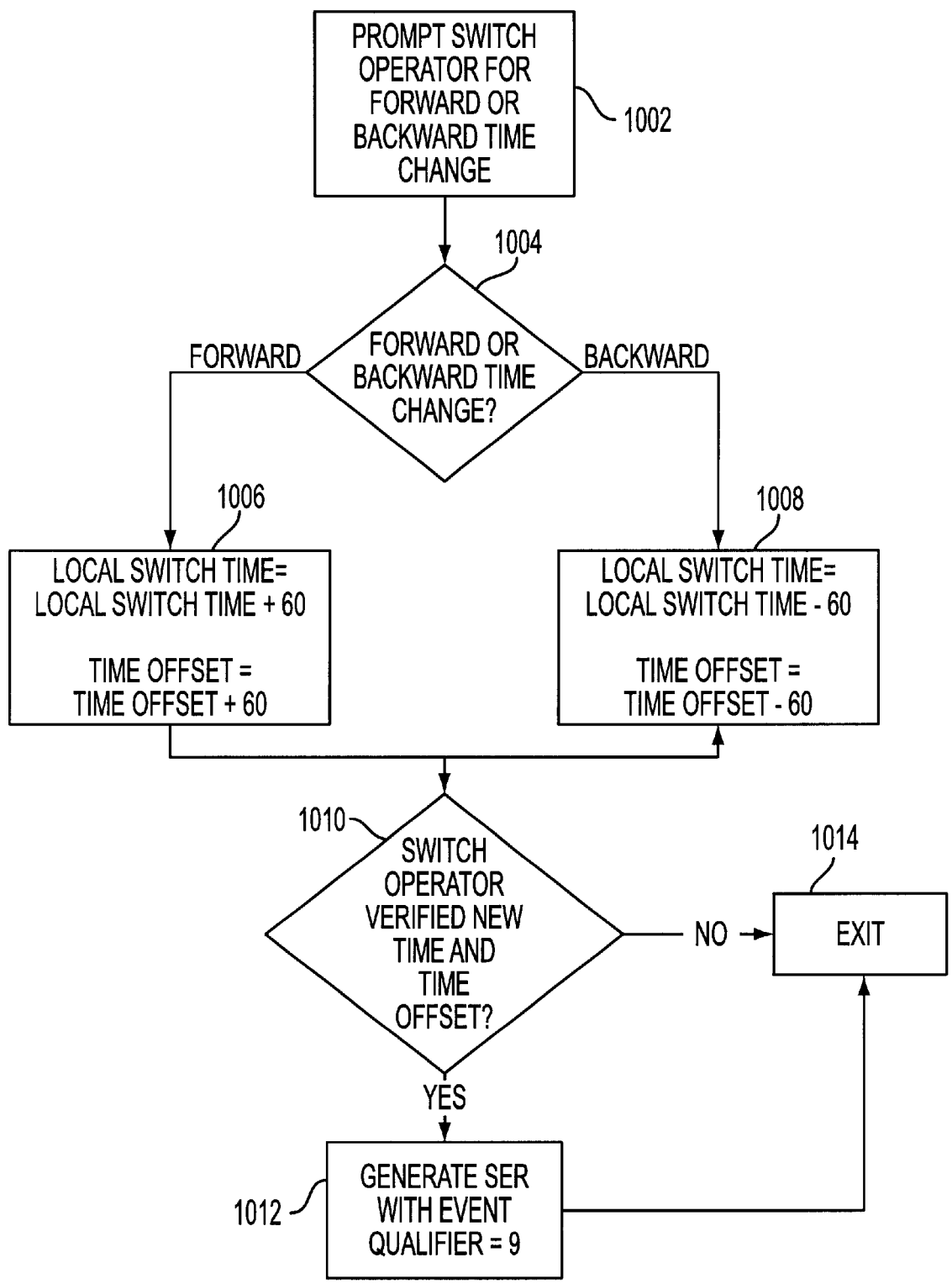
FIG. 10 is a control flow diagram illustrating the Change Daylight Savings Time command in accordance with a preferred embodiment of the present invention.

FIG. 10 illustrates the control flow for the Change Daylight Savings Time command 1000 which is the second command for changing time. In FIG. 10, after a switch operator enters the Change Daylight Savings Time command, the switch enters step 1002 and prompts the switch operator to select either a Forward or Backward time change. Continuing to step 1004, the switch operator makes a selection. In step 1004, if the switch operator selects the Forward option, the switch enters step 1006. In step 1006, the switch sets the Local Switch Time forward one hour and adds one hour (count of 60) to the Time Offset. The switch then proceeds to step 1010. Referring back to step 1004, if the switch operator selects the Backward option, the switch sets the Local Switch Time back one hour and subtract one hour (count of 60) from the Time Offset. The switch then proceeds to step 1010.

In step 1010, the switch operator must verify the forward or backward option and the new Local Switch Time and Time Offset before the actual time change takes place. If in step 1010, the switch operator verifies the new time and Time Offset, the switch proceeds to step 1012 and generates a SER with an Event Qualifier equal to nine which changes the Local Switch Time and Time Offset of the switch. The switch proceeds to step 1014 and exits the command. Referring back to step 1010, if the switch operator does not verify the changes, the switch proceeds to step 1014 and exits the command without updating the Local Switch Time and Time Offset.

After the successful completion of a Change Daylight Savings Time Command, the billing records are affected by the new Time Offset. This embodiment allows the epoch time, used as the billing time, to increment normally through the daylight savings time change procedure, and not to be affected by the change of Local Switch Time and Time Offset.

Network Call Identifier

An embodiment provides a unique NCID that is assigned to each telephone call that traverses through the telecommunications network. Thus, the NCID is a discrete identifier among all network calls. The NCID is transported and recorded at each switch that is involved with the telephone call.

The originating switch of a telephone call generates the NCID. The chosen embodiment of the NCID of the present invention is an eighty-two (82) bit identifier that is comprised of the following subfields:

i) Originating Switch ID (14 bits) This field represents the NCS Switch ID as defined in the Office Engineering table at each switch. The SER call record, however, contains an alpha numeric representation of the Switch ID. Thus, a switch uses the alphanumeric Switch ID as an index into a database for retrieving the corresponding NCS Switch ID.

ii) Originating Trunk Group (14 bits): This field represents the originating trunk group as defined in the 32/64-word call record format described above.

iii) Originating Port Number (19 bits): This field represents the originating port number as defined in the 32/64-word call record format described above.

iv) Timepoint 1 (32 bits): This field represents the Timepoint 1 value as defined in the 32/64-word call record format described above.

v) Sequence Number (3 bits) : This field represents the number of calls which have occurred on the same port number with the same Timepoint 1 (second) value. The first telephone call will have a sequence number set to '0.' This value increases incrementally for each successive call which originates on the same port number with the same Timepoint 1 value.

It would be readily apparent to one skilled in the relevant art to create an NCID of a different format. Each switch records the NCID in either the 32 or 64-word call record format. Regarding the 32-word call record format, intermediate and terminating switches can be used to record the NCID in the AuthCode field of the 32-word call record if the AuthCode filed is not used to record other information. In this case, the Originating Switch ID is the NCS Switch ID, not the alphanumeric Switch ID as recorded in the SER call record. If the AuthCode is used for other information, the intermediate and terminating switches record the NCID in the 64–word call record format. In contrast, originating switches do not use the AuthCode field when storing an NCID in a 32-word call record. Originating switches record the subfields of the NCID in the corresponding separate fields of the 32-word call record. That is, the Originating Switch ID is stored as an alphanumeric Switch ID in the Switch ID field of the SER call record; the Originating Trunk Group is stored in the Originating Trunk Group field of the 32-word call record; the Originating Port Number is stored in the Originating Port field of the 32-word call record; the Timepoint 1 is stored in the Timepoint 1 field of the 32-word call record; the Sequence Number is stored in the NCID Sequence Number field of the 32-word call record. The 32-word call record also includes an NCID Location (NCIDLOC) field to identify when the NCID is recorded in the AuthCode field of the call record. If the NCID Location field contains a '1,' then the AuthCode field contains the NCID. If the NCID Location field contains a '0,' then the NCID is stored in its separate sub-fields in the call record. Only intermediate and terminating switches set the NCID Location field to a '1' because originating switches store the NCID in the separate fields of the 32-word call record.

Regarding the 64-word call record format, the expanded call record includes a separate field, call the NCID field, to store the 82 bits of the NCID. This call record is handled the same regardless of whether an originating, intermediate, or terminating switch stores the NCID. In the 64-word call record format, the Originating Switch ID is the NCS Switch ID, not the alphanumeric Switch ID as recorded in the SER call record.

Figure 11:
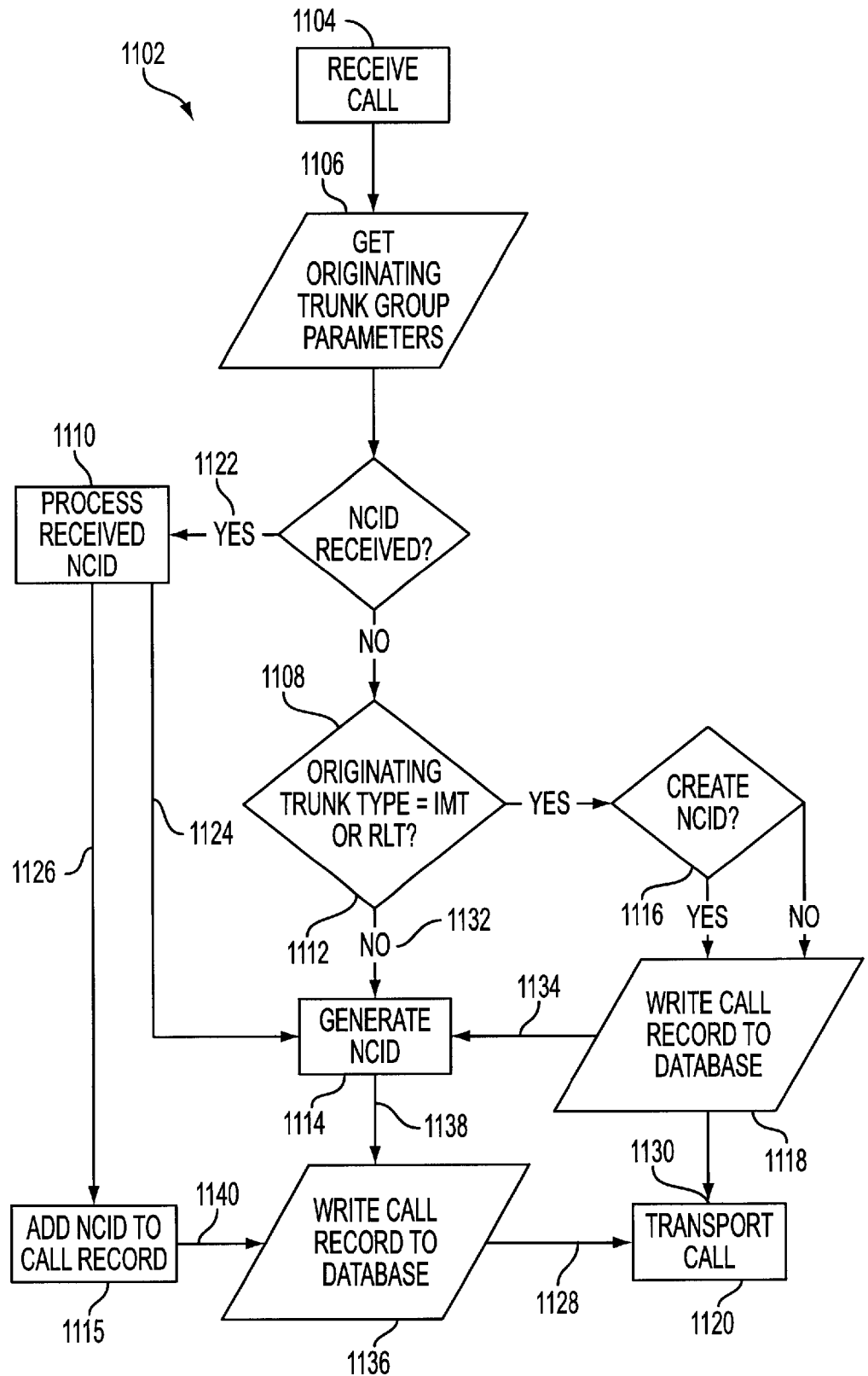
FIG. 11 is a control flow diagram illustrating the Network Call Identifier (NCID) switch call processing in accordance with a preferred embodiment of the present invention.

FIG. 11 illustrates the control flow of the Network Call Identifier switch call processing. A call 202 comes into a switch 106–110 (called the current switch for reference purposes; the current switch is the switch that is currently processing the call) at step 1104. In step 1104, the current switch receives the call 202 and proceeds to step 1106. In step 1106, the current switch accesses a local database and gets the trunk group parameters associated with the originating trunk group of the call 202. After getting the parameters, the current switch proceeds to step 1108. In step 1108, the current switch determines if it received an NCID with the call 202. If the current switch did not receive an NCID with the call 202, the switch continues to step 1112.

In step 1112, the switch analyzes the originating trunk group parameters to determine the originating trunk group type. If the originating trunk group type is an InterMachine Trunk (IMT) or a release link trunk (RLT), then the switch proceeds to step 1116. An IMT is a trunk connecting two normal telecommunication switches, whereas a RLT is a trunk connecting an intelligent services network (ISN) platform to a normal telecommunication switch. When the current switch reaches step 1116, the current switch knows that it is not an originating switch and that it has not received an NCID. In step 1116, the current switch analyzes the originating trunk group parameters to determine whether it is authorized to create an NCID for the call 202. In step 1116, if the current switch is not authorized to create an NCID for the call 202, the current switch proceeds to step 1118. When in step 1118, the current switch knows that it is not an originating switch, it did not receive an NCID for the call 202, but is not authorized to generate an NCID. Therefore, in step 1118, the current switch writes the call record associated with the call 202 to the local switch database and proceeds to step 1120. In step 1120, the current switch transports the call 202 out through the network with its associated NCID. Step 1120 is described below in more detail.

Referring again to step 1116, if the current switch is authorized to create an NCID for the call 202, the current switch proceeds to step 1114. In step 1114, the current switch generates a new NCID for the call 202 before continuing to step 1136. In step 1136, the current switch writes the call record, including the NCID, associated with the call 202 to the local switch database and proceeds to step 1120. In step 1120, the current switch transports the call 202 out through the network with its associated NCID. Step 1120 is described below in more detail.

Referring again to step 1112, if the current switch determines that the originating trunk group type is not an IMT or RLT, the current switch proceeds to step 1114. When reaching step 1114, the current switch knows that it is an originating switch and, therefore, must generate a NCID for the call 202. Step 1114 is described below in more detail. After generating a NCID in step 1114, the current switch proceeds to step 1136 to write the call record, including the NCID, associated with the call 202 to the local database. After writing the call record, the current switch proceeds to step 1120 to transport the call out through the network with its associated NCID. Step 1120 is also described below in more detail.

Referring again to step 1108, if the current switch determines that it received an NCID with the call 202, the current switch proceeds to step 1110. In step 1110, the current switch processes the received NCID. In step 1110, there are two possible results. First, the current switch may decide not to keep the received NCID thereby proceeding from step 1110 to step 1114 to generate a new NCID. Step 1110 is described below in more detail. In step 1114, the current switch may generate a new NCID for the call 202 before continuing to step 1136. Step 1114 is also described below in more detail. In step 1136, the current switch writes the call record associated with the call 202 to the local database. The current switch then proceeds to step 1120 and transports the call 202 out through the network with its associated NCID. Step 1120 is also described below in more detail.

Referring again to step 1110, the current switch may decide to keep the received NCID thereby proceeding from step 1110 to step 1115. In step 1115, the current switch adds the received NCID to the call record associated with the call 202. Steps 1110 and 1115 are described below in more detail. After step 1115, the current switch continues to step 1136 where it writes the call record associated with the call 202 to the local database. The current switch then proceeds to step 1120 and transports the call 202 out through the network with its associated NCID. Step 1120 is also described below in more detail.

Figure 12:
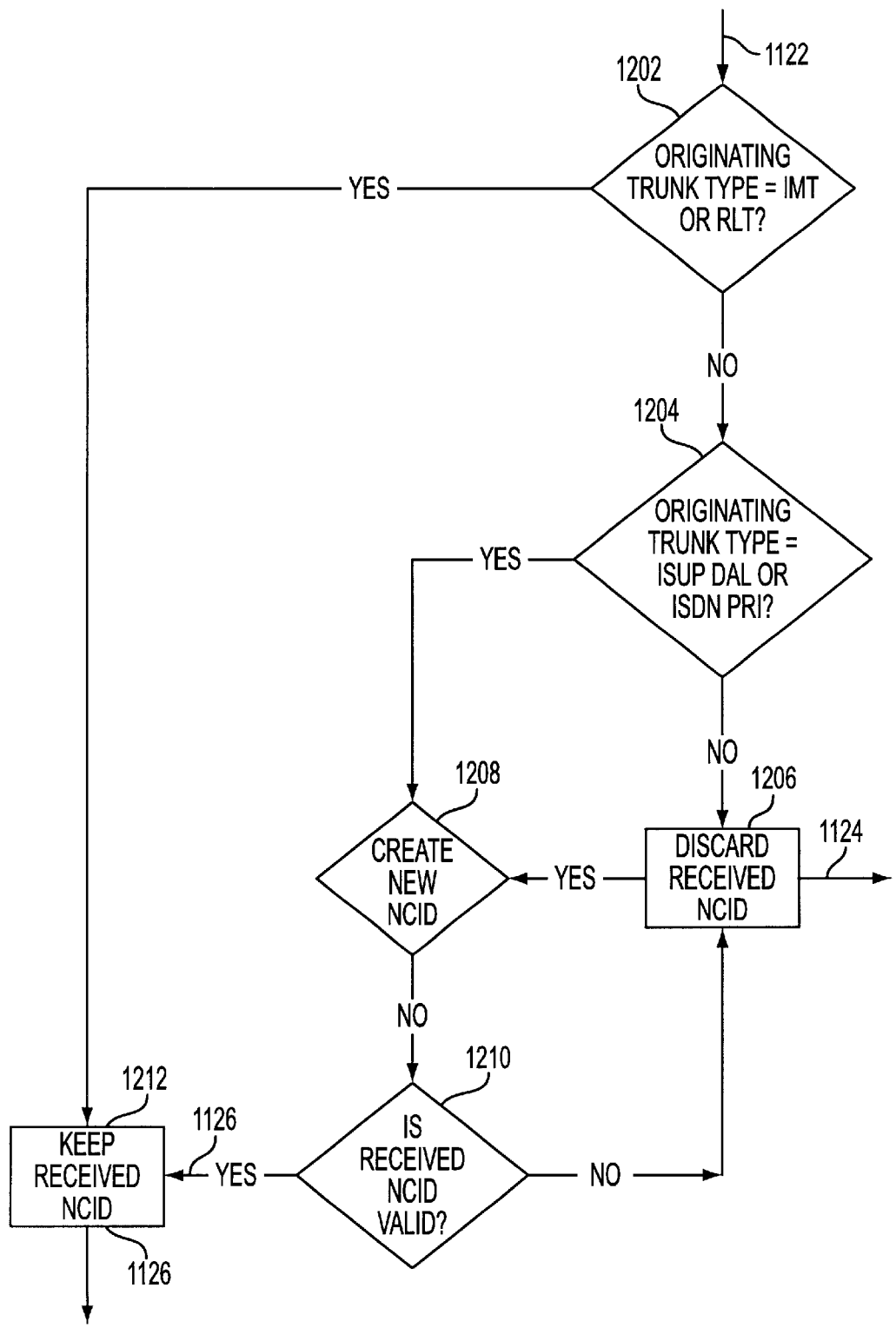
FIG. 12 is a control flow diagram illustrating the processing of a received Network Call Identifier in accordance with a preferred embodiment of the present invention.

FIG. 12 illustrates the control logic for step 1110 which processes a received NCID. The current switch enters step 1202 of step 1110 when it determines that an NCID was received with the call 202. In step 1202, the current switch analyzes the originating trunk group parameters to determine the originating trunk group type. If the originating trunk group type is an IMT or RLT, then the current switch proceeds to step 1212. When in step 1212, the current switch knows that it is not an originating switch and that it received an NCID for the call 202. Therefore, in step 1212, the current switch keeps the received NCID and exits step 1110, thereby continuing to step 1115 in FIG. 11, after which the current switch stores the received NCID in the call record and transports the call.

Referring again to step 1202, if the originating trunk group type is not an IMT or RLT, the current switch proceeds to step 1204. In step 1204, the current switch determines if the originating trunk group type is an Integrated Services User Parts Direct Access Line (ISUP DAL) or an Integrated Services Digital Network Primary Rate Interface (ISDN PRI). ISUP is a signaling protocol which allows information to be sent from switch to switch as information parameters. An ISUP DAL is a trunk group that primarily is shared by multiple customers of the network, but can also be dedicated to a single network customer. In contrast, an ISDN PRI is a trunk group that primarily is dedicated to a single network customer, but can also be shared by multiple network customers. A network customer is an entity that leases network resources. In step 1204, if the current switch determines that the trunk group type is not an ISUP DAL or ISDN PRI, the current switch proceeds to step 1206. When in step 1206, the current switch knows that it received an NCID that was not generated by a switch that is part of the telecommunication network or by a switch that is a customer of the network. Therefore, in step 1206, the current switch discards the received NCID because it is an unreliable NCID. From step 1206, the current switch exits step 1110, thereby continuing to step 1114 in FIG. 11 where the current switch creates a new NCID and transports that NCID with the call 202.

Referring back to step 1204, if the current switch determines that the originating trunk group type is an ISUP DAL or ISDN PRI, the current switch continues to step 1208. When in step 1208, the current switch knows that it received an NCID from a customer trunk group. Therefore, the current switch analyzes the originating trunk group parameters to determine whether it is authorized to create a new NCID for the call 202. The current switch may be authorized to create a new NCID and overwrite the NCID provided by the customer to ensure that a valid NCID corresponds to the call 202 and is sent through the network. In step 1208, if the current switch is not authorized to create a new NCID for the call 202, the current switch proceeds to step 1210. In step 1210, the current switch checks the validity of the received NCID, for example, the NCID length. If the received NCID is invalid, the current switch proceeds to step 1206. In step 1206, the current switch discards the invalid NCID. From step 1206, the current switch exits step 1110, thereby continuing to step 1114 in FIG. 11 where the current switch creates a new NCID and transports that NCID with the call 202.

Referring again to step 1210, if the current switch determines that the received NCID is valid, the current switch proceeds to step 1212. In step 1212 the current switch keeps the received NCID and exits step 1110, thereby continuing to step 1115 in FIG. 11 where the current switch stores the received NCID in the call record and transports the call.

Figure 13A:
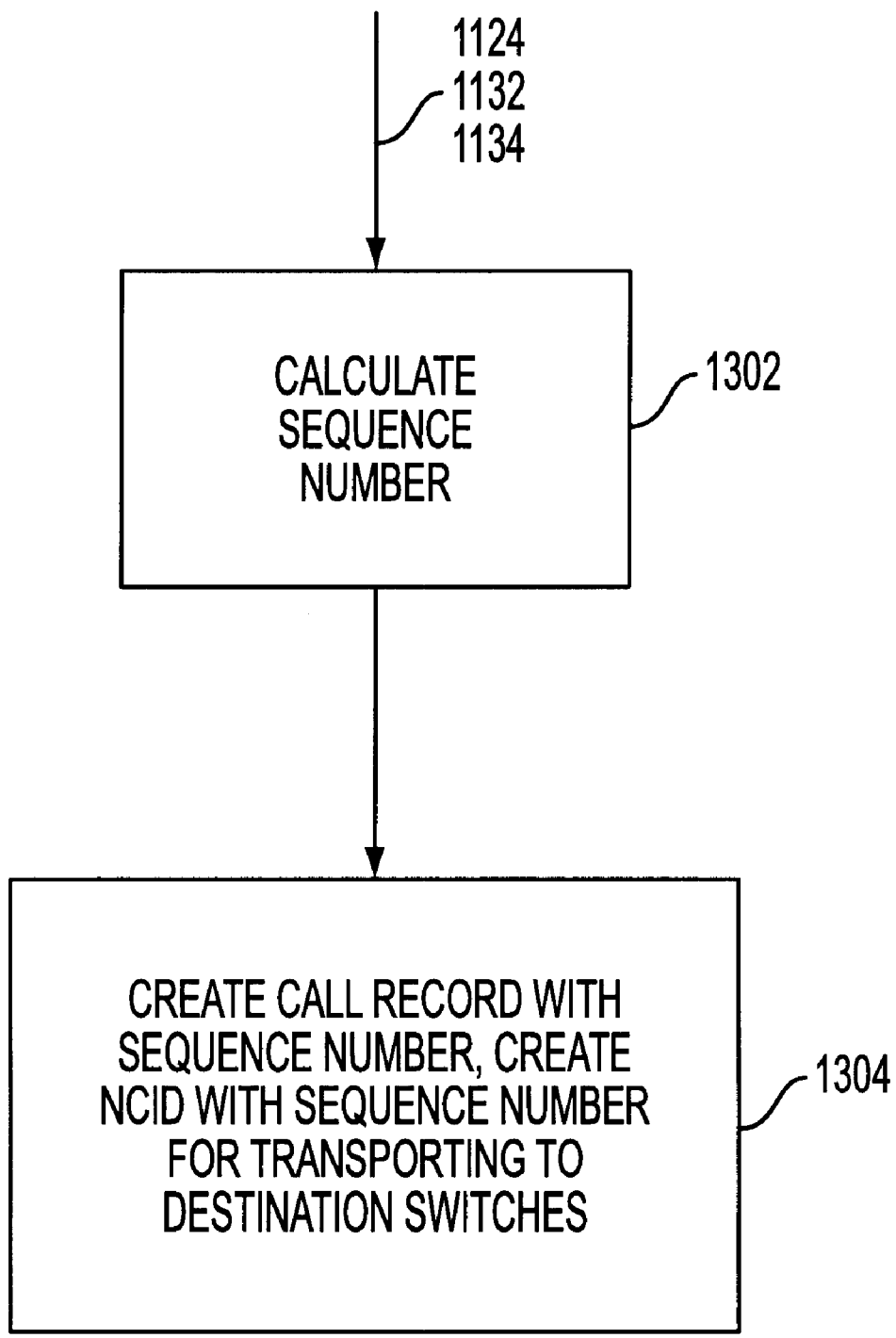
FIG. 13A is a control flow diagram illustrating the generation of a Network Call Identifier in accordance with a preferred embodiment of the present invention.

FIG. 13A illustrates the control logic for step 1114 which generates an NCID. The current switch enters step 1302 when an NCID must be created. In step 1302, the current switch calculates a sequence number. The sequence number represents the number of calls which have occurred on the same port number with the same Timepoint 1 value. The first call has a sequence number value of '0,' after which the sequence number increases incrementally for each successive call that originates on the same port number with the same Timepoint 1 value. After creating the sequence number in step 1302, the current switch proceeds to step 1304. In step 1304, the current switch creates a call record for the call 202, including in it the call's 202 newly created NCID. After the call record has been created, the current switch exits step 1114 and proceeds to step 1136 in FIG. 11 where the current switch writes the call record to the local switch database.

Figure 13B:
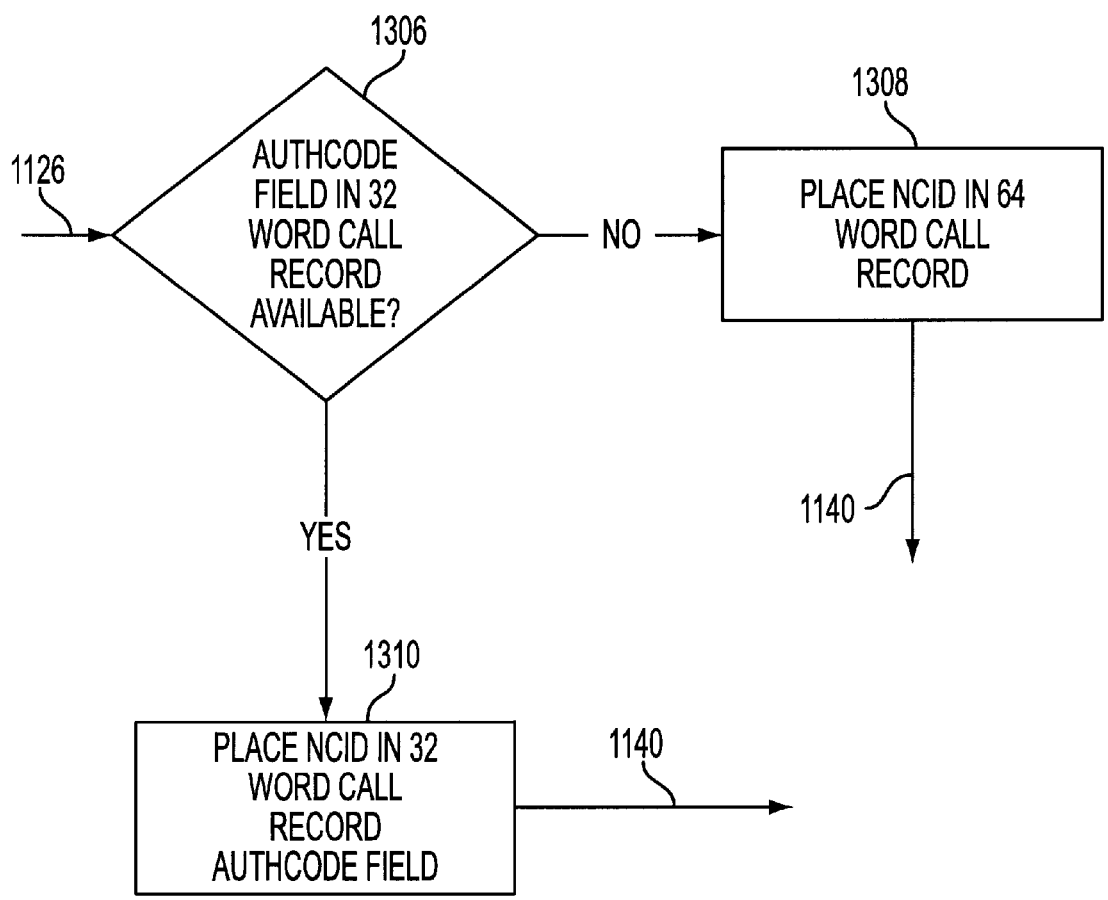
FIG. 13B is a control flow diagram illustrating the addition of a Network Call Identifier to a call record in accordance with a preferred embodiment of the present invention.

FIG. 13B illustrates the control logic for step 1115 which adds a received NCID to the call record associated with the call 202. Upon entering step 1115, the current switch enters step 1306. When in step 1306, the current switch knows that it has received a valid NCID from an intermediate or terminating switch, or from a customer switch. In step 1306, the current switch determines if the AuthCode field of the 32-word call record is available for storing the NCID. If the AuthCode field is available, the current switch proceeds to step 1310. In step 1310, the current switch stores the NCID in the AuthCode field of the 32-word call record. The current switch must also set the NCID Location field to the value '1' which indicates that the NCID is stored in the AuthCode field. After step 1310, the current switch exits step 1115 and continues to step 1136 in FIG. 11 where the current switch writes the call record to the local switch database.

Referring again to step 1306, if the AuthCode field is not available in the 32-word call record, the current switch proceeds to step 1308. In step 1308, the current switch stores the NCID in the NCID field of the 64-word call record. After step 1308, the current switch exits step 1115 and continues to step 1136 in FIG. 11 where the current switch writes the call record to the local switch database.

Figure 14:
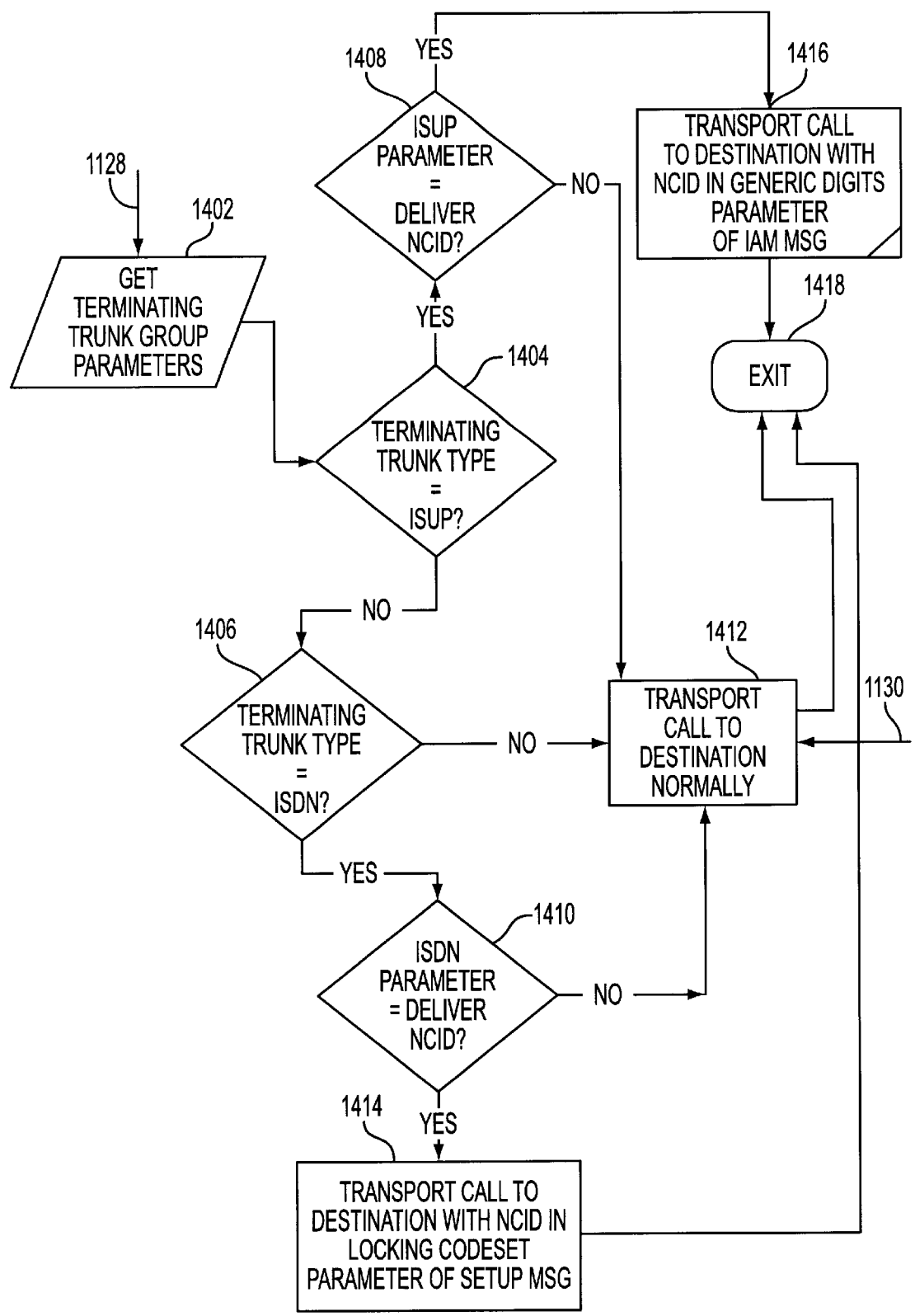
FIG. 14 is a control flow diagram illustrating the transport of a call in accordance with a preferred embodiment of the present invention.

FIG. 14 illustrates the control logic for step 1120 which transports the call from the current switch. There are two entry points for this control logic: steps 1402 and 1412. Upon entering step 1402 from step 1136 of FIG. 11, the current switch knows that it has created an NCID or has received a valid NCID. In step 1402, the current switch accesses a local database and gets the trunk group parameters associated with the terminating trunk group for transporting the call 202. After getting the parameters, the current switch proceeds to step 1404. In step 1404, the current switch determines the terminating trunk group type. If the terminating trunk is an ISUP trunk, the current switch proceeds to step 1408. In step 1408, the current switch analyzes the parameters associated with the ISUP trunk type to determine whether or not to deliver the NCID to the next switch. If the current switch is authorized to deliver the NCID, the current switch proceeds to step 1416. In step 1416, the current switch transports the call to the next switch along with a SS7 initial address message (IAM). The NCID is transported as part of the generic digits parameter of the IAM. The IAM contains setup information for the next switch which prepares the next switch to accept and complete the call 202. The format of the generic digits parameter is shown below in Table 306:

Generic Digits Parameter:
Code: 11000001
Type: 0

TABLE 306

| Byte #, Bit # | Description |
| --- | --- |
| byte 1, bits 0–4 | Type of Digits: Indicates the contents of the parameter. This field has a binary value of '11011' to indicate that the parameter contains the NCID. |
| byte 1, bits 5–7 | Encoding Scheme: Indicates the format of the parameter contents. This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 202 and the IAM, the current switch proceeds to step 1418, thereby exiting the switch processing.

Referring again to step 1408, if the current switch is not authorized to deliver the NCID to the next switch in an IAM message, the current switch proceeds to step 1412. In step 1412, the current switch transports the call 202 to the next switch under normal procedures which consists of sending an IAM message to the next switch without the NCID recorded as part of the generic digits parameter. After transporting the call 202, the current switch proceeds to step 1418, thereby exiting the switch processing.

Referring again to step 1404, if the current switch determines that the terminating trunk is not an ISUP, the current switch proceeds to step 1406. In step 1406, the current switch determines if the terminating trunk group is an ISDN trunk (the terminating trunk group is dedicated to one network customer). If the terminating trunk group is an ISDN, the current switch proceeds to step 1410. In step 1410, the current switch analyzes the parameters associated with the ISDN trunk group type to determine whether or not to deliver the NCID to the next switch. If the current switch is authorized to deliver the NCID, the current switch proceeds to step 1414. In step 1414, the current switch transports the call to the next switch along with a setup message. The setup message contains setup information for the next switch which prepares the next switch to accept and complete the call 202. The NCID is transported as part of the locking shift codeset 6 parameter of the setup message. The format of the locking shift codeset 6 parameter is shown below in Table 307:

Locking Shift Codeset 6 Parameter:
Code: 11000001
Type: 0

TABLE 307

| Byte #, Bit # | Description |
| --- | --- |
| byte 1, bits 0–4 | Type of Digits: Indicates the contents of the parameter. This field has a binary value of '11011' to indicate that the parameter contains the NCID. |

TABLE 307-continued

| Byte #, Bit # | Description |
|---|---|
| byte 1, bits 5–7 | Encoding Scheme: Indicates the format of the parameter contents. This field has a binary value of '011' to indicate that the NCID is stored in the binary format. |
| byte 2, bits 0–7 | Originating Switch ID |
| byte 3, bits 0–5 | |
| byte 3, bits 6–7 | Originating Trunk Group |
| byte 4, bits 0–7 | |
| byte 5, bits 0–3 | |
| byte 5, bits 4–7 | Originating Port Number |
| byte 6, bits 0–7 | |
| byte 7, bits 0–6 | |
| byte 7, bit 7 | Not Used |
| byte 8, bits 0–7 | Timepoint 1 |
| byte 9, bits 0–7 | |
| byte 10, bits 0–7 | |
| byte 11, bits 0–7 | |
| byte 12, bits 0–2 | NCID Sequence Number |
| byte 12, bits 3–7 | Not Used |

After transporting the call 202 and the setup message, the current switch proceeds to step 1418, thereby exiting the switch processing.

Referring again to step 1410, if the current switch determines that it does not have authority to deliver the NCID to the next switch in a setup message, the current switch proceeds to step 1412. In step 1412, the current switch transports the call 202 to the next switch under normal procedures which consists of sending a setup message to the next switch without the NCID recorded as part of the locking shift codeset 6 parameter. After transporting the call 202, the current switch proceeds to step 1418, thereby exiting the switch processing.

Referring again to step 1412, this step is also entered from step 1118 on FIG. 11 when the current switch did not receive an NCID, is an intermediate or terminating switch, and is not authorized to create an NCID. In this case, in step 1412, the current switch also transports the call 202 to the next switch under normal procedures which consists of sending an IAM or setup message to the next switch without the NCID recorded as part of the parameter. After transporting the call 202, the current switch proceeds to step 1418, thereby exiting the switch processing.

A system and method for the switches of a telecommunications network to generate call records for telephone calls using a flexible and expandable record format. Upon receipt of a telephone call, a switch in the network analyzes the telephone call to determine whether the default call record is sufficiently large to store call record information pertaining to the telephone call, or whether the expanded call record must be used to store the call information pertaining to the telephone call. After determining which call record to use, the switch generates the default or expanded call record. The switch sends a billing block, comprised of completed call records, to a billing center upon filling an entire billing block.

Introduction to a Callback Telephony System in Accordance with a Preferred Embodiment In today's telephony environment, a caller must contact an operator to initiate a conference call and/or have all parties dial a common number to connect into a conference call. This requires the cost of a human operator and the inconvenience of dialing a predefined number to be carried as overhead of each conference call. It also makes it very inefficient to schedule a conference call and assure that all parties are available to participate. It also requires a dedicated number for all the parties to access to facilitate the call.

In accordance with a preferred embodiment, a callback system is facilitated by a caller accessing a display from a computer and filling out information describing the parameters of a call. Information such as the date and time the call should be initiated, billing information, and telephone numbers of parties to participate in the call could be captured. Then, based on the information entered, a central or distributed computing facility with access to the hybrid network transmits e-mail in a note to each party required for the call copying the other parties to verify participation and calendar the event. The e-mail would include any particulars, such as the password associated with the call and time the call would be commenced. The necessary network facilities would also be reserved to assure the appropriate Quality of Service (QOS) would be available, and when the date and time requested arrived, the call is initiated by contacting each of the participants whether they be utilizing a telephone attached to a PSTN or a voice capable apparatus (such as a computer or intelligent television) attached to the hybrid network. At any time during scheduling, initiation or duration of the call, any party could request operator assistance by selecting that service from the display associated with the call. Thus, a completely automated callback system is provided for call setup and control.

For callers that utilize the callback system on a regular basis a custom profile is provided as an extension to the users existing profile information. The custom profile allows a user to store frequent conference call participants information. The profile contains participant's telephone numbers (which could be DDD, 1DDD, IP Address or Cellular phone number), E-mail address, paging service, fax number, secretary phone number, location, time zone, working hours and other pertinent information that may be useful for initiating a call.

Default profiles based on company or organization needs are also enabled and can be tailored to meet the needs of a particular user based on more global information.

Billing information would also be provided online. A user could enter a pre-arranged billing number or the ability to bill to a credit card or telephone number. If billing to a telephone number, the system treats the call like a collect or third party call to verify billing.

If profile information were predefined for a particular call scenario, then another option would allow an immediate connection of a conference call or single call at the press of a button, much as speed dialing is performed today except that more than one caller could be joined without intervention of the calling party, Internet callers are supported and an operator can be joined as required.

Before describing this aspect of the present invention, a description of internet environment is presented.

Internet

The Internet is a method of interconnecting physical networks and a set of conventions for using networks that allow the computers they reach to interact. Physically, the Internet is a huge, global network spanning over 92 countries and comprising 59,000 academic, commercial, government, and military networks, according to the Government Accounting Office (GAO), with these numbers expected to double each year. Furthermore, there are about 10 million host computers, 50 million users, and 76,000 World-Wide Web servers connected to the Internet. The backbone of the Internet consists of a series of high-speed communication links between major supercomputer sites and educational and research institutions within the U.S. and throughout the world.

Protocols govern the behavior along the Internet backbone and thus set down the key rules for data communication. Transmission Control Protocol/Internet Protocol (TCP/IP) has an open nature and is available to everyone, meaning that it attempts to create a network protocol system that is independent of computer or network operating system and architectural differences. As such, TCP/IP protocols are publicly available in standards documents, particularly in Requests for Comments (RFCs). A requirement for Internet connection is TCP/IP, which consists of a large set of data communications protocols, two of which are the Transmission Control Protocol and the Internet Protocol.

The International Telecommunication Union-Telecommunication Standardization Sector ("ITU-T") has established numerous standards governing protocols and line encoding for telecommunication devices. Because many of these standards are referenced throughout this document, summaries of the relevant standards are listed below for reference.

ITU G.711 Recommendation for Pulse Code Modulation of 3 kHz Audio Channels.

ITU G.722 Recommendation for 7 kHz Audio Coding within a 64 kbit/s channel.

ITU G.723 Recommendation for dual rate speech coder for multimedia communication transmitting at 5.3 and 6.3 kbits.

ITU G.728 Recommendation for coding of speech at 16 kbit/s using low-delay code excited linear prediction (LD-CELP)

ITU H.221 Frame Structure for a 64 to 1920 kbit/s Channel in Audiovisual Teleservices ITU H.223 Multiplexing Protocols for Low Bitrate Multimedia Terminals ITU H.225 ITU Recommendation for Media Stream Packetization and Synchronization on non-guaranteed quality of service LANs.

ITU H.230 Frame-synchronous Control and Indication Signals for Audiovisual Systems ITU H.231 Multipoint Control Unit for Audiovisual Systems Using Digital Channels up to 2 Mbit/s ITU H.242 System for Establishing Communication Between Audiovisual Terminals Using Digital Channels up to 2 Mbits ITU H.243 System for Establishing Communication Between Three or More Audiovisual Terminals Using Digital Channels up to 2 Mbit/s ITU H.245 Recommendation for a control protocol for multimedia communication ITU H.261 Recommendation for Video Coder-Decoder for audiovisual services supporting video resolutions of 352488 pixels and 176344 pixels.

ITU H.263 Recommendation for Video Coder-Decoder for audiovisual services supporting video resolutions of 128296 pixels, 176344 pixels, 352488 pixels, 7042576 pixels and 14083152 pixels.

ITU H.320 Recommendation for Narrow Band ISDN visual telephone systems.

ITU H.321 Visual Telephone Terminals over ATM

ITU H.322 Visual Telephone Terminals over Guaranteed Quality of Service LANs

ITU H.323 ITU Recommendation for Visual Telephone Systems and Equipment for Local Area Networks which provide a non-guaranteed quality of service.

ITU H.324 Recommendation for Terminals and Systems for low bitrate(28.8 Kbps) multimedia communication on dial-up telephone lines.

ITU T.120 Transmission Protocols for Multimedia Data.

In addition, several other relevant standards exist including:

ISDN Integrated Services Digital Network, the digital communication standard for transmission of voice, video and data on a single communications link.

RTP Real-Time Transport Protocol, an Internet Standard Protocol for transmission of real-time data like voice and video over unicast and multicast networks.

IP Internet Protocol, an Internet Standard Protocol for transmission and delivery of data packets on a packet switched network of interconnected computer systems.

PPP Point-to-Point Protocol

MPEG Motion Pictures Expert Group, a standards body under the International Standards Organization(ISO), Recommendations for compression of digital Video and Audio including the bit stream but not the compression algorithms.

SLIP Serial Line Internet Protocol

RSVP Resource Reservation Setup Protocol

UDP User Datagram Protocol

The popularity of the TCP/IP protocols on the Internet grew rapidly because they met an important need for worldwide data communication and had several important characteristics that allowed them to meet this need. These characteristics, still in use today, include:

1) A common addressing scheme that allows any device running TCP/IP to uniquely address any other device on the Internet.

2) Open protocol standards, freely available and developed independently of any hardware or operating system. Thus, TCP/IP is capable of being used with different hardware and software, even if Internet communication is not required.

Independence from any specific physical network hardware, allows TCP/IP to integrate many different kinds of networks. TCP/IP can be used over an Ethernet, a token ring, a dial-up line, or virtually any other kinds of physical transmission media.

An understanding of how information travels in communication systems is required to appreciate the recent steps taken by key players in today's Internet backbone business. The traditional type of communication network is circuit switched. The U.S. telephone system uses such circuit switching techniques. When a person or a computer makes a telephone call, the switching equipment within the telephone system seeks out a physical path from the originating telephone to the receiver's telephone. A circuit-switched network attempts to form a dedicated connection, or circuit, between these two points by first establishing a circuit from the originating phone through the local switching office, then across trunk lines, to a remote switching office, and finally to the destination telephone. This dedicated connection exists until the call terminates.

The establishment of a completed path is a prerequisite to the transmission of data for circuit switched networks. After the circuit is in place, the microphone captures analog signals, and the signals are transmitted to the Local Exchange Carrier (LEC) Central Office (CO) in analog form over an analog loop. The analog signal is not converted to digital form until it reaches the LEC Co, and even then only if the equipment is modem enough to support digital information. In an ISDN embodiment, however, the analog signals are converted to digital at the device and transmitted to the LEC as digital information.

Upon connection, the circuit guarantees that the samples can be delivered and reproduced by maintaining a data path of 64 Kbps (thousand bits per second). This rate is not the rate required to send digitized voice per se. Rather, 64 Kbps is the rate required to send voice digitized with the Pulse Code Modulated (PCM) technique. Many other methods for digitizing voice exist, including ADPCM (32 Kbps), GSM (13 Kbps), TrueSpeech 8.5 (8.5 Kbps), G.723 (6.4 Kbps or 5.3 Kbps) and Voxware RT29HQ (2.9 Kbps). Furthermore, the 64 Kbps path is maintained from LEC Central Office (CO) Switch to LEC CO, but not from end to end. The analog local loop transmits an analog signal, not 64 Kbps digitized audio. One of these analog local loops typically exists as the "last mile" of each of the telephone network circuits to attach the local telephone of the calling party.

This guarantee of capacity is the strength of circuit-switched networks. However, circuit switching has two significant drawbacks. First, the setup time can be considerable, because the call signal request may find the lines busy with other calls; in this event, there is no way to gain connection until some other connection terminates. Second, utilization can be low while costs are high. In other words, the calling party is charged for the duration of the call and for all of the time even if no data transmission takes place (i.e. no one speaks). Utilization can be low because the time between transmission of signals is unable to be used by any other calls, due to the dedication of the line. Any such unused bandwidth during the connection is wasted.

Additionally, the entire circuit switching infrastructure is built around 64 Kpbs circuits. The infrastructure assumes the use of PCM encoding techniques for voice. However, very high quality codecs are available that can encode voice using less than one-tenth of the bandwidth of PCM. However, the circuit switched network blindly allocates 64 Kpbs of bandwidth for a call, end-to-end, even if only one-tenth of the bandwidth is utilized. Furthermore, each circuit generally only connects two parties. Without the assistance of conference bridging equipment, an entire circuit to a phone is occupied in connecting one party to another party. Circuit switching has no multicast or multipoint communication capabilities, except when used in combination with conference bridging equipment.

Other reasons for long call setup time include the different signaling networks involved in call setup and the sheer distance causing propagation delay. Analog signaling from an end station to a CO on a low bandwidth link can also delay call setup. Also, the call setup data travels great distances on signaling networks that are not always transmitting data at the speed of light. When the calls are international, the variations in signaling networks grows, the equipment handling call setup is usually not as fast as modem setup and the distances are even greater, so call setup slows down even more. Further, in general, connection-oriented virtual or physical circuit setup, such as circuit switching, requires more time at connection setup time than comparable connectionless techniques due to the end-to-end handshaking required between the conversing parties.

Message switching is another switching strategy that has been considered. With this form of switching, no physical path is established in advance between the sender and receiver; instead, whenever the sender has a block of data to be sent, it is stored at the first switching office and retransmitted to the next switching point after error inspection. Message switching places no limit on block size, thus requiring that switching stations must have disks to buffer long blocks of data; also, a single block may tie up a line for many minutes, rendering message switching useless for interactive traffic.

Packet switched networks, which predominate the computer network industry, divide data into small pieces called packets that are multiplexed onto high capacity intermachine connections. A packet is a block of data with a strict upper limit on block size that carries with it sufficient identification necessary for delivery to its destination. Such packets usually contain several hundred bytes of data and occupy a given transmission line for only a few tens of milliseconds. Delivery of a larger file via packet switching requires that it be broken into many small packets and sent one at a time from one machine to the other. The network hardware delivers these packets to the specified destination, where the software reassembles them into a single file.

Packet switching is used by virtually all computer interconnections because of its efficiency in data transmissions. Packet switched networks use bandwidth on a circuit as needed, allowing other transmissions to pass through the lines in the interim. Furthermore, throughput is increased by the fact that a router or switching office can quickly forward to the next stop any given packet, or portion of a large file, that it receives, long before the other packets of the file have arrived. In message switching, the intermediate router would have to wait until the entire block was delivered before forwarding. Today, message switching is no longer used in computer networks because of the superiority of packet switching.

To better understand the Internet, a comparison to the telephone system is helpful. The public switched telephone network was designed with the goal of transmitting human voice, in a more or less recognizable form. Their suitability has been improved for computer-to-computer communications but remains far from optimal. A cable running between two computers can transfer data at speeds in the hundreds of megabits, and even gigabits per second. A poor error rate at these speeds would be only one error per day. In contrast, a dial-up line, using standard telephone lines, has a maximum data rate in the thousands of bits per second, and a much higher error rate. In fact, the combined bit rate times error rate performance of a local cable could be 11 orders of magnitude better than a voice-grade telephone line. New technology, however, has been improving the performance of these lines.

The Internet is composed of a great number of individual networks, together forming a global connection of thousands of computer systems. After understanding that machines are connected to the individual networks, one can investigate how the networks are connected together to form an internetwork, or an internet. At this point, internet gateways and internet routers come into play.

In terms of architecture, two given networks are connected by a computer that attaches to both of them. Internet gateways and routers provide those links necessary to send packets between networks and thus make connections possible. Without these links, data communication through the Internet would not be possible, as the information either would not reach its destination or would be incomprehensible upon arrival. A gateway may be thought of as an entrance to a communications network that performs code and protocol conversion between two otherwise incompatible networks. For instance, gateways transfer electronic mail and data files between networks over the internet.

IP Routers are also computers that connect networks and is a newer term preferred by vendors. These routers must make decisions as to how to send the data packets it receives to its destination through the use of continually updated routing tables. By analyzing the destination network address of the packets, routers make these decisions. Importantly, a router does not generally need to decide which host or end user will receive a packet; instead, a router seeks only the destination network and thus keeps track of information sufficient to get to the appropriate network, not necessarily the appropriate end user. Therefore, routers do not need to be huge supercomputing systems and are often just machines with small main memories and little disk storage. The distinction between gateways and routers is slight, and current usage blurs the line to the extent that the two terms are often used interchangeably. In current terminology, a gateway moves data between different protocols and a router moves data between different networks. So a system that moves mail between TCP/IP and OSI is a gateway, but a traditional IP gateway (that connects different networks) is a router.

Now, it is useful to take a simplified look at routing in traditional telephone systems. The telephone system is organized as a highly redundant, multilevel hierarchy. Each telephone has two copper wires coming out of it that go directly to the telephone company's nearest end office, also called a local central office. The distance is typically less than 10 km; in the U.S. alone, there are approximately 20,000 end offices. The concatenation of the area code and the first three digits of the telephone number uniquely specify an end office and help dictate the rate and billing structure.

The two-wire connections between each subscriber's telephone and the end office are called local loops. If a subscriber attached to a given end office calls another subscriber attached to the same end office, the switching mechanism within the office sets up a direct electrical connection between the two local loops. This connection remains intact for the duration of the call, due to the circuit switching techniques discussed earlier.

If the subscriber attached to a given end office calls a user attached to a different end office, more work has to be done in the routing of the call. First, each end office has a number of outgoing lines to one or more nearby switching centers, called toll offices. These lines are called toll connecting trunks. If both the caller's and the receiver's end offices happen to have a toll connecting trunk to the same toll office, the connection may be established within the toll office. If the caller and the recipient of the call do not share a toll office, then the path will have to be established somewhere higher up in the hierarchy. There are sectional and regional offices that form a network by which the toll offices are connected. The toll, sectional, and regional exchanges communicate with each other via high bandwidth inter-toll trunks. The number of different kinds of switching centers and their specific topology varies from country to country, depending on its telephone density.

Using Network Level Communicstion For Smooth User Connection

In addition to the data transfer functionality of the Internet, TCP/IP also seeks to convince users that the Internet is a solitary, virtual network. TCP/IP accomplishes this by providing a universal interconnection among machines, independent of the specific networks to which hosts and end users attach. Besides router interconnection of physical networks, software is required on each host to allow application programs to use the Internet as if it were a single, real physical network.

The basis of Internet service is an underlying, connectionless packet delivery system run by routers, with the basic unit of transfer being the packet. In internets running TCP/IP, such as the Internet backbone, these packets are called datagrams. This section will briefly discuss how these datagrams are routed through the Internet.

In packet switching systems, routing is the process of choosing a path over which to send packets. As mentioned before, routers are the computers that make such choices. For the routing of information from one host within a network to another host on the same network, the datagrams that are sent do not actually reach the Internet backbone. This is an example of internal routing, which is completely self-contained within the network. The machines outside of the network do not participate in these internal routing decisions.

At this stage, a distinction should be made between direct delivery and indirect delivery. Direct delivery is the transmission of a datagram from one machine across a single physical network to another machine on the same physical network. Such deliveries do not involve routers. Instead, the sender encapsulates the datagram in a physical frame, addresses it, and then sends the frame directly to the destination machine.

Indirect delivery is necessary when more than one physical network is involved, in particular when a machine on one network wishes to communicate with a machine on another network. This type of communication is what one may think of when speaking of routing information across the Internet backbone. In indirect delivery, routers are required. To send a datagram, the sender must identify a router to which the datagram can be sent, and the router then forwards the datagram towards the destination network. Recall that routers generally do not keep track of the individual host addresses (of which there are millions), but rather just keeps track of physical networks (of which there are thousands). Essentially, routers in the Internet form a cooperative, interconnected structure, and datagrams pass from router to router across the backbone until they reach a router that can deliver the datagram directly.

The changing face of the internet world causes a steady inflow of new systems and technology. The following three developments, each likely to become more prevalent in the near future, serve as an introduction to the technological arena.

Asynchronous Transfer Mode (ATM) is a networking technology using a high-speed, connection-oriented system for both local area and wide area networks. ATM networks require modern hardware including:

1) High speed switches that can operate at gigabit (trillion bit) per second speeds to handle the traffic from many computers.
2) Optical fibers (versus copper wires) that provide high data transfer rates, with host-to-ATM switch connections running at 100 or 155 Mbps (million bits per second).
3) Fixed size cells, each of which includes 53 bytes.

ATM incorporates features of both packet switching and circuit switching, as it is designed to carry voice, video, and television signals in addition to data. Pure packet switching technology is not conducive to carrying voice transmissions because such transfers demand more stable bandwidth.

Frame relay systems use packet switching techniques, but are more efficient than traditional systems. This efficiency is partly due to the fact that they perform less error checking than traditional X.25 packet-switching services. In fact, many intermediate nodes do little or no error checking at all and only deal with routing, leaving the error checking to the higher layers of the system. With the greater reliability of today's transmissions, much of the error checking previously performed has become unnecessary. Thus, frame relay offers increased performance compared to traditional systems.

An Integrated Services Digital Network is an "international telecommunications standard for transmitting voice, video, and data over digital lines," most commonly running at 64 kilobits per second. The traditional phone network runs voice at only 4 kilobits per second. To adopt ISDN, an end user or company must upgrade to ISDN terminal equipment, central office hardware, and central office software. The ostensible goals of ISDN include the following:

1) To provide an internationally accepted standard for voice, data and signaling;
2) To make all transmission circuits end-to-end digital;
3) To adopt a standard out-of-band signaling system; and
4) To bring significantly more bandwidth to the desktop.

An ISP is composed of several disparate systems. As ISP integration proceeds, formerly independent systems now become part of one larger whole with concomitant increases in the level of analysis, testing, scheduling, and training in all disciplines of the ISP.

Internet-Based Callback Architecture

The following information discusses the detailed architecture of an internet-based callback architecture in accordance with a preferred embodiment. The callback call flow commences when a caller calls into a local internet service provider. The caller addresses the callback server to access the callback home page through the internet. At the callback server home page, the caller enters, sees and/or updates default information such as: callback Internet Protocol (IP) address, call-to phone number (or multiple phone numbers to initiate a conference call) and charge-to method at a minimum. Other information, such as one or more numbers comprising entry of a Direct Distance Dialing (DDD), International Direct Distance Dialing (IDDD) or an Internet Protocol (IP) address can be utilized to specify a phone number or internet computer with voice capability. In addition, a date and time can be prearranged for staging the callback operation. Additional information that can be captured at the callback server home page is detailed below in specific examples designed to elaborate and clarify in accordance with a preferred embodiment.

Then, the callback server sends a message to the callback switch with the appropriate calling information, and the callback switch initiates the callback leg of the call through the Public Service Telephony Network (PSTN) to the destination specified by the caller whereby the callback caller answers the incoming call to. Once the caller end of the call is prepared, then the callback switch initiates call-to call leg(s) which connect the call through path through PSTN to a telephone set. Once all of the callers have been connected, then when the status of the call changes, an exception condition is indicated on the display if it is an IP call, or an audio indicia of the condition is transmitted to the callers if they are utilizing a standard telephony device. A change in status could be a caller hanging up or a glitch occurring in the transmission. The exception conditions are also captured for quality of service analysis.

When the call is initiated utilizing the information entered into the callback server home page, as part of the initialization of the callback session, a separate temporary webpage is created which is accessible to all members of the callback via a password selected by the initiator of the callback session. While all of the callers are being connected and throughout the duration of the telephony experience, the status of the call leg changes, and exception conditions, are indicated on the temporary created status webpage, or an audio indicia, where appropriate, of the condition is transmitted to the callers if they are utilizing a standard telephony device. Then, as callers are connected, removed, or change status, the display is updated to reflect the status of each participant's connection. In addition, as the call progresses, participants can drag and drop files, video clips or any other information which would be utilized as collaborative material during the call. Each participant would be required to move information to their personal computer before the call terminated, since the webpage is temporary and is deleted upon termination of the call. The temporary webpage is password protected to avoid unauthorized access to the information contained in the webpage.

Callback Service Potential

The callback service includes support for one-to-one calling, one-to-many calling (conference calling, fax broadcast, text-to-speech message delivery, voice-to-voice message delivery, conference call reservation whereby the server sends E-mails to call-to participants with the conference call details, the server sends fax to call-to participants, or the server sends a text-to-speech message to call-to participants.

Internet Service Potential

Real-time view of the status of each conference call participant, ANI and an alphanumeric representation to identify each participant entered by the initiator when a call is "reserved" can be displayed on screen as participants connect to conference. This information is captured as part of the call record set forth earlier.

In an alternative embodiment, a conference call without callback leg is enabled. In this embodiment, a callback customer participates through a Voice Over Network (VON) application utilizing a computer with voice capability, and can initiate a video screen popup on the computer display for manual operator assistance as detailed above in the description of a video operator.

Internet-Based Callback Architecture

In an internet based callback architecture, the callback caller dials into a local internet service provider. Then, the caller addresses the host server containing the callback home page. At the callback server home page, the caller enters the information described earlier including a callback Internet Protocol (IP) address, call-to phone number (or multiple phone numbers to initiate a conference call) and charge-to method at a minimum. Then, for the callback call flow to initiate the call, the callback server, where the callback server home page is located, transmits a message to the callback switch with the necessary calling information generated from the callback home page. Finally, the callback switch establishes an internet voice session with the callback caller utilizing the internet service provider to establish a voice IP session with the initiating client. The callback switch then initiates the call-to call leg(s) routing the call out over the public service telephony network to a telephone set.

Self-Regulating System

An expert system monitors each call in accordance with a preferred embodiment. The system includes rules that define what logic to execute when an exception occurs. The rules include specialized processing based on whether the call is routed via a PSTN or the internet. In addition, the system includes a default connection to a manual operator if no other correction of the connection is available. For example, if a caller hangs up during a teleconference and other callers are still connected, an exception message is sent to each of the still connected callers informing them of the status change. Another aspect of the expert system is to ensure quality of service (QOS) and produce reports indicating both integrity and exceptions. Scheduling of resources is tied to this expert system, which regulates whether calls can be scheduled based on available or projected resources at the time of the proposed call. For example, since all calls used by this system are initiated by the callback switch, if there are insufficient outgoing trunk ports during the period of time that a callback subscriber requests, then the callback subscriber is prompted to select another time or denied access to the resources for that time. This is utilized to predict when additional ports and/or resources are required.

Fault Management

The NGN operations architecture specifies the points of insertion and collections for network wide events that feed the Fault Management systems. Since the components of the packet portion of the hybrid NGN infrastructure are in most cases manageable by SNMP or some other standard management protocol the major challenges are the following:

1. Correlation of the events from the packet infrastructure with the Core circuit-based network events to provide the operators with a seamless service oriented view of the overall health of the network;
2. Event gathering and interpretation from the Core circuit network elements; and
3. Mediation and standardization of the network messages to aid processing by the network management framework of the NGN.

The network management components of the NGN provide comprehensive solutions to address these challenges. Correlation is provided by the use of rules based inference engines. Event gathering and interpretation is typically performed by custom development of software interfaces which communicate directly with the network elements, process raw events and sort them by context prior to storing them. For example, alarms versus command responses. The mediation and standardization challenge is addressed by using a comprehensive library of all possible message types and network events categorize the numerous messages that the NGN generates.

FIG. 15A is a flowchart showing a Fault Management Process 1550 in accordance with a preferred embodiment of the present invention. The Fault Management Process 1550 begins with a transmitting step 1552. In step 1552, data is transmitted over the hybrid network, including video and mixed audio information. The data transmission generally makes full use of the hybrid networks mixed circuit-switched an packet-switched components. As discussed above, the hybrid network includes approximately all the advantages of a packet based network while still making use of the older circuit-switched components already in place. The system is able to do this by correlating events raised by both the circuit-switched and packet-switch network elements, as discussed later in relation to event and correlating steps 1554 and 1556.

In a circuit-switched event gathering step 1554, an event is obtained from a circuit-switched based network element. As discussed above, event gathering and interpretation is typically performed by custom developed software interfaces which communicate directly with the network elements, process raw network events, and sort the events by context prior to storing them. After obtaining the events, the events are correlated in a correlation step 1556.

In a correlation step 1556, the event gathered in step 1554 is correlated with a second event obtained from a packet-switched network element. As with circuit-switched network elements, packet-switched event gathering and interpretation is typically performed by custom developed software interfaces which communicate directly with the network elements, process raw network events, and sort the events by context prior to storing them. As discussed above, the correlation is preferably provided by a rules based inference engine. After the events are correlated, a fault message is created in a fault message step 1558.

In a fault message step 1558, a fault message is created based on the correlated first and second events obtained in steps 1554 and 1556. Preferably the fault message is created utilizing a comprehensive library of all possible message types and network events which categorizes the numerous messages that the hybrid network generates.

FIG. 15B is a block diagram showing a Fault Management component 1500 in accordance with a preferred embodiment of the present invention. The Fault Management component 1500 records failures and exceptions in network devices (e.g. network routers or UNIX servers) and performs the following operations:

1) performs root-cause correlation of the failures and exceptions;
2) immediately takes corrective and/or informative actions such as sending a page, logging a help desk ticket, sending an electronic mail message, or calling a resolution script;
3) stores the information into a Database Component for later analysis by the Reporting Component; and
4) allows real time viewing of faults in a network map and network event views.

The Fault Management component 1500 includes the following elements:

UNIX Servers 1502—Any UNIX Server with BMC Patrol clients loaded.

NT Servers 1504—Any NT Server with BMC Patrol clients loaded.

SNMP Devices 1506—Any SNMP manageable device.

HP OV Network Node Manager (Collector Component) 1508—HP OpenView Network Node Manager is one product which performs several functions. In this context it is it is responsible for receiving performance information from BMC Patrol clients via BMC Patrol View.

Seagate NerveCenter 1510—In a fault management context, Seagate NerveCenter performs root-cause correlation of faults and events across the network.

HP OV Network Node Manager Network Map 1512—HP OpenView Network Node Manager is one product which performs several functions. In this context it is responsible for maintaining and displaying the node level network map of the network the MNSIS architecture monitors.

HP OV Network Node Manager 1514—HP OpenView Network Node Manager is one product which performs several functions. In this context it is it is responsible for receiving and displaying all events, regardless of their source.

Netcool HP OV NNM Probe 1516—An Omnibus Netcool probe which is installed on the same system as HP OV Network Node Manager and forwards events to the Omnibus Netcool Object Server.

Micromuse Internet Service Monitors 1518—An Omnibus Netcool suite of active probes (monitors) which monitor internet services such as FTP, POP3, SMTP, NNTP, DNS, HTTP, and RADIUS. These monitors collect availability and performance data and forward the information as alerts to the Omnibus Netcool Object Server.

Netcool Object Server 1520—The Omnibus Netcool Object Server is a real-time memory resident database which stores all current events (alerts). The events are viewable by operations personnel using a number of event lists and views, all of which are highly customizable by each operator.

Notification Stooler 1522—A custom provided subcomponent which spools job-files that specify which events have occurred for possible notifications.

Spooled Job 1524—Each spooled job represents a specific event that was received by the Netcool Object Server and may need to result in one or more notification actions. Each job is stored as a file in a special notification spool directory.

Notification Actor 1526—A custom provided subcomponent which determines the alert time, source node, and alert type from the loaded spooled job and initiates notification actions based as specified in the configuration file. Notification actions include alphanumeric pages, trouble tickets, email, and resolution scripts. Multiple notification actions can be specified in the configuration files such that different actions are taken for different alert times, source nodes, and/or alert types. Default actions are also supported.

Alphanumeric Page 1528—An alphanumeric page sent using Telamon TelAlert via modem dialing the relevant paging provider. The alphanumeric page message provides contextual notification of actions to be performed. Context can include any information but frequently contains information such as the device name, problem description, and priority.

Electronic Mail Message 1530—An internet mail message send using the UNIX mail utility. The mail message is frequently used to provide non-urgent notification of situations or actions automatically performed by the MNSIS architecture along with detailed context.

Local Script Execution 1532—Initiates any local script on the machine, which may initiate scripts or applications on other machines.

Remedy Gateway 1534—The Omnibus Netcool Remedy Gateway automatically reads alerts in the Netcool Object Server and opens tickets within Remedy as customized by the user. The Remedy trouble ticket 1D is returned to the Omnibus and can be viewed as further reference.

Remedy 1536—Remedy Action Request System, a trouble ticketing system.

Oracle Gateway 1538—The Omnibus Netcool Oracle Gateway automatically reads alerts in the Netcool Object Server and logs records within Oracle as customized by the user.

Oracle 1540—Oracle is a relational database management system.

Generate Time Key Script 1542—Script which generates New Time Records from alerts in the Netcool Object Server.

New Time Records 1544–Time records corresponding to new alerts in Netcool Object Server which need to be added to the Oracle time tables.

SQL Loader Script 1546—A custom script which automatically loads records into Oracle via SQL Loader Direct Load.

Proactive Threshold Manager

The Proactive Threshold Manager is an automated network manager that forewarns service providers of a chance that a service level agreement to maintain a certain level of service is in danger of being breached.

The Proactive Threshold Manager provides real-time threshold analysis (that is, it continuously monitors for plan thresholds that have been exceeded) using algorithms. It receives call detail records from the Server and returns alarms which may be retrieved and examined using an NGN workstation. The threshold manager resides on an NGN hybrid network computer.

A threshold generally is a number which, when exceeded, generates an alarm in the Proactive Threshold Manager indicating possible breach of a service level agreement. Thresholds may be specified for the time of day and/or the day of the week. Furthermore, a threshold may be applied to each category for which the Proactive threshold manager keeps counts, including the number of short-duration calls, long-duration calls, and cumulative minutes.

When an alarm is generated by the Proactive Threshold Manager, it is also prioritized. The priority is a multiple of the number of times a threshold has been exceeded. For example, if the threshold was 10 and the relevant count has reached 50, then the priority of the alarm is 5 (50.div.10).

Each alarm is available to an NGN hybrid network analyst via an NGN Workstation. The workstation is a PC with access to a Server and retrieves the next available alarm of the highest priority. The analyst investigates the alarm data and, if a service level agreement breach is suspected, notifies the provider and suggests appropriate actions to stop the breach.

Figure 16A:
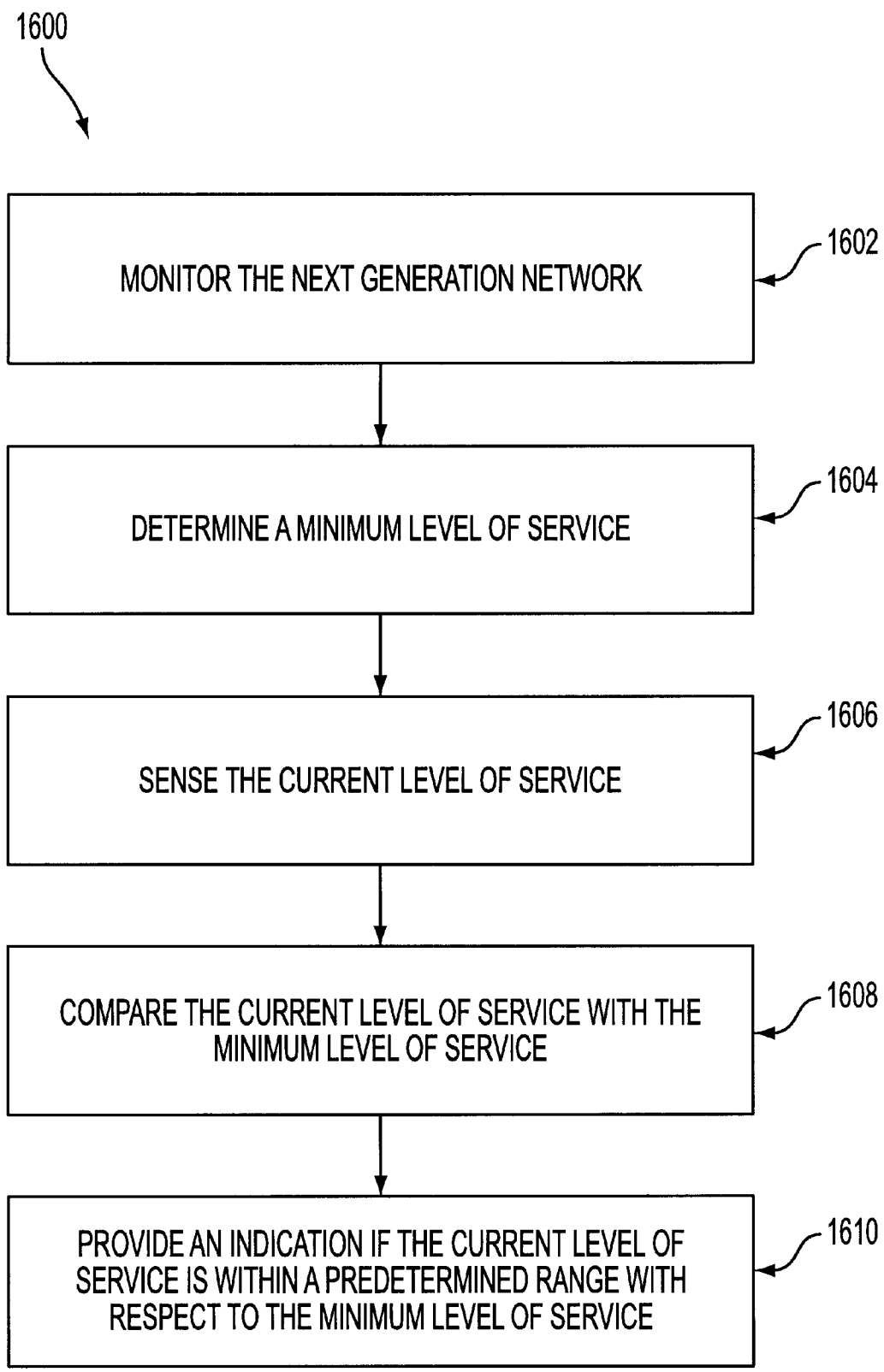
FIG. 16A is a flowchart showing a Proactive Threshold Management Process in accordance with a preferred embodiment of the present invention.

FIG. 16A is a flowchart showing a Proactive Threshold Management Process 1600 in accordance with a preferred embodiment of the present invention. The process begins with a monitoring step 1602. In step 1602, the Proactive Threshold Manager monitors the NGN hybrid network. The Proactive Threshold Manager generally monitors the network at all times to ensure proper service is provided to subscribers of the network, by assisting service providers in maintaining a proper level of service.

In a minimum level determination step 1604, the Proactive Threshold Manager determines the minimum level of service needed to avoid breaching subscriber service level agreements. Service level agreement information is generally provided to the Proactive Threshold Manager by the rules database which contains most pertinent subscriber information.

In a sensing step 1606, the Proactive Threshold Manager senses the current level of service which is being provided to customers. Protocol converters assist the Proactive Threshold Manager in communicating with various components of the system. Protocol converters are able to translate information between the packet-switched an circuit-switched system components, thus allowing the Proactive Threshold Manager to communicate with all the components of the hybrid system.

In a comparing step 1608, the Proactive Threshold Manager compares the current level of service, sensed in step 1606, with the minimum level of service, determined in step 1604, to determine where the current level of service is in relation to the minimum level service which needs to be provided to subscribers.

In an alarm step 1610, the Proactive Threshold Manager provides an indication or alarm to the service provider if the current level of service is within a predetermined range with respect to the minimum level of service. The threshold is preferably chosen such that the service provider is allowed enough time to cure the service level problem before the minimum service level is reached and the subscriber's service level agreement breached.

Figure 16B:
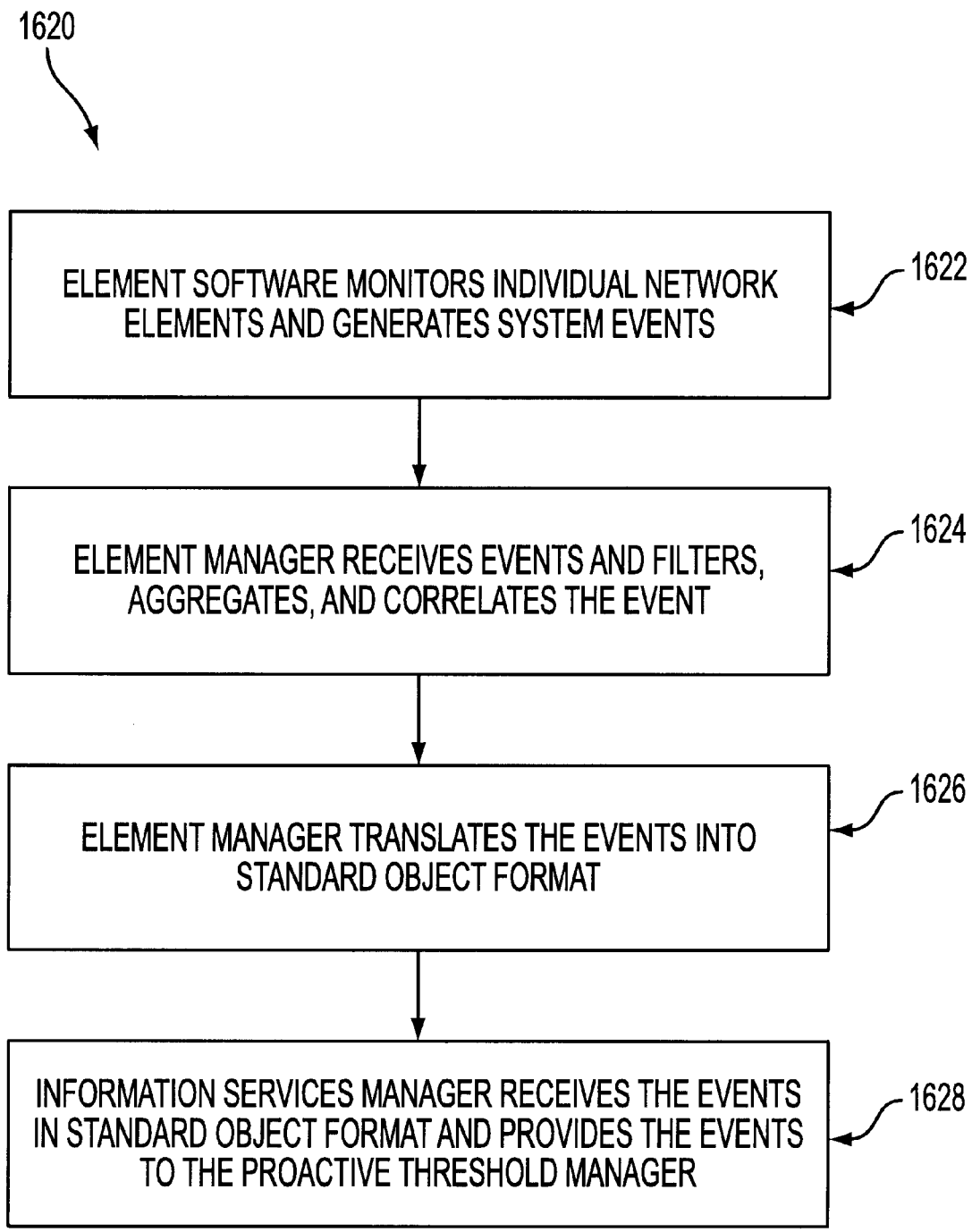
FIG. 16B is a flowchart showing a Network Sensing Process in accordance with one embodiment of the present invention.

FIG. 16B is a flowchart showing a Network Sensing Process 1620 in accordance with one embodiment of the present invention. The Network Sensing Process 1620 begins with an element monitoring step 1622. In step 1622, custom developed element software monitors the individual network elements and generates events based on hardware occurrences, such as switch failures. Typically, the various elements that make up the hybrid network are very different from one another. Thus, custom software is generally needed for each network element or group of related network elements. The custom developed software communicates directly with the hardware and generates events when various occurrences related to the individual hardware happens. For example, when a hardware element fails, the related element software senses the failure and generates an event indicating the hardware failure and the general nature of the failure. The events are then routed to an element manger to processed.

In an event processing step 1624, events generated in step 1622 are filtered, aggregated, and correlated by an element manager. The element manager is where the primary data reduction functions reside. The element manager filters, aggregates, and correlates the events to further isolate problems within the network. Any information that is deemed critical to monitor and manage the network is translated into standard object format in a translation step 1626.

In a translation step 1626, information from step 1624 that is deemed critical to monitor and manage the network is translated into a standard object format. Generally, typical operational events are only logged and not translated into standard object format. However, critical information, such as hardware failure, is translated and forwarded to the Information Services Manager in an information provisioning step 1628.

In an information provisioning step 1628, information from step 1626 is received by the Information Services Manager and forwarded to the Proactive Threshold Manager. The Information Services Manager provides the data management and data communications between the element manager and other system components. Generally, the Information Services Manager adheres to CORBA standards to provide universal information access by an object request broker. The object request broker allows the Information Services Manager to share management information stored in distributed databases. The Proactive Threshold Manager uses the information provided by the Information Services Manger to determine a current level of service and compare the current level of services with the minimum level of service that the service provider can provide without violating SLAs.

Element Management

As discussed above, the element manager works with the Information Services Manager and the Presentation Manager to assist in the management of the hybrid network system. The three components are briefly described below to provide context for the detailed discussion of the element manager that follows.

Element Manager

The element manager communicates with the network elements to receive alarms and alerts through trapping and polling techniques. The element manager is the layer where the primary data reduction functions reside. At this layer, events received at the element manager can be filtered, aggregated and correlated to further isolate problems within the network. Information that is deemed critical to monitor and manage the network is translated into a standard object format and forwarded to the Information Services Manager. An element manager can be, but is not necessarily, software which adheres to open standards such as the Simple Network Management Protocol (SNMP) and the Object Management Group's (OMG) Common Object Request Broker Architecture (CORBA).

Information Services Manager

The information services manager provides the data management and data communications between element managers and presentation managers. All information forwarded from the element managers is utilized by the information services manager to provide information to the network operators. The information services manager adheres to CORBA standards to provide ubiquitous information access via an object request broker (ORB). The ORB allows the information services manager to share management information stored in distributed databases.

The information services manager stores critical management information into operational (real-time) and analytical (historical) distributed databases. These databases provide common data storage so that new products can be easily inserted into the management environment. For example, if an event is received at an element manager that is deemed critical to display to a network user, the information services manager may store a copy of the alarm in the operational database and then forward the alarm to the appropriate network operator.

Media and textual databases are also provided by the information services manager. The databases includes online manuals for administrative purposes, as well as for the maintenance specialists to access element specific information. The databases also provide procedures, policies and computer based training to network users.

The information services manager provides requested information (real-time and historical) to the network users via the presentation manager.

Presentation Manager

The presentation manager performs the function its name implies: the presentation of the information to an end user. Because different locations and job functions require access to different types of information, there are at least two types of display methods. The first is for graphic intensive presentations and the second is for nomadic use, such as field technicians. The first environment requires a graphic intensive display, such as those provided by X-Windows/MOTIF. The second enviromnent is potentially bandwidth poor where dial-up or wireless access may be used along with more traditional LAN access. This is also where browser technology is employed.

Figure 17:
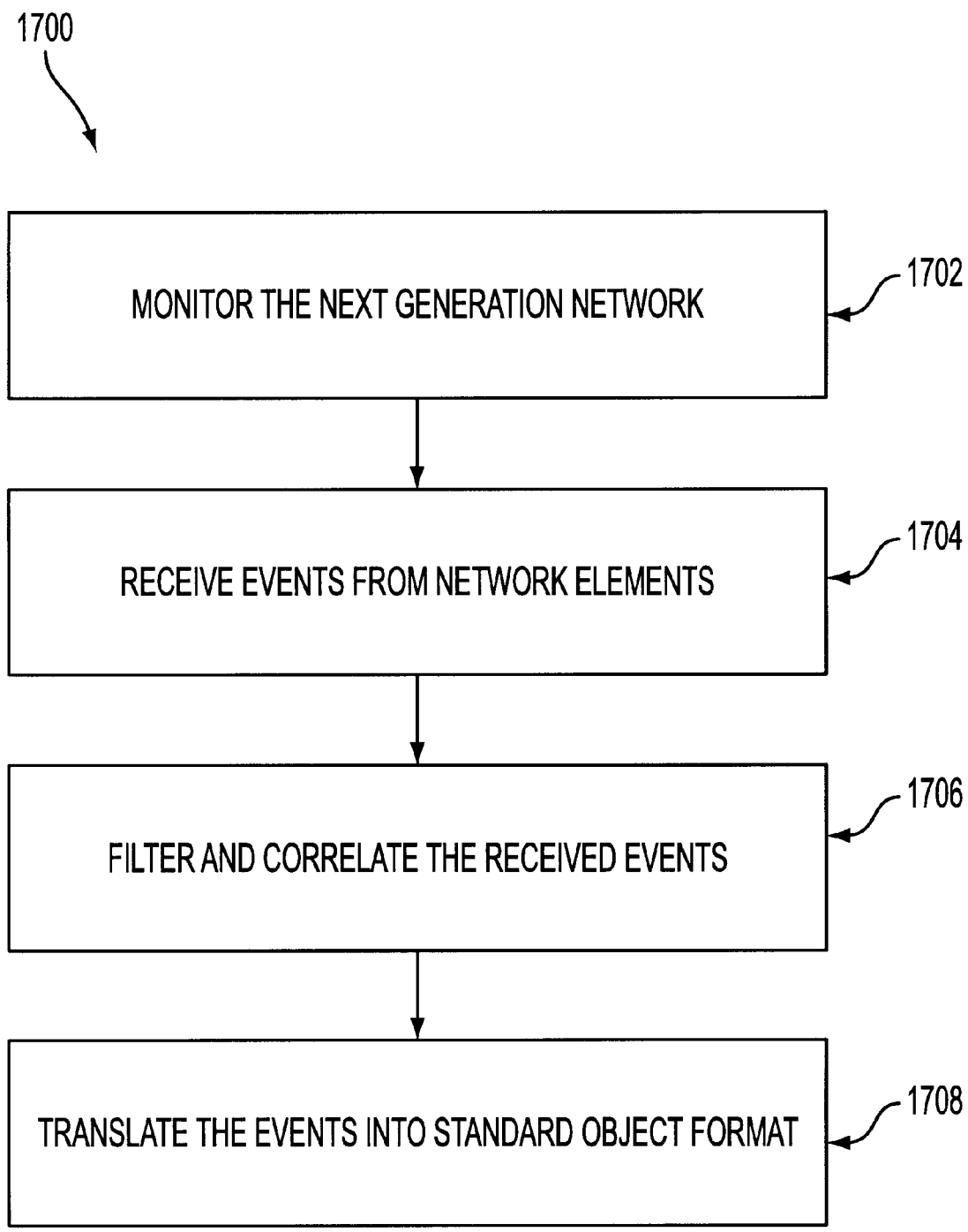
FIG. 17 is a flowchart showing an Element Management Process in accordance with a preferred embodiment of the present invention.

The Element Management Aspect of the present invention works in conjunction with other components of the system, such as Fault Management, to provide communication between the various network elements of the system. FIG. 17 is a flowchart showing an Element Management Process 1700 in accordance with a preferred embodiment of the present invention. The Element Management Process 1700 begins with a monitoring step 1702. In step 1702, the Element Manager monitors the system for events generated by network elements. Generally, the Element Manager continuously monitors the system to translate events for other system components, such as the Fault Management Component. In an event receiving step 1704, the Element Manager receives events from various network elements. Preferably the events are provided by custom software interfaces which communicate directly with network elements. The software interfaces preferably process the raw network events and sort them by context prior to providing the events to the Element Manager.

In a filtering and correlating step 1706, the Element Manager filters and correlates the events received in step 1704. Preferably the correlation is provided by a rules based inference engine. After collecting and correlating the events, the Element Manager performs a translation step 1708. In step 1708, the events correlated in step 1706 are translated into standard object format. Generally a comprehensive library of all message types generated by the hybrid system is utilized to translate the correlated events into standard object format. Once the events are translated, they are ready for use by other system components, such as Fault Management or Billing.

Customer Support Structure

The organization model for customer service support in the NGN network provides a single point of contact that is customer focused. This single point of contact provides technical expertise in resolving customer incidents, troubles and requests. Generally a three tiered support structure is greatly increases customer satisfaction in service needs. Each tier, or level, possesses an increased level of skill, with tasks and responsibilities distributed accordingly.

Figure 18:
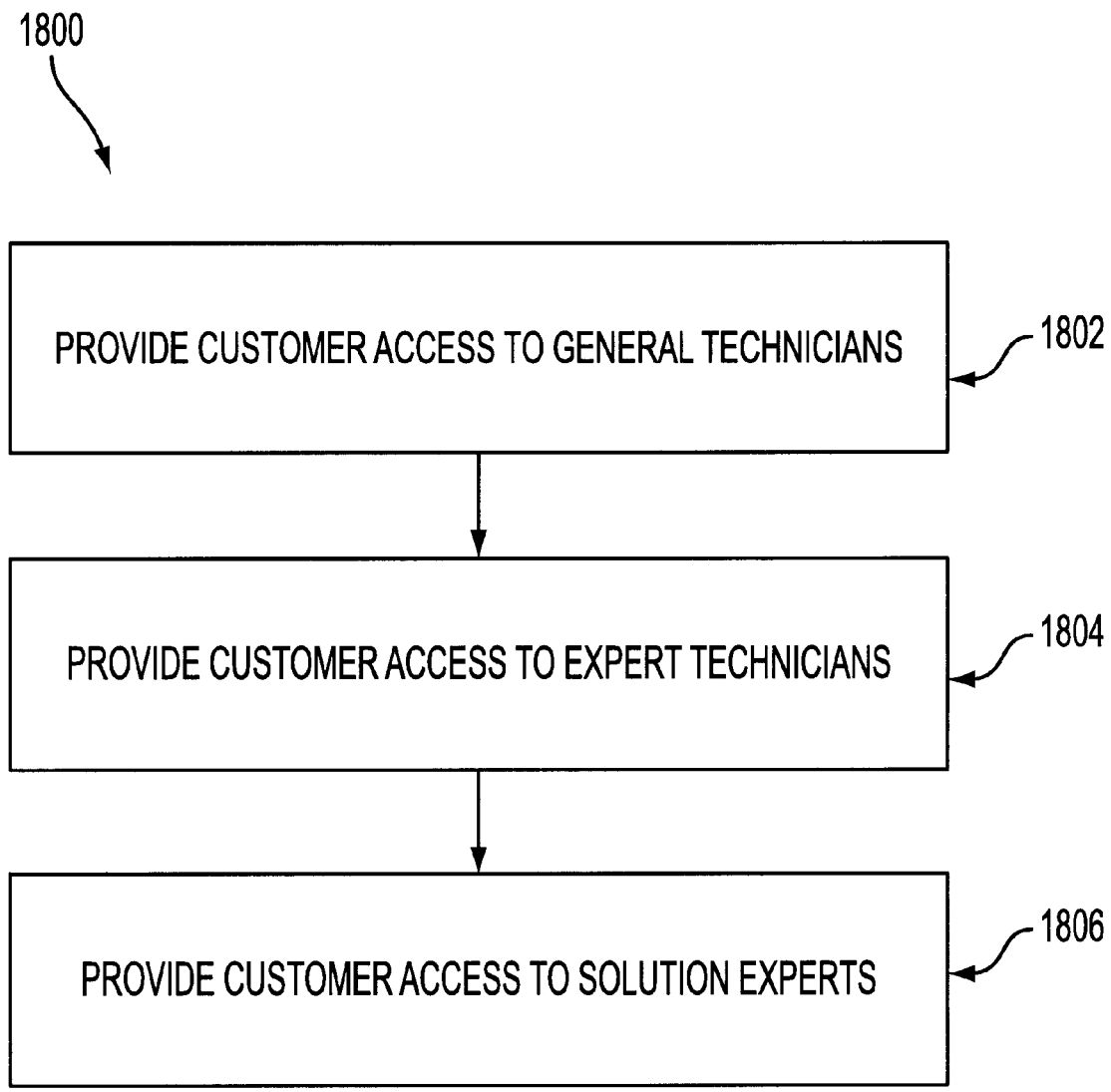
FIG. 18 is a flowchart showing a three tiered customer support process in accordance with a preferred embodiment of the present invention.

FIG. 18 is a flowchart showing a Three Tiered Customer Support Process 1800 in accordance with a preferred embodiment of the present invention. The Three Tiered Customer Support Process 1800 begins with a First Tier step 1802. In step 1802, a customer with a hybrid network problem is provided access to customer support personnel having a broad set of technical skills. The broad set of technical skills allows this group to solve about 60–70% of all hybrid network problems. If the customers network problem is solved at this stage, the process ends. However, if the customers network problem is not solved at this stage, the process continues to a Second Tier step 1804.

In the Second Tier step 1804, the customer is provided access to technical experts and field support personnel who may specialize in specific areas. The greater specialized nature of this group allows it to solve many problems the group in step 1802 could not solve. This group is generally responsible for solving 30–40% of all hybrid network problems. If the customers network problem is solved at this stage, the process ends. However, if the customers network problem is not solved at this stage, the process continues to a Third Tier step 1806.

In the Third Tier step 1806, the customer is provided access to solution experts who are often hardware vendors, software vendors, or customer application development and maintenance teems. Customer network problems that get this far in the customer support process 1800 need individuals possessing in-depth skills to investigate and resolve the difficult problems with there area of expertise. Solution experts are the last resort for solving the most difficult problems. Typically this group solves about 5% of all hybrid network problems.

The above model is generally referred to as the Skilled Model because personnel at all three tiers are highly skilled. This model generally creates a high percentage of calls resolved on the first call. Other approaches include a Functional Model, and a Bypass Model. In the Functional Model users are requested to contact different areas depending on the nature of the incident. Calls are routed to the customer support representative best able to handle the call. This model can easily be coupled with the Skill Model above. In the Bypass Model First Tier only logs calls, they do not resolve calls. One advantage of this model is that skilled resources don't have to waste time logging calls.

In more detail, a customer calling a customer support center in accordance with one embodiment of the present invention is first asked a series of questions by an interactive voice response (IVR) system or an live operator. The customer uses Touch-Tone keys on the telephone to respond to these queries from the IVR, or responds normally to a live operator.

When a product support engineer becomes available, the previously gathered information (both from the IVR query responses and the diagnostic information solicited from the system problem handlers and element managers) is available to the product support engineer.

After reviewing the situation with the customer, the product support engineer can query the customer's computer via support agents for additional information, if necessary.

In systems according to the preferred embodiment, the customer spends less time interacting with a product support engineer, and is relieved of many of the responsibilities in diagnosing and resolving problems. Automated diagnoses and shorter customer interactions save the product support center time, resources, and money. At the same time, the customer receives a better diagnosis and resolution of the problem than could usually be achieved with prior art product support techniques.

In addition, one embodiment of the present invention makes the Internet a viable alternative to telephone calls as a tool for providing consumer product support. Many on-line computer services, such as Prodigy and America On-Line, provide, for a fee as a part of their on-line service, software for connecting to and accessing the Internet.

The Internet access software accesses and "handshakes" with an "Internet Entry Server", which verifies the PIN number, provides the access and times the user's access time. The Internet Entry Server is programmed to recognize the PIN number as entitling the user to a limited prepaid or "free" Internet access time for on-line help services. Such a time period could be for a total time period such as 1 hour or more, or access to on-line help services can be unlimited for 90 days, 6 months, etc., for example, with the access time paid for by the sponsor/vendor. The first time a customer uses the on-line help service, the Internet Entry Server performs a registration process which includes a number of personal questions and custom data gathering in the form of queries provided by the sponsor/vendor for response by the user.

The pertinent answers are then immediately provided to the sponsor/vendor. The Internet Entry Server then "hot-links" the customer to the sponsor/vendor's Internet domain or Home Page for a mandatory "guided tour" where the user is exposed to any current product promotion by the sponsor/vendor and can download promotional coupons, product information, etc. After this mandatory guided tour is completed, the customer is allowed to enter queries for help in installing or using the sponsor/vendor's product. As an optional promotional service, upon termination of the on-line help session, access to other information on the Internet can be provided. Once the "free" on-line help service time or time period is up, the Internet Entry Server prompts the user with one or more of a plurality of options for extending the availability of on-line help. For example, the user can be prompted to enter a credit card number to which on-line help charges can be charged; he or she can be given the opportunity to answer additional survey information in return for additional "free" on-line help; or a 900 subscriber paid telephone access number can be provided through which additional on-line help could be billed via the normal telephone company 900 billing cycles.

Integrated IP Telephony User Interface

One embodiment of the present invention allows a user of a web application to communicate in an audio fashion in-band without having to pick up another telephone. Users can click a button and go to a call center through a hybrid network using IP telephony. The system invokes an IP telephony session simultaneously with the data session, and uses an active directory lookup whenever a person uses the system.

Figure 19:
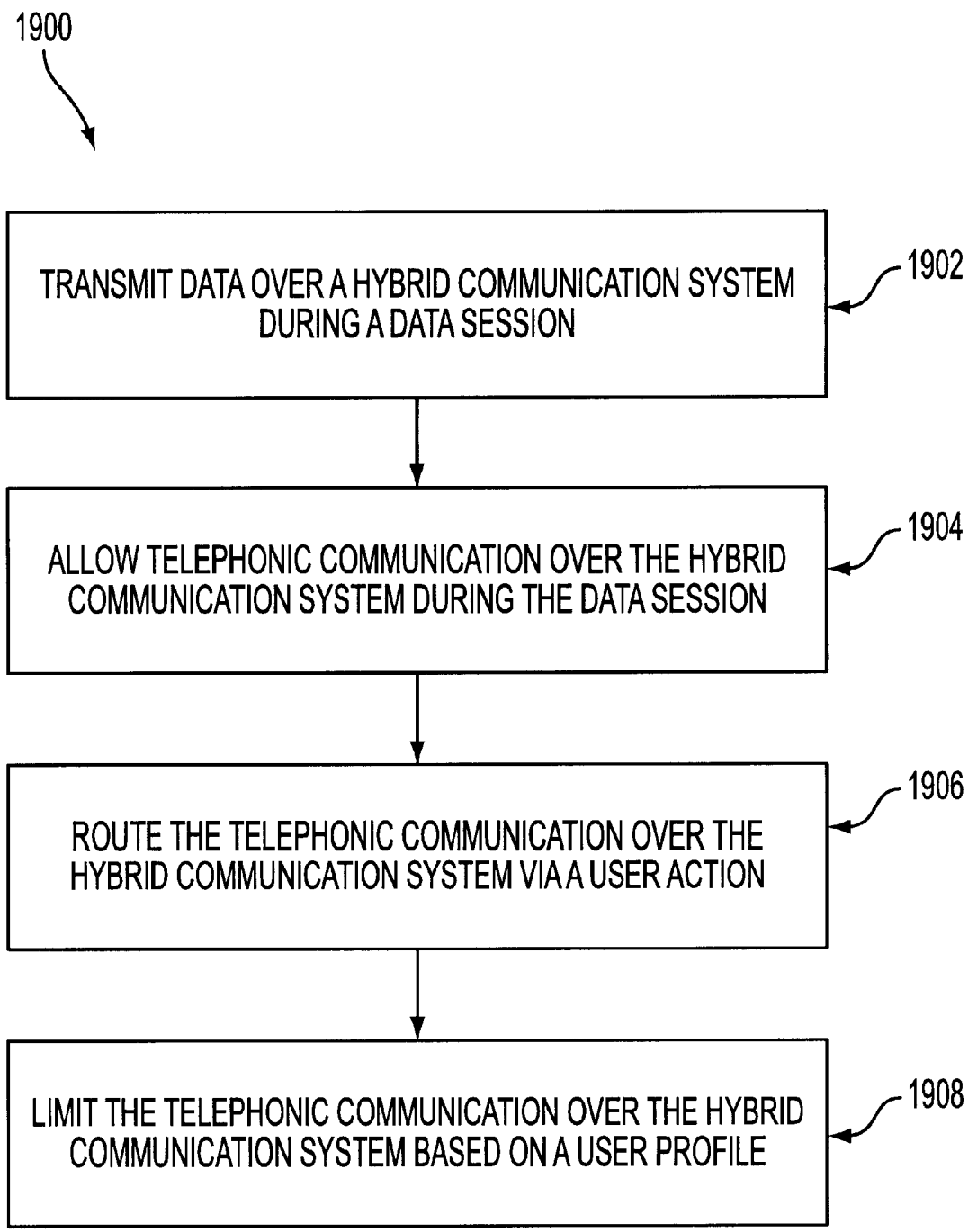
FIG. 19 is a flowchart showing an integrated IP telephony process in accordance with a preferred embodiment of the present invention.

FIG. 19 is a flowchart showing an integrated IP telephony process 1900 in accordance with a preferred embodiment of the present invention. The IP telephony process 1900 begins with a transmitting step 1902. In step 1902, data is transmitted over the hybrid network during a data session. This data session is typically a normal Internet browsing session, and is generally initiated by a web browser. Utilizing a web browser, users begin the data session by performing actions such as searching for web sites or downloading data from Internet sites. During the data session, the present invention allows users the option to initiate phone calls without the need to use another telephone.

In a telephony step 1904, the present invention allows users to initiate and continue telephonic communication. The telephonic is routed by a user action in step 1906, when a user selects a phone number to call. Telephone numbers are typically included in a telephone directory accessible on screen by the user. In addition, the directory may include icons which provide a highly recognizable visual mnemonic to allow users to easily recall the information included in a particular directory entry. The present invention utilizes the routing information to direct the call. Since both the original data from the data session and the new IP telephony data use Internet protocol, the present invention can provide a seamless integration of the two, to provide virtually simultaneous telephonic and non-telephonic data communication. The availability of packet switching elements in the hybrid network facilitate this process.

In packet switching networks, packets in the form of units of data are transmitted from a source—such as a user terminal, computer, application program within a computer, or other data handling or data communication device—to a destination, which may be simply another data handling or data communication device of the same character. The devices themselves typically are referred to as users, in the context of the network. Blocks or frames of data are transmitted over a link along a path between nodes of the network. Each block consists of a packet together with control information in the form of a header and a trailer which are added to the packet as it exits the respective node. The header typically contains, in addition to the destination address field, a number of subfields such as operation code, source address, sequence number, and length code. The trailer is typically a technique for generating redundancy checks, such as a cyclic redundancy code for detecting errors. At the other end of the link, the receiving node strips off the control information, performs the required synchronization and error detection, and reinserts the control information onto the departing packet.

Packet switching arose, in part, to fulfill the need for low cost data communications in networks developed to allow access to host computers. Special purpose computers designated as communication processors have been developed to offload the communication handling tasks which were formerly required of the host. The communication processor is adapted to interface with the host and to route packets along the network; consequently, such a processor is often simply called a packet switch. Data concentrators have also been developed to interface with hosts and to route packets along the network. In essence, data concentrators serve to switch a number of lightly used links onto a smaller number of more heavily used links. They are often used in conjunction with, and ahead of, the packet switch.

In virtual circuit (VC) or connection-oriented transmission, packet-switched data transmission is accomplished via predetermined end-to-end paths through the network, in which user packets associated with a great number of users share link and switch facilities as the packets travel over the network. The packets may require storage at nodes between transmission links of the network until they may be forwarded along the respective outgoing link for the overall path. In connectionless transmission, another mode of packet-switched data transmission, no initial connection is required for a data path through the network. In this mode, individual datagrams carrying a destination address are routed through the network from source to destination via intermediate nodes, and do not necessarily arrive in the order in which they were transmitted.

In a lookup step 1908, the telephonic communication over the hybrid network is limited bases on a user profile. Preferably the user profile is included in a rules database. By locating the user profile within the rules database, the rules database can provide seamless cross-location registration without the need for duplicate databases located on different networks. Using a rules database, a user utilizing the Internet in Europe can get the same telephony service as provided in the United States, as described above. Preferably the computer used to interface with the Internet includes multimedia equipment such as speakers and a microphone. Utilizing a multimedia equipped computer allows a user to use telephonic communication with little or no disruption while interfacing with the Internet. Multimedia computer speakers are used to receive the telephony audio from the network and the microphone is used to transmit the telephony data to the network.

Data Mining

The present invention includes data mining capability that provides the capability to analyze network management data looking for patterns and correlations across multiple dimensions. The system also constructs models of the behavior of the data in order to predict future growth or problems and facilitate managing the network in a proactive, yet cost-effective manner.

A technique called data mining allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information.

Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground.

Accurate forecasting relies heavily upon the ability to analyze large amounts of data. This task is extremely difficult because of the sheer quantity of data involved and the complexity of the analyses that must be performed. The problem is exacerbated by the fact that the data often resides in multiple databases, each database having different internal file structures.

Rarely is the relevant information explicitly stored in the databases. Rather, the important information exists only in the hidden relationships among items in the databases. Recently, artificial intelligence techniques have been employed to assist users in discovering these relationships and, in some cases, in automatically discovering the relationships.

Figure 20:
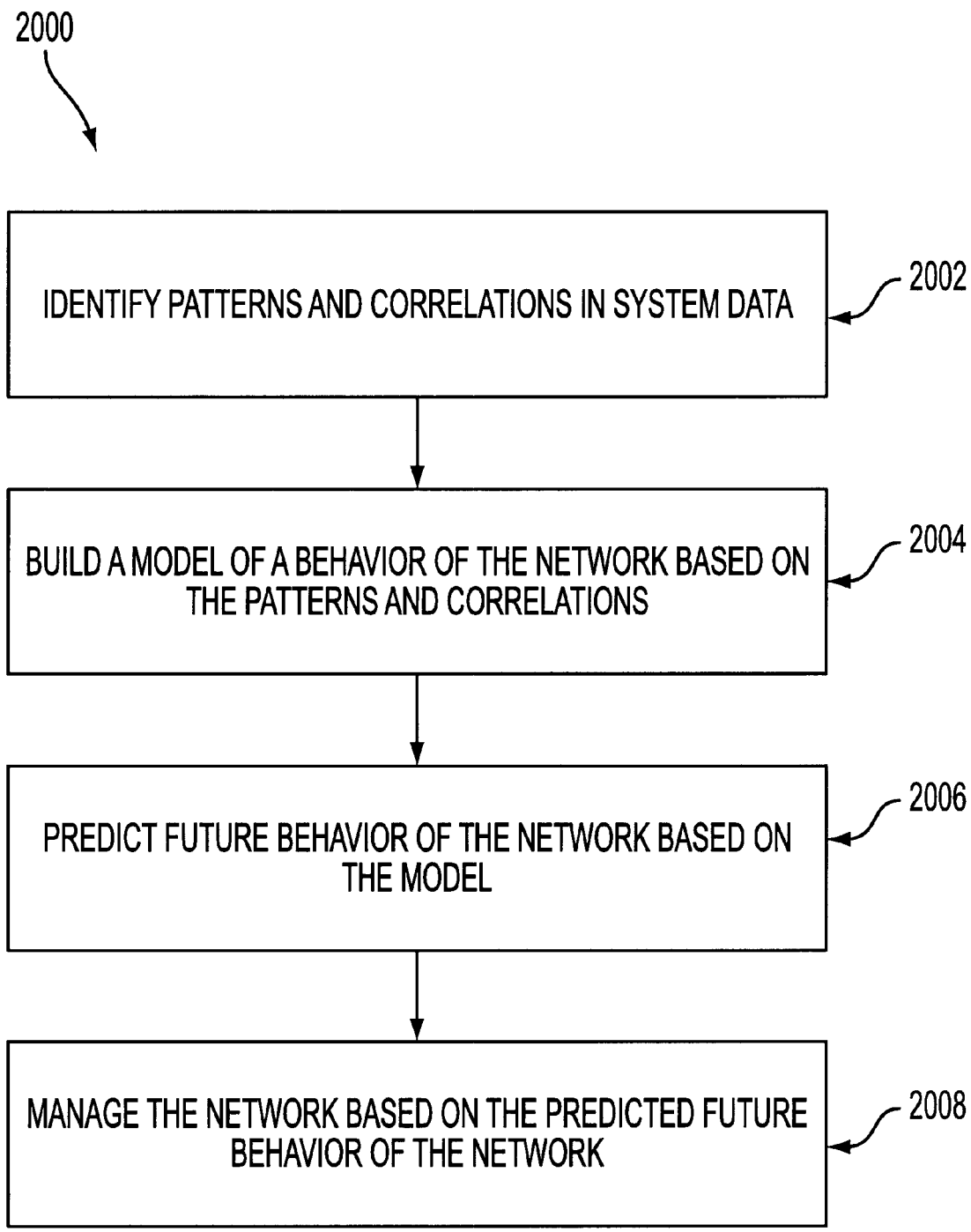
FIG. 20 is a flowchart showing a Data Mining Process in accordance with a preferred embodiment of the present invention.

FIG. 20 is a flowchart showing a Data Mining Process 2000 in accordance with a preferred embodiment of the present invention. The Data Mining Process 2000 begins with an identifying step 2002. In step 2002, the system identifies patterns and correlations in the system data over the hybrid communication system. Preferably the system data is analyzed across multiple dimensions to provide better future system behavior prediction.

In a model building step 2004, the system builds a model of the network behavior based on the patterns and correlations identified in step 2002. Data mining is a process that uses specific techniques to find patterns in data, allowing a user to conduct a relatively broad search of large databases for relevant information that may not be explicitly stored in the databases. Typically, a user initially specifies a search phrase or strategy and the system then extracts patterns and relations corresponding to that strategy from the stored data. Such a search system permits searching across multiple databases. The extracted patterns and relations can be: (1) used by the user, or data analyst, to form a prediction model; (2) used to refine an existing model; and/or (3) organized into a summary of the target database, as in predicting step 2006.

In a predicting step 2006, the system predicts future behavior of the network based on the model generated in step 2004. There are two existing forms of data mining: top-down; and bottom-up. Both forms are separately available on existing systems. Top-down systems are also referred to as "pattern validation," "verification-driven data mining" and "confirmatory analysis." This is a type of analysis that allows an analyst to express a piece of knowledge, validate or validate that knowledge, and obtain the reasons for the validation or invalidation. The validation step in a top-down analysis requires that data refuting the knowledge as well as data supporting the knowledge be considered. Bottom-up systems are also referred to as "data exploration." Bottom-up systems discover knowledge, generally in the form of patterns, in data.

Finally, in a managing step 2008, the network is managed based on the future behavior of the network. Data mining involves the development of tools that analyze large databases to extract useful information from them. As an application of data mining, customer purchasing patterns may be derived from a large customer transaction database by analyzing its transaction records. Such purchasing habits can provide invaluable marketing information. For example, retailers can create more effective store displays and more effective control inventory than otherwise would be possible if they know consumer purchase patterns. As a further example, catalog companies can conduct more effective mass mailings if they know that, given that a consumer has purchased a first item, the same consumer can be expected, with some degree of probability, to purchase a particular second item within a defined time period after the first purchase.

Classification of the data records to extract useful information is an essential part of data mining. Of importance to the present invention is the construction of a classifier, from records of known classes, for use in classifying other records whose classes are unknown. As generally known in the prior art, a classifier is generated from input data, also called a training set, which consist of multiple records. Each record is identified with a class label. The input data is analyzed to develop an accurate description, or model, for each class of the records. Based on the class descriptions, the classifier can then classify future records, referred to as test data, for which the class labels are unknown.

As an example, consider the case where a credit card company which has a large database on its card holders and wants to develop a profile for each customer class that can be used for accepting or rejecting future credit applicants. Assuming that the card holders have been divided into two classes, good and bad customers, based on their credit history. The problem can be solved using classification. First, a training set consisting of customer data with the assigned classes are provided to a classifier as input. The output from the classifier is a description of each class, i.e., good and bad, which then can be used to process future credit card applicants. Similar applications of classification are also found in other fields such as target marketing, medical diagnosis, treatment effectiveness, and store location search.

In data mining applications of classification, very large training sets such as those having several million examples are common. Thus, it is critical in these applications to have a classifier that scales well and can handle training data of this magnitude. As an additional advantage, being able to classify large training data also leads to an improvement in the classification accuracy.

Another desirable characteristic for a data mining classifier is its short training time, i.e., the ability to construct the class descriptions from the training set quickly. As a result, the methods of the invention are based on a decision-tree classifier. Decision trees are highly developed techniques for partitioning data samples into a set of covering decision rules. They are compact and have the additional advantage that they can be converted into simple classification rules. In addition, they can be easily converted into Structured Query language (SQL) statements used for accessing databases, and achieve comparable or better classification accuracy than other classification methods.

Another data mining classifier technique solves the memory constraint problem and simultaneously improve execution time by partitioning the data into subsets that fit in the memory and developing classifiers for the subsets in parallel. The output of the classifiers are then combined using various algorithms to obtain the final classification. This approach reduces running time significantly. Another method classifies data in batches.

Network Management

The telecommunications industry is rapidly changing with new rules, new competitors, new customers, and unprecedented demands. Service Providers world-wide all face similar challenges, similar risks, a similar struggle to stay profitable in the face of more competition, falling market share and price pressures. As the Providers face these challenges, their suppliers must also find innovative ways to deliver value or they may also go out of business.

The heart of any telecommunications provider is the services it provides. The key objective is "More for Less"; new services, faster service introduction, better quality of service and all at a lower price. These objectives can only be achieved by automation of customer care processes, operational support processes and a strong automated linkage between the management of customer service offerings and the underlying networking assets. Some Service Providers choose also to procure and operate network infrastructure, whilst others choose to outsource this part of their business. The effective exploitation of this network infrastructure, whether directly operated or outsourced, is an integral part of the service delivery chain and directly influences the service quality and cost perceived by the end customer.

To understand the information flows and relationships between Service Providers and between them and their underlying network infrastructure, a Reference Model may be provided that shows the relevant business relationships.

Service Providers may face very different regulatory pressures, and the approaches each one takes to competitive threats may be quite distinct. However, in general, Service Providers share three characteristics. They are all:

heavily dependent upon effective management of information and communications networks to stay competitive;

adopting a service oriented approach to the way they run their business and thus their networks; and automating their service and network management processes, sometimes undertaking a complete re-engineering of the way they do business.

Current interfaces for exchanging management information, on which service and network infrastructure providers currently depend, are manual or involve proprietary, low-level interactions. There is therefore an opportunity to establish common specifications and agreements which will allow providers, their customers and their suppliers to work together more effectively, than is currently possible. Achieving this goal depends on first identifying the business objective of each interface, the roles established, and then ensuring that technical work to implement electronic interfaces is well founded and delivers the required business benefits.

In the following description, various terms and acronyms will be used the definitions for which are as follows:
ATM Asynchronous Transfer Mode
BPM Business Process Model
EM Element Management
EML Element Management Layer
ITU International Telecommunications Union
ITU-T ITU—Telecommunications Sector
NE Network Element
NEM Network Element Management
NM Network Management
NML Network Management Layer
NMP Network Management Program
NO Network Operator
OLO Other Licensed Operator
OMT Object Modelling Technique
ONO Other Network Operator
SDH Synchronous Digital Hierarchy
SLA Service Level Agreement
SM Service Management
SML Service Management Layer
SP Service Provider
SMART Service Management Automation and Re-engineering Team
TMN Telecommunications Management Network
TOM Telecommunications Operations Map
UML Unified Modelling Language The Reference Model shown in FIG. 21 illustrates the principal points of contact between service providers 2100, their customers 2102 and suppliers 2104.

Figure 21:
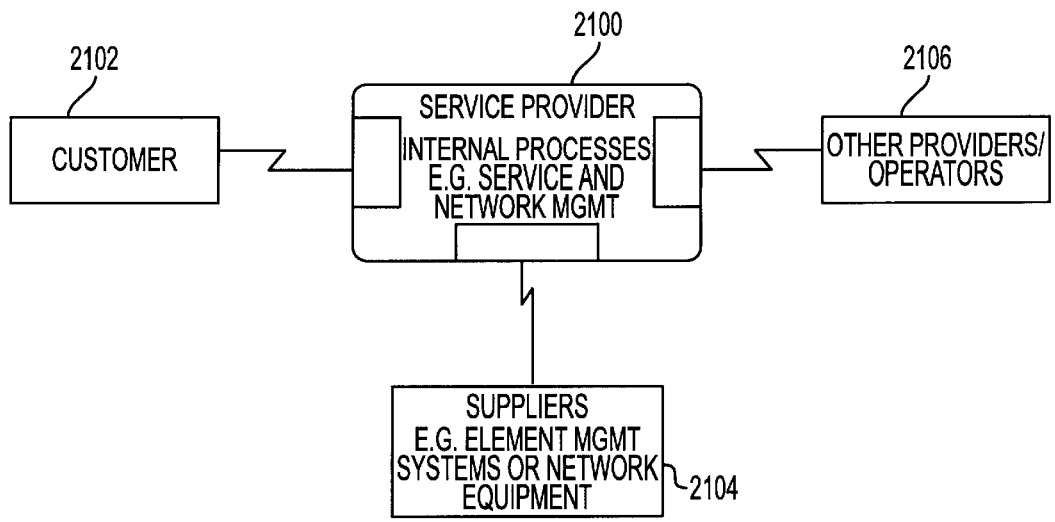
FIG. 21 is a diagram that illustrates the principal points of contact between service providers, their customers and suppliers in accordance with a preferred embodiment of the present invention.

A wide range of management automation opportunities exist within the business roles and relationships shown in FIG. 21. Each has a specific business objective that will dictate the level and type of management information to be exchanged, the robustness of the management interface, and the priority with which industry agreements are pursued in the area concerned.

The processes that drive Network Management are part of the 'management value chain' from the Customer 2102, through the Service Management to Network Management and subsequently to the externally sourced equipment, which supplies the communications service. This chain may also include other participating Service Providers (or Network Operators) 2106 in delivering the end-to-end service.

The interfaces to Suppliers 2104 and other Provider/Operators 2106 are external. These are initially 'procurement' interfaces, but post deployment, become very much operational interfaces. The suppliers of these products or services need to ensure that their management systems directly support the Service Provider's 2100 internal business processes to ensure the most efficient service delivery. There are therefore potential benefits to all by agreeing upon an open, core set of processes, and information flows. To the Service Provider 2100 it enlarges the source of potential suppliers; to the Supplier 2104 it creates a larger potential customer base for their products, while still allowing room for competitive innovation.

The following roles have been identified to describe the relationships in the industry, relevant to Service and Network Management:

Customer: the recipient of one or more services supplied by one or more Service Providers. (e.g. a corporate entity which could also be another Service Provider.)

Service Provider: a general reference to an organization that provides telecommunications services to Customers and End Users either on a tariff or contract basis. A SP may or may not operate a network. A SP may or may not be a Customer of another SP or Network Operator.

Network Operator: an organization that operates a telecommunications infrastructure. A Network Operator may also be a SP.

Supplier: an individual or organization that provide networking products or services (e.g., maintenance or facilities management) to a Service Provider or Network Operator. These products could include telecommunications equipment, computing platforms or management applications software.

The following interactions impact Network Management processes and directly drive the need for interface specifications in the form of information agreements that may need to be automated:

Interactions with Service Management

This is one of the primary relationships for Network Management and acts as the main source of requests for information and actions to execute tasks. Service Management is responsible for managing the customers' perspective for each individual service provided, normally against some type of contractual agreement. Thus its purpose is to 'act on behalf of the customer' for interactions with Network Management.

Interactions with Suppliers or with Supplier-provided Equipment

Most traditional Service Providers own and operate networks in order to deliver their services. Certainly, the service delivery chain should always include at least one Provider which takes on this Network Operator role. For these Provider/Operators, the network operations task is an internal business function rather than a point of external interface. However, since most Service Providers do not manufacture their own network equipment, they are reliant on the equipment suppliers, from whom they procure, to help them achieve their automation goals. The ability for devices to be configured in a common way, for example, or to provide alarm or performance data using common formats and terms, is critical to achieving the full benefits of service and network management automation. To get the most from automation efforts, procured equipment must be able to receive and act on common high-level instructions, and deliver performance and usage-related information in a common way, that meets the Providers' requirements.

Interaction with Customers

Most Service Providers see a need for automated management links with their Customers, at least with some types of Customers, or for some types of services. These interactions occur mainly with Service Management, which act as a proxy for the customers' needs to Network Management.

Interactions with Other Providers

World-wide alliances and regulatory actions are generating huge volumes of interactions between Service Providers. Today, these often involve manual intervention, representing an unacceptable cost and often significantly degrading service quality to the Customer.

Some of the interactions between Providers may be similar in content to the interactions between a Provider and a Customer. However, it is likely that the volumes of transactions, the level of detail required, and the speed with which information needs to be exchanged between Providers will dictate substantially different implementation agreements.

Figure 22:
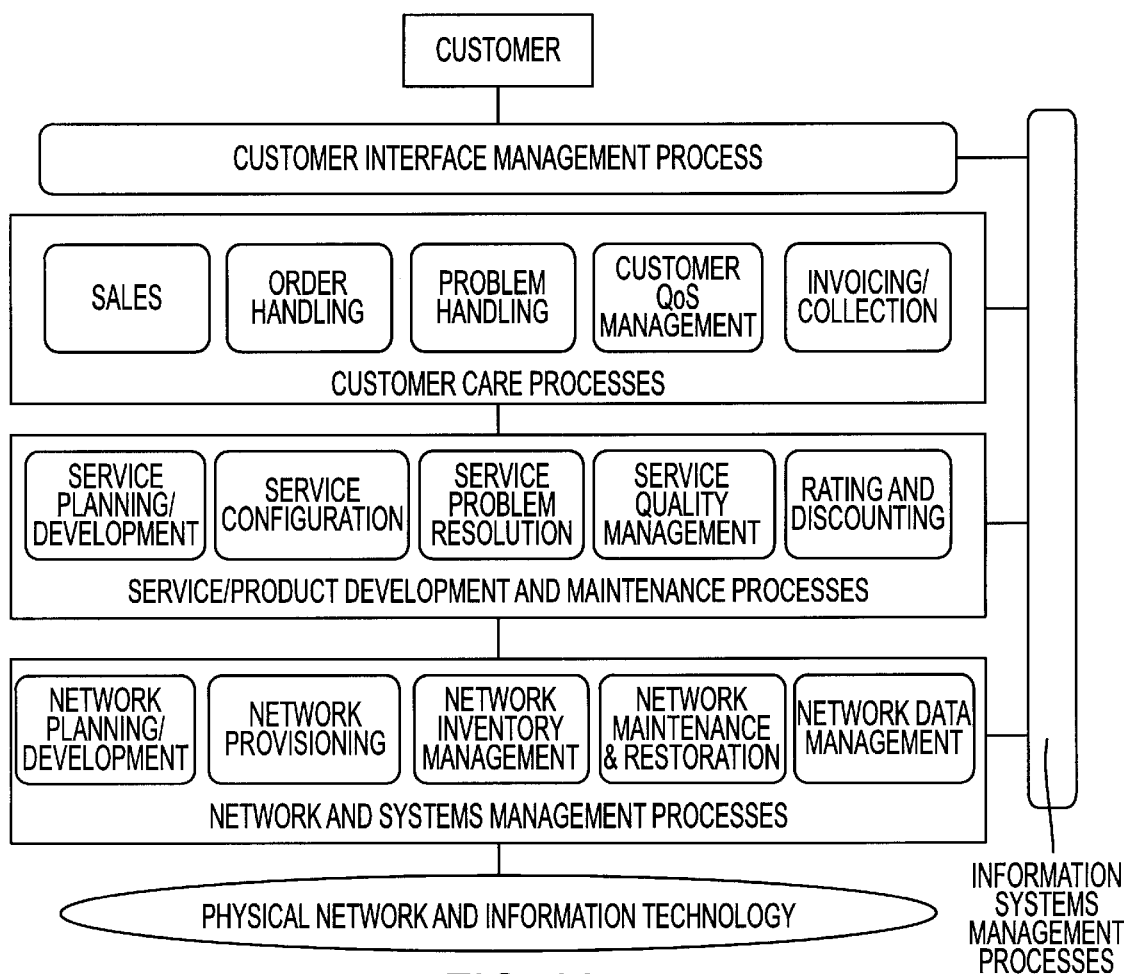
FIG. 22 is a simplified view of processes used by Service and Network Providers in accordance with a preferred embodiment of the present invention.

FIG. 22 is a simplified view of processes used by Service and Network Providers. As shown in FIG. 22, a number of operations management processes are shown to be provided covering Customer Care 2200, Service Management 2202 and Network Management 2204.

It should be realized that the physical implementation of the management systems may not reflect this strict segmentation between Service and Network Management systems 2202,2204. Providers and Operators may make their own decisions on the location within their management environment of applications that interoperate using the agreed information flows according to their own business judgment.

Network Management processes 2204 will now be identified, and each process is mapped onto its component functions. The modeling of the Network Management processes 2204 and functions is based on the following considerations:

top-down decomposition of Service Management needs to guide the structuring of processes and to identify the supporting functions within Function Set Groups.

positioning of the Network Management processes and functions within a layered management architecture.

Network Management processes 2204, and the process flows that link these, have been derived from discussions and interviews with business planning and operational staff in a number of Service Providers and represent a business-oriented (top-down) view of the structure of the Network Management Layer. The Function Set Groups are drawn from standards and reflect a structure and terminology which may also be familiar to operational and planning staff.

Processes describe the flow of activities to solve a particular problem, or part of it. For processes, at the analysis stage, the means of availability and how the data flows is not significant, i.e. whether or not data is handed over or accessed in a central database is not addressed. However, processes are concerned with the triggers that set them into action.

A function is a unit of processing (either initiated by humans or through an automated action) with specific, well-defined inputs and outputs. For functions (unlike processes) the data is essential because the function is described as a unit of processing together with its associated data inputs and outputs. Functions tend to be dedicated to a single purpose and highly granular.

A process typically makes use of a number of functions, and a given function may be employed by one, or more, processes. Thus, there is in principle a many-to-many mapping between process and function.

Based on TMN standards, functions with related or complementary capabilities are grouped into Function Set Groups, which then provide operational support to individual processes. It is envisaged that agreement is possible on the high-level processes and the standardized Function Set Groups, without constraining the way in which these are mapped through the intermediate work strings and sub-processes. This maintains the flexibility of application and implementation of this work, in individual organizations, and provides harmonization of the underlying functional support and the broad process structure in which these are used.

Figure 23:
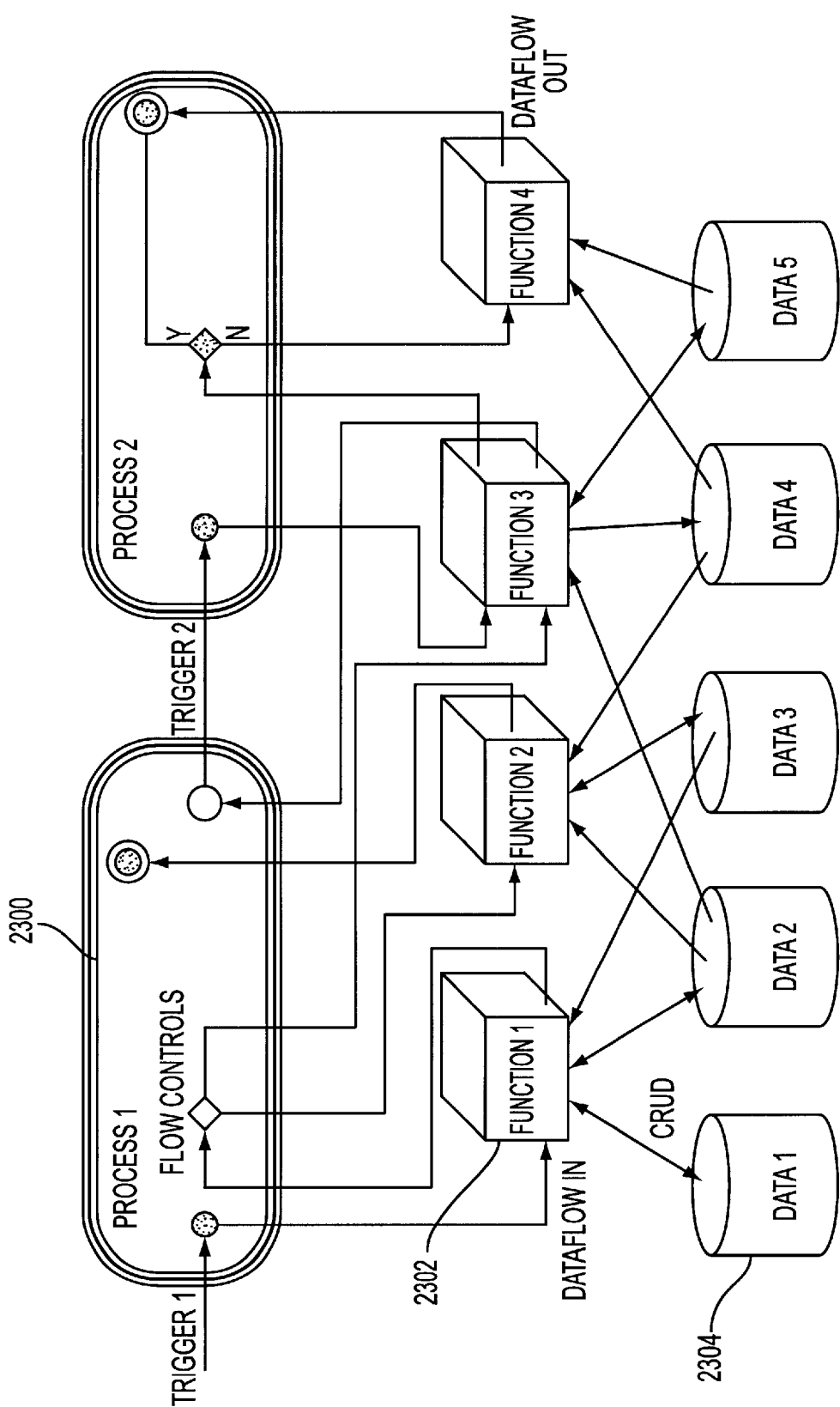
FIG. 23 shows the relationship between Processes, Functions and Data in a system in accordance with a preferred embodiment of the present invention.

FIG. 23 shows the relationship between Processes 2300, Functions 2302 and Data 2304. A function 2302 can be considered as a mechanistic reaction to specific inputs (and is thus relatively straightforward to automate), whereas a process 2300 is a reaction to one or more triggers with the application of business rules (and can therefore be more complex to automate). By structuring processes 2300, functions 2302 and data 2304 (see FIG. 23), their relationships can become clearer.

This function-oriented perspective for understanding the content of processes 2300 supports the "top-down" analysis of processes 2300, by identifying likely target functional capabilities which the processes 2300 can employ in carrying out their role. The overall analysis and design of individual process areas (using techniques such as OMT or UML) may be handled by individual Working Groups, using the Telecomms Operations Map as a common backdrop for their work.

Initially, an analysis of the information flows is needed to guide the structuring of the overall operational environment into major processes, and to identify the contents and linkages between these. The following steps can be distinguished for the development of processes 2300.

1) Identify Actors. Actors are the external parties providing triggers to the business area to be modeled. What is considered to be external will, of course, depend on what is to be modeled. Furthermore, external parties not providing triggers are not called actors.

2) Describe the different Roles each actor can perform.

3) Identify Triggers. Each actor in a certain role can provide and receive several triggers. Start with the triggers provided by the actors and model the triggers received by the actors after modeling the process flow-through.

4) Identify reaction to triggers. What sequence of activities (flow-through) will take place in response to the trigger?

Grouping of activities. All reactions to all triggers can be grouped together in sets of activities. These are called the business processes.

Processes 2300 are distinguished within a management layer (such as Network Management) because they represent a major area of operational responsibility, and provide a clean separation of concerns between individual processes.

In terms of TMN management layers, process flows occur vertically, from the Network Management Layer up to the Service, or down to Network Element Management Layers, as well as within the Network Management Layer itself. Indeed, the process flows to support the Service Management Layer are one of the primary drivers in this top-down approach to delivering business benefit. Another issue to recognize is that the dynamics of the lifecycle of each of these Layers is likely to be very different and the implications need to be well understood.

An overview of Process, Function Set Group and Data Area names will now be presented. The Function Set Groups and Data Areas are those identified as belonging to the Network Management Layer, but can be used by the processes within other layers, where this is appropriate. For example, Network Configuration functions may be used directly by the Service Configuration Process, for service configuration. These relationships are important for a complete view of the requirements placed on the functions.

Figure 24:
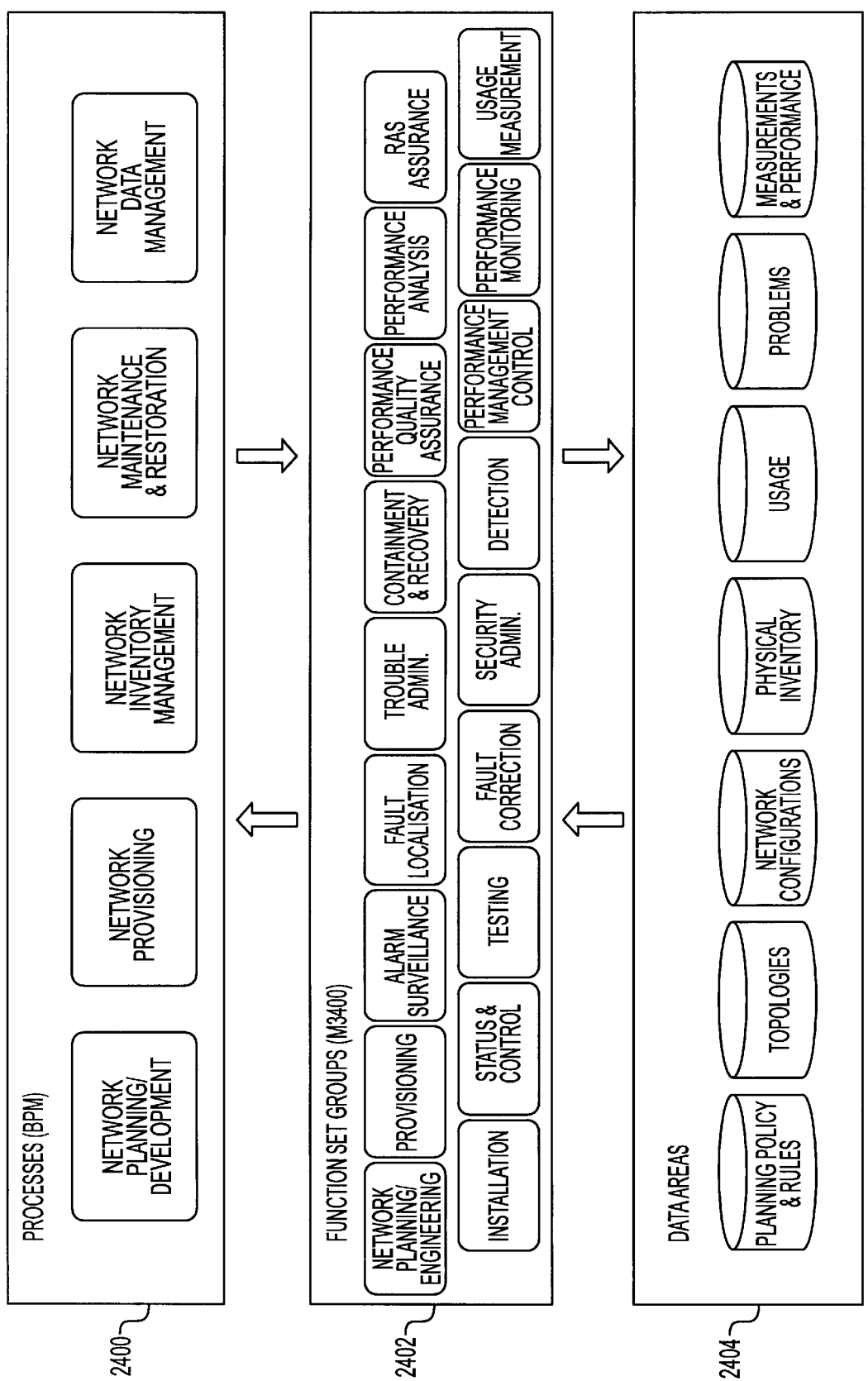
FIG. 24 illustrates the high-level structure of Network Management processes, the supporting Function Set Groups, and the Data Areas on which these depend in accordance with a preferred embodiment of the present invention.
Figure 25A:
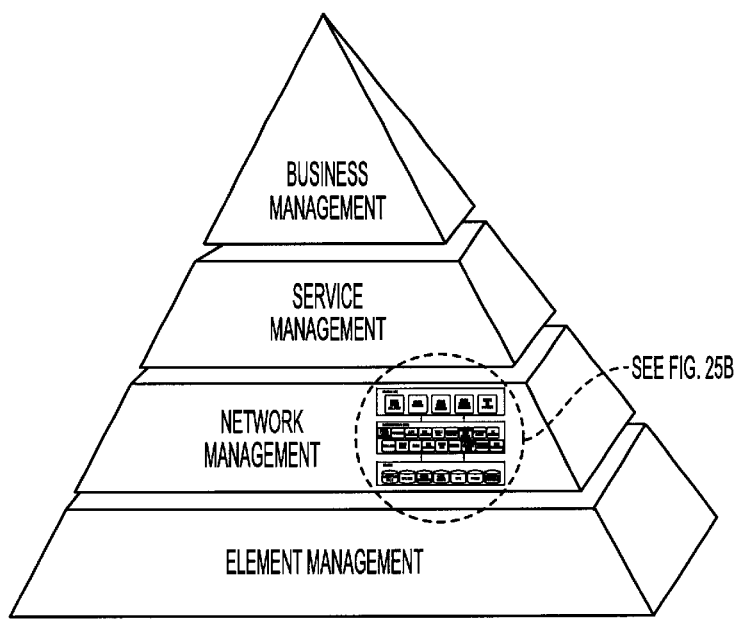
FIG. 25 depicts the positioning of the Network Management processes within a Telecommunications Management Network (TMN) in accordance with a preferred embodiment of the present invention.
Figure 25B:
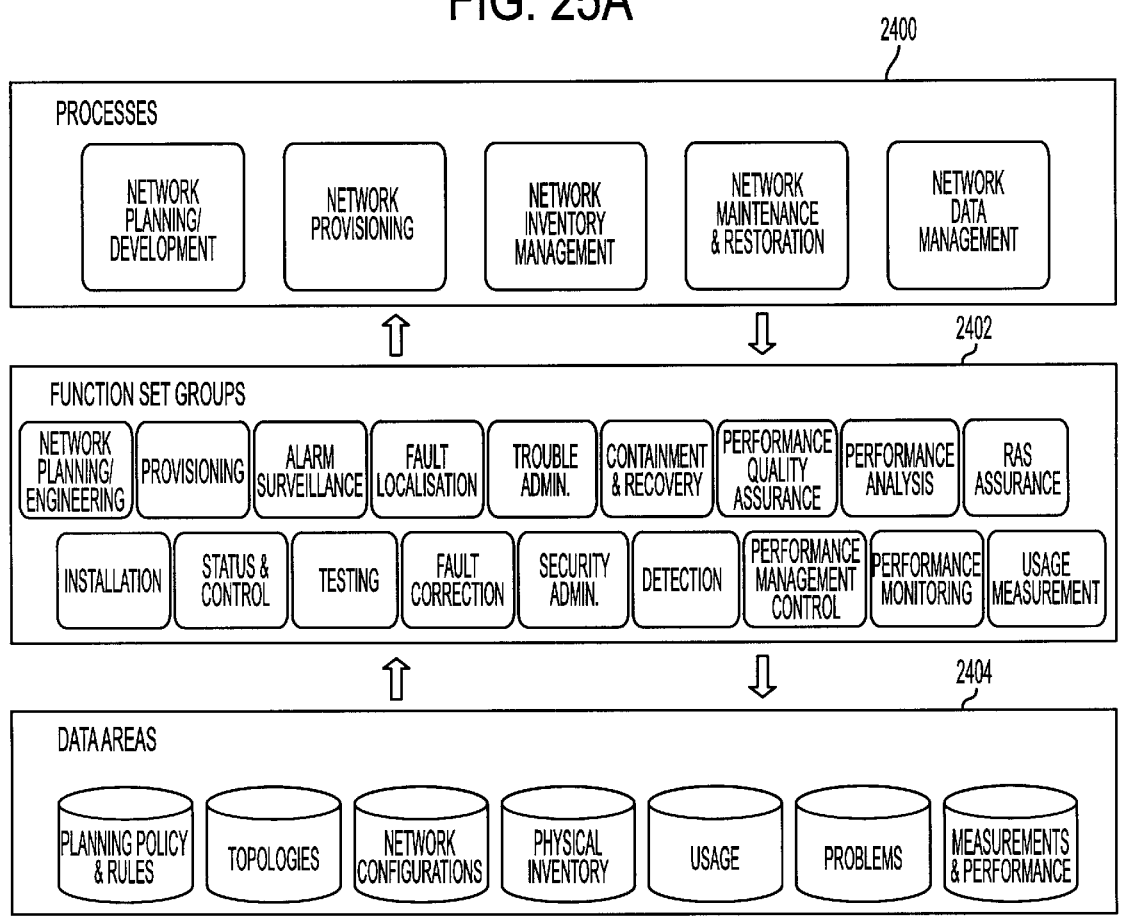

FIG. 24 shows the high-level structure of Network Management processes 2400, the supporting Function Set Groups 2402, and the data areas 2404 on which these depend. The processes are those already identified in the lower layer of FIG. 22. As an example, Network Provisioning might make use of a number of the Function Set Groups 2402, say Provisioning for the actual choice and set-up of network paths, and Testing to validate that these are usable. Data 2404 concerning Topologies and Network Configurations may then be involved in supporting those functions. FIG. 25 shows the positioning of the network management telcomms operations map within TMN.

The processes shown in FIG. 24 are described in more detail in this section. Each process description is supported by a process flow diagram that illustrates the linkages between the process and other parts of overall operations. These processes are likely to be implemented in a typical Provider environment for a specific domain of network operation, so that where networks are layered or partitioned for technical or commercial reasons, a process area may be used several times to deal with the different components involved. For example, managing mobile services could involve management of a mobile network which itself makes use of several fixed network domains (possibly provided by different network operators). Network management in such an environment may involve invoking Network Provisioning separately for each network domain to support configuration of an overall mobile service. This would imply that the Network Provisioning process might be used several times in different ways to achieve the necessary Network Management in support of the service concerned. To accommodate this kind of situation, the processes described here should be recognized as potentially layered in the same way that telecommunications networks and services can be layered.

The process flow diagrams consist of a process box in which the process tasks or responsibilities are listed, together with a set of input and output information flows to identify significant interactions between the process area concerned and other parts of the operation. The flow arrows are labeled with the nature of the interaction, and the process or entity, with which they interact, is shown as a smaller process box at their termination. In the diagrams, only triggers (i.e. interactions which control the process operation) are included, and not other data flows which may exist (since there may be several ways of exchanging information between processes). Triggers which interact outside of the Network Management Layer are explicitly indicated. Triggers may be initiated from:

1) Service Management, where these NM processes provide support for the Service Management flows (e.g. Service Problem Resolution triggering Network Maintenance & Restoration)
2) Within the Network Management layer, in response to needs (triggers) concerned specifically with Network Management (e.g. Network Planning detects the need to re-deploy network resources to deal with, say, a local network overload)
3) Externally supplied (but owned, leased or otherwise contracted) equipment or networks (i.e. from the underlying Element/Sub-Network Management)

In addition, the structure of FIG. 24 is reproduced for each process area, with the Function Set Groups 2402 which are involved in supporting that process area, and relevant data areas 2404 highlighted.

Network Planning and Development

Figure 26:
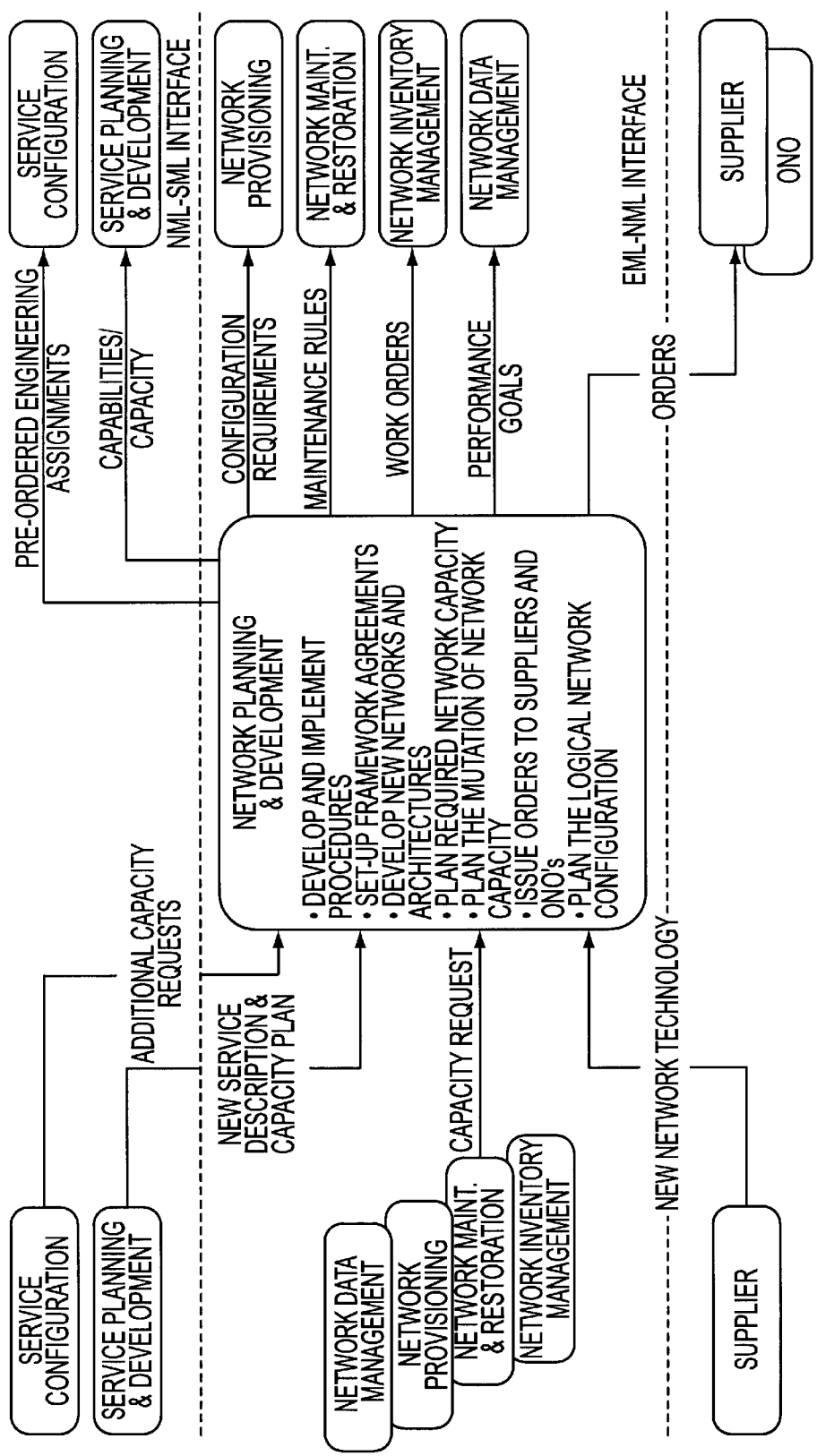
FIG. 26 shows a Network Planning &Development process of the present invention, including input and output triggers in accordance with a preferred embodiment of the present invention.

FIG. 26 shows a Network Planning &Development process, including input and output triggers. This process is responsible for the definition of rules for network planning, installation and maintenance, application of new technology and supplier strategy, development and acceptance of new network types, description of standard network configurations for operational use.

Furthermore, this process is responsible for designing the network capability to meet a specified service need at the desired cost and for ensuring that the network can be properly installed, monitored, controlled and billed. The process is also responsible for ensuring that enough network capacity will be available to meet the forecasted demand. Based on the required network capacity, orders are issued to suppliers or other network operators (ONO's) and site preparation and installation orders are issued to the Network Inventory Management or a third party Network Constructor (work orders). A design of the logical network configuration is provided to Network Provisioning.

Figure 27:
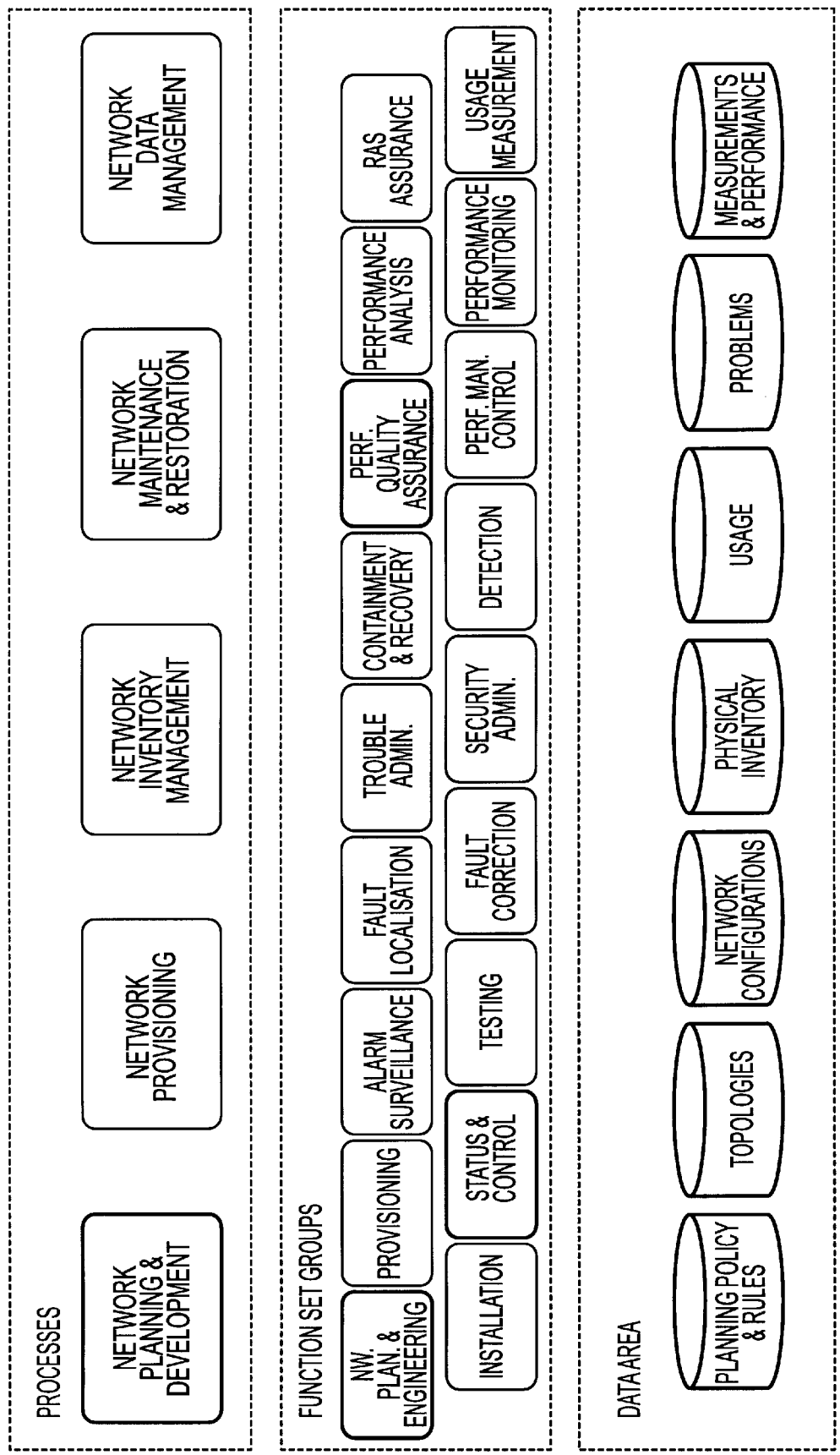
FIG. 27 illustrates the Functional Groups and Data Areas for the Network Planning & Development process in accordance with a preferred embodiment of the present invention.

Input Triggers
  new service description from Service Planning & Development
  new network technology from Supplier
  capacity plan from Service Planning & Development
  capacity request from Network Provisioning, Inventory Management and Maintenance & Restoration
Output Triggers
  orders to Suppliers and/or ONO's
  work orders to Network Inventory Management or a Network Constructor
  configuration requirements to Network Provisioning
  performance goals to Network Data Management
  maintenance rules to Network Maintenance & Restoration
  work orders to Network Inventory Management
  deployment plans to Service Planning & Development
Output Data (i.e. data generated within this process)
  purchasing, installation, performance and maintenance rules. This includes standard network configurations (for example SDH rings) and routing restrictions/ requirements
  network capabilities (including performance goals)
  planned network capacity
  planned logical network configuration
  deployment plans
Process Responsibilities
  develop and implement procedures set-up framework agreements with suppliers develop new networks and architectures, determine network capabilities, based on network technology and architecture plan required network capacity plan the mutation of network capacity (including destruction of obsolete networks)

issue orders to suppliers and ONO's plan the logical network configuration plan the required physical site facilities FIG. 27 illustrates the Functional Groups and Data Areas for the Network Planning & Development process.

Network Provisioning

Figure 28:
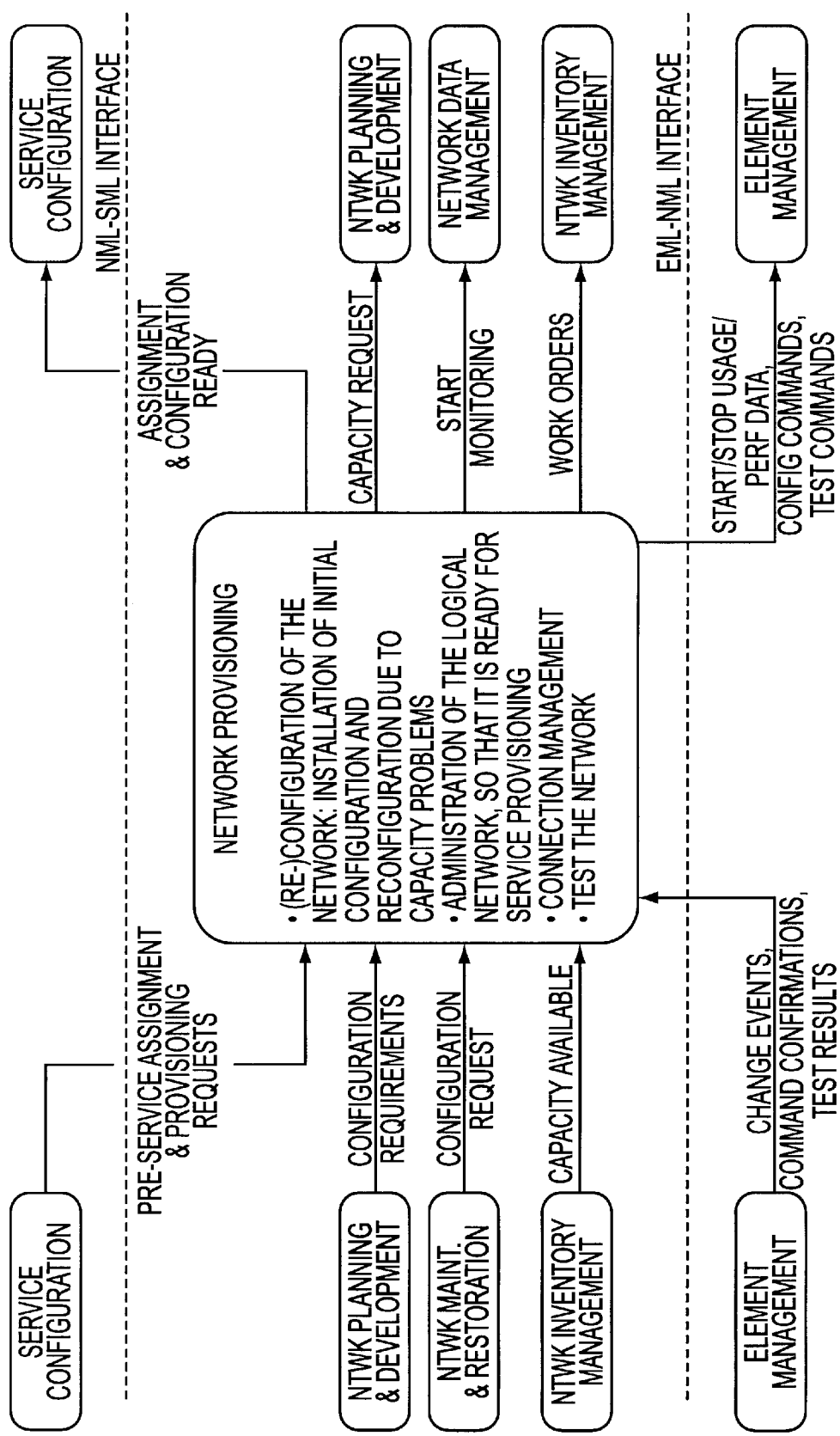
FIG. 28 shows the Network Provisioning process of the present invention, including input and output triggers in accordance with a preferred embodiment of the present invention.

FIG. 28 illustrates the Network Provisioning process, including input and output triggers. This process is responsible for the configuration of the network, to ensure that network capacity is ready for provisioning of services. It carries out network provisioning, as required, to fulfill specific service requests, and configuration changes to address network problems. The process must assign and administer identifiers for provisioned resources, and make them available to other processes.

Note that the routine provisioning of specific instances of a customer service (especially 'simple' services such as POTS) may not normally involve Network Provisioning but may be handled directly by Service Provisioning from a pre-configured set (see later).

Input Triggers network capacity available from Network Inventory configuration requirements from Network Planning & Development network provisioning request from Service Configuration (to support a new request for service)

configuration request from Network Maintenance

Figure 29:
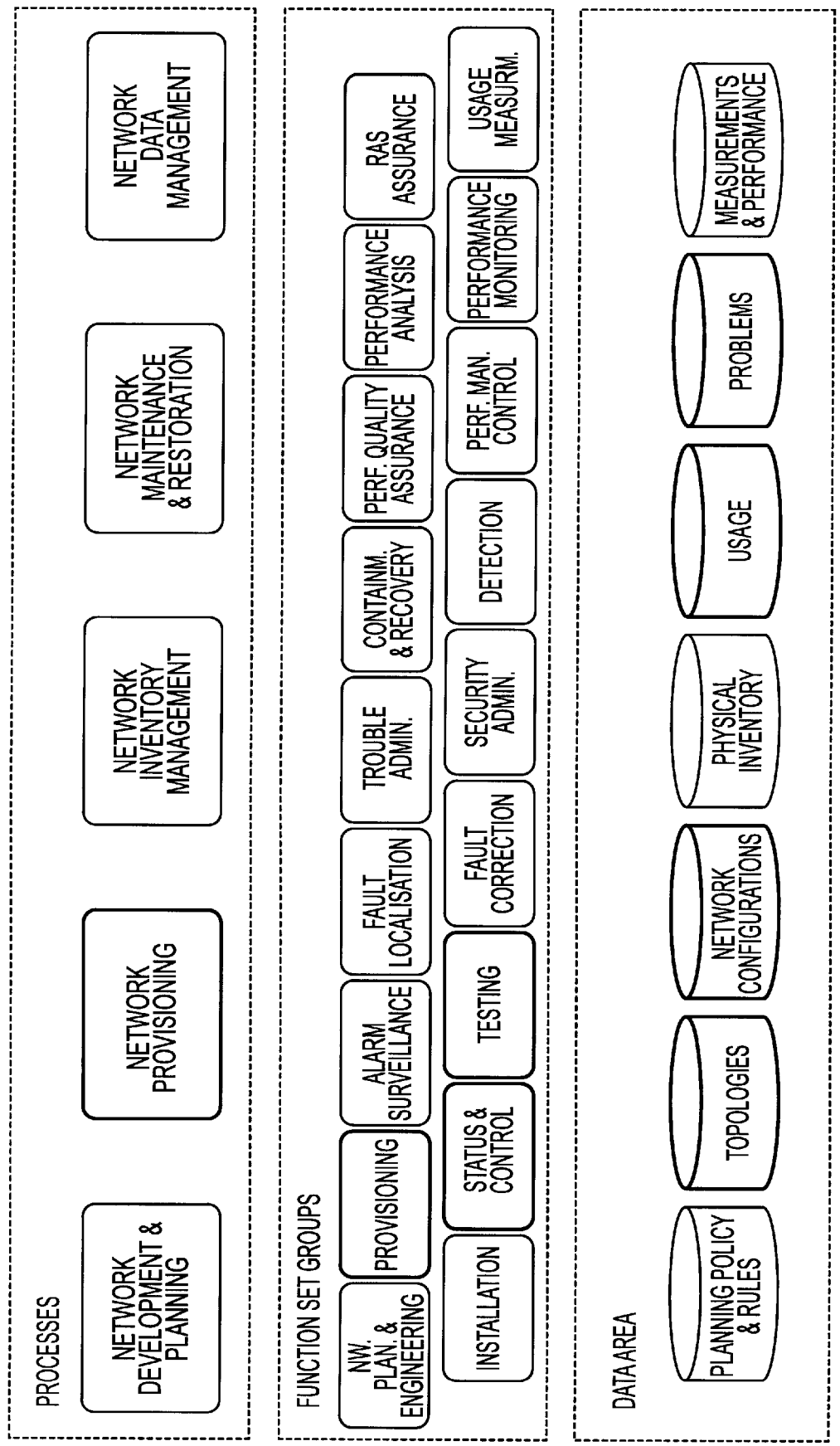
FIG. 29 depicts Functional Groups and Data Areas for the Network Provisioning process in accordance with a preferred embodiment of the present invention.

Output Triggers network capacity request to Network Planning network configuration ready (including identifier if successful), to Service Configuration work order to Network Inventory Management (if any physical work is necessary)

start monitoring request to Network Data Management network configuration request to lower-level management Output Data (i.e. data generated within this process)

installed logical network configuration network identifiers and associations with services supported Process Responsibilities (re-)configuration of the network administration of logical networks assignment of identifiers testing the network to ensure operational readiness FIG. 29 illustrates Functional Groups and Data Areas for the Network Provisioning process.

Network Inventory Management

Figure 30:
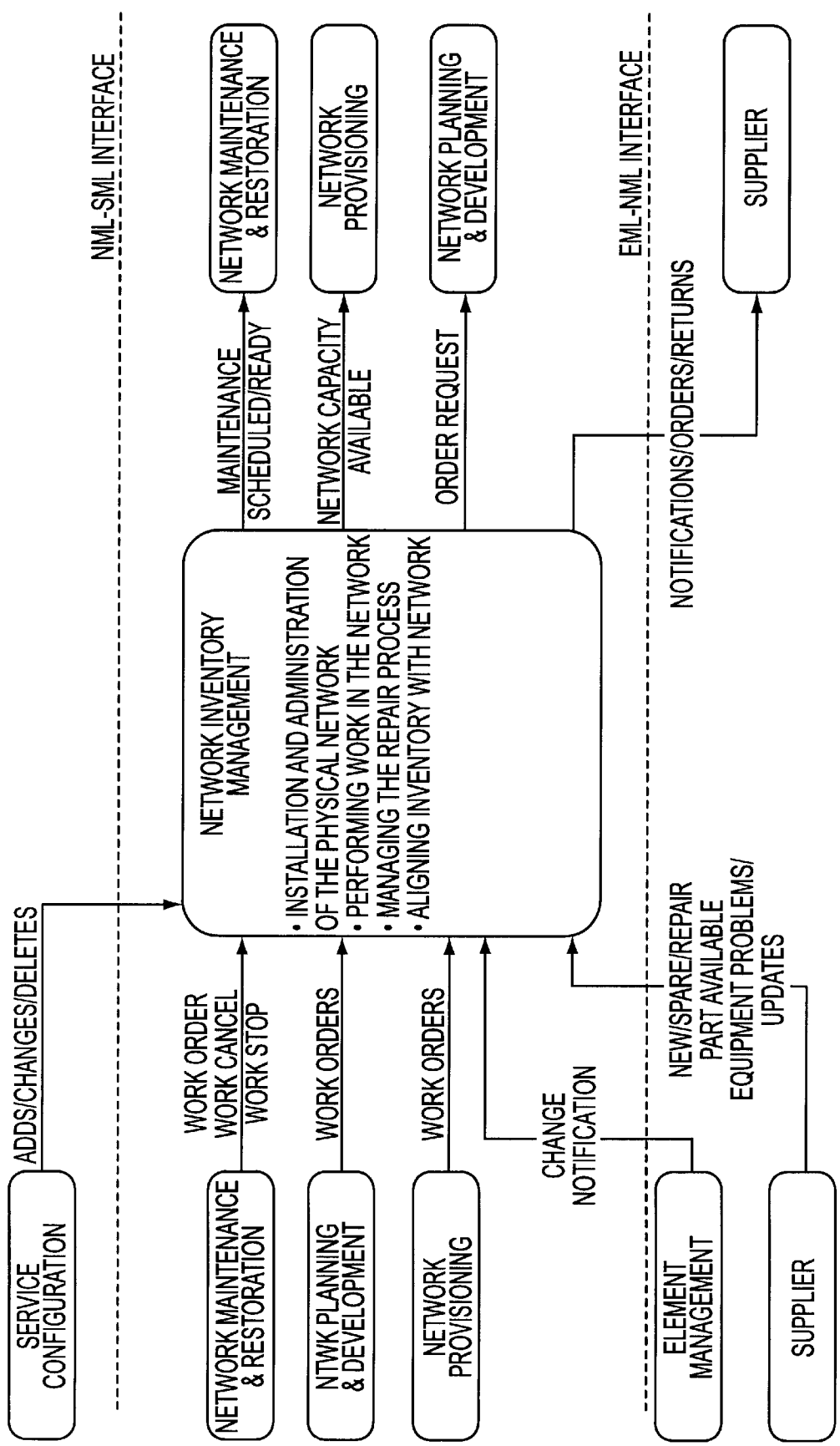
FIG. 30 illustrates the Network Inventory Management process of the present invention, including input and output triggers in accordance with a preferred embodiment of the present invention.

FIG. 30 illustrates the Network Inventory Management process, including input and output triggers. This process is responsible for anything to do with physical equipment and the administration of this equipment. The process is involved in the installation and acceptance of equipment, with the physical configuration of the network, but also with handling of spare parts and the repair process. Software and hardware upgrades are also the responsibility of this process.

Input Triggers work order from Network Planning and/or Network Provisioning change notification from Element Manager work order(start/stop/cancel) from Network Maintenance & Restoration start monitoring request to Network Data Management new/spare/repair part available from Supplier equipment problems/updates from Supplier Output Triggers maintenance scheduled/ready to Network Maintenance & Restoration network capacity available to Network Provisioning request to Network Planning for equipment (new or spares) orders notifications/orders/returns to Suppliers capacity ready indication to Service Marketing Output Data (i.e. data generated within this process)

physical network data maintenance schedule inventory/repair information

Figure 31:
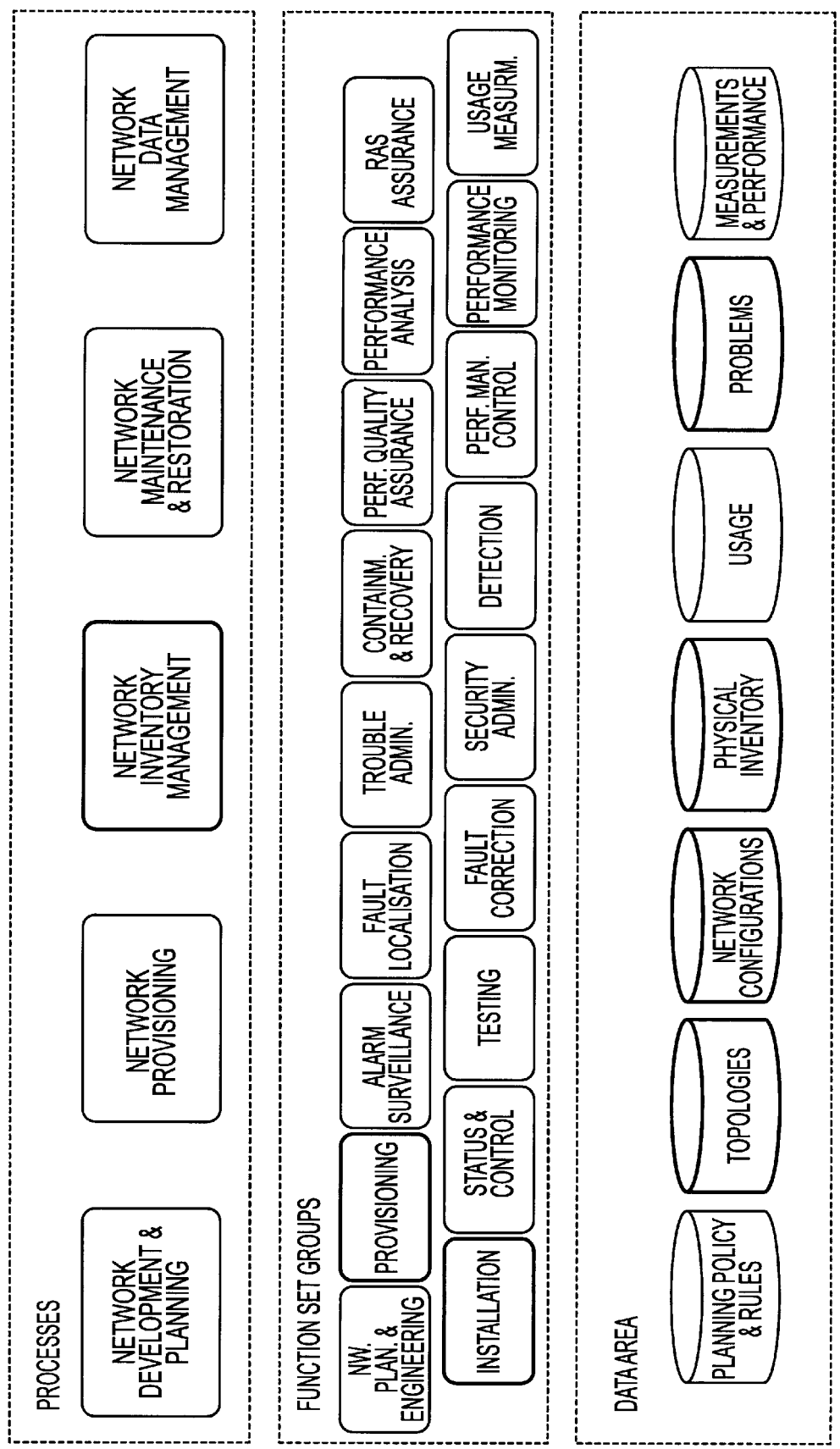
FIG. 31 shows the Functional Groups and Data Areas for the Network Inventory Management process in accordance with a preferred embodiment of the present invention.

Process Responsibilities installation and administration of physical network performing work in the network managing the repair process responsibilities for alignment of inventory information with actual network FIG. 31 shows the Functional Groups and Data Areas for the Network Inventory Management process.

Network Maintenance & Restoration

Figure 32:
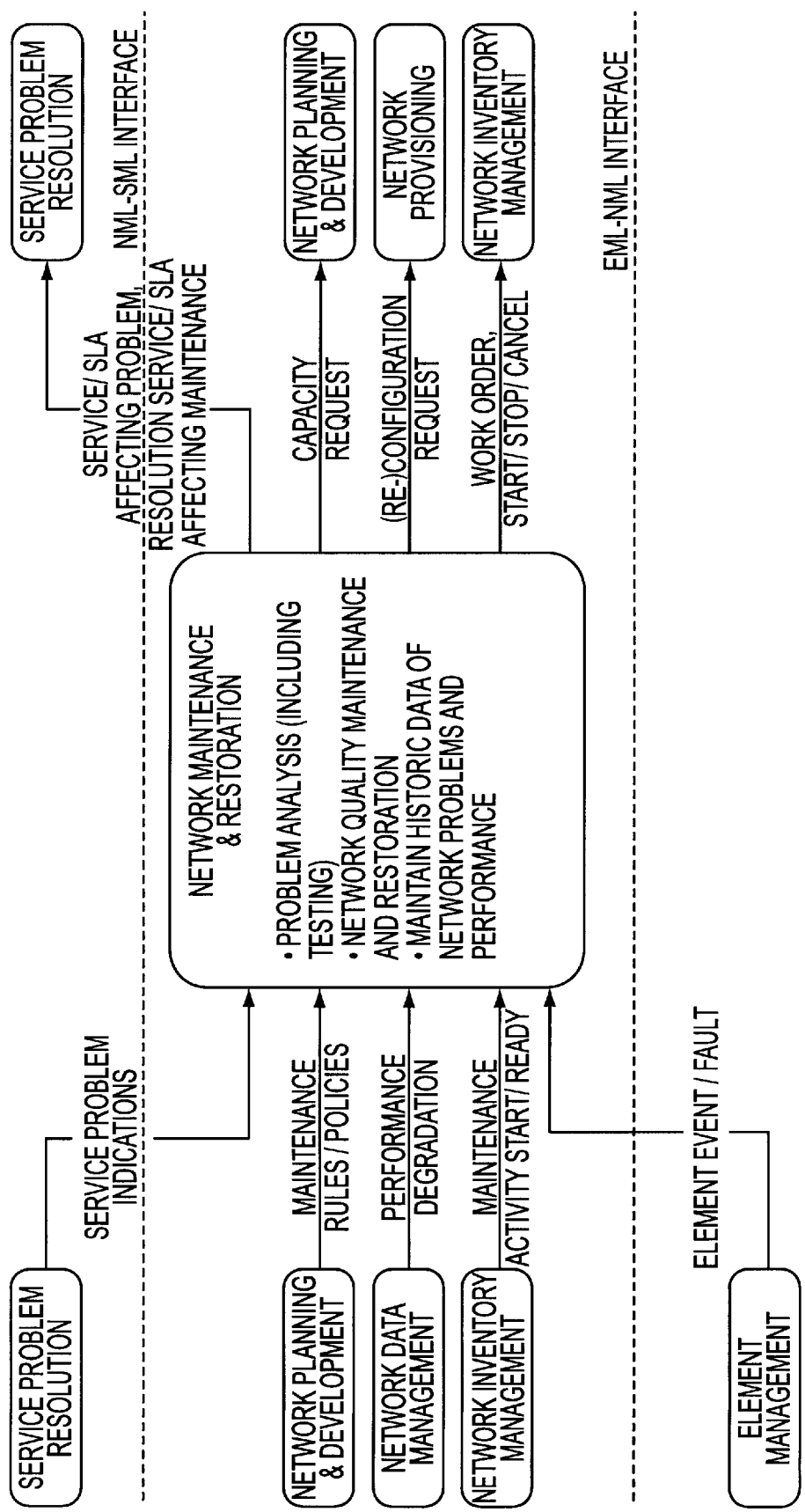
FIG. 32 illustrates the Network Maintenance & Restoration process of the present invention, including input and output triggers.

FIG. 32 illustrates the Network Maintenance & Restoration process, including input and output triggers. This process is responsible for maintaining the operational quality of the network, in accordance with the required network performance goals. Network maintenance activities can be preventative (such as scheduled routine maintenance) or corrective. Corrective maintenance can be in response to faults or to indications that problems may be developing (proactive). This process initiates tests, does analysis to determine the cause and impact of problems, and notifies Service Management of possible effects on quality. The process can issue requests for corrective actions.

Figure 33:
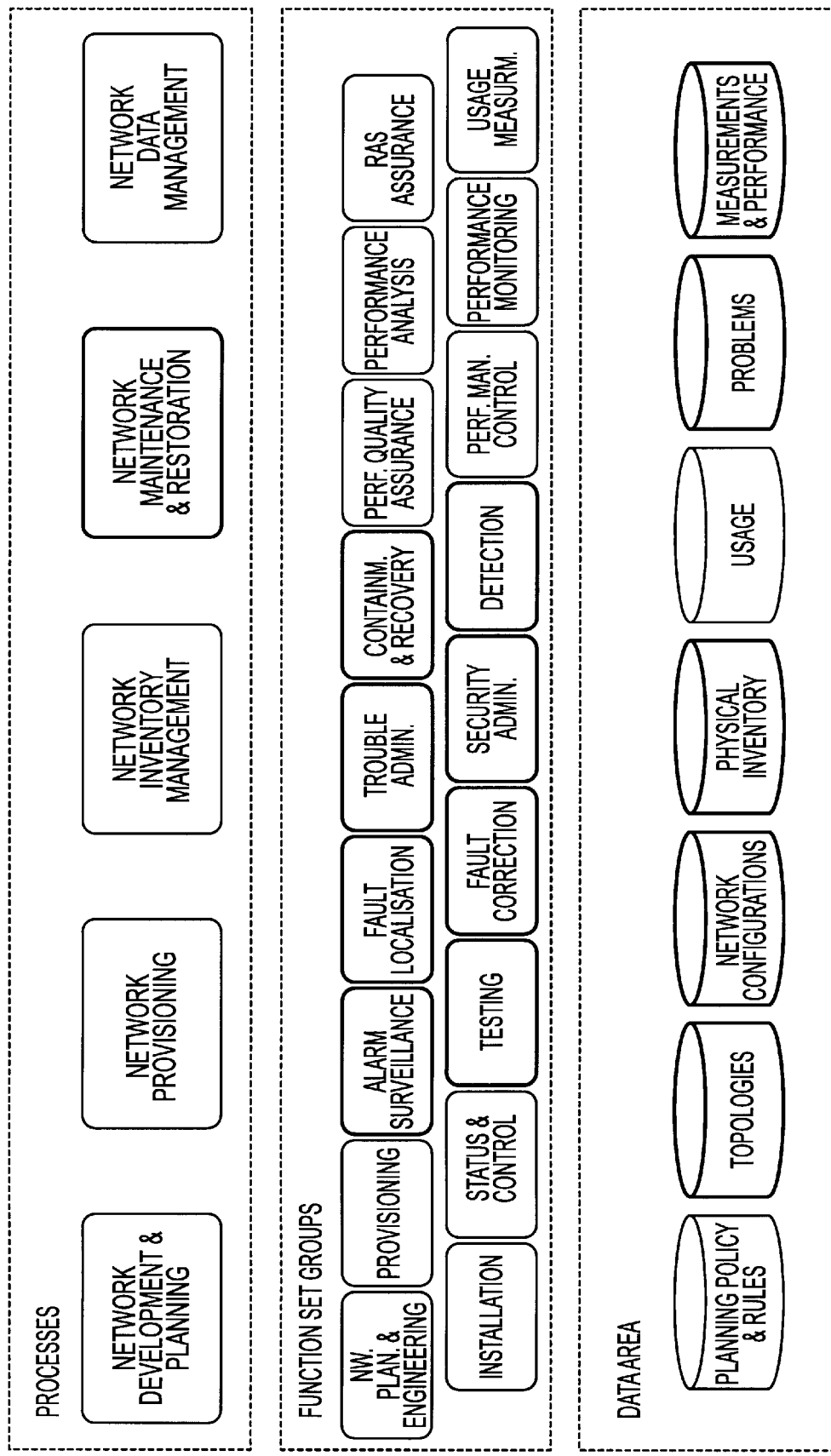
FIG. 33 is depicts the Functional Groups and Data Areas for the Network Maintenance & Restoration process.
Figure 34:
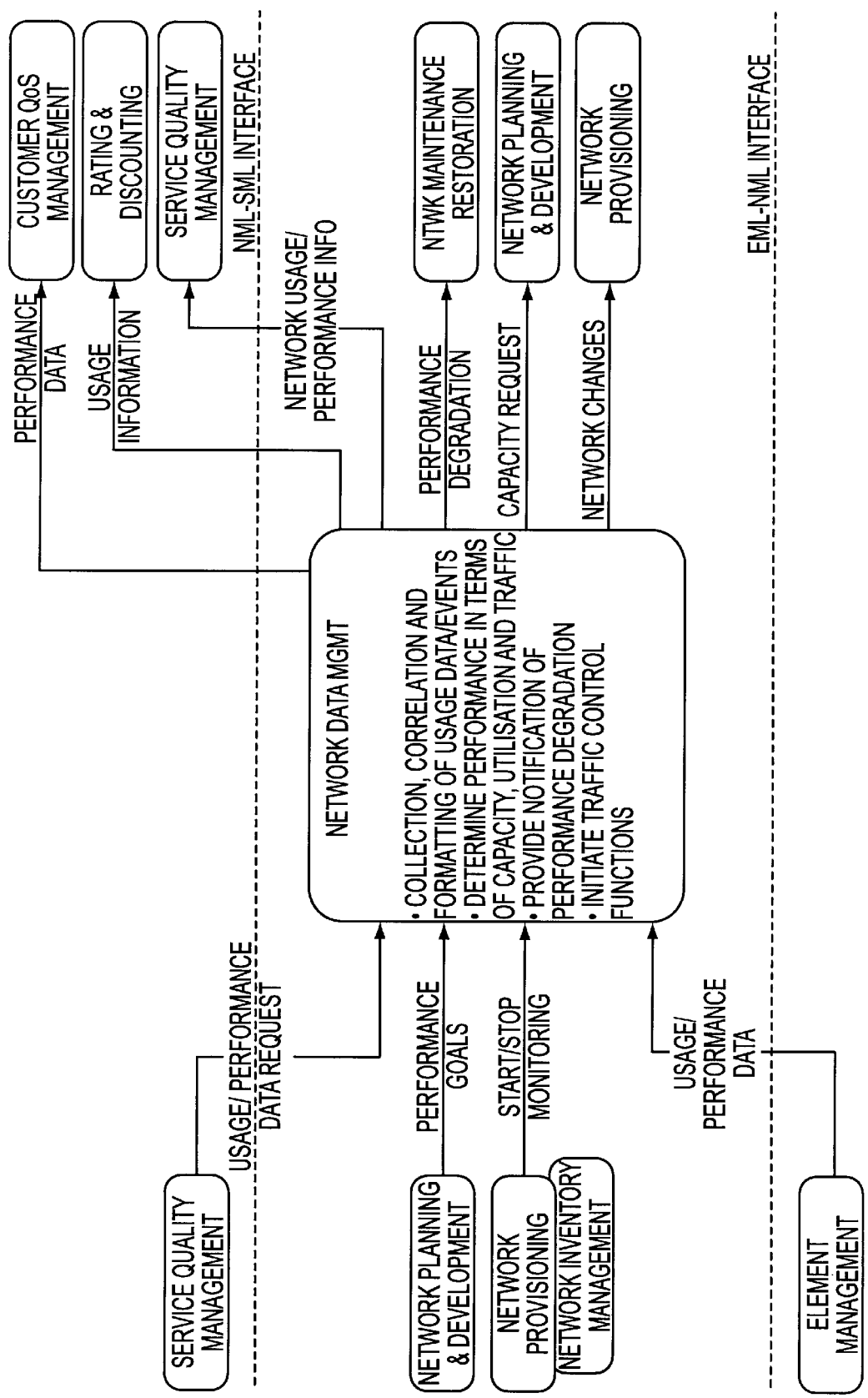
FIG. 34 shows the Network Data Management process of the present invention, including input and output triggers.

Input Triggers maintenance rules/policies from Service Problem Resolution/Quality Management element faults/events from Element Managers regular/preventative maintenance requirements from Network Planning maintenance activity start/complete from Network Inventory Management performance degradation indication from Network Data Management Output Triggers work order (start/stop/cancel) to Network Inventory Management configuration and restoration requests to Network Provisioning service or SLA affecting network problem and resolution notification to Service Problem Resolution service or SLA affecting network maintenance activity to Service Problem Resolution capacity request to Network Planning & Development Output Data (i.e. data generated within this process)
    historic data on network problems, testing and maintenance
Process Responsibilities
    problem analysis (including testing)
    network quality maintenance and restoration
    maintain historic data of network problems and performance
    FIG. 33 shows the Functional Groups and Data Areas for the Network Maintenance & Restoration process Network Data Management FIG. 34 shows the Network Data Management process, including input and output triggers. This process is responsible for the collection of usage data and events primarily for the purpose of network performance and traffic analysis and optimization. This data may also be an input to Billing (Rating and Discounting) processes at the Service Management Layer.

The process must provide sufficient and relevant information to verify compliance/non-compliance to Service Level Agreements. However, the Service Level Agreements are not known at the NML. This process must ensure that the Network Performance goals are tracked, and that notification is provided when they are not met (threshold exceeded, performance degradation). This includes information on capacity, utilization and traffic. In some cases, changes in traffic conditions may trigger changes to the network (via Network Provisioning) for the purpose of traffic control e.g. call gapping in case of network congestion. Reduced levels of network capacity can result in requests to Network Planning for more resources.

Figure 35:
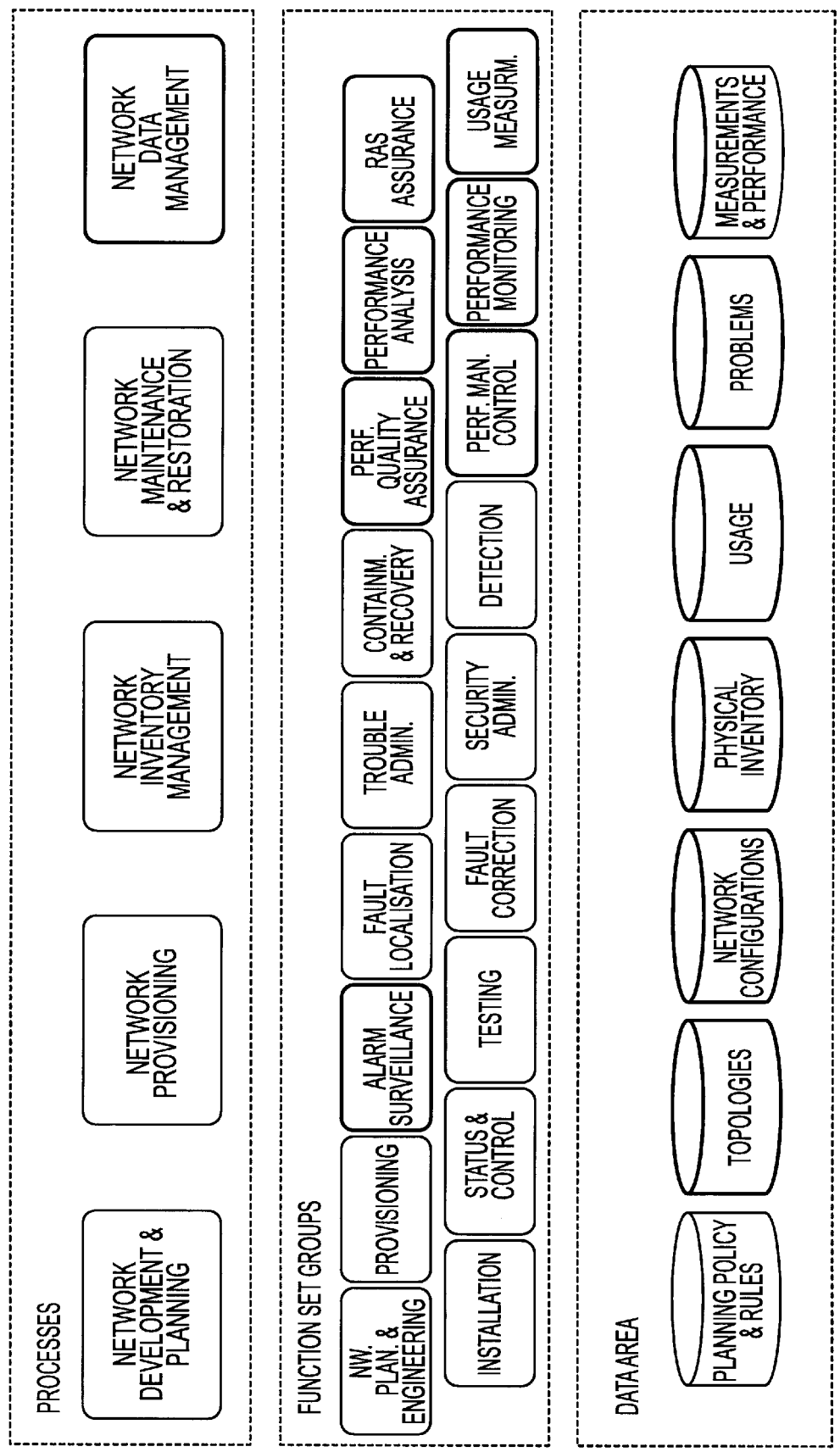
FIG. 35 illustrates Functional Groups and Data Areas for the Network Data Management process.

Input Triggers
    performance goals from Network Planning and Development
    usage/performance data request from Service Quality Management or Rating/Discounting
    start monitoring request from Network Provisioning and/or Network Inventory
Output Triggers
    performance degradation notification to Network Maintenance
    service quality degradation notification to Service Problem Resolution
    usage information to Service Management Layer for Billing
    capacity request to Network Planning and Development
    network changes (including start/stop monitoring) for traffic control to the Element Manager
Output Data (i.e. data generated within this process)
    usage/performance data
    historical performance and traffic analysis
Process Responsibilities
    collection, correlation and formatting of usage data and events
    determining Network Performance in terms of capacity, utilization and traffic
    providing notification of performance degradation
    implementation of Traffic Control functions
    FIG. 35 illustrates Functional Groups and Data Areas for the Network Data Management process.

The impact of interaction with particular network technologies on the structure of the management solution will now be set forth. It is often advantageous in such a situation to establish a technical boundary to separate those Network Management capabilities that are network technology dependent, from those that are common, or generic, to the broader operation of an Operator. The key benefits of defining such a boundary are:

For the Service Provider:
    Minimizes the impact of introducing new network technologies on the NML and above, hence lowering systems costs and speeding up introduction of new network technologies. (For instance, existing generic applications can be applied to the management of new technologies).
    Reduces the cost of the technology-dependent components and the capabilities these offer since vendors are free to innovate below the boundary, and can generate higher volume business for their solutions. (Providers should be free to purchase only the functionality (applications) they need).
    Allows the higher level functionality (i.e. above the boundary) to be procured more competitively (potential to create a market for the generic applications).
    Promotes a more structured management solution (with potential for increased flexibility and easier evolution for new services and management capabilities).

For the Vendors:
    Increases the value of their offerings (i.e. greater functionality) by allowing inclusion of appropriate higher-level management capabilities accessed in an agreed way across the technology-dependent boundary.
    Improves potential for growth in their market size (due to greater functionality and faster take up by SPs).
    Improves potential for new revenue through the enhanced functionality of their network equipment or software support.
    Provides increased "headroom" for development of management capabilities and innovative solutions within the envelope of the offered technology (a common structure allows the vendor to focus on the applications structure as well as functionality, and to more clearly target and price management solutions for given Operator needs. Incumbent needs may be very different to a new operators).
    Improves the efficiency of systems integration among vendor application products, enabling a vendor 'value chain' to operate more effectively.

Relationship with the Telecomms Operations Map

Figure 36:
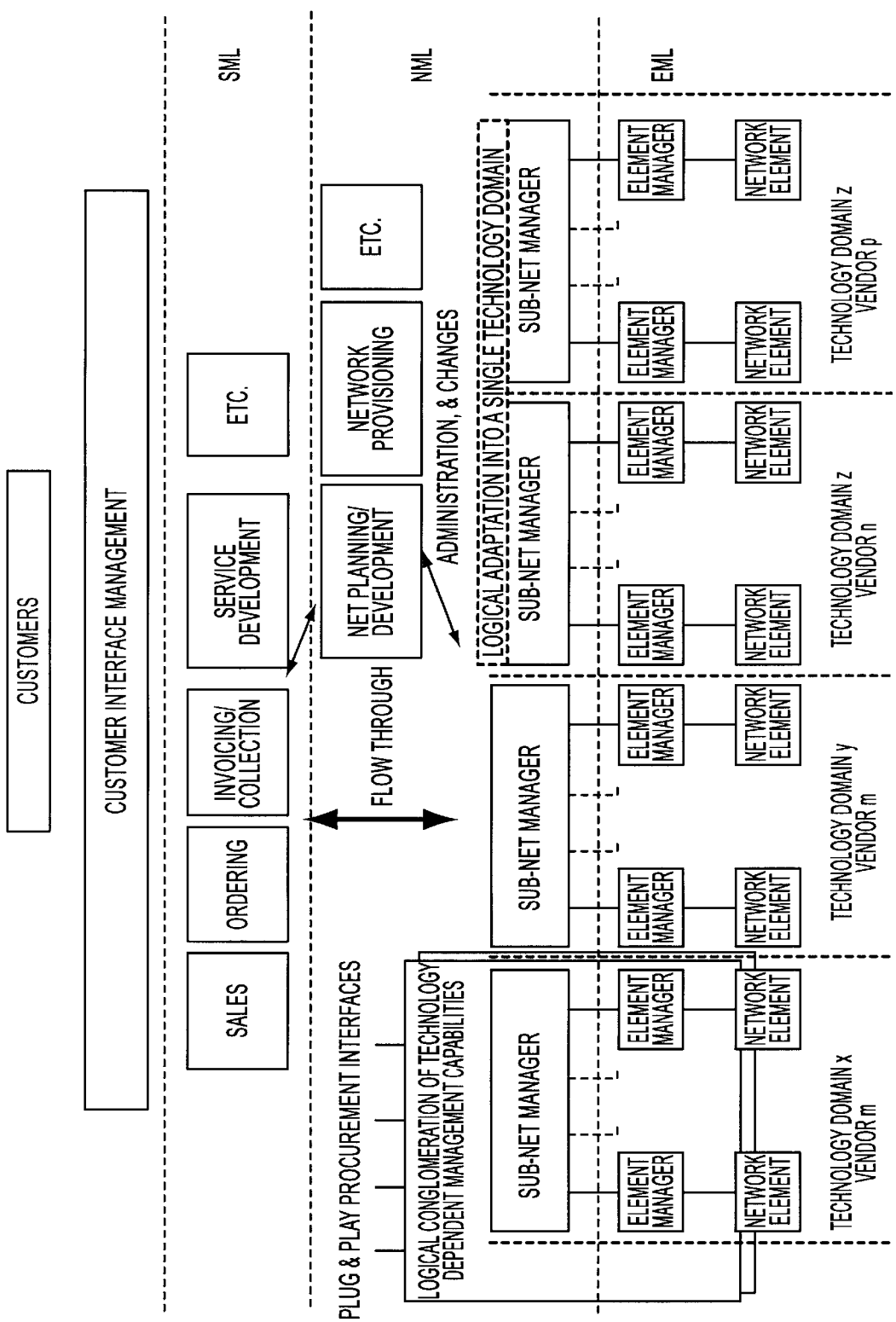
FIG. 36 shows the Structuring of the Network Management Layer of the present invention.

The functional areas addressed herein can be encapsulated as blocks of functionality within the Telecomms Operations Map framework, and the scope of the chosen functional blocks can reflect the distinction between generic and technology-specific management indicated above. FIG. 36 illustrates the Structuring of the Network Management Layer. The functional blocks shown in FIG. 36 have been chosen, on this basis, to distinguish Network Management capabilities associated with Element Managers (at the node level) and Sub-Network Manager(s) (say, for some managed network area or domain). Note that this is only one possible structuring. Procurement by Service Providers of managed network technology is often based on a combination of Element Management and some aspects of Network Management packaged into this type of Sub-Network Management. This allows the managed Sub-Network domain to be accessed as a network area, rather than just a series of individual network nodes. The Sub-Network might be defined:
    on the basis that it employs a particular network technology (e.g. SDH or ATM), with its associated management, and is procured as a package;

on the basis of geographical partitioning;

because specific areas of management functionality are supported; and on many other criteria for defining the Sub-Network boundaries.

However, it is not necessary to distinguish explicitly the Sub-Network Manager functionality and Element Manager functionality. In practice, the balance between these aspects will be determined by the deployment constraints imposed by the procurer administration and the internal design constraints of the technology. As a result, the distribution of functionality may vary significantly from one implementation to another. The factors influencing distribution of functionality are illustrated by the following examples:

Aggregation of performance and usage data may best be done at the nodal level in order to minimize the volumes of data flows transferred to higher-level management.

The design/routing of PVCs must by its nature be performed from a central place, before fanning out to the lower level tasks which are performed at the nodal level.

Detailed configuration functions may best be performed at the nodal level in order to provide a fully assured configuration mechanism and to minimize data duplication.

Mapping of network-oriented to node-oriented resource choices (e.g. network routings mapped to equipment port choices) may be optimally handled in different ways for each type of technology and for each separate implementation of the same technology. This can lead to different distributions of functionality within each technology domain to support similar capabilities presented at the boundary to higher-level management.

Constraints at the Time of Deployment

State of the computing infrastructure (e.g. processing capability) upon which the management solution is deployed.

Physical computing architecture adopted by the SP. For example, presentation of management services through standard and open interfaces from a central place may be preferred in order to minimize the cost of supporting protocol stacks and to minimize the impact on evolution of the computing infrastructure.

Degree of adaptation required due to shortfalls or overlaps in functionality.

Segmentation needs of the administration; physical (geographical domains) or logical (customer groups, product groups etc.)

The main criteria applied to the partitioning of functionality is that the function is:

Logically related to the other functions chosen, in support of some overall management feature or capability. This is the major area of linkage with the Telecomms Operations Map, since the processes and process flows identified in the Telecomms Operations Map are used to identify which functions are logically related and should be considered together.

Specific to a technology Sub-Network or is considered to require a significant degree of knowledge about the internals of the network technologies.

Each process will now be evaluated in terms of requiring industry-common interfaces to be developed. Service providers may determine where they need industry agreements based on the magnitude of inefficiencies caused by manual interactions or lack of common terms. These inefficiencies can be manifested as excessive errors, protracted process intervals, or the inability to respond quickly to new market opportunities.

Network Development Process

This process requires information on policies and design rules to be exchanged between network operators and their suppliers. It is however, a highly interactive process that is not easily automated since each network development comes with its own set of unique characteristics. In some cases, the result is to amend or extend the detailed processes and functions in other areas to accommodate the effective introduction of new services and technologies.

This process is the entry point for the Service Management lifecycle.

Network Planning Process

This process takes capacity plans and capacity requests to generate the specific orders for the provision, configuration and construction of equipment. These ordering interfaces can be automated to improve effectiveness of the processes.

Internal works orders are likely to be automated by some local proprietary interfaces such as a work scheduler or project planning tool. External orders to suppliers are the traditional domain of Electronic Data Interchange (EDI), and more recently engineering ordering processes (e.g. CALS).

This process supports the Service and Network Management lifecycles.

Network Provisioning Process

This process takes configuration requests from Customer Care and Service Management Processes as well as from other NML processes. The result of Provisioning is to provide the data for the logical configuration of the Network Element through the EML, or for a request to the Network Inventory for physical configurations. For the former, automation based upon industry agreements is essential, for the latter the automation of the interface may be a local issue. However, if the Network Inventory is run by a separate organization then automation based upon industry agreements will be desirable.

This Process is an essential support component of the Customer Care Ordering Process and the Service Management Service Configuration Process.

Network Inventory Management Process

This process supports a number of Network Level Processes and needs to be automatically updated to track the physical state of the network inventory across an EML interface. The execution of the physical work is carried out by Workforce Management that may need an automated interface which may not be based upon industry agreements.

This process is an essential part of the Network Management lifecycle and supports those Service Management and Customer Care lifecycles that require physical changes to the network.

Network Maintenance and Restoration Process

The Maintenance and Restoration Process strongly impacts a customer's perception of service quality. The rapid and accurate handling of problem reports and alarms, their subsequent diagnosis, and restoration require the accurate processing of large numbers of events. This process is essential to support the Network Management, Service Management, and Customer Care lifecycles.

Network Data Management Process

The Data Management Process has two distinct aspects:

Usage Measurement for Billing

For this aspect, the need is to collect, collate and correlate large volumes of data and move them efficiently to systems that can carry out rating and billing. The data transfer needs high level of integrity and auditability.

Monitoring of Network Traffic and Performance Conditions

This aspect is crucial as network degradation usually precedes network failure. Detection and raising of problems at this stage can improve customer perception of service quality. It is also essential to the Network Planning and Development processes as it gives early warning of exhaustion of network capacity.

This process is essential to support the Network Management, Service Management, and Customer Care lifecycles.

TMN and Role of Network Management

TMN (Telecommunications Management Network) represents a series of architectural and interfacing agreements focused on an infrastructure for managing telecom networks and services, including planning, installation, provisioning, operation, maintenance and administration. It is defined by the ITU-T, the international body responsible for specifying telecommunications standards. A TMN provides management functions for telecommunication networks and services and offers communications between itself and the telecommunication networks, services and other TMNs. In this context a telecommunication network is assumed to consist of both digital and analogue telecommunications equipment and associated support equipment. A telecommunication service in this context consists of a range of capabilities provided to customers.

Figure 37:
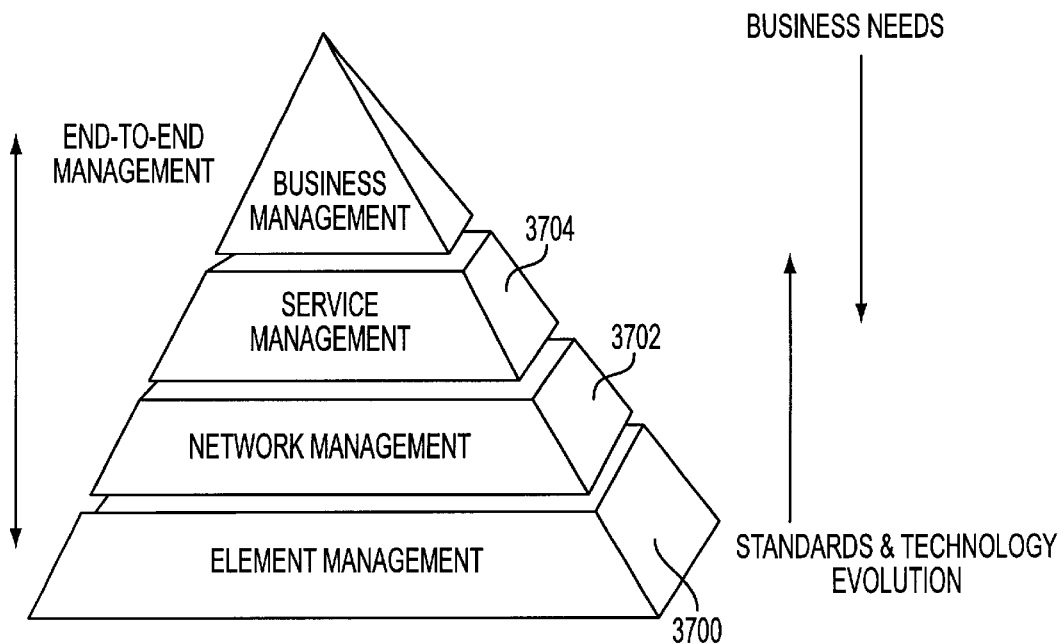
FIG. 37 depicts a TMN Layered Management Architecture in accordance with one embodiment of the present invention.

Within the TMN layered management architecture, the Network Management Layer is a key integration layer between the Element Management Layer and the Service Management Layer. FIG. 37 illustrates a TMN Layered Management Architecture. Its basic function is to bring together information from the Element Management systems 3700 which support it, and then integrate, correlate and in many cases summarize that information, in order to pass on the relevant information to Service Management Systems 3704. That information may generally relate to the characteristics of the network technologies involved, but should describe an end to end view which is consistent across the (multiple) technologies which may support a customer service. In the reverse direction the Network Management Layer 3702 receives information from the Service Management Layer 3704, process it and then pass on relevant commands and data to the appropriate Element Management System(s) 3700.

However, the Network Management Layer 3702 is more than just a mediator between the EML and SML. The Network Management Layer 3702 has its own responsibilities; for example, network provisioning and network fault management. The key issue is that management responsibility will be placed at a level where adequate information is present, instead of shifting all responsibilities to the SML 3704. For example if a non service-affecting network failure occurs, i.e., breakdown o f one leg of an SDH ring, the Network Management Layer 3702 may handle the failure without notifying the SML.

Although there has been a good deal of valuable attention given in ITU-T and elsewhere to "higher-level" management, much of the work completed so far by Standardization and other bodies is reflected in Recommendations, Standards and Implementation agreements which describe aspects of the Element Management Layer 3700, with work now progressing quickly toward the Network Management Layer 3702. Much of this crucial work can be characterized as defining the 'instrumentation' of the equipment to be managed, rather than defining automated management information process flows to achieve integrated management of services for a customer. Much can be done to analyze the Service Management Layer 3704, to try to understand and document the business needs of Service Providers and Network Operators. The knowledge gained from this activity can be applied in determining which activities, at the NML, need to be progressed first to document requirements, detailed information flows and subsequently specifications, that support Service Management. These information flows may be between SML and NML, NML and EML or wholly within the NML.

Service Related Lifecycles

Figure 38:
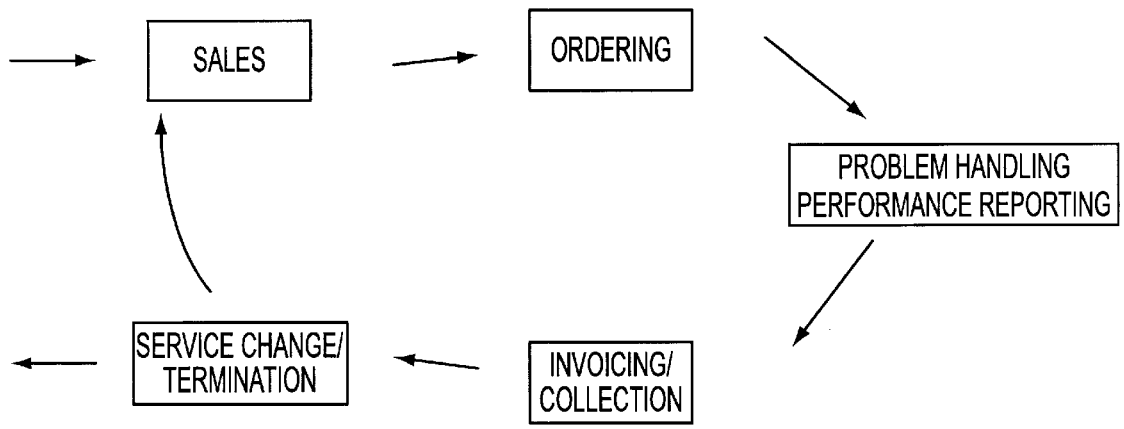
FIG. 38 illustrates the Customer Care Lifecycle of the present invention.

FIG. 38 illustrates the Customer Care Lifecycle. As noted earlier, many Providers are re-engineering their business processes and a common approach is to identify a set of service related lifecycles. In general, the key lifecycle is the Service Management lifecycle, from initial identification and definition of a service, through planning and development, deployment, ongoing operation and finally phasing out that service, as this will drive the other lifecycles. While there can be many combinations in how a particular company will segment and name their particular processes and methods, the overall lifecycle will generally contain many of the same steps.

Each step in a service lifecycle has consequences throughout the management (TMN) framework, with consequential activities required at Business, Service (Customer Care), Network and Element Management layers. It should be noted though that many of the steps are not subject for standardization, as they represent a key competitive differentiator for the Provider. However, in order to be able to procure cost effective management systems, rather than develop bespoke software, Providers are realizing that some commonality of approach is required, both across management systems in their own environment, as well as between the management systems of their partners and customers. Both equipment and software suppliers, also recognize that there is advantage in providing easily integratable products to this environment. Thus, the main emphasis herein is driven from the Service Operation and Monitoring aspects of Service Management, where more commonality of approach is acceptable and beneficial to the industry, rather than some of the more value added areas, which are likely to remain proprietary.

The following identifies the typical lifecycles that have been identified and also discusses some differences in their characteristics.

Customer Care Lifecycle

The customer care processes in the top row of FIG. 22 forms a lifecycle driven by the provision of a specific instance of a customer service. Because there are likely to be many customers, many different services, and a fairly dynamic need to add, delete, or change services, this implies the need to support high transaction rates in the Service Providers Customer Care systems (but not necessarily in each individual customers management system), relatively low data volumes per transaction, high transactional integrity, and low levels of manual intervention to save costs.

The Service Management processes in the middle row of the overall process model of FIG. 22 form a longer periodicity lifecycle driven by the introduction, modification, and withdrawal of different service products (or 'classes' of service). This lifecycle involves creating the specific policies, rules, process, and data templates used to configure and select service products the Customer Care process can utilize.

Figure 39:
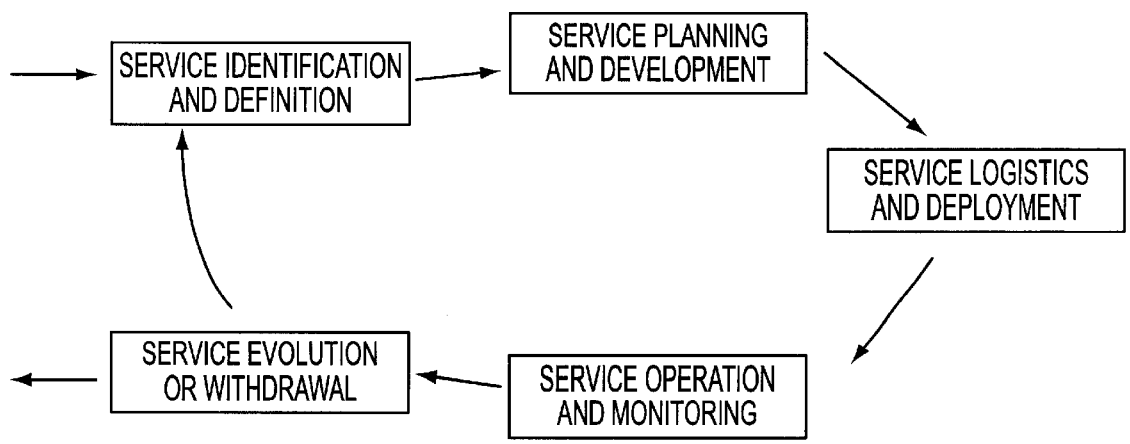
FIG. 39 shows a Typical Service Management Lifecycle of the present invention.

As stated previously, while there can be many combinations in how a particular company will segment and name their particular processes and methods, the overall lifecycle will generally contain many of the same steps. FIG. 39 shows a Typical Service Management Lifecycle.

The Network Management Lifecycle

Figure 40:
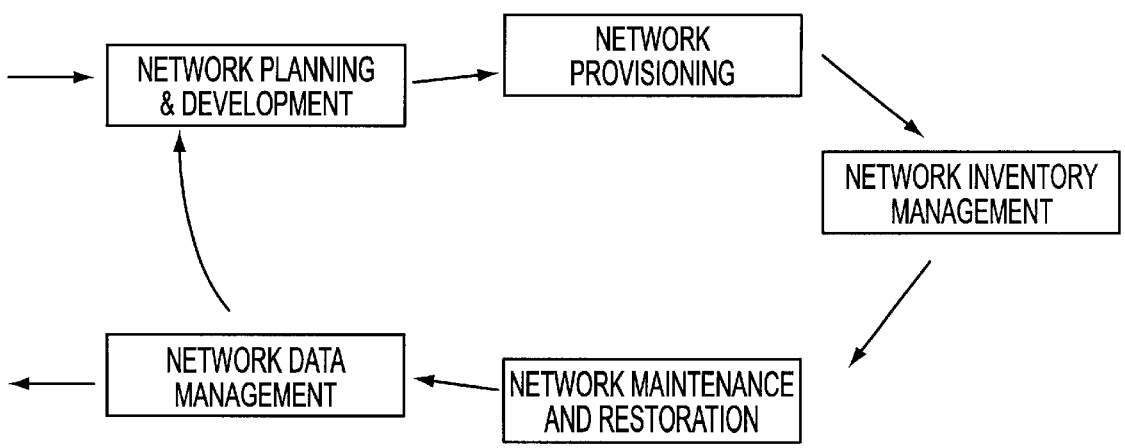
FIG. 40 depicts the Network Management Lifecycle of the present invention.

FIG. 40 shows the Network Management Lifecycle. The Network Management processes form the lower layer of processes in the overall Service Management Telecomms Operations Map and have to respond to and support both the Customer Care process lifecycle and the Service Management Lifecycle.

In addition to responding to these two process lifecycles the building of the network infrastructure introduces additional lifecycles comprising:

the cycle of planning and building of the network for expansion of capacity, which has a relatively long periodicity, and the cycle of technology evolution which involves technology change-out whilst ensuring service continuity.

Whilst many of the planning processes can be largely manual, some of the steps are amenable to automation because they involve the creation of large amounts of data. This has to be internally consistent, and has to be introduced into the operational network in a relatively short interval of time, maintaining a high degree of integrity during the process. The monitoring and maintenance processes may involve the processing of high volumes of small transactions.

Integration of Network Management systems into the Providers' environment is one of the main issues the industry needs to address. Until recently, real-time operational management was limited to the Element Management Layer, i.e. more or less stand-alone alarm and configuration boxes, with much proprietary internal development within the Network Operator to 'glue' important aspects (e.g. alarm monitoring) together. However, moving to the NML, Network Management systems have to support the business processes of the network operator. Inter-operability problems arise because the network management processes are complex, since all of these lifecycles have to be resolved, integrated, and supported.

Interfacing and/or support problems arise in the following areas:

Deficiencies in life cycle support. Network management systems currently tend to only support the operational phase of network management.

Inter-operability problems with different network technologies and equipment from multiple vendors.

Inter-operability problems towards other TMN layers. For example, topology of the network (physical location of NE's, cable management, and logical connectivity) is not supported, and the link towards Service Management is not present.

Partitioning of, ownership of, and support for network data. Different vendor (element or sub-network management) systems tend to build in assumptions about who owns specific data and who may access or change it. Different Operators choose to manage data in their own environments in different ways and many of their own systems make similar assumptions on location and ownership.

Figure 41:
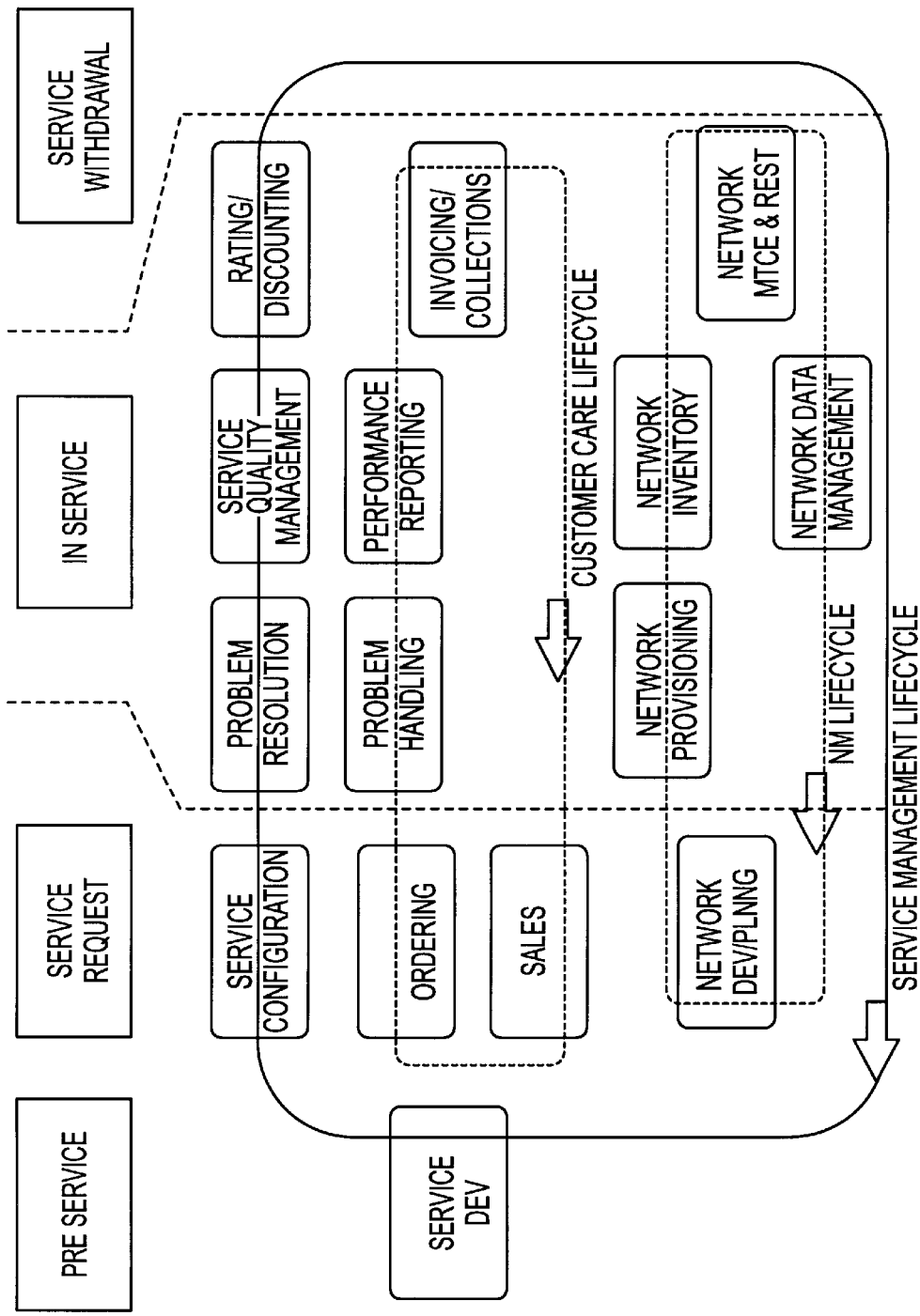
FIG. 41 shows how the Customer Care, Service Management and Network Management Lifecycles interact.

FIG. 41 shows how the foregoing three lifecycles interact.

Examples will now be set forth relating to how the high level processes set forth hereinabove may be decomposed into optional sub-processes, which may be linked together in 'work strings' (for instance by using workflow engines).

These sub-processes support the high level processes and represent the way providers describe daily tasks they perform, or would ideally like to perform, in managing integrated networks to support automated management of services, delivered to their customers.

Figure 42:
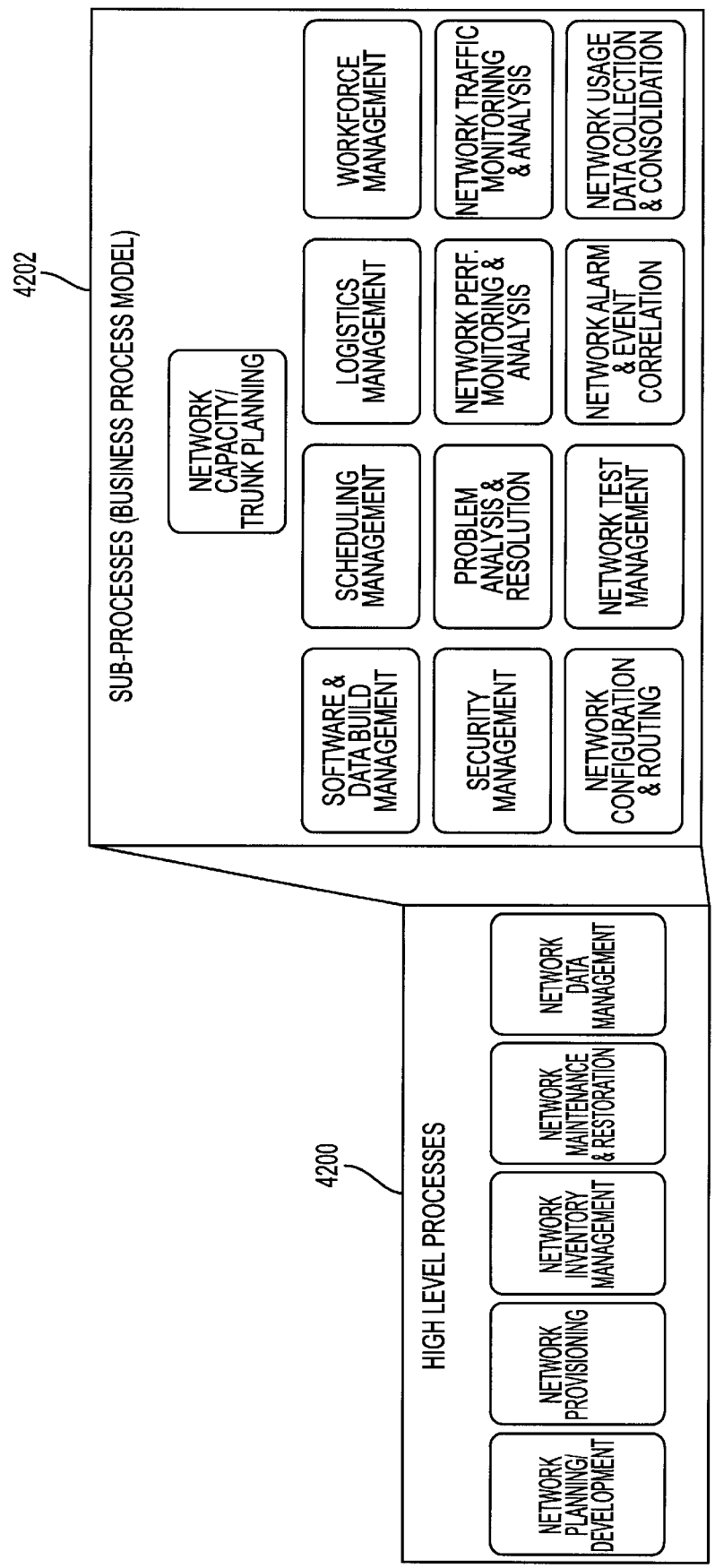
FIG. 42 illustrates the five high level network management business processes and thirteen sub-processes.

FIG. 42 shows the five high level network management business processes 4200 and thirteen sub-processes 4202. Note that additional sub-processes may be added as knowledge increases through analysis of this area. This is a slightly different view from that described in current standards, but it should be noted that neither view is wholly right or wrong. Both views are necessary if the objective is to be achieved. The difficult task is to map the process view onto the wealth of available standards that can be used, and to deliver the business benefits through tangible products that can be deployed. In doing that, further requirements will be identified that will influence future standards.

Figure 43:
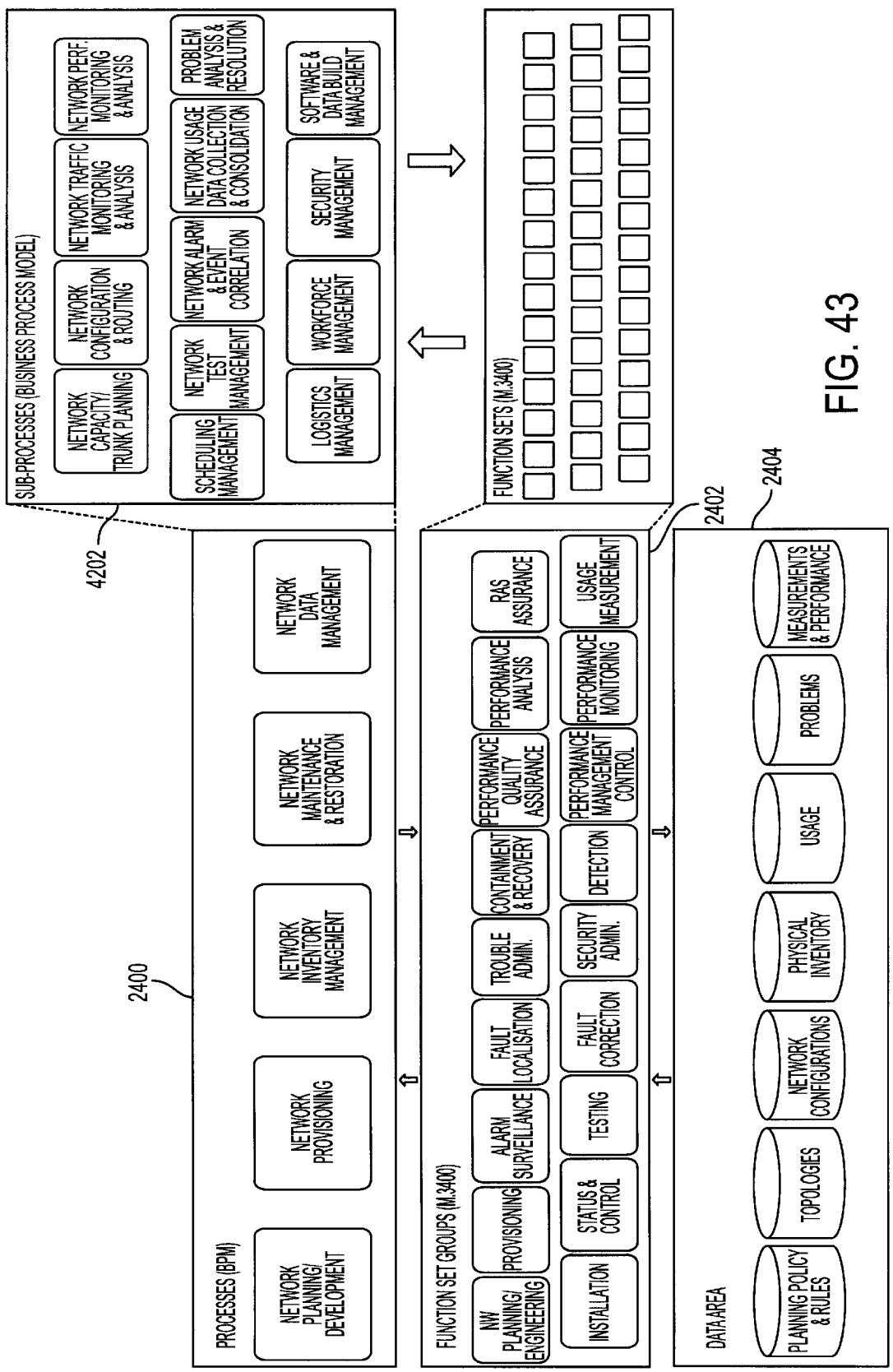
FIG. 43 is a diagram that illustrates the position of the processes and sub-processes in relation to the processes, function set groups, and data areas of FIG. 22.

As a first step, the need to understand the relationship of processes and sub-processes with Function Set Groups and Function Sets is useful. FIG. 43 helps to position the processes and sub-processes 4202 in relation to FIG. 24.

Figure 44:
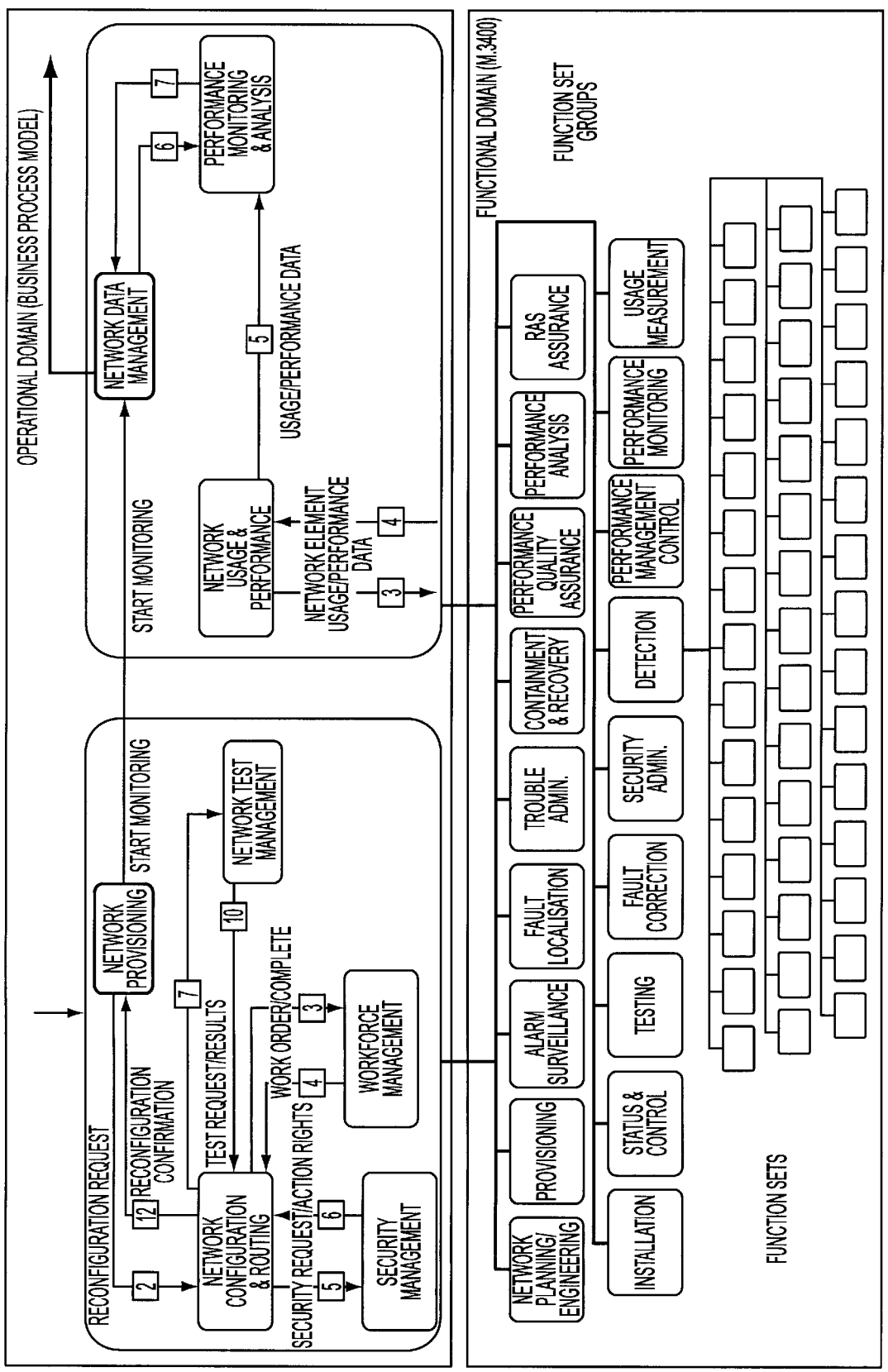
FIG. 44 shows how two examples of the linked workflows might be used in accordance with one embodiment of the present invention.

Each process or subprocess may be composed of all or part of the different Function Set Groups or Function Sets, perhaps as a linked workflow, to achieve its objectives. FIG. 44 shows how two examples of the linked workflows might be used.

An outline will now be set forth for some process automation examples that address areas identified to be of common need in the industry and of higher priority. The examples are not exhaustive, but will give a view to industry players on which capabilities could be tackled first, as part of an industry effort. Initially it can be seen that each high level process maps to several sub-processes and that each sub-process maps to several high level processes, creating many-to-many relationships.

Two examples will now be set forth in which the flow of information between the sub-processes is depicted. Although the examples were chosen arbitrarily, they demonstrate the insight gained through the expansion of high level processes. The figures show the flow between TMN Layers and between those sub-processes that support the high level business process.

Network Provisioning Process Example

Figure 45:
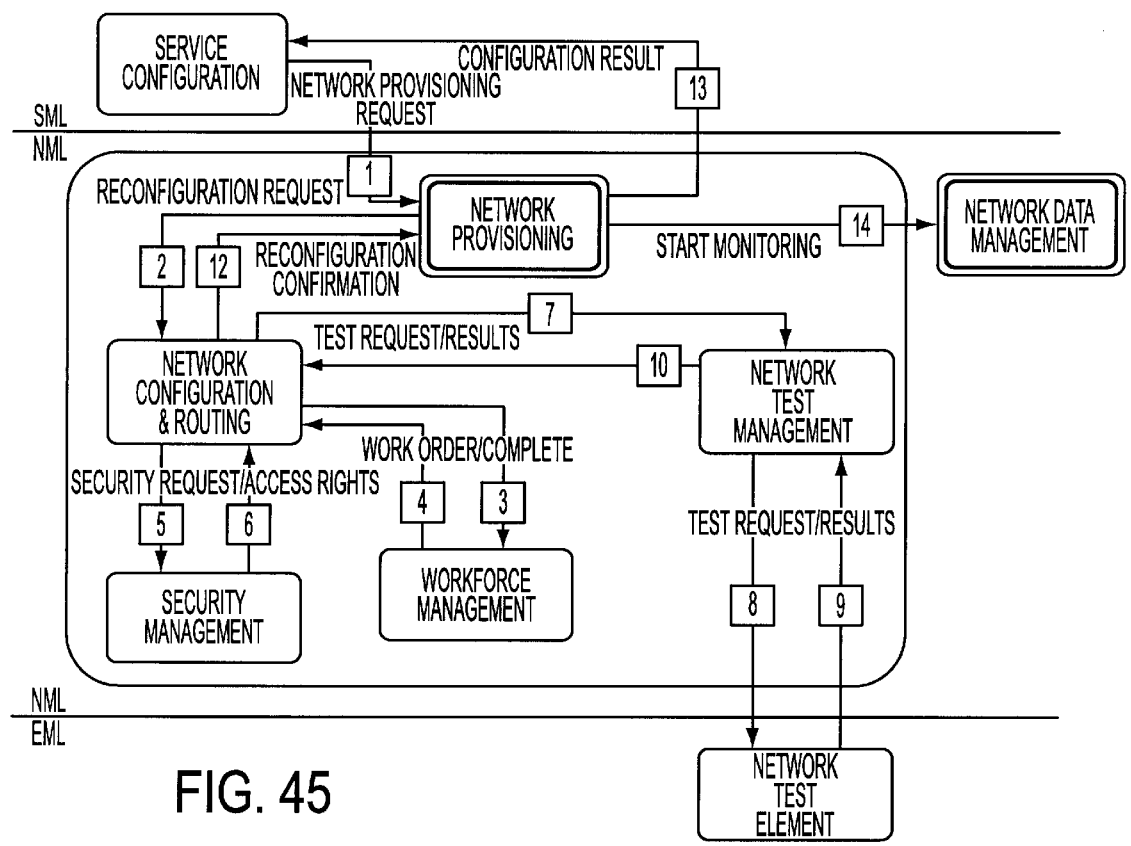
FIG. 45 illustrates a process flow for the Network Provisioning process of FIG. 28.

This example assumes that a new service is being provisioned and that the necessary network construction has already taken place. FIG. 45 illustrates process flow for network provisioning. The numbers in FIG. 45 show the sequence of operations starting with a network provisioning request [1] from the Service Configuration process within the Service Management Layer 3704 (see FIG. 37) and finishing with the configuration result [13] and start monitoring [14] messages sent to the Service Configuration and Network Data Management processes respectively.

Network Data Management Process Example

Figure 46:
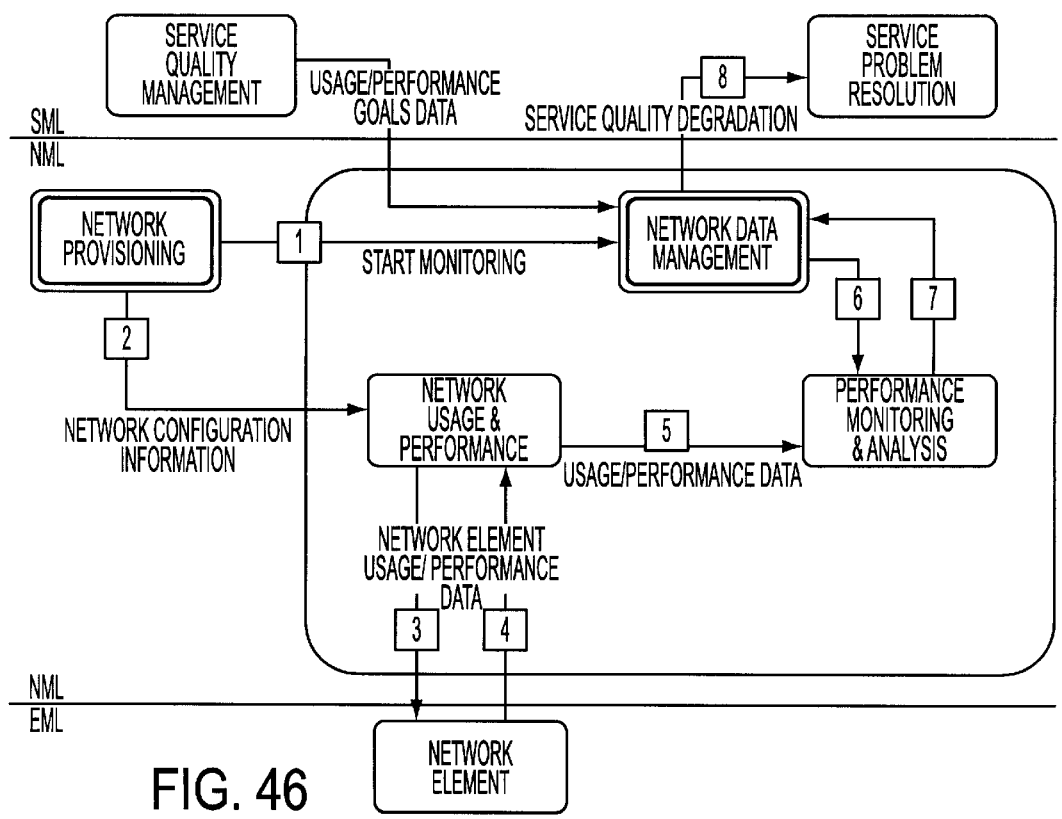
FIG. 46 illustrates a Process flow for the Network Data Management process of FIG. 34.

FIG. 46 illustrates a Process flow for Network Data Management. This example assumes that a new service has been provisioned and has triggered Network Data Management to start its function. Further, it shows that Network Data Management has discovered an out-of-spec condition and has notified the Service Problem Resolution process.

Although each sub-process has many triggers and data flows, in the previous examples, only those triggers and data flows pertinent to the high level process are shown. A more detailed view of inputs, outputs and responsibilities of three of the sub-processes will now be set forth.

Performance Monitoring and Analysis Sub-process

Figure 47:
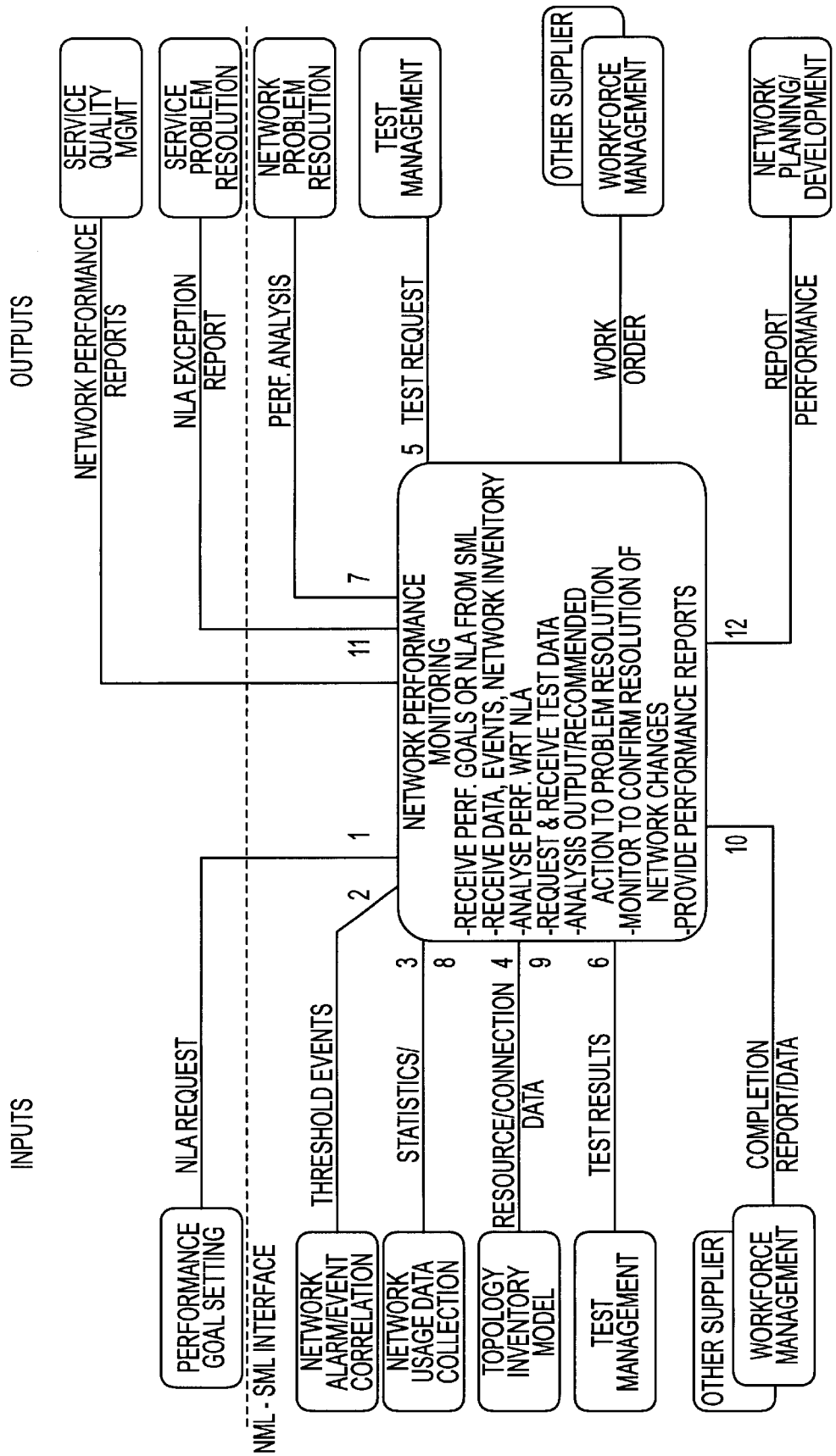
FIG. 47 shows the Network Performance Monitoring sub-process of FIG. 42.

FIG. 47 shows the Network Performance Monitoring sub-process. (Managing/Servicing individual NLA's with the Service Management Layer) This sub-process is responsible for managing, processing and analyzing network and NE statistical information, to determine and track network performance, providing Network Performance Assessment. It is also responsible for the gathering of network performance data needed by the Service Management Layer to track Service Level Agreements. Mapping of the SLA to the network level has been called a Network Level Agreement (NLA).

Inputs:

Receives Network Performance and QoS performance goals from Network Planning and the Service/Business Layer processes. This would include performance requirements, thresholds for degradation notification, and organization/scheduling information such as, which reports are done daily, which are done monthly, and so forth.

Receives Network QoS threshold events, including error Threshold events, from Network Alarm/Event Correlation and assessing immediate or potential impact on NLA's.

Receives statistical data, which may include Call Detail Records for switched services, from the Network Usage Data sub-process, in order to track resource and connection QoS and utilization.

Receives network test data from Network Test Management, used to characterize performance; such as, baselining and Network/QoS assessment.

Receives network outage information from Alarm/Event Correlation in order to track resource/connection availability, MTBF, MTTR. Receives traffic violations from Traffic Monitoring.

Requests network inventory and topology data from the Network Inventory Management process, to analyze performance data.

Requests additional performance data from Network Data Collection and/or Test Management, based on need for proactive maintenance of suspect resources Functions:

Performs trending of historical information to predict future performance and provide proactive maintenance recommendations.

Maintains historical view of network performance information.

Outputs:

A historical view of Network Performance analysis. Outputs Capacity and Traffic analysis to Business Layer (forecasting and Planning)

Network performance degradation notifications to Network Maintenance and Restoration.

Outputs NLA violations to the Service Management Layer.

Outputs network domain performance statistics to Service Performance Reporting.

Requests additional performance data from Network Data Collection and/or Network Test Management, based on the need for proactive maintenance of suspect resources.

Identifies the need for changes in network capacity to Network Planning.

Network Test Management Sub-process

Figure 48:
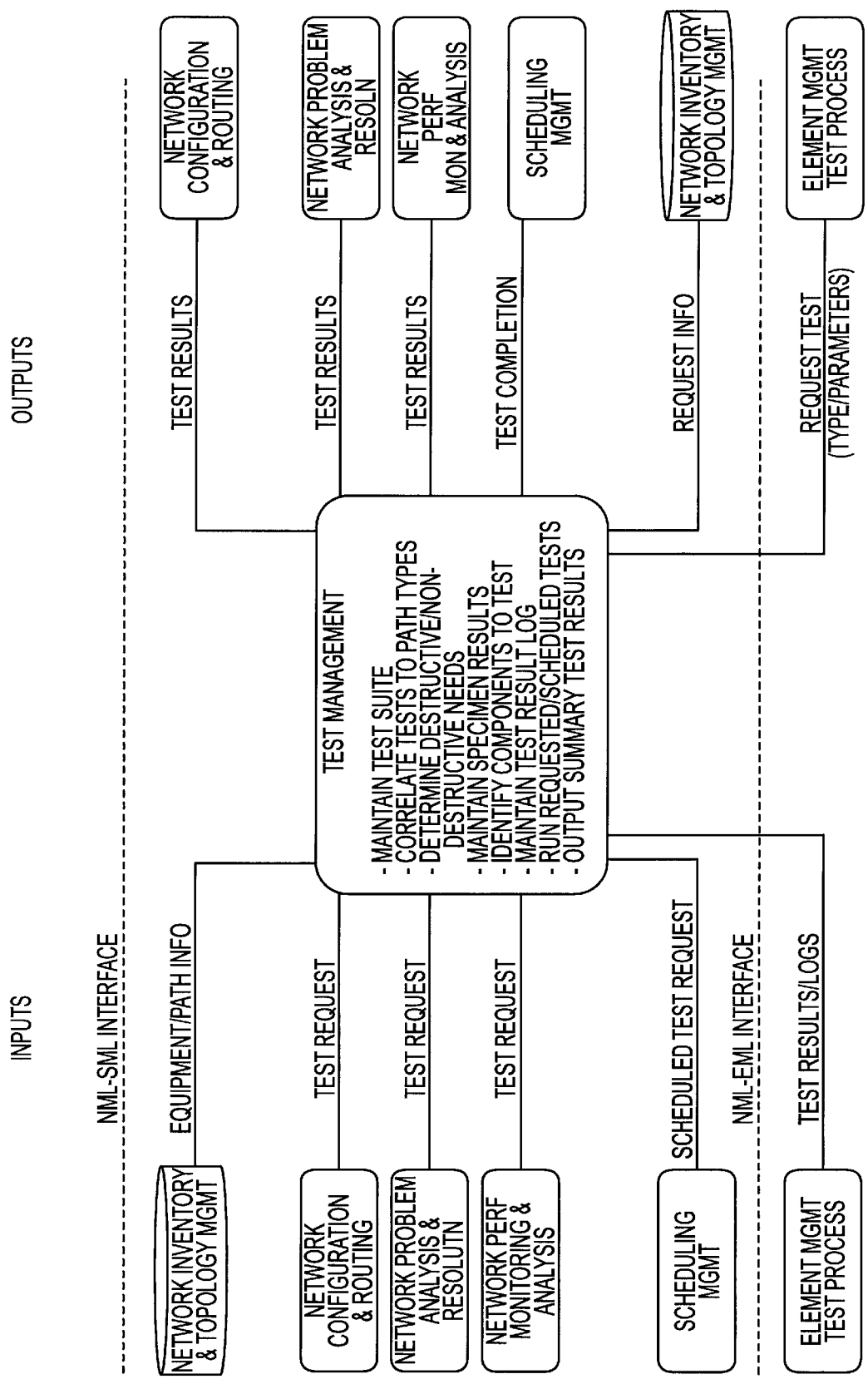
FIG. 48 illustrates the Network Test Management sub-process of FIG. 42.

FIG. 48 illustrates the Network Test Management sub-process. This sub-process is responsible for verifying the operational usability of individual or connected network components, which may be supporting a service, and determining causes of faults. It manages all aspects of the testing process, determining the appropriate tests which will be run, depending on path and equipment characteristics, controlling the tests and collating and comparing the results against predetermined limits or norms. It provides traceability and auditability against all actions.

Inputs:

Receives test request commands from Network Configuration and Routing for pre 'in-service' components and Network Problem Resolution for 'in-service' components.

Receives test request commands from Network Performance Monitoring & Analysis for performance problems, Network Problem Resolution for network failures, and from Scheduling Management for routine testing.

Receives network and element configuration details.

Receives test results from Element Management Systems.

Receives circuit ID information from test requester.

Functions:

Maintains suite of suitable test suites and expected test results.

Maintains a data base of test resources.

Identifies explicit components to be tested.

Manages the application of different tests to differing equipment and paths.

Identifies if test will be destructive (to existing traffic) or not and gives suitable warning.

Runs Scheduled routine tests as requested.

Compares test results with expected results and assigns pass/fail/indeterminate.

Maintains log of test and result.

Outputs:

Requests configuration details from appropriate network databases.

Requests Element Management Systems run tests.

Reports 'completion' to Scheduling Management and 'fails' to Network Problem Resolution.

Outputs results to Network Configuration and Routing for pre 'in-service' components Outputs results to Network Problem Analysis & Resolution or to Network Performance & Monitoring for 'in-service' components.

Network Configuration & Routing Sub-process

Figure 49:
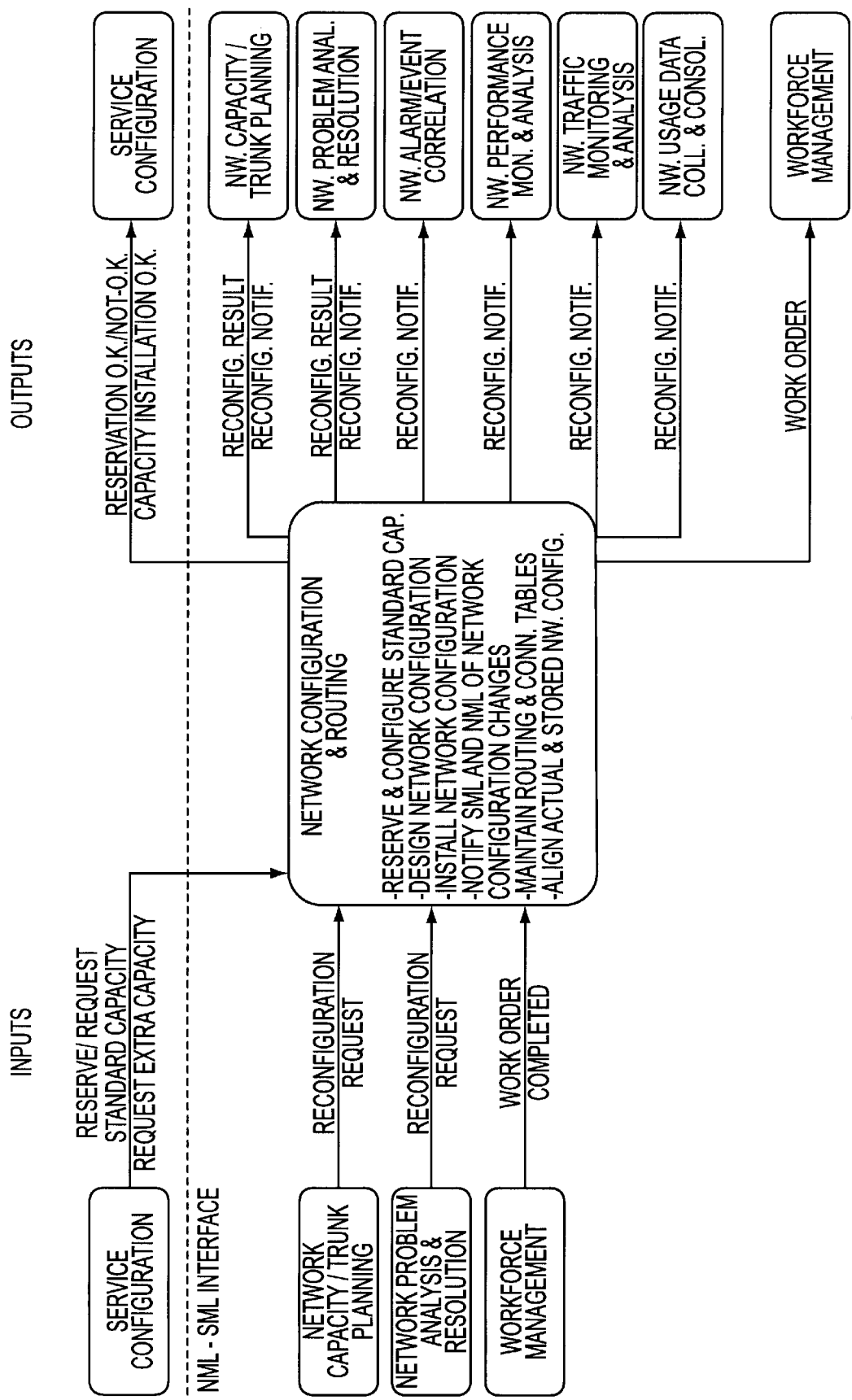
FIG. 49 illustrates the Network Configuration and Routing subprocess of FIG. 42.

FIG. 49 illustrates the Network Configuration and Routing subprocess. This sub-process installs the initial logical configuration of the network after network construction. Furthermore, this process designs and installs network re-configurations in the operational network. In the design process, business rules for the utilization of the network are applied. In the design, the reconfiguration requests from different sources (high level processes an sub-processes) are co-ordinated. This sub-process is also responsible for the alignment of the configuration as stored in the network management and administrative systems with the real network configuration.

Inputs:

Initial configuration design of a newly constructed network from the Network Capacity/Trunk Planning process.

Requests for reservation and configuration of standard network capacity from the Service Configuration process.

Reconfiguration requests:

from the Network Capacity/Trunk Planning sub-process, when network integrity might be compromised by third party activity.

from the Service Configuration process when a service request cannot be implemented from the available network inventory. In this case, the Network Configuration & Routing sub-process will investigate if capacity can be obtained by reconfiguration.

from the Problem Analysis & Resolution sub-process when a structural network problem can be resolved by network reconfiguration.

from the Logistics Management sub-process when network construction requires reconfiguration of the network, because the operational network is jeopardized by the construction activities.

from the Network Capacity/Trunk Planning sub-process when reconfiguration is required to link the new network to the existing network.

Functionality:

Reserves and configures standard network capacity.

Responsible for network re-configuration.

Installs initial network configuration and subsequent network re-configurations. Issues work orders when physical actions are required for network reconfiguration.

Keeps actual network configuration synchronized with network configuration information stored in network management and administrative systems.

Maintains routing and connectivity tables.

Applies business rules for network utilization.

Co-ordinates re-configuration requests.

Outputs:

Notification to the Service Configuration process about installed standard capacity.

Notification to other processes about pending re-configurations:

to the initial requester of the reconfiguration.

to affected processes; such as, the Network Performance Monitoring & Analysis, Network Traffic Monitoring & Analysis, Network Alarm & Event Correlation, Network Usage Data Collection & Consolidation, and Network Capacity/Trunk Planning sub-processes.

Work order information to the Workforce Management process.

Figure 50:
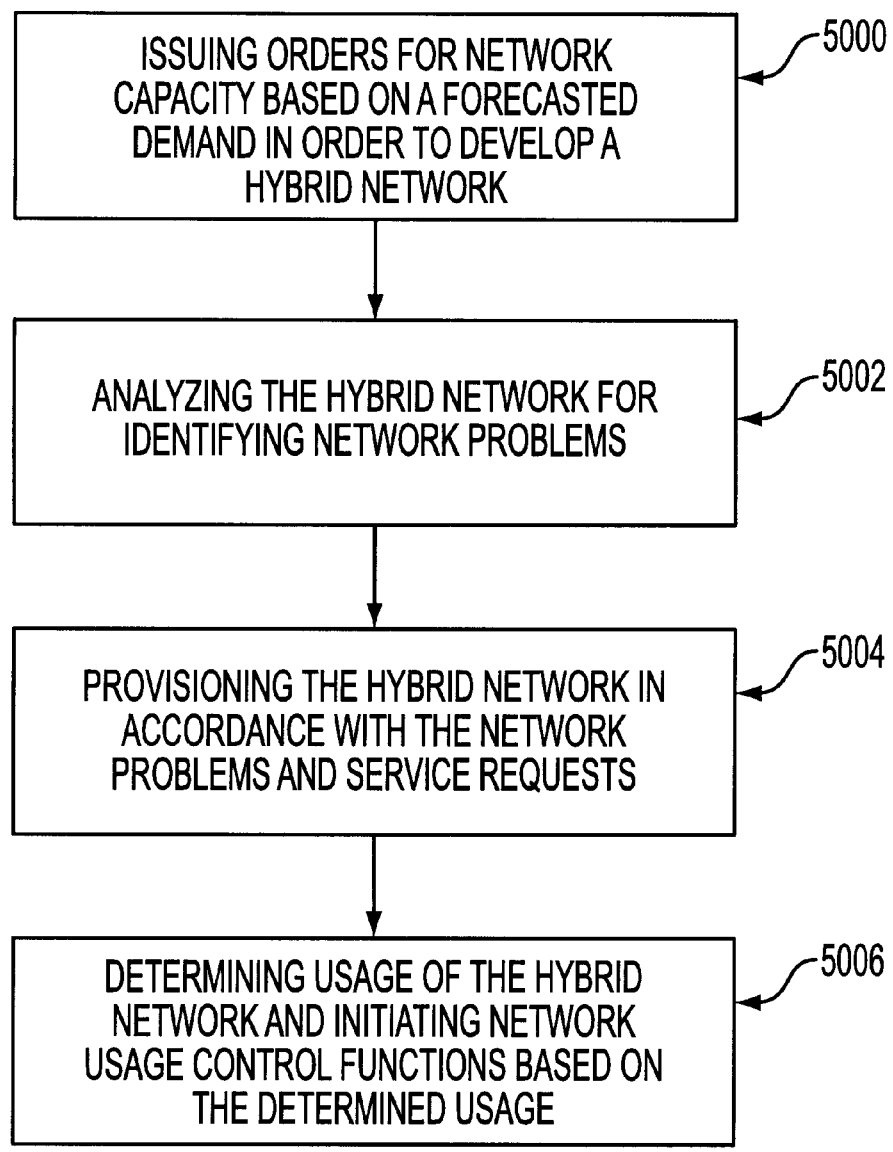
FIG. 50 is a flowchart illustrating a method of implementing a hybrid network in accordance with one embodiment of the present invention.
Figure 53:
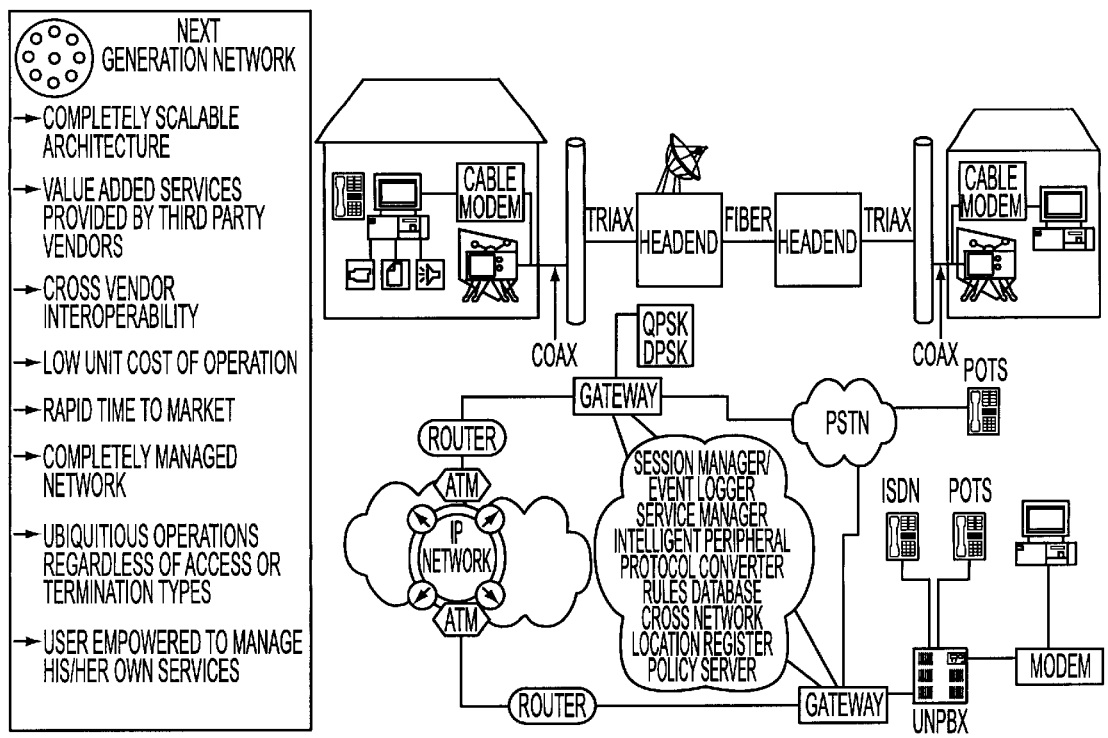
FIG. 53 depicts another exemplary configuration of the NGN Prototype in accordance with a preferred embodiment of the present invention.
Figure 54:
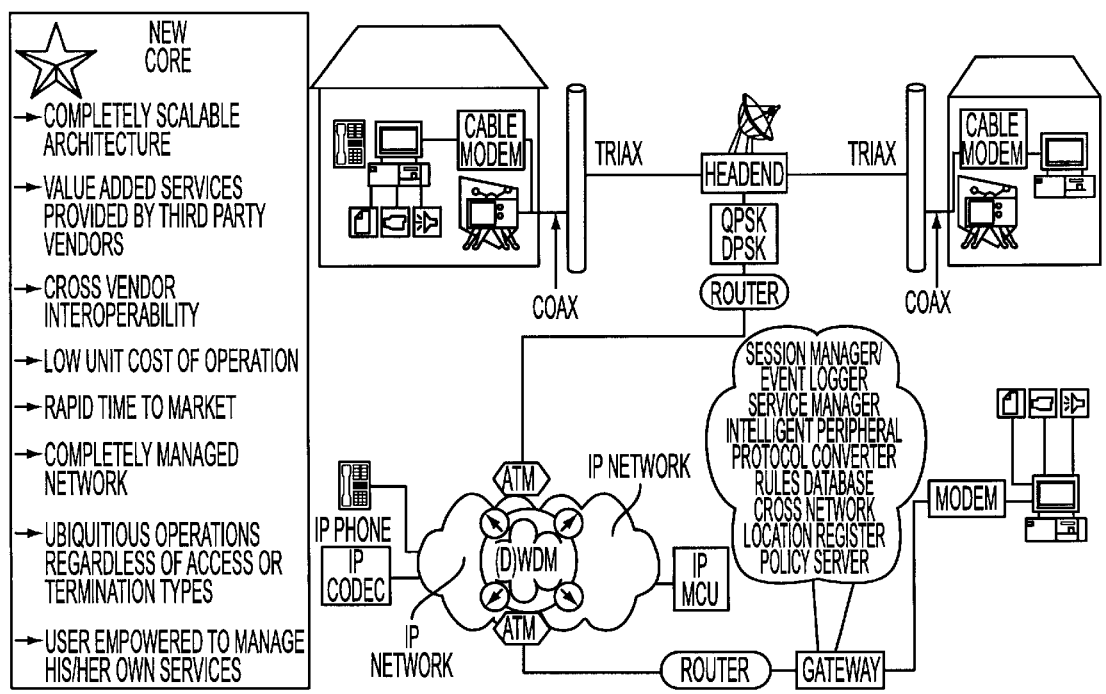
FIG. 54 shows another exemplary configuration of the NGN Prototype in accordance with a preferred embodiment of the present invention.
Figure 55:
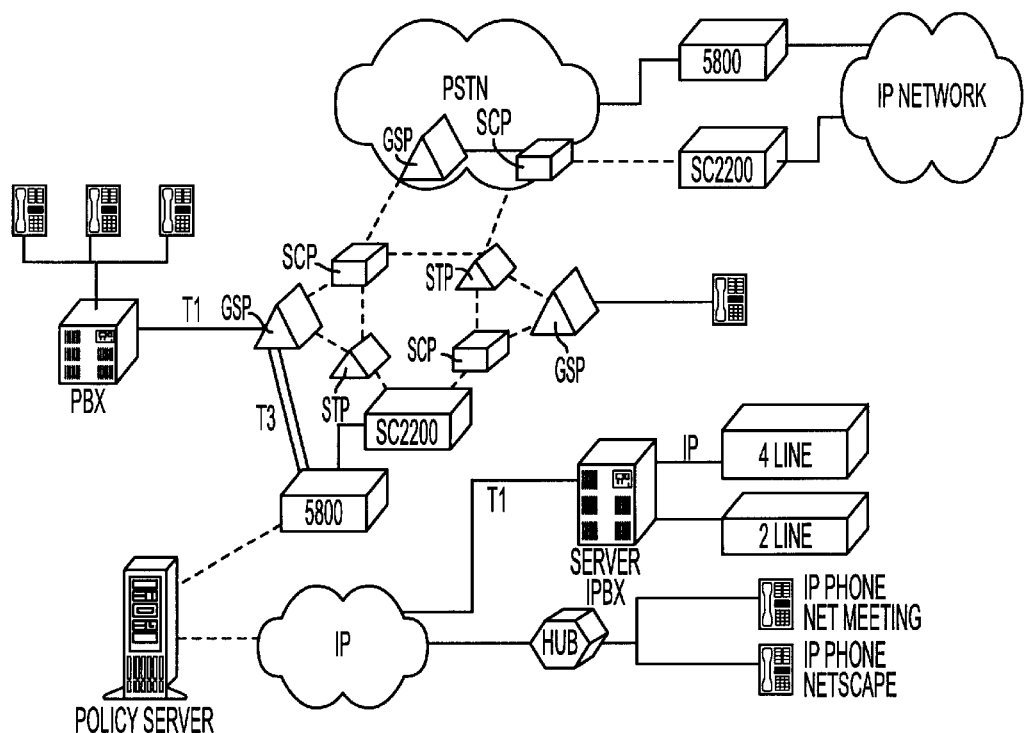
FIG. 55 depicts another exemplary configuration of the NGN Prototype in accordance with a preferred embodiment of the present invention.
Figure 56:
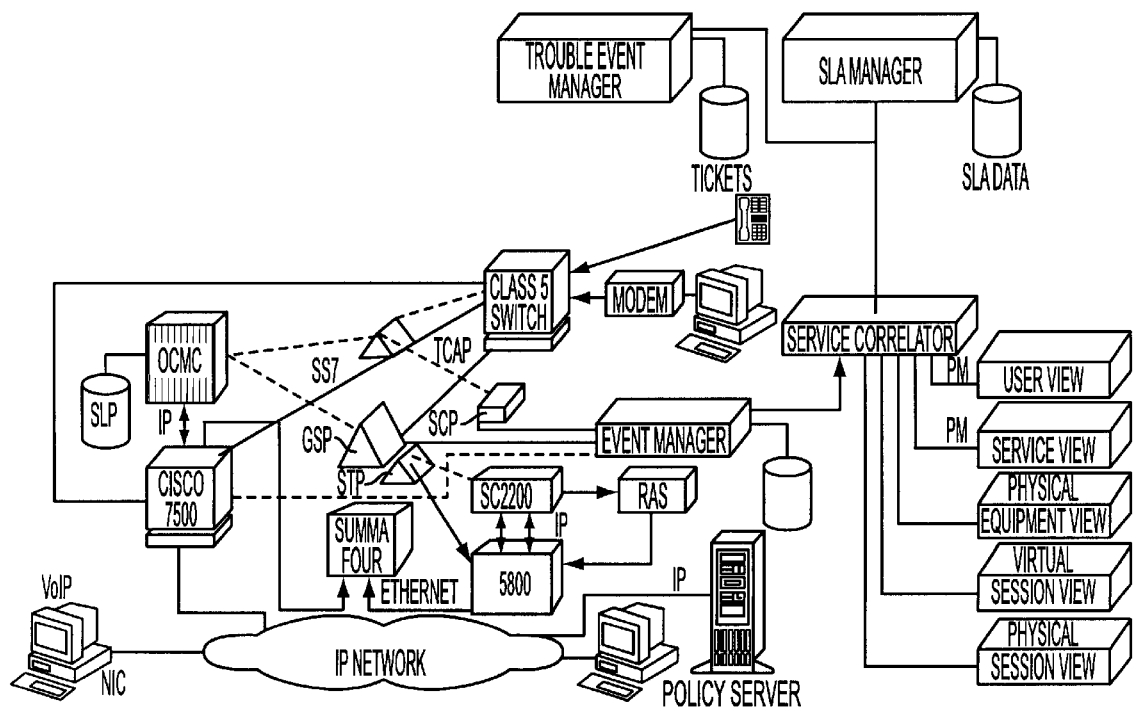
FIG. 56 shows another exemplary configuration of the NGN Prototype in accordance with a preferred embodiment of the present invention.
Figure 57:
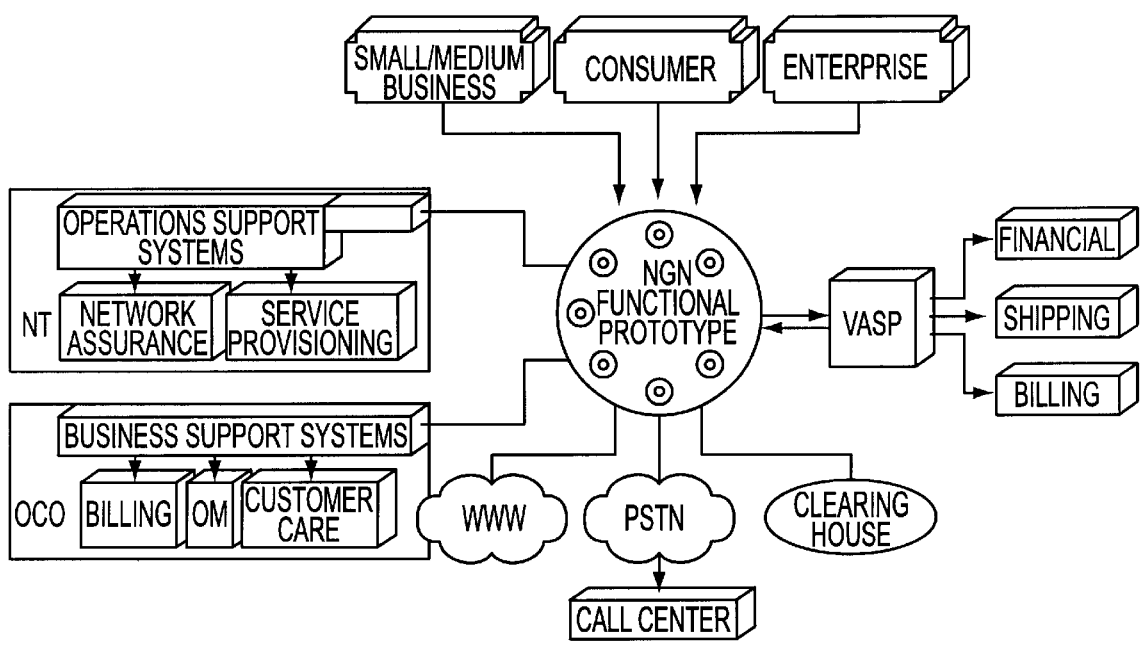
FIG. 57 illustrates another exemplary configuration of the NGN Prototype in accordance with a preferred embodiment of the present invention.

In summary, a hybrid network in accordance with the discussion above may be implemented in the manner shown in FIG. 50. Orders for network capacity are issued in operation 5000 based on a forecasted demand in order to develop a hybrid network. Note FIG. 26. In operation 5002, the hybrid network is analyzed to identify network problems. Note FIG. 32. Then, in operation 5004, the hybrid network is provisioned, as set forth in FIG. 28, in accordance with the network problems and service requests. Usage of the hybrid network is determined and network usage control functions are initiated based on the determined usage in operation 5006. Note FIG. 34.

In one embodiment of the present invention, provisioned portions of the hybrid network are assigned identifiers. Hardware of the hybrid network may be managed by performing duties selected from the group of duties consisting of installing the hardware of the hybrid network, performing work on the hardware of the hybrid network, and repairing the hardware of the hybrid network. Further, historic data of the network problems may be maintained, such as in a log.

A notification of the usage of the hybrid network may be provided if the usage is above a predetermined amount.

Optionally, sub-processes are used. Such sub-processes include network capacity/trunk planning, software and data building management, scheduling management, logistics management, workforce management, security management, problem analysis and resolution, network performance monitoring and analysis, network traffic monitoring and analysis, network configuration and routing, network test management, network alarm and event correlation, and network usage data collection and consolidation.

Network Prototype

Overview of the Prototype Network

A prototype of the NGN Network can be created as a selling tool for services of the network. While the prototype network may include only a portion of the features of the network described above, the prototype should be a feature rich service delivery platform that can launch applications which are usable in communications and non-communications industry hence stressing the cross industry applicability of this solution. For non-communications industry clients, this platform shows them how to effectively use communication services to their advantage. For communications industry service providers, the simulator shows what technology capabilities are needed in the network, what communications business capabilities this can enable, and what new services communications companies may want to provide to their clients.

Objectives of the Prototype Network

The objective of the prototype is two-fold:

Build selling capabilities for Network Transformation (and OCO) market offerings.

This is done through demonstration scenarios that can be presented to communications industry clients as well as other industries at various locations throughout the world. The prototype is a tool to show businesses how they can exploit the new network, and to show communications providers why they need to offer these new networking and systems services, and how they can provide them. The assets developed may include business scenarios, white papers, technology assessments, and value propositions for communications clients as well as other industries' clients.

Build delivering capabilities for Network Transformation (and OCO) market offerings.

This is done by actually building prototype versions of (1) the next-generation broadband intelligent network infrastructure connecting various sites, such as Palo Alto with Northbrook or Chicago (2) integrating new NMS, OSS, and other communications software systems, and (3) integrating eCommerce applications and services that fully exploit and demonstrate the benefits of this new communications infrastructure.

The assets developed for the prototype may include methodology, solution construction kits, workplans, budgets, and a number of skilled resources ready for jump-starting client engagements.

Communications industry clients' business needs may be addressed by showing:

What are the necessary features of the new broadband, intelligent IP-based network in order to efficiently deliver new services that generate revenues.

What are the new network management and operations support systems needed to efficiently implement these services.

What set of new value-added services that communications clients could profitably offer to their business and consumer customer base in order to generate additional revenues and reduce costs. These services primarily revolve around eCommerce offerings being developed at the CST. The NT market offering team can choose to integrate with one or more of these eCommerce services in order to showcase NGN capabilities. The current recommended integration is with eCRM offering since it has both business-to-business and business-to-consumer aspects, extensive call center and CRM capabilities, and also very relevant to OCO market offering.

eCRM—Demonstrate the broadband consumer lifestyle with personal home pages, portals, value intentions network (MySite!) interacting with back-end business Customer Relationship Management systems (CRM, call center). Value Chain Integration—Demonstrate how the cross-enterprise interactions might be changed with wide spread broadband availability e.g. purchasing is not just catalogs but also multimedia information and consultative sessions; cross-enterprise design groups; dynamic configuration, deployment, monitoring, management, and analysis of entire value chain.

Enterprise Transformation—Business data analysis and simulation to every desktop. Network-aware enterprise applications. Voice-enabled anywhere anytime access to business information systems. Next-generation ERP (XRP).

Workgroup Transformation—Collaboration, virtual teaming environment, telecommuting.

Worker Transformation & Human Performance—Multimedia business simulation and training. Remote workshop capabilities. Remote experts.

and innovative projects such as:

Active Knowledge Management—Personal information management agents that delivers customized news, tasks, meetings, competitor and client information, etc. to the business traveler anytime, anywhere.

Pocket BargainFinder—Consumer shopping agents that actively solicits product offers and compare prices anytime, anywhere.

Community Page—Integrated community services such as governmental, healthcare, educational, etc. provided over a broadband community network. (Potentially, this could integrate with the Next-Generation Cities project by CommerceNet and city of Palo Alto or San Francisco.)

In building the prototype, many issues are solved, including:

how to efficiently build the new network how to efficiently build the management and support systems for the new network how to efficiently build value-added services that fully exploit the new network The prototype should be able to demonstrate the 3 aforementioned components to communications and other industry clients: new network, new network operations/management systems, and new network-based services.

The architecture to enable these opportunities are based on:

Extensions to the Network Transformation Architecture roadmap and detailed design documents/solution construction kits that are deliverables of the prototype.

Detailed design documents of a number of eCommerce architecture initiatives, such as Enterprise Management Internet Architecture (EMIA), Microsoft eCommerce Chemicals/Utilities Enterprise, financial services shared eCommerce infrastructure, etc.

Prototype Description

The prototype environment should consist of 3 layers that show how a communication service provider will operate in the future:

1. New IP-based convergent network

A prototype broadband network can be built with voice, data, and video over IP capabilities. An exemplary prototype network would be deployed initially at the CST in Palo Alto, for example, with wide-area links to Northbrook or Chicago for example. This network can be used to demonstrate service providers' management and operation capabilities, and business-to-business collaboration and eCommerce scenarios.

Additionally, a consumer broadband access environment may be deployed in Palo Alto using cable and DSL modems. This would allow demonstrations of business-to-consumer eCommerce scenarios.

The following products may be used:

Cisco 7500 wide-area routers.

Cisco AS5300 with VoIP cards.

Cisco Selsius/Summa Four integrated router and PBX.

Cisco NetSpeed line of DSL access equipment

Cisco cable modems.

WebTV, @Home services

New Network Management Systems and Operation Support Systems

Integration of best-of-breed network management systems and operation support systems is preferred in order to demonstrate how service providers will operate their networks and deliver value-added services to customers in the future.

The following products may be used:

Cisco IOS software

Cisco/HP network management products

Cisco Directory-Enabled Network (DEN) SDK

HP OpenCall (OpenCall MultiService Controller), OpenView

HP/UX servers and workstations

HP Intel-based servers and workstations

BellCore Operations Support Systems

Microsoft Directory Server, Certificate Server

New network-based eCommerce services and applications

An eCommerce scenario may be built to demonstrate the types of services that may be enabled by the new network and new operation systems. The prototype can integrate and extend an eCRM II prototype with a MySite! consumer portal prototype. A customer support scenario may be built which shows multimedia and shared browsing interactions between a consumer with broadband access at home and a service provider's call center agent.

The following products may be used:

Cisco PIX Firewall, LocalDirector

HP VirtualVault

HP Intel-based servers and workstations

Microsoft Site Server, Directory Server

Other eCommerce services and applications

By building the prototype, a demonstration is created of a totally convergent IP-based network that handles all types of traffic which can dramatically reduce maintenance costs and toll charges versus what organizations are faced with today. The prototype network also demonstrates how organizations can provide better security for their network, and better utilize their existing bandwidth to dynamically allocate resources to more critical functions. The convergent network also efficiently provide an integrated multimedia active environment that removes some of the obstacles to eCommerce today such as slow download times, lack of user friendliness, inability to find and examine merchandise (beyond a line of text in a catalog), undifferentiated quality of service and access (flat pricing, busy internet provider dial up signals), etc.

Prototype Scope

The objective of the Network Prototype is to provide a platform that demonstrates the capability to transform from a circuit-switched environment to a packet-switched infrastructure.

A broadband, intelligent, convergent network may be the fundamental driver and enabler to the changes taking place in all industries. The proposed model can be used as a showcase to build a convergent broadband services solution and a business model that (1) has high appeal to carrier operator customers, (2) readily scales, and (3) is easily replicable as well as exportable to North American and worldwide markets.

The resulting outcome of this simulator is to depict many fully integrated demonstration scenarios encompassing all layers of the E-economy.

Hardware and Software

The following products may be used to create the prototype: Cisco 7500 routers, Cisco AS5300 with VoIP cards, Cisco Selsius/Summa Four integrated router and PBX, Cisco SC2200, etc.

The following products may be used to create the prototype: Cisco IOS software, Cisco Directory-Enabled Network, HP OpenCall, OpenCall MultiService Controller, OpenView, HP/UX servers and workstations, BellCore Operations Support Systems, Microsoft Directory Server, etc.

TDM multiplexers have served the industry well in the past (in a 9.6 to 64 kbit/s world) but are not well suited to today's needs (in a LAN and ATM world). TDM multiplexers are now at the end of their life cycle.

Routers do a good job of routing multiple protocols such as IP and IPX. While routers can provide some delay controls through various queuing schemes, minimum delay variation cannot be controlled in a frame-based architecture. In addition, bandwidth reservation in a router network is soft in the sense that no firm guarantees over an extended period of time can be provided in a connectionless environment, this being exacerbated by the lack of COS-sensitive routing. In addition, routers lack interface and adaptation flexibility, and COS support to be enterprise network consolidation vehicles.

Not surprisingly, either of the two ATM-based architectures are the best, by design, in meeting COS requirements. Broadband ATM switches as enterprise network consolidation vehicles are a niche solution applicable to a few customers who can afford them and who have a major thrust towards desktop ATM.

The ATM Enterprise Network Switch is designed specifically to meet enterprise WAN needs. It provides multimedia consolidation of legacy and LAN data, circuit-based and ATM-based traffic, and integrates switching and routing to provide low-latency, high-performance networking. It provides extensive interface support to consolidate in-building traffic over multiple carrier services and is based on open standards.

NGN Network Simulator

Network Fabric Overview

A Network Simulator includes a Network Fabric component. It is recommended that a two stage approach be taken to the design and implementation of the Network Fabric: firstly, design and implement the Network Fabric based on a "Simple Connectivity" solution; and secondly, upgrade the network to a "Carrier Grade Edge Network" solution.

The "Simple Connectivity" solution may be comprised of CISCO high-end customer routers, interconnected across a core ATM network sourced from Cable & Wireless. The "Carrier Grade Edge Network" adds an Edge Network of CISCO IP+ATM WAN switches around the Cable & Wireless ATM core, replicating typical Carrier Point of Presence (POP) functionality.

The two stage approach can been chosen for the following reasons:

Enabling A Full Capability Demonstration

The "Simple Connectivity" solution allows the demonstration of basic capability. In order to demonstrate capabilities to potential Carrier clients, a replication to the limits of available resources of the unique features which are likely to exist in a carrier/new core network should be performed. These are more completely enabled by the "Carrier Grade Edge Network" solution.

Minimizing Risk

Technical support for "Carrier Grade" equipment that forms key components of the "Carrier Grade Edge Network" solution is limited from suppliers. The detailed design of such a network mandates a strong participation of scarce "Carrier Grade" equipment specialists at CISCO. The complexity of the "Carrier Grade" option detailed design is substantially more complex and hence a higher risk than a "Simple Connectivity" option.

Detailed design and implementation in a two stage approach allows appropriate resources to be mobilized on both sides within a realistic timeframe.

Components of an Exemplary NGN Prototype

An exemplary NGN prototype showcases multiple technologies, each of which would typically be deployed by different carrier organizations such as cable, ISP and LEC. This approach would demonstrate the ability to implement the various network architectures that the network transformation market offering deliverables define.

The prototype can simulate a broadband intelligent carrier grade network with cable data as well as xDSL access loop technologies. The XDSL access infrastructure would connect the Palo Alto location to the NGN backbone as well as potentially an NGN alliance partner facility. The cable data modem infrastructure may link the Cisco technology lab to the NGN backbone and demonstrate the various network control applications that rely on broadband access technologies.

The components listed below constitute the primary partner/vendor provided systems and applications that can be integrated to form the basis of the NGN carrier infrastructure.

Aspect: WebAgent, CallServer
Cisco 5x00, 7xxx Routers, Firewall, LocalDirector
Com21 Cable modems, QAM/QPSK ATM Switches.
Netspeed: DSLAM, DSL modems
BigSky: Unified messaging server
Microsoft: NetMeeting, SiteServer, OpenSite, FreeMarkets
HP: Smart Internet Usage, Web QoS, OpenCall SS7, Openview
VeriSign
Ariba Netscape Commerce Server
Cybercash
CheckFree, MSFDC
Broadvision
SAP
PeopleSoft
J. D. Edwards: One World
Developed or Created Components The following components may be developed in order to augment the standard off the shelf products (listed above) that can be integrated to provide the network intelligence of the broadband IP network.

NGN-SCE : Development and test environment for intelligent service control applications Intelligent call routing: Mixed media network path builder NGN Session manager: Dynamic bandwidth allocation NGN distributed Policy Server: Service activation, Provisioning and Security propagation NGN event logger: Intelligent OSS and BSS enabler Network Control Applications: Least cost routing based on smart switching between the circuit and IP infrastructure on a DYNAMIC per call basis.

FIGS. 51 through 57 illustrate exemplary configurations of the NGN Prototype.

Carrier and Value Added Service Provider Capabilities

Initiating with the change in role of the call center worker from support, to selling specialized services to collaborative design, the NGN prototype can enable capabilities such as e-payment integrated multimedia interaction, e-selling (consultative selling) and e-support for both their traditional customers and a new breed of network service user such as trade associations jointly forming industry "extranets" to deliver cross enterprise communications.

The end-user can be provided with a means for self service, by web applications that allow a service feature to be selected, ordered (priced) and then activated without a traditional customer service operator and service technician intervention.

NGN OSS: Activate, is a proposed command and control application that provides the back-end functionality necessary to implement and effect the requests made from the end-user initiated Web-Control applications described above. Furthermore, this application may enable a carrier to provision and activate the new services which span the circuit and packet segments of the NGN in an intuitive and highly productive fashion aligned to the optimized next generation carrier business processes.

Additionally, the prototype may showcase carrier support functionality such as the ability to take an order on or off-line and then within minutes verify credit, validate the service order configuration, provision, test and activate the service with a minimum number of user operators getting involved in the process.

Capabilities
  To Carrier

The intelligent OSS provisioning capability may significantly improve efficiency and productivity of a carrier since the traditional time frame from order entry to service activation is 21 to 60 days depending on the complexity of the service. This interval may be reduced by between 21 and 60 days using these new NGN system capabilities.

The OSS—restore, real-time restoration and self healing network capability may provide the carrier with a unique advantage since unlike traditional processes that are reactive in nature, the new capability determines, through predictive fault and performance analysis, the degradation in service caused by equipment or physical transport failure; having done that, the OSS—restore application, reconfigures the network to ensure that the pending failure does not impact the end-user services that depend on the faulty resources. More detail about the OSS—restore network capability is provided below.

The e-payment capabilities provide the carrier with a means to collect and process payment for services rendered to end-users. The differentiation this application provides is primarily the 24 hour, 7 day a week accounting department. Additionally, this capability provides the carrier with a reduced operational cost infrastructure which is a competitive advantage.

Perceived by end-users

The OSS—restore capability provides the end-user with uninterrupted service to the point that service availability is taken for granted; (this is a good thing).

The CNM capability can provide the end-user with an unprecedented view of the network that delivers the services by means of alarms, performance and trouble information that impacts the services that the subscriber uses. Such capabilities improve consumer confidence in the carrier and present the carrier as a proactive customer service oriented organization.

The e-payment and e-support capabilities gives the end-user a convenient method for customer service and payment that is compatible with today's 24 hour lifestyle. This empowers the end-user with control of their services and stimulates growth in usage of network resources.

OSS—Restore: Predictive Fault Management

Figure 58:
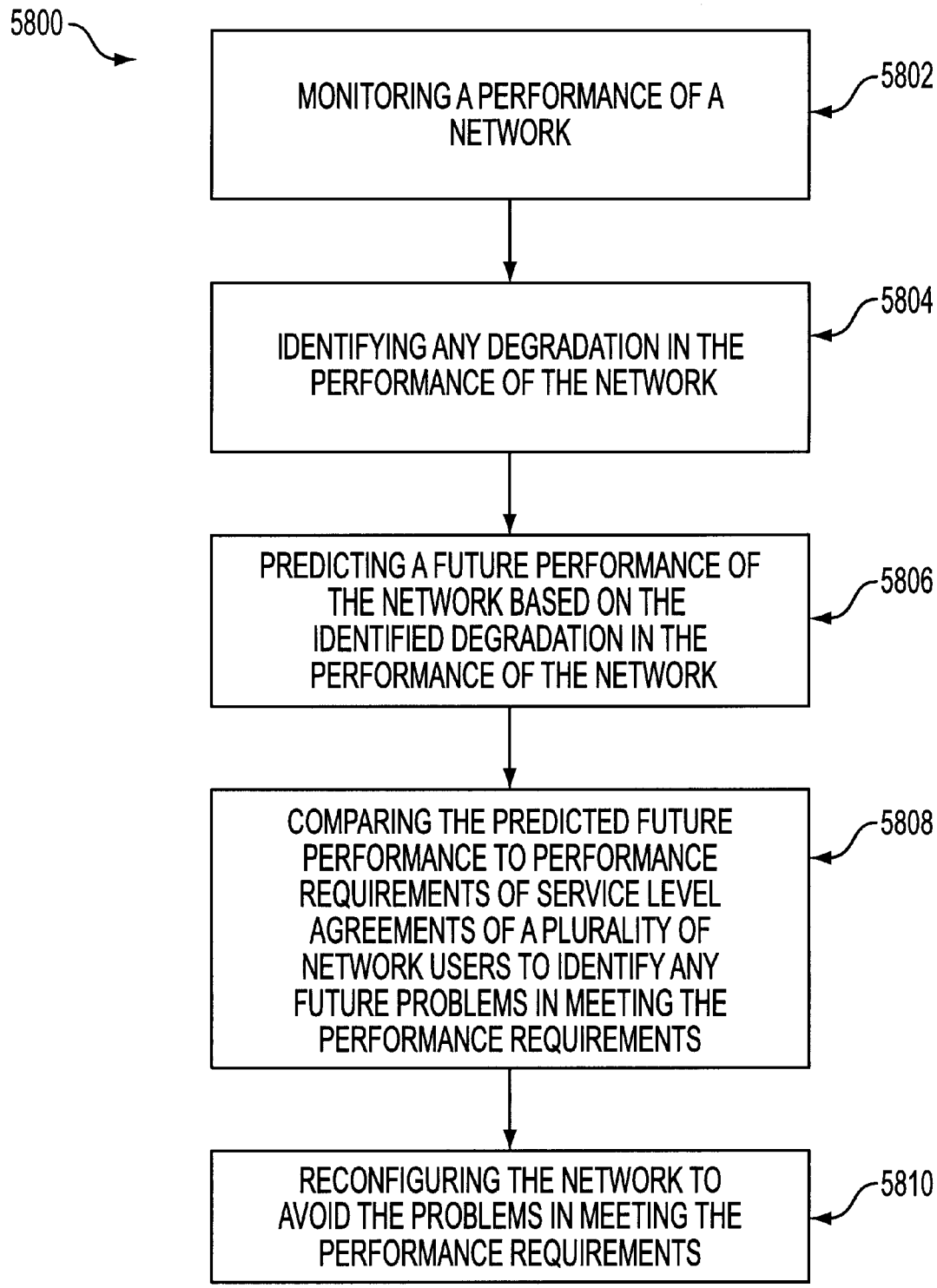
FIG. 58 is a flowchart illustrating a method for predictive fault management over a network in accordance with a preferred embodiment of the present invention.

FIG. 58 illustrates a method 5800 for predictive fault management over a network. A performance of a network is monitored in operation 5802. In operation 5804, any degradation in the performance of the network is identified. A future performance of the network is predicted in operation 5806 based on the identified degradation in the performance of the network. In operation 5808, the predicted future performance is compared to performance requirements of service level agreements of a plurality of network users to identify any future problems in meeting the performance requirements. The network is reconfigured in operation 5810 to avoid the problems in meeting the performance requirements. An exemplary network management system for a network that monitors the network and reconfigures it to avoid future problems is set forth below.

The degradation in the performance of the network may be caused by, for example, equipment failure and/or physical transport failure as well as network faults. Preferably, operation 5810 (reconfiguring the network) is performed in real-time. More preferably, operations 5802 through 5810 are continuously repeated in real-time.

A network management system may be used to monitor and reconfigure the network to avoid anticipated problems in any one or more of fault, test and performance management.

In providing and operating a communications network, it is clearly important that monitoring and control functionality is provided to support various management aspects of the network, including performance and configuration as well as fault management. In more recent times, not only does the network itself have to be managed, but the services provided by means of the network also have to be managed.

Various network management systems are known and published. For instance, network management is discussed in "Communications Networks: A First Course" by Jean Walrand, published in 1991 by Richard D Irwin Inc and Aksen Associates Inc, US. Another relevant publication is "Telecommunications Network Management into the 21st Century", edited by Salah Aidarous and Thomas Plevyak and copublished in 1994 by the Institution of Electrical Engineers (IEE) and the Institute of Electrical and Electronics Engineers, Inc, US.

In general, a network management system has to have interfaces with the network it is managing so that it can monitor or test various aspects such as the current configuration and traffic conditions, and whether it is performing satisfactorily, i.e. meeting any performance criteria applicable. Preferably, the system should be able to detect such indicators as performance deterioration so that faults can be predicted and acted on in advance. Another purpose of the interfaces is for output from the network management system to the network so as to correct or control aspects of the network.

Historically, the emphasis has inevitably been on monitoring and controlling the hardware of the network itself, the switches and multiplexors for instance which are carrying the traffic. The services provided by the networks were relatively simple. However, as communications has developed in recent times, with the huge proliferation in services as well as network hardware, network management systems have had to encompass functionality for installing, monitoring and controlling service functionality together with supporting technologies such as billing and charging.

In some cases, service management systems have been treated as separate entities from the network management systems and, in other cases, as different functions of the same equipment development.

It is important that the approach taken is consistent and flexible, so that the network operator or service provider can react quickly to problems and demands involving hardware or software of the networks, of the services, or arising at the customer interfaces, as well as to competitor activities, and it is clearly preferable if any strategy used is able to accommodate new networks and new services.

A management system for a network needs to have an interface to the network itself, in order to pick up information and output control messages for instance, and then to have a view of the network according to which it can process the information. Complex communications networks, the services they provide and the associated management systems, have been described for management purposes in terms of having different layers or domains. Such layers or domains have started with for instance the network equipment itself, the network layer, which is then monitored and controlled by means of a network management layer (NML). For services provided by the network, there may be a separate service management layer (SML).

A network management system of this type, structured according to functionality and viewed in terms of layers, has been published by the present applicant as an architecture known as the "Co-operative Network Architecture for Management" (CNA-M). Documentation in respect of CNA-M can be obtained from the CNA Secretariat, British Telecommunications pic, St. Vincent House, Ipswich, Suffolk IP1 1UX (UK). It defines a structural architecture within which business processes, and therefore management systems required to provide services on a network, are contained. Two principal layers of this architecture are the Service Management Layer (SML) and the Network Management Layer (NML). The SML provides co-ordination of all activities associated with the management of services provided on the relevant network. The NML provides processes by means of which the network itself can be planned and operated.

Clearly, activities relating to a particular layer in a network management system have an impact in other layers. For instance, a switch failure is directly relevant to the network layer but could have an impact on the services running on that switch, and therefore on the SML. It is thus very important in the management system that there can be close interaction between layers (or domains) of a network management system of this type and embodiments of the present invention are designed such that close and effective interaction is enabled between layers, or domains, of a service and network management system. According to a first aspect of the network management system of the present invention, there is provided a management system for a communications network, for use in monitoring and controlling the provision of services by means of the network, wherein the management system includes inputs for trigger signals containing information in respect of the network and/or a service provided thereby; data processing means for accessing and processing information in response to the trigger signals; and outputs for issuing control and/or report signals in respect of the network and/or services.

Preferably, the management system is provided with a data structure comprising sets of feature-describing data, each set identifying and describing a manageable aspect of the communications network, management rule profiles to be associated with selected sets of feature-describing data, each management rule profile containing management rules in respect of the feature described by the relevant set of feature-describing data, and association data sets for associating one or more management rule profiles with one or more selected sets of feature-describing data.

The data processing means is adapted to respond to a trigger signal by identifying a set of feature-describing data and accessing a management rule profile, identified by an association data set in respect of the set of feature-describing data, and, if indicated by the profile or by an association data set or otherwise by the data structure, accessing at least one further association data set and a management rule profile identified by the further association data set, such that the management system is enabled to respond appropriately to the trigger signal.

Conveniently, the association data sets may be arranged in a hierarchical structure. This can employ a "supported by" relationship between association data sets which reflects a layered model of the network.

The trigger signals might arise for instance because there is a fault in a hardware element of the network. In that case the management system needs to be able to analyze the consequences of the fault and to determine whether management action needs to be taken. Management action might simply be a report to a customer, or might involve traffic rerouting for instance.

A trigger signal may instead arise because performance of the network or services provided thereby has degraded. In this case, management action by the system may be designed to allow corrective or avoiding action to be taken.

Alternatively, a trigger signal might arise because a customer or service provider requires a test to be done in relation to the network or its services. The management system will then have to be able to decide the nature of the test or tests to be done, and to report back the results.

Embodiments of the present invention allow problems and faults arising in relation to a network, and the manner in which their effects propagate, to be detected and controlled in spite of any inherent interface which may be present in the architecture or functionality of the management system. Since embodiments may also enable testing of the network and services, a full range of fault, test and performance management can be provided.

The sets of feature-describing data may identify network capabilities, such as capacity, or may identify services or service-supporting features. The principle of management systems according to embodiments of the present invention is that the data structure effectively decouples services from the networks on which they are provided. This can be particularly important for instance where one or more service providers are to provide services across one or more independent network operators' networks.

Management systems according to embodiments of the present invention can be designed for use with the sort of telecommunications networks used in the past, with software built into the switches, or for instance with the intelligent network architectures now being developed, or the like, where the network intelligence is provided away from the switches and is of much increased sophistication, in line with the proliferation of services being made available.

(Although reference may be made in this specification to network management systems, it will generally be the case, as a matter of practicality, that these systems will also provide service management functionality.)

The management rule profiles referred to above, in the description of a first aspect of the present invention, may hold data in relation to network constraints, such as capacity, or may hold data in relation to service constraints, such as conditions set out in service level agreements between a customer and a service provider and/or network operator. It is this, at least in part, which gives embodiments of the present invention the capability of managing across inherent interfaces of a management system, for instance between the service management and network management domains.

Service level agreements are usually between a network or service provider and a user or customer in respect of the network, and set out the service or services the user or customer has selected, together with the conditions the service provider has agreed to meet.

An embodiment of the first aspect of the network management system of the present invention may be structured according to a layered model of a managed network, which management system includes inputs for trigger signals in respect of the network and/or a service provided thereby; data processing means for accessing and processing information in response to said trigger signals; and outputs for issuing signals in respect of the network and/or said services. The data processing means comprises a data structure having a hierarchy of feature agreement data stores, each for use in retrieving data defining feature-specific requirements, at a layer of the network model, to support a set of operational-related conditions such as those of a service level agreement or the like.

The trigger signals might for instance be fault or performance reports indicating that a network element is malfunctioning. The management system might then respond by accessing the data structure at a level corresponding to a network management layer of the network model and use data accessible at that level to determine what network features might be affected and to what extent. The data could also indicate whether it is necessary to access the data structure at a second level. If no feature is affected, or features are only affected to a slight extent, then the management system may be able to trigger diagnosis and repair of the network without for instance having to generate a report to a customer.

Alternatively, a fault report might mean that one or more features provided by the network are seriously affected and consequently a service to a customer is affected and should be reported to the customer accordingly. The management system in this case will probably need to access the data structure at a series of levels in the hierarchy, to put in train not just diagnosis and repair to the network but also to issue consequential reports such as a fault report to the customer.

Achieving control of the management functions of the network is particularly difficult in terms of the interfaces between different levels of the network. Embodiments of the present invention can provide a framework for interfacing between the different levels, for example between the service and network management layers, and the feature agreement based data structure provides the relationship between the network and the services. Embodiments of the present invention allow fault detection and management not only in retrospect but also predictively, for instance capturing fault propagation into different layers. This latter aspect allows potential fault prevention as well as cure.

The emphasis above lies on fault management, and refers to a trigger signal being a fault report in respect of a network element. However, embodiments of the present invention could be us ed in managing other aspects of a network, such as test management or propagation of performance reports. If a customer requests information which necessitates a test of some aspect of a service, a feature or a network element, then the trigger signal might comprise a test request. In this the management system is likely to access a level of the data structure corresponding to a service management layer of the network model as a first step in determining what tests need to be applied and whether services, features and/or network elements need to be tested. Depending on the data accessed at that level of the data structure, the management system may need then to access a level corresponding to the network management layer of the network model. The signals issued by the management system in this scenario might be test signals, to generate tests of actual network elements, and subsequent test reports to convey results to the customer.

If a network condition occurs when a network component is malfunctioning such that its performance is degraded then this may cause a trigger signal to be generated which is compared with the feature and feature agreement data store appropriate to that level of the network or service management systems to determine whether the performance report should be propagated up to higher levels of management. This process can be applied iteratively at each successive level and may result in a performance report being sent either in real time or summarized in a periodic statistical report to the customer of the service.

According to a second aspect of the network management system of the present invention, there is provided a method of managing a communications network, by means of a network management system incorporating a hierarchical data structure, levels oft the hierarchy corresponding to layers of a network model, and the data structure containing or having access to data defining feature-specific functional requirements for the network relevant to the respective layers, which method includes receiving a trigger signal comprising information in respect of the network and/or a service provided thereby; responding to the trigger signal by accessing the data structure at a first level in the hierarchy; using data at the first level to process the information received; and responding to the outcome of said processing to access the data structure at a second level of the hierarchy, as indicated by said outcome.

In general terms, a network management system according to an embodiment of the present invention for use with a layered model of the network incorporates a hierarchical data structure which can apply sets of conditions relevant to different layers of a network model in response to a trigger so as to determine a network management outcome. Looking at a network model having a network management layer below a service management layer, if the management system receives a fault report for a network element as the trigger, it will generally first apply a set of conditions from a level in the data structure equivalent to the network management layer and depending on the outcome, subsequently apply sets of conditions from elsewhere in the data structure. The relevant sets of conditions in each case are determined by feature agreement data stores embedded in the data structure.

If the management system receives a test request from a customer as the trigger, it will generally first apply a set of conditions from a level in the data structure equivalent to the service management layer, and then effectively move in the other direction across the SML/NML interface to apply a set of conditions from a level equivalent to the network management layer.

Business Simulator

A Business Simulator can be a tool used to demonstrate the transformation from a company's current business architecture to the business architecture required to support the company's next generation and new core network environments. The Business Simulator is a component of the Network Transformation Market Offering, providing a showcase and test environment for companies to experience first-hand Network Transformation knowledge capital and assets.

The objective of the business simulator is to demonstrate the network transformation market offering capabilities and assets that assist carriers' change to be more successful. The business simulator depicts the transformation of a typical Core Network carrier's operating infrastructure to one that utilizes next generation network technology, re-defined organization structures and enhanced people processes to deliver high value business benefits such as new revenues and dramatic operational cost reductions.

Overview of the Next Generation Network (NGN) Business Simulator

The NGN Business Simulator provides a real-life view of the Telco of the Future. As such, the simulator provides a knowledge vehicle for companies/users to learn before doing, in a safe risk-free environment, instead of learning by doing, in a production environment. In addition to the know-how, the simulator provides the 'know-why', an essential knowledge capital for the companies/users to leap forward into the realm of the New World Networks.

However, the experience of learning is just one aspect of the NGN Business Simulator. It embodies components that will enable eClients and communications carriers to create Network Enabled Services for the new economy. It can be an integrated business (strategy, process, technology and people) approach for delivering the New World Network. This is because simulating technology alone, in a form of a physical network, can not provide incremental value to clients. To succinctly articulate the impact of eCommerce products and services, there has to be a holistic approach. Clients will want to know the downstream repercussions of making the transformation to NGN. What should be process of provisioning a new network service look like? What supporting systems will be required to assure quality of service? What kind of organizational infrastructure will be needed? These important questions, and many others, will be answered by the NGN Business Simulator and the many services that may be integrated into the Business Simulator.

Figure 59:
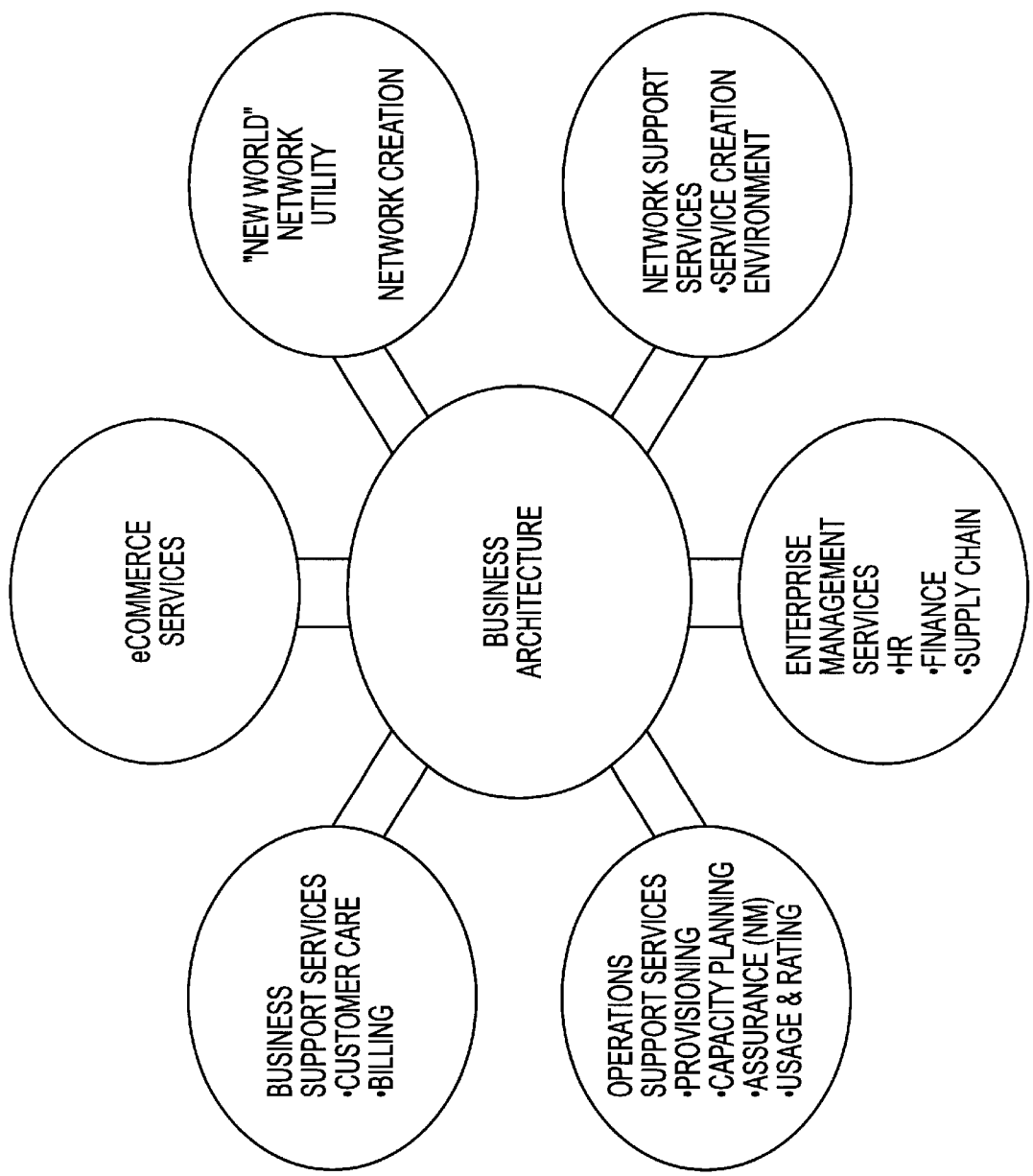
FIG. 59 is a diagram which illustrates some exemplary services that may be integrated into the NGN Business Simulator of the present invention.

See FIG. 59, which illustrates some exemplary services that may be integrated into the Business Simulator.

NGN Business Simulator Architecture

Figure 60:
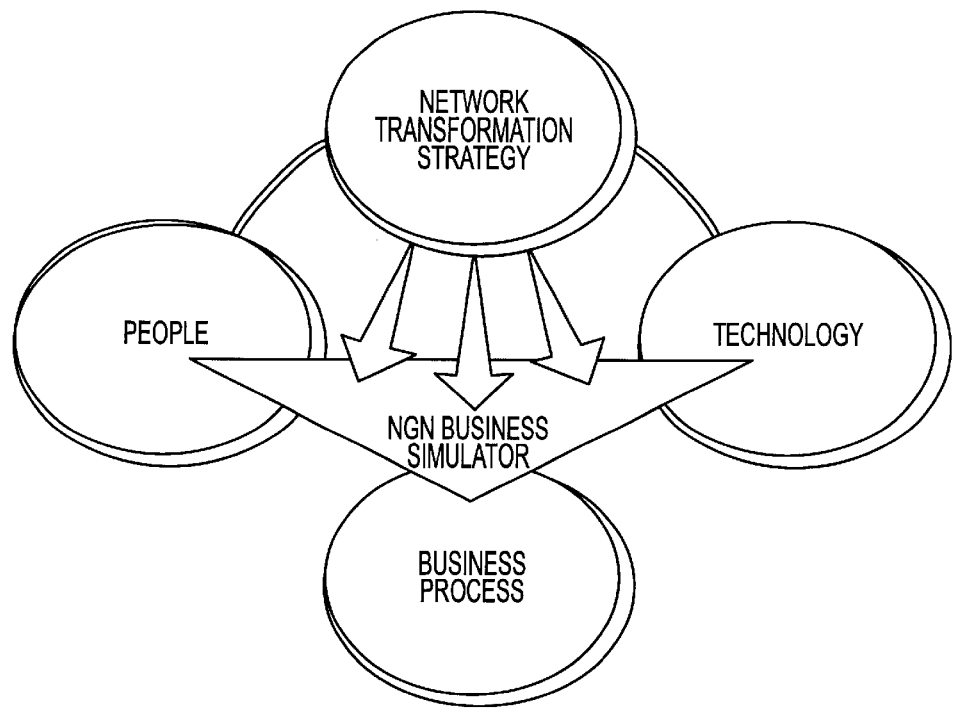
FIG. 60 illustrates four strategic platforms that can be integrated into the NGN Business Simulator of the present invention.

As illustrated in FIG. 60, the components of the NGN Business Simulator support and integrate four strategic platforms: process excellence, enabling technologies, strategy excellence, and is crucial to maximizing business performance through optimizing human performance at scale. Therefore, the Business Integration Methodology is central to the NGN Business Simulator Architecture and each business capability will be defined as a function of people, process, and technology.

Figure 61:
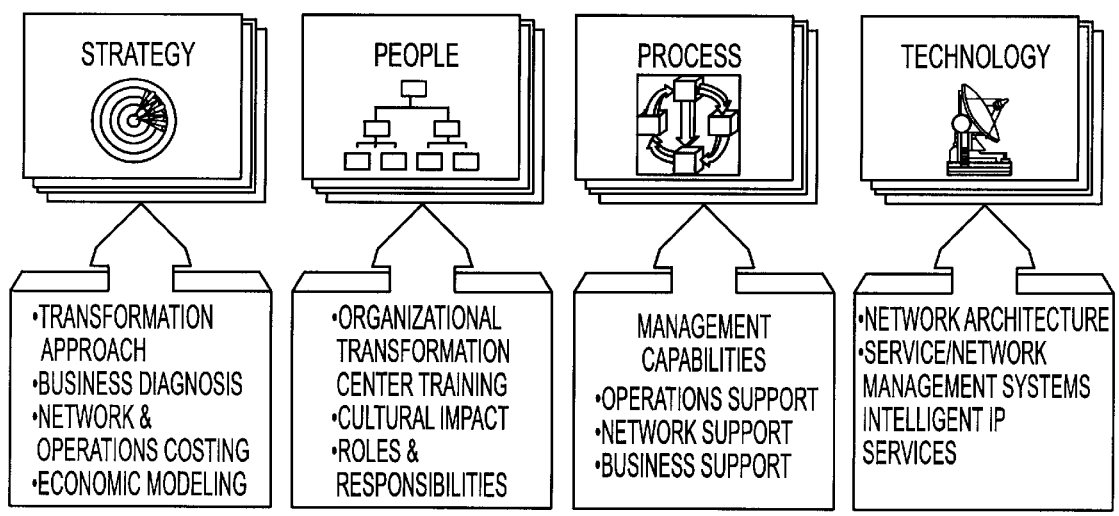
FIG. 61 illustrates how the NGN Business Simulator utilizes the entire Business Integration Framework by integrating Network Transformation assets with assets from other market offerings.

The NGN Business Simulator utilizes the entire Business Integration Framework by integrating Network Transformation assets with assets from other market offerings as is shown in FIG. 61.

Strategy

The strategy component for the implementation of the NGN Business Simulator should focus primarily on the following Network Trans formation market offering assets:

Transformation Approach

Business Diagnosis Study

Business Architecture Blueprint Release 1.0 and 2.0

Network Creation Process Model

MNS/NM deliverables

Figure 62:
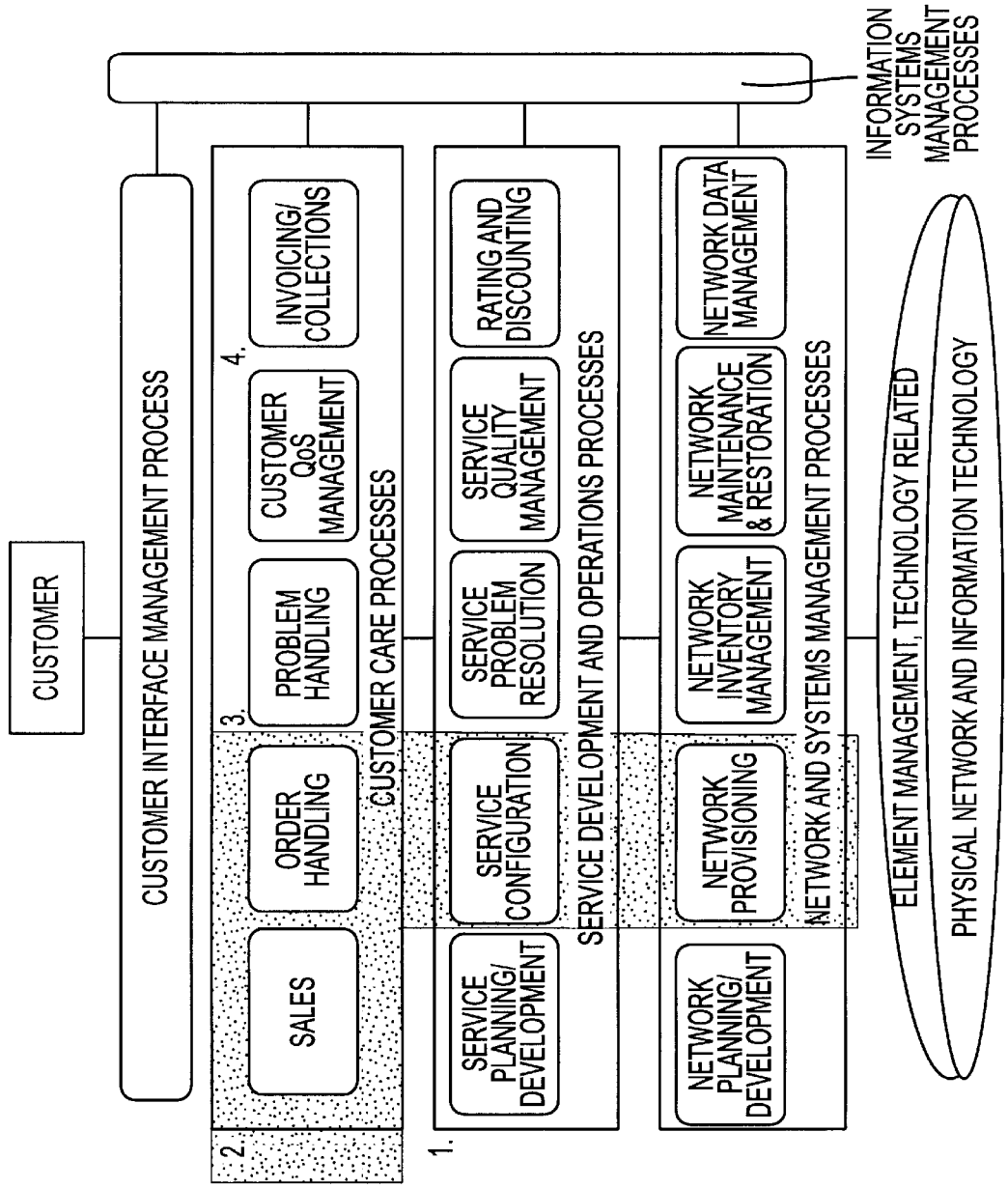
FIG. 62 is an exemplary Operations Map that may be used to define and implement the NGN Business Simulator processes.

Other Market Offering assets such as of End-to-End, Optimizing Customer Operations Process To define and implement the NGN Business Simulator processes an Operations Map can be utilized. An exemplary Operations Map is shown in FIG. 62. This particular Operations Map describes and defines 15 Service and Network Management processes which can be found in most communications service providers' networks. The model is a widely accepted industry standard.

Using the Telecom Operations Map will help:

Guarantee interoperability with other users/providers operating on an industry standard process model and, Speed up the roll-out of the NGN Simulator by linking to well known process definitions and descriptions.

Technology

The technology component for implementing the NGN Business Simulator focuses on two areas:

Network Architecture

Service and Network Management Systems

People

The people component for the implementation of the NGN Business Simulator plays a significant role in answering the following client questions:

How will hundreds of engineers be trained and deployed to transform and migrate networks from circuit switching to packet switching?

What new skills are needed to develop a packet switching environment?

How will the next generation network NOC be organized?

How will the Customer Care Center staff be trained and introduced into their new role?

NGN Business Simulator Business Capabilities

1. New World "utility" Network

2. Operations Support Services

3. Network Support Services

4. Business Support Services

5. Enterprise Management Services 6. eCommerce Services

New World "utility" Network

Figure 63:
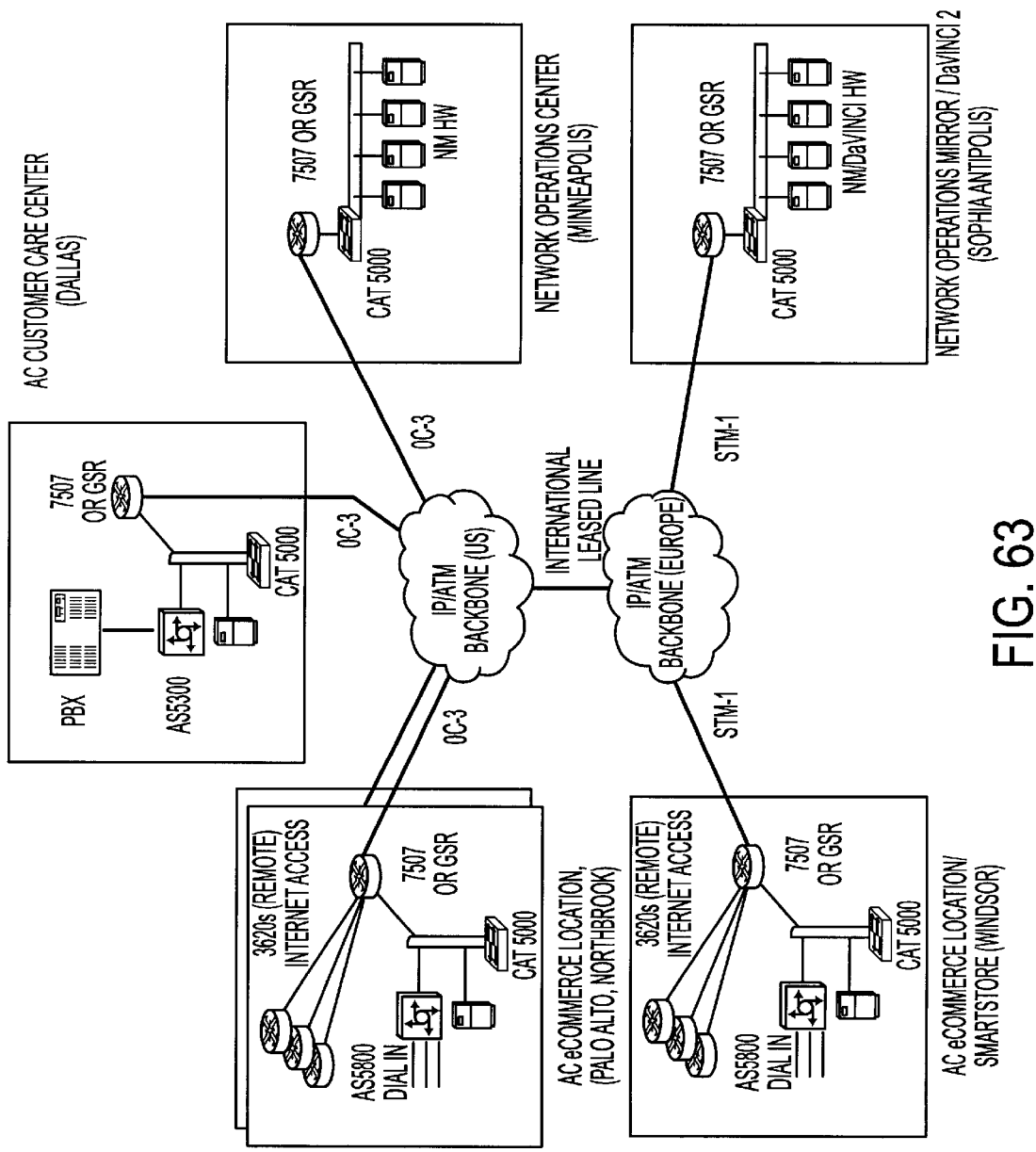
FIG. 63 is an illustration of a utility network that is the underlying supporting infrastructure that provides intelligent connectivity between the various NGN components.
Figure 64:
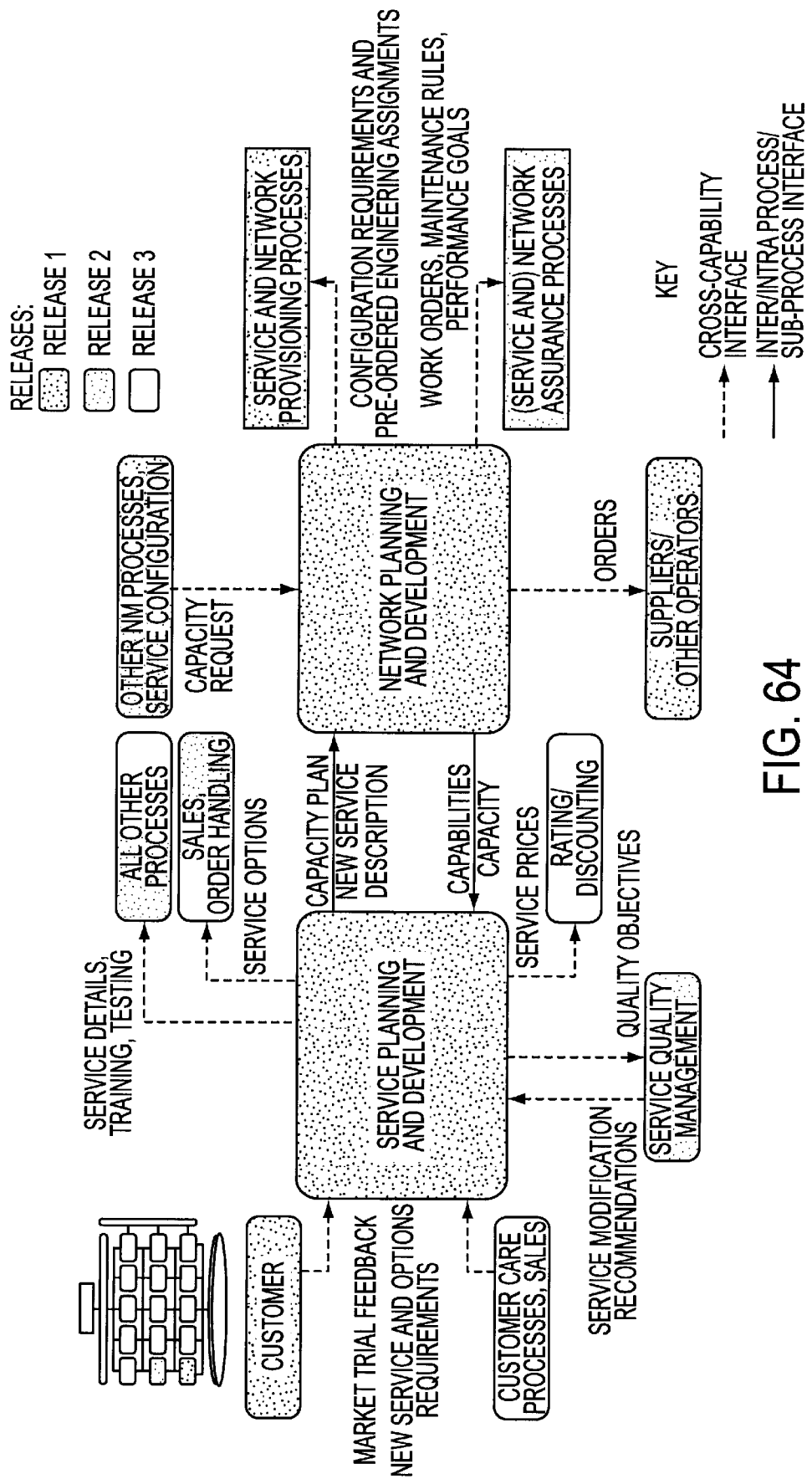
FIG. 64 is a flowchart illustrating a network creation process in accordance with one embodiment of the present invention.

The network "utility" is the underlying supporting infrastructure that provides intelligent connectivity between the various NGN components. They may consist of back-haul circuit facilities, broadband switching fabric, access devices, routers, end-devices etc. See FIG. 63, which illustrates an exemplary utility network. Within this capability, processes will also be defined for Network Creation, as shown in FIG. 64. These processes will enable clients to build NGN networking capabilities such that NGN products and services, like eCommerce applications, that can be supported with respect to capacity, availability and quality of service.

The following exemplary site locations for the NGN Business Simulator are selected based on the proximity of Solution Centers such as Teleworks and SmartStore (eCommerce). Therefore, each location, Palo Alto (eCommerce), Minneapolis(Teleworks), Sophia Antipolis (ACTP), Northbrook (Future Release), Windsor (SmartStore—Future Release), Dallas (INFOMART—Future Release), Manila (Teleworks—Future Release), hold a strategic importance in terms of capability it can provide to the overall NGN Business Simulator. In addition, the utility network may have the added capability to interoperate Operations Support Systems (OSS)

Figure 65:
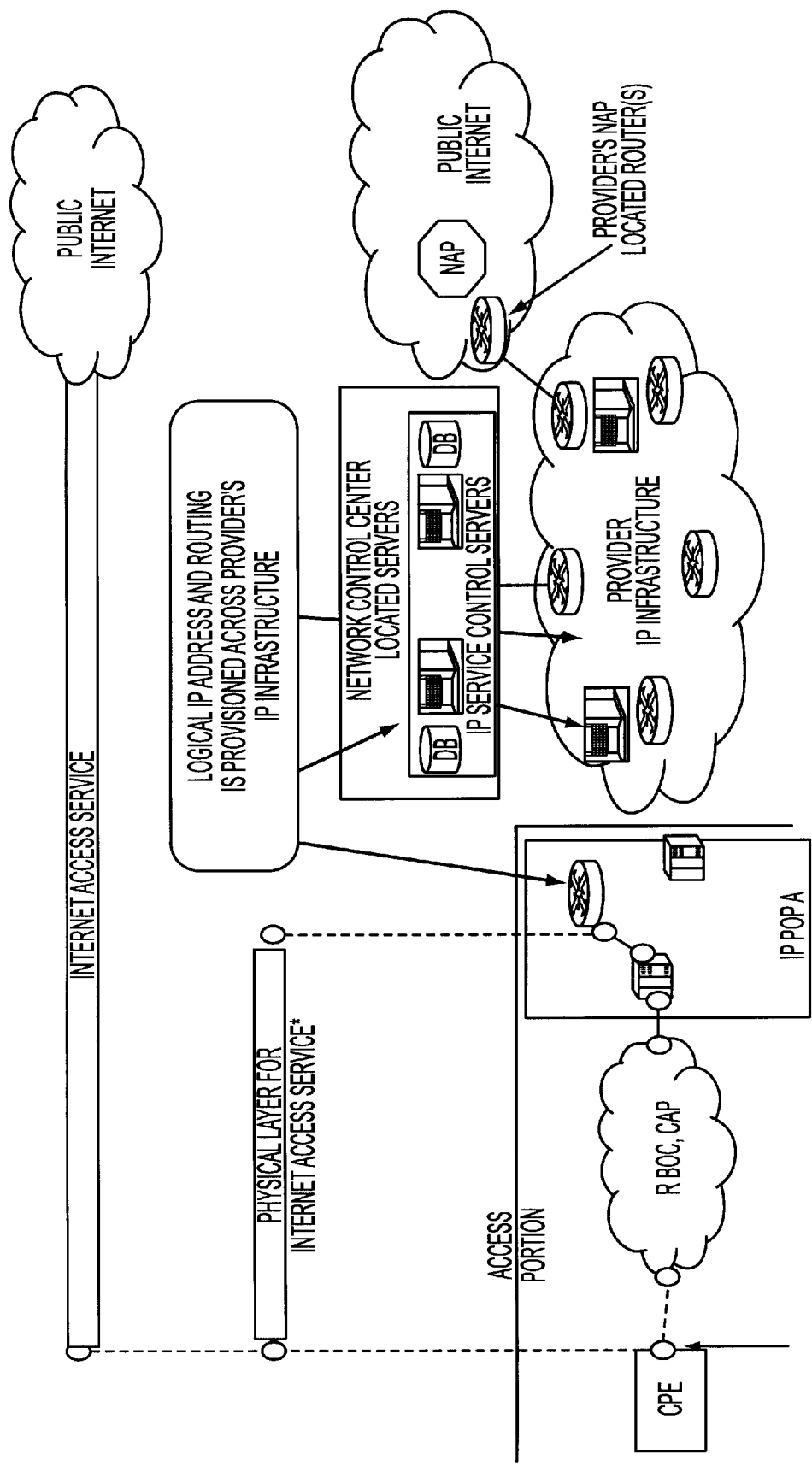
FIG. 65 illustrates a network and service provisioning scenario in accordance with one embodiment of the present invention.

The Operations Support Systems capability provides the required infrastructure that accepts a customer's order for service, tracks the progress of the order, and notifies the customer when the order is complete. The systems may also provide installation and configuration information for specific customers, including the installation and configuration of customer premise equipment. See FIG. 65.

Additionally, the OSS systems may be responsible for receiving service complaints from customers, resolving them to the customer's satisfaction and providing status on repair or restoration activity. It also encompasses monitoring, managing and reporting of quality of service as defined in Service Descriptions and SLAs. Actions may include immediate reconfiguration or monitoring service quality on a service class basis in order to determine whether service levels are being met consistently.

Finally, the OSS systems can ensure that the operational quality of the network is in accordance with required network performance goals.

To support the OSS infrastructure, the following processes may be developed:

Service & Network Provisioning

Sales

Order Handling

Service Configuration

Service & Network Provisioning

Service & Network Assurance

Problem Handling

Customer, QoS Management,

Service Quality Management

Service Problem Resolution

Network Inventory Management

Network Maintenance & Restoration

Network Data Management

Network Support Services

In the circuit-switched architecture, the Advanced Intelligent Network plays the key role of creating and provisioning new services. In the packet environment, however, the Network Support Services (NSS) fulfill the role of service creation environment. This capability, in the NGN Business Simulator, may consist of components ranging from Policy Servers to Directory Servers.

eCommerce Applications

Winning scenarios for communications companies involved in eCommerce include an environment in which the NGN environment is viewed as an essential part of communications packages, or where eCommerce drives constant communications between consumers and retailers. As the potential provider for these channels, communication companies stand to profit from the adoption of eCommerce in many industries. To address upcoming dramatic shifts, service providers must improve customer service, productivity (reducing costs), market capability, and speed to market. As such, the NGN Business Simulator can illustrate how eCommerce applications can be supported not only from a network capability standpoint, but also from an operations and management perspective.

NGN Business Simulator Usage and Benefits

Figure 66:
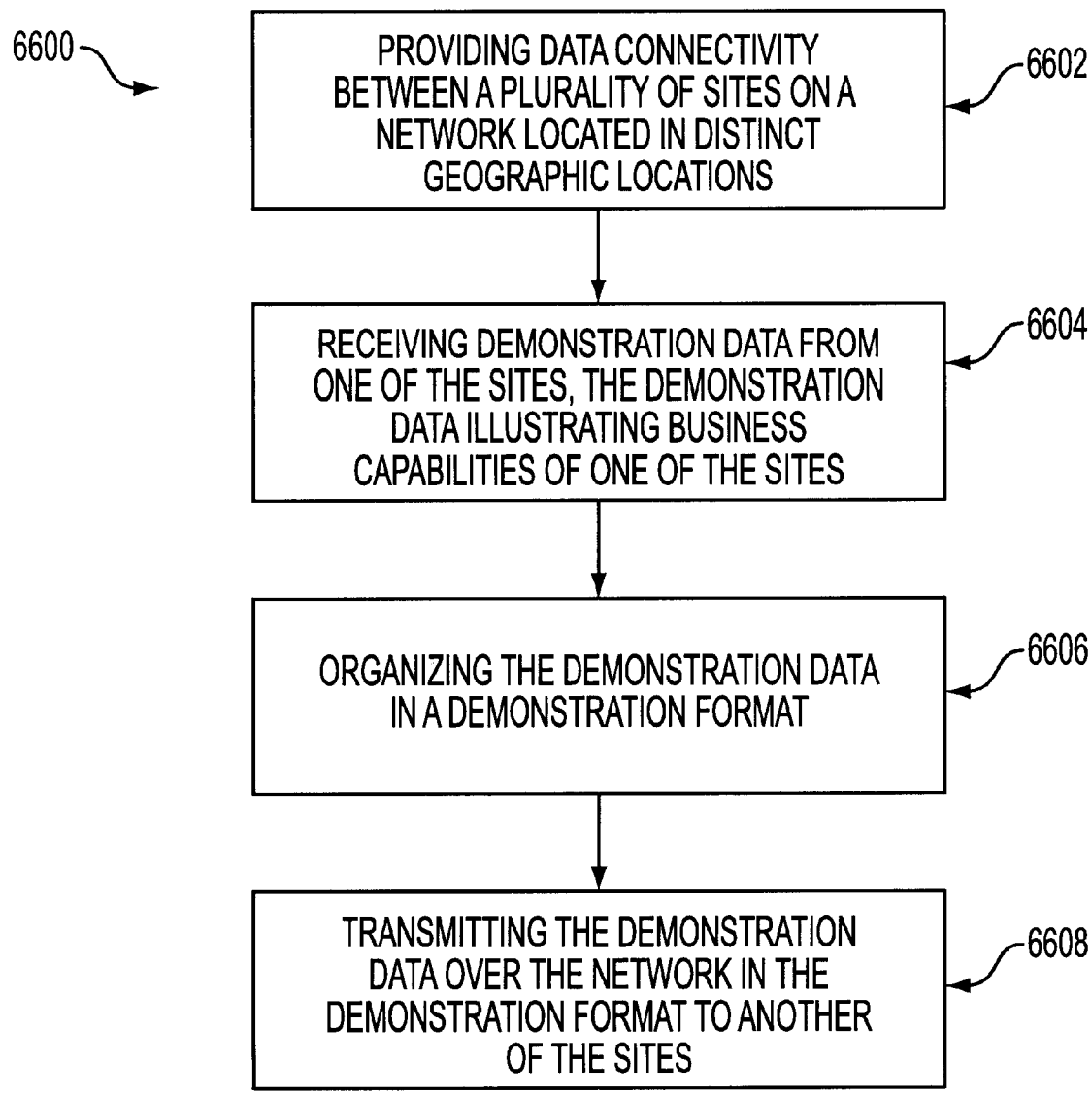
FIG. 66 is a flow diagram illustrating a method for demonstrating business capabilities in an eCommerce environment.

FIG. 66 illustrates a method 6600 for demonstrating business capabilities in an eCommerce environment. In operation 6602, data connectivity is provided between a plurality of sites on a network located in distinct geographic locations. Demonstration data is received from one of the sites in operation 6604. The demonstration data illustrates business capabilities of one ore more of the sites. The demonstration data is organized in a demonstration format in operation 6606, such as by organizing the data in objects contained in object containers as discussed below. The demonstration data is transmitted over the network in operation 6608 in the demonstration format to another of the sites.

Figure 71:
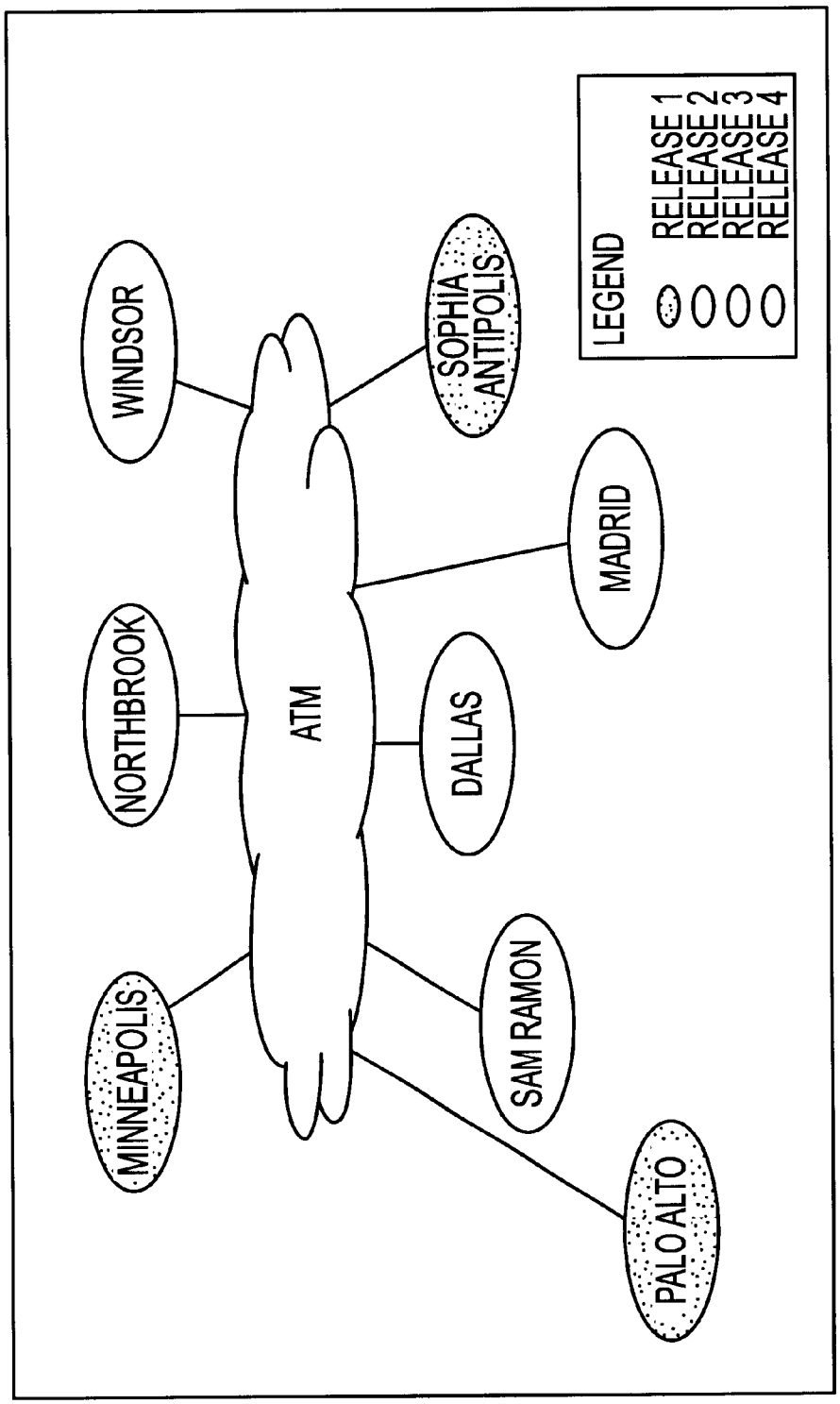
FIG. 71 illustrates exemplary locations between which the Network Fabric of the present invention may provide connectivity in the manner illustrated in FIG. 70.

In one exemplary embodiment of the present invention, the demonstration data is a business simulation. In another embodiment, the demonstration data includes a demonstration of product/service capabilities offered by one of the sites. Optionally, the demonstration data may be received in real time as it is being created. Exemplary internet protocol services that may be supported include at least one of streaming audio, streaming video, facsimile transmission and receipt, and internet telephony. Data connectivity should be provided between at least eight sites, as is illustrated in FIG. 71 (discussed below).

Organization in Demonstration Format

The organization of the demonstration data in a demonstration format is performed by an application development system that enables its users to create reusable "object containers" merely by defining links among instantiated objects. Employing a technique referred to herein as Hierarchical Encapsulation, the system automatically isolates the external dependencies of the object containers created by its users.

Objects contained within other objects are not "hidden" within or tightly coupled to their object container environments. Rather, they are loosely coupled with those environments, and therefore can more easily be reused in other environments. By virtue of being contained within another object, the contained object automatically is afforded access to its environment. Its object container is, in essence, an "environmental frame of reference" for the objects it contains. For example, unless overridden by the author, objects automatically receive messages sent to their object container. They automatically can access data known to their object container. Their position is even determined relative to their object container.

Moreover, objects are decoupled from their characteristics. By defining two distinct types of objects (one of which modifies the characteristics of the other), and loosely coupling (i.e., temporarily linking) these two types of objects, the system provides a mechanism for authors to modify an object's characteristics merely by deeming one object to be contained within another. Removing that object from its container removes that characteristic. In this manner, authors easily can modify an object's characteristics and reuse it in other environments.

In one embodiment described herein, the system is optimized for the development of interactive multimedia applications or "titles." This multimedia authoring system provides its users ("authors") with a visual authoring interface that requires little, if any, scripting or programming. The system employs a form of object-based authoring in which authors create and configure instantiated objects directly, typically by "dragging and dropping" icons and configuring dialog boxes.

Authors can create two basic types of objects: Elements and Modifiers. Elements represent the actual characters or actors that interact with one another in the author's title. Elements generally can be linked to external media (such as text, sounds, pictures, animations and movies), and possess certain inherent characteristics relating to that media.

Authors can supplement an Element's inherent characteristics by incorporating Modifiers within that Element. These Modifiers provide the Element with properties (known as Variables) that further define what the Element is and capabilities that further determine what the Element does. A special type of Modifier, known as a Behavior, can contain additional Behaviors and other Modifiers, providing the author with a mechanism to create a complex Element "personality."

Both Elements and Behaviors are "object containers"—in this embodiment, object instances that can "contain" (i.e., be linked to) other object instances. Elements can contain Modifiers as well as other Elements; and Behaviors can contain Modifiers, including other Behaviors.

By incorporating Elements within Elements, authors create a Structural Hierarchy of Elements, each Element providing an environmental "frame of reference" for the Elements it contains. These "parent" Elements enable authors to provide structure for their titles and to model relationships among their Elements.

Elements can communicate with one another at a high "Element level," without regard to their child Elements. In one respect, Elements "encapsulate" their child Elements by creating a modular interface through which an Element's child Elements can communicate with objects external to that Element container.

Similarly, by incorporating Behaviors (and other Modifiers) within Behaviors, all inside an Element, authors create a Behavioral Hierarchy within the Element—i.e., the Element's internal "personality." Within the context of an Element "personality," each Behavior provides an environmental "frame of reference" for the Modifiers it contains. These "parent" Behaviors enable authors to model the relationships among the various Behaviors within an Element's overall personality.

Elements, in effect, "inherit" the characteristics provided by their internal Behavioral Hierarchy. Because Elements and Modifiers are distinct, loosely coupled objects, authors can modify an Element's characteristics merely by adding Modifiers to (or removing Modifiers from) an Element.

The system provides for significant reusability of object containers by utilizing the Structural and Behavioral Hierarchies to isolate the external dependencies of Elements and Behaviors. In essence, the system automatically "encapsulates" an author's object containers. Once encapsulated, they can be reused in other "environments." Moreover, by loosely coupling an Element to the Modifiers it contains, the system enables authors to modify their Elements so as to "inherit" and "disinherit" characteristics while maintaining an evolving hierarchical encapsulation vis-a-vis the Element's external environment.

Using a technique known as Adoption, an author can cause an Element to be "adopted" by a new parent Element. Using a similar technique known as Transplantation, an author can "transplant" an Element's Behavior (or its entire "personality") into another Element.

Because Hierarchical Encapsulation is integrated into the Structural and Behavioral Hierarchies determined by the author's object containers, authors obtain the benefits of this technique automatically. Their Elements and Behaviors are thus selectively reusable.

For example, a mechanism known as Hierarchical Message Broadcasting provides a structured messaging system that broadcasts messages from their initial destination down the Structural and Behavioral Hierarchies to all descendant Elements and Modifiers. This mechanism isolates an object container as a centralized abstract destination for all messages intended for "any object within that object container." This mechanism facilitates reusability of object containers in other environments in that an object container's new "parent" Element will provide it with messages automatically.

Another mechanism, known as Hierarchical Variable Scoping, makes a Variable accessible automatically to all descendant objects of the Variable's parent Element or Behavior. This mechanism isolates an object container's dependencies on Variables that are external to that object container, but still within its ancestral "environment." By making such Variables "known" to those objects in the object container that rely on that Variable, the object container can be moved to another environment with a well-defined external interface that "knows" which external Variables are assumed to be present in that environment.

Yet another mechanism, known as Hierarchical Relative Positioning, determines the position of a child Element relative to the position of its parent Element. As a result, the child Element moves with its parent Element automatically. This mechanism isolates an Element's external positional dependencies—i.e., the effects of an Element's environment on the Element's position.

In addition to the "built-in" Elements and Modifiers, the system is quite extensible via a "Component API." This Component API enables programmers to seamlessly integrate new Modifiers (and "Services" that support them) into the system.

The system also provides an inter-application communication mechanism integrated into the system's Hierarchical Message Broadcasting mechanism. By providing a Net Messenger Modifier and corresponding Service, an author can target a message to any known Element in another Project/title (as well as within its own Project/title), and utilize the Structural and Behavioral Hierarchies to propagate that message to descendant Elements and Modifiers. As is the case with intra-Project/title messaging, this mechanism facilitates reusability of object containers in other environments by providing them with messages via their new "parent" Elements.

In addition to facilitating selective reusability of object containers, this communication mechanism also provides an infrastructure for targeting and propagating messages in accordance with the object hierarchies of each individual Project/title.

Rather than limiting communication to "point-to-point" messaging between objects, the system utilizes for inter-application communication the very same object hierarchies that each author constructs for intra-application communication. In this manner, one can target a message to an object container in another application without knowing which object inside that object container will handle the message. The target application's Structural and Behavioral Hierarchies will determine how the message is handled. The authors only need agree on the name and meaning of messages, without having to worry about the name or even functionality of the objects that ultimately will handle such messages.

The system's inter-application messaging mechanism enables authors to send to another Project/title not only messages, but also data attached to those messages. Such data can range from simple integers, strings and other common data types to more complex lists, compound objects and even entire object containers including their Structural and Behavioral Hierarchies. In the latter case, these "teleported" object containers are much more than mere "data" and must be instantiated in the target Project/title. Just as Elements within a Project/title can dynamically be "cloned" or "killed", and "adopted" by (or have their Modifiers "transplanted" to) another "parent" object container, so too these "teleported" object containers must be "cloned" or instantiated in the target Project/title and "adopted" by or "transplanted" to their new target "parent" object container (e.g., the initial destination of the inter-application message).

By utilizing "Object Reference Variables," an author can specify the initial destination of a message to be an objects relative or absolute point within the Structural and/or Behavioral Hierarchies (within and across Projects/titles). Authors can leverage their degree of knowledge of the Structural and Behavioral Hierarchies in the target Project/title by targeting a message to any known object container (including the highest "Project" level). By resolving such references dynamically, the system provides authors significant flexibility in targeting objects that might move within their own Structural and Behavioral Hierarchies.

"List Variables" provide authors with a convenient mechanism for, among other things, targeting multiple remote Projects/titles. This mechanism is extremely useful in the context of multi-user titles in which the number of users can change dynamically.

The ability to specify a list or array of remote hosts enables the author to target a message to all hosts with a single Net Messenger Modifier (as is usually desired), without sacrificing the ability to target one or more individual hosts when necessary.

Also, an author can embed a title within a World Wide Web page by utilizing a browser plug-in and the "Open URL Modifier." With this mechanism, the author can provide a user (within the context of a browser window) the ability to interact with multiple titles. Any Element can link dynamically to another title (or open any page on the World Wide Web) as easily as it can respond to any runtime message sent within or across titles.

Finally, the architecture of the system is substantially platform-independent. Titles can be "played" on multiple platforms. Moreover, the entire authoring environment can be ported to a variety of platforms with relatively little modification due to the isolation of a platform-dependent layer within the system.

Use of Scenarios

Based on the capabilities within the NGN Business Simulator, various scenarios will be defined that represent an NGN environment. Each of the scenarios will be a mix of capabilities, identifying specific business architecture gaps between clients existing business operating model and the NGN. This approach ensures that the challenges involved in enabling underlying capabilities are clearly accentuated. Moreover, some scenarios may be customized for specific client needs. Towards that end, planning sessions may be conducted with client to 'walk through' these capabilities at a Solution Centers such as Teleworks Center in Minneapolis. The overall intent is to articulate to clients a pragmatic transformation approach that leads them to the New World Network.

Exemplary Network Prototype Scenario (Customer Service Scenario)

Figure 67:
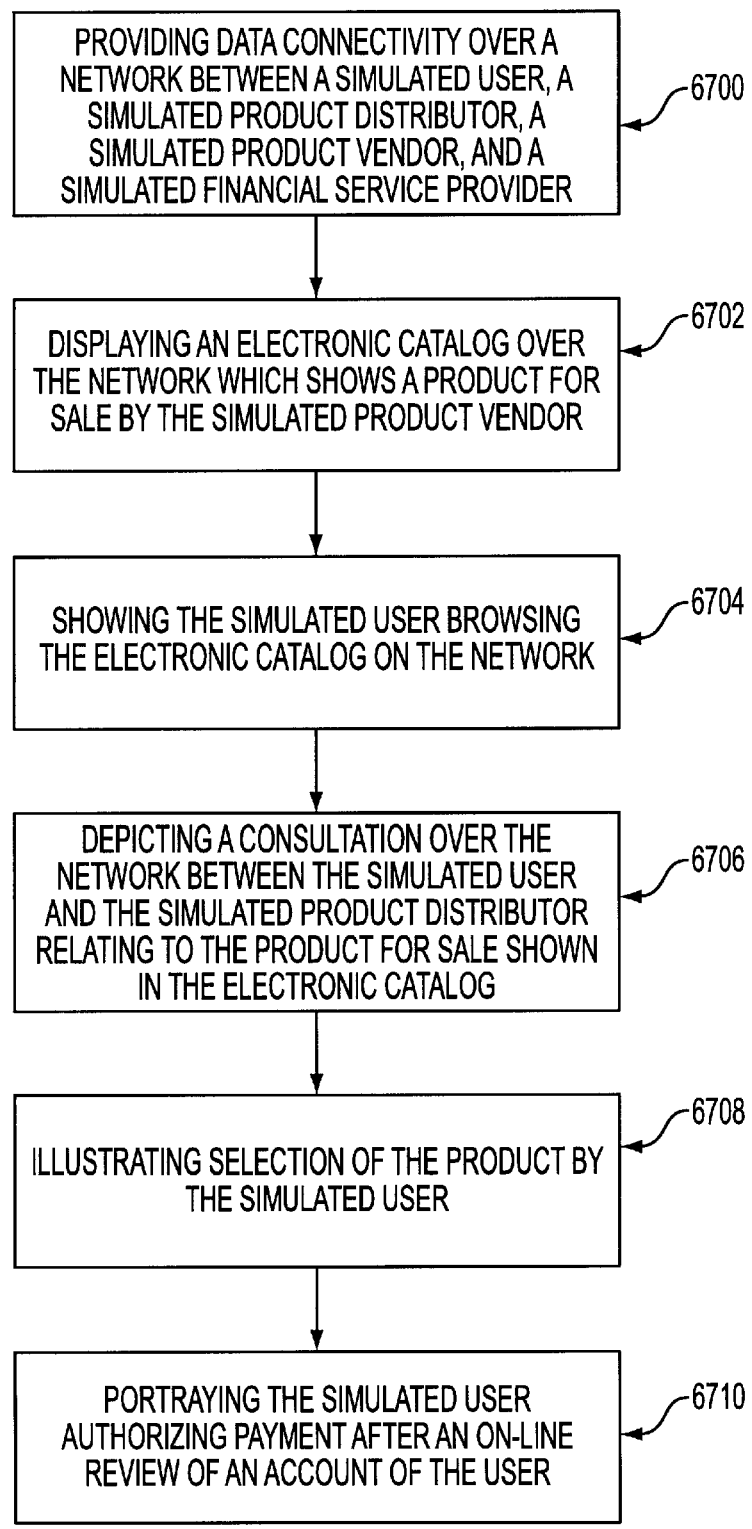
FIG. 67 is a flowchart depicting how eCommerce capabilities on the NGN prototype (or other) network can be demonstrated via a simulation.

FIG. 67 illustrates how eCommerce capabilities on the NGN prototype (or other) network can be demonstrated via a simulation. In operation 6700, data connectivity over a network is provided between a simulated user, a simulated product distributor, a simulated product vendor, and a simulated financial service provider. An electronic catalog is displayed over a network in operation 6702. The electronic catalog shows a product for sale by the simulated product vendor. In operation 6704, the simulated user is shown browsing the electronic catalog on the network. A consultation over the network is depicted in operation 6706 between the simulated user and the simulated product distributor relating to the product for sale shown in the electronic catalog. Selection of the product by the simulated user is illustrated in operation 6708. The simulated user is portrayed in operation 6710 authorizing payment after an on-line review of an account of the user. For example, the simulated user may be depicted reviewing a bill for the product, which would be received by the simulated user in real time.

Preferably, internet protocol services supported on the network include at least one of streaming audio, streaming video, facsimile transmission and receipt, and multi-point internet telephony. Also preferably, the consultation between the simulated user and the simulated product distributor is shown to be conducted with streaming audio and video.

An exemplary prototype scenario for the method set forth above would be an interactive transactive Internet-commerce experience between a MySite consumer user, a remote call center worker (distributor) supporting a web storefront, a products company (vendor) and a financial services organization. Optionally, the simulated user, simulated product distributor, simulated product vendor, and simulated financial service provider may each be located at a unique site on the network, such as the user at the Minneapolis site and the call center worker at the Palo Alto site.

The remote call center worker would highlight the network's ability to exploit the 24 hour nature of the evolving internet universe by providing time zone and location insensitive workforce to man the web storefront using IP based data, audio and full motion video telephony.

The products vendor would be an audio visual entertainment company that would partner with the web commerce vendor to sell audio and video content delivered via the NGN and finally presented to the consumer via a web browser enabled viewer managed by the MySite application.

The MySite consumer would be shown to actually browse or sample the content prior to purchasing it IP audio and video streaming, consult with the storefront operator at the click of a button on the web site (IP video conferencing) collaborate with a subject matter expert on the configuration of the browser to decode the purchased content (T.120 white-boarding and application sharing) Join in a phone in Q/A with the authors of the content in a foreign country (multi-point IP telephony). Review a real-time bill for the costs of the transaction (real-time billing rendered over IP-Fax to a unified messaging mailbox) and finally authorize payment after an on-line account review (Secure Internet banking). The financial services organization would illustrate the network's ability to interface with and support third party value added service providers in a secure robust fashion.

The real-time billing capability demonstrates the transformation of the OSS/BSS to the Next Generation Network support systems.

This model will be usable by other portfolios to demonstrate the viability of industry transformation and aid the sales of these market offering deliverables across industry and market unit.

Customer Service Scenario Description

The following table describes, at a basic level of detail, the above scenario. It describes the scenario's major components and the NGN capability it showcases (categorized by technology).

As part of the simulation, browsing interactions may be shown between a service provider and a consumer with access from home to the prototype broadband network. Optionally, one of the capabilities of the prototype broadband network that may be demonstrated is receiving both voice and keyed input and storing the same in a mailbox, and playing back a predetermined length of the voice input and converting a predetermined amount of the keyed input into speech for playback purposes. The following section provides a more detailed description of some of the capabilities of the prototype broadband network.

Functionality Enabled by the Developed and Integrated Components

The following scenarios describe the applications and functionality that may be enabled by the intelligent broadband next generation network that can be demonstrated by the telecom carrier of the business simulator.

Caller Id Info: This is the delivery of short text/audio messaging during an ongoing voice, or video call or in the case of a multimedia collaborative session, hot links to detailed information about contextualized up to the minute information that would impact the decision making process.

| Customer Scenario | Business Event | Business Event Description | NGN Capability Showcased Tech |
|---|---|---|---|
| C0001 | B0001 | My Site consumer browses/samples content of web commerce vendor (audio visual entertainment). | IP audio and video streaming |
| NGN Customer Service | B0002 | My Site consumer consults with storefront operator via a web site button. | IP video conferencing. |
| | B0003 | My Site consumer collaborates with a subject matter expert on the configuration of the browser to decode purchased content. | T120 white-boarding and application sharing |
| | B0004 | Consumer joins in a phone Q/A session with the authors of the content in a foreign country. | Multi-point IP telephony |
| | B0005 | Consumer reviews a real-time bill for the costs of the transaction | Real time billing rendered over IP-Fax to a unified messaging mailbox. |
| | B0006 | Consumer authorizes payment after an on-line account review | Secure Internet Banking |

Exemplary Network Prototype Scenario (Operation of Service Provider Scenario)

Figure 68:
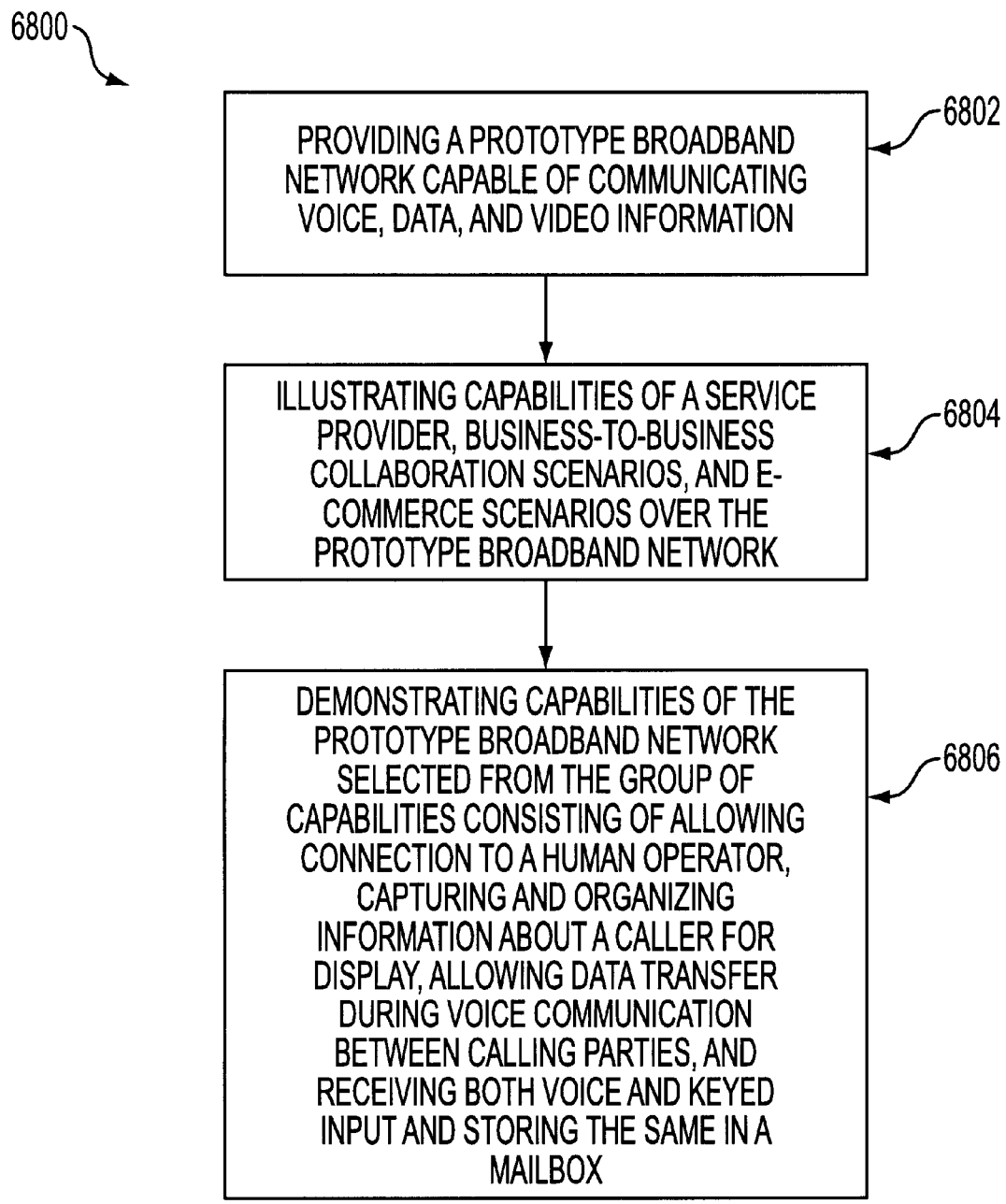
FIG. 68 is a flow diagram illustrating a method to simulate operation of a service provider network.

FIG. 68 illustrates a method 6800 to simulate operation of a service provider network. In operation 6802, a prototype broadband network i.e., the NGN Network set forth above, is provided. The network is capable of communicating voice, data, and video information. Capabilities of a service provider, business-to-business collaboration scenarios, and eCommerce scenarios are illustrated in operation 6804 over the prototype broadband network. Capabilities of the prototype broadband network are demonstrated in operation 6806. These capabilities are selected from the group of capabilities consisting of: allowing connection to a human operator, capturing and organizing information about a caller for display, allowing data transfer during voice communication between calling parties, and receiving both voice and keyed input and storing the same in a mailbox. Preferably, the information about the caller includes at least one of availability information for a return call, contact information, and an urgency of a call.

An optional further operation includes illustrating business-to-consumer eCommerce scenarios. Another optional further operation includes demonstrating the capability of allowing a caller to reference internal and external sources of information during a call and further to retrieve the information for access by a party called by the caller.

Smart Attendant: Ability to call a network based attendant to delegate tasks such as deliver messages using voice, fax, e-mail and video content, setup conferences, distribution lists content packages on demand, return a call "live" from unified mailbox (live version of option #8 in OCTEL)

Grabber: Capture and organize detailed information about callers in addition to called time, caller-id; example: availability information for return call (where are you going to be reachable within the hour if your message is urgent (contact number (voice, video, multi-media -IP address etc or if not urgent best time and address to be reached;)

Data Vector: Allow the caller to reference internal or external sources of information that the called party needs to review prior to returned call or for discussion during call and retrieve the content for access by the called party.

Detailed notification: For example rather than a page asking the called party to check mailbox; the page or phone notification should say you received 7 messages, 3 urgent from Andre Hughes, Joe Forehand, Bruce Baxter; short subject of the messages (may be the first 10 seconds of the urgent messages played back or converted from Speech to Text or Text to speech; depending on the notification mechanism i.e.: if PDA then speech to text else if Phone or audio aware device convert speech to text and play back on device.

Web-Control Applications: Applications that will enable the carrier to empower the end-users via the public but secure, internet to takeover control over their services thus relieving the carrier of the responsibility and cost burden of these mundane non-profitable tasks and simultaneously, improve productivity and customer satisfaction.

Carrier and Value Added Service Provider capabilities

Initiating with the change in role of the call center worker from support, to selling specialized services to collaborative design, the NGN prototype enables capabilities such as e-payment integrated multimedia interaction, e-selling (consultative selling) and e-support for both their traditional customers and a new breed of network service user such as trade associations jointly forming industry extranets to deliver cross enterprise communications.

NGN OSS: Activate, is a proposed command and control application that provides the back-end functionality necessary to implement and effect the requests made from the end-user initiated Web-Control applications described above. Furthermore, this application may enable a carrier to provision and activate the new services which span the circuit and packet segments of the NGN in an intuitive and highly productive fashion aligned to the optimized next generation carrier business processes.

Additionally, the prototype may showcase carrier support functionality such as the ability to take an order on or off-line and then within minutes verify credit, validate the service order configuration, provision, test and activate the service with a minimum number of user operators getting involved in the process. This capability will significantly improve efficiency and productivity of a carrier since the traditional time frame from order entry to service activation is 21 to 60 days depending on the complexity of the service. This interval can be reduced by between 21 and 60 days using these new NGN system capabilities. Finally, the end-user will be provided with an unprecedented view of the network that delivers the services by means of alarms, performance and trouble information that impacts the services that the subscriber uses. Such capabilities improve consumer confidence in the carrier and present the carrier as a proactive customer service oriented organization.

Benefits of the NGN Business Simulator

Specific benefits of the NGN Business Simulator fall into three categories, NGN Network Provider Benefits, Alliance and Vendor Partner Benefits, and Client Benefits. They are listed below.

| Client Benefits | Network Provider Benefits | Alliance and Vendor Partner Benefits |
| --- | --- | --- |
| Learning Tool- | Selling Tool- | Selling Credentials- |
| The NGN Business Simulator provides the first tangible view of the NGN environment in a risk-free environment. The network showcases the value added services that a client will be able to launch. | The NGN Business Simulator gives clients a glass window view of the first NGN environment. It also demonstrates the value added services that a client will be able to launch while demonstrating the network provider's implementation and delivery capabilities. | The NGN Business Simulator will enable the network providers alliances' and vendor partners' products to be associated with the first proven solution, resulting in aggressive deployment of their products in the NGN marketplace. |
| "One Stop-Shopping"- | "One-Stop-Shopping"- | Enhanced Image- |
| The NGN Business Simulator demonstrates all the services and capabilities that can be offered on a next generation network. Through one-stop-shopping environment a client can choose the entire solution or specific components. | Since the NGN Business Simulator demonstrates the assets and solutions from all of the network provider's Communications market offerings, it enables clients to see many solutions in an integrated environment. | The NGN Business Simulator provides direct association with the network provider, an innovative business integrator, for alliances and vendor partners. |
| Training- | Training- | Multiple Offerings- |
| The NGN Business Simulator provides a training school for the clients' employees to learn how to manage and operate networks. | The NGN Business Simulator can be used to train the network provider's personnel in network implementation and delivery of NGN creation, transformation, capabilities and services. | Since the NGN Business Simulator may incorporate multiple market offerings, alliances and vendor partners can leverage their products and investments across many service offerings |
| Pilot Services- | Leadership Role- | Leadership Role- |
| Since the NGN Business Simulator is a testing environment, it enables clients to launch a new service in a risk free environment. | Through the creation of the NGN Business Simulator, the network provider can present itself as an innovative leader who built the first next generation network operational model. | Through the creation of the first NGN Business Simulator, alliances and vendor partners will be regarded as thought leaders in the communications industry. |
| Leased Equipment- | Build NGN Methodology and MO Assets- | Future Sales- |
| The NGN Business Simulator enables clients to lease network equipment instead of buying their own, by linking a client's network to the NGN Business Simulator. | The NGN Business Simulator can showcase specific BIM and project deliverables such as methodologies, toolkits, work plans, budgets, and scenario models which can be leveraged to promote and execute engagements. | The NGN Business Simulator builds a relationship between the network provider and alliances and vendor partners. This relationship may lead to future sales (of product) when the NGN network is implemented at a client. |
| | Minimized Risk- | Minimized Risk- |
| | Since the NGN Business Simulator leverages the knowledge and equipment of other internal the network provider market offering and selected alliances and vendor partners, it minimizes the cost of the NGN Business Simulator. | Since the NGN Business Simulator utilizes the network provider's network skills and resources, it minimizes the investment of alliances and vendor partners. |
| | Future Experimentation- | |
| | The NGN Business Simulator creates an extensible environment for experimentation of future the network provider, selected vendor, and client solutions. | |

Key Components of Business Simulator

The current scope of the Business Simulator includes several key components. See FIG. 69. The shaded area indicates the components within the scope of the network fabric.

Communication Requirements

Purpose: Establish outline requirements of the NGN Business Simulator network.

Methodology Link: Method NS version 4.0—Network Planning Deliverables

Objectives of the Network Fabric Capability

Figure 70:
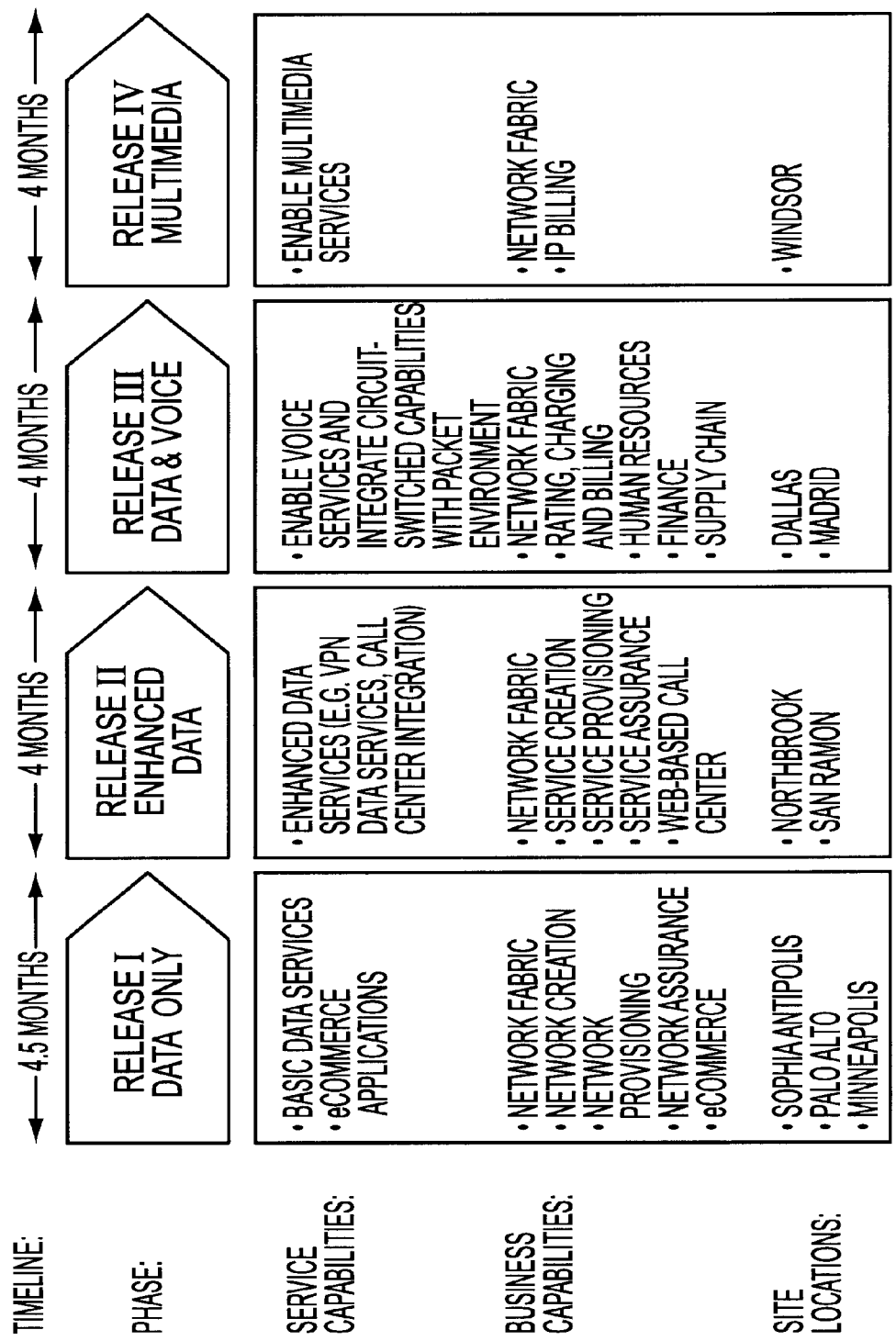
FIG. 70 depicts an exemplary release plan for the NGN Business Simulator of the present invention.

The communications requirements for the network fabric are derived from the following list of basic objectives that it should achieve:
1. The network should provide data connectivity between sites. It may enable remote demonstrations of capabilities that are located in specific sites (e.g. eCommerce in Palo Alto, Network Creation Tools in Minneapolis and Sophia Antipolis).
2. The network should be able to support demonstrations of a specific portfolio of advanced IP services (e.g. VoiP, Fax over IP, IPVPN). The network should provide a certain level of Quality of Services (QOS) to support these advanced IP services.
3. The network should allow the Network Creation (NC) capability to be demonstrated in a "live environment". That is to say that the data for the NC demonstrations may come from a live network and not from a database of dummy data.
4. The network should allow the Network Assurance (NA) capability to be demonstrated in a "live environment".
5. The network should allow the Network Provisioning (NP) capability to be demonstrated in a "live environment".
6. The network must run IP sessions over ATM in the backbone, as these are the preferred technologies used in the Next Generation Network and in the New Core Network.
7. The network must be robust enough to be used as a bearer of Teleworks Solution Center clients and for Client Market Trials of Next Generation Service Suggested Release Plan The business simulator can be deployed in a number of phases spanning over several months. Different site locations may be connected to the Network Fabric on a rolling basis as shown in the Capability release plan of FIG. 70.

Location Requirements

In an exemplary embodiment, the network fabric can connect 8 locations globally, each of which play a specific role in achieving the overall objectives of the Business Simulator:

Exemplary locations between which the Network Fabric may provide connectivity are shown in FIG. 71:
1. Minneapolis leverages the work done at Teleworks and can be used as the first tier Network Operation Center
2. Palo Alto may be used to demonstrate eCommerce capabilities
3. Sophia Antipolis hosts CST and hence is a key location for European companies. Sophia Antipolis may host a second tier Network Operation Center shadowing Minneapolis
4. Northbrook heads the research and development of methodology and eCommerce capabilities
5. Windsor can be connected to show a next generation SmartStore environment
6. Dallas is the Infomart location and may also provide Call Center facilities to be integrated into the Business Simulator
7. Madrid is the most important Teleworks Solution center in Europe and may be important for ELA client work
8. San Ramon can be used to demonstrate eCommerce capabilities More or different locations could be attached to the Business Simulator. For the moment these will be the exemplary core subset. Future locations may be planned, designed and built as exact copies of any of the locations listed above.

Bandwidth Requirements

A decision on bandwidth requirements should be made during the capacity planning stage. The initial conceptual design assumes that for Release 1, ATM capacity of 2 Mb/s will meet the bandwidth requirements for interconnecting the initial sites (e.g. Minneapolis, Sophia Antipolis and Palo Alto).

Bandwidth requirements will change during the lifetime of the project as further decisions are taken on which carrier services and eCommerce applications are to be supported and on which third party might use the network. The following assumptions on hardware requirements have therefore been made with this consideration in mind. The design should select solutions that maximize the scalability in terms of capacity upgrades.

Performance Requirements

There is a requirement for full availability during periods of business simulation activity. Due to the time zone differences between nodes this, in effect, results in a high level requirement for 24×7 availability. As this requirement is likely to result in an excessive investment in people, this requirement could be reduced, for the first releases of the network fabric where no companies (like e.g. client market trial) will be using the network infrastructure. The resource could then be increased in line with network usage.

An appropriate Service Level Agreement can be defined between the Network Transformation market offering client and the party charged with overall maintenance of the network Security Requirements The network should provide a level of security at every access point and at every level (i.e. physical, logical). Also, although network management platforms typically provide security management functions, the network architecture should be compatible with and support those functions.

Communications Architecture Conceptual Design

Purpose: Provide a high level overview of different conceptual network design alternatives and to assess the relative advantages and disadvantages.

Methodology Link: Method NS version 4.0—Network Planning Deliverables

The network should meet these high level requirements:

General Capabilities:

Support Video Conferencing, such as NetMeeting and Intel ProShare

Support for streaming video

Support for IP Telephony (Integrated with PABX)

Support for 3270 emulation to client mainframe hosts and printing from 3270 hosts Support for telnet and X-Window sessions to UNIX hosts Support for ftp for file transfer between Teleworks and client sites Support for http traffic for Teleworks internal and client sites Support of client specific mail traffic (MS Mail, MS Exchange, Lotus Notes, HP Open Mail) as well as SMTP and LDAP Support of file server access between Teleworks sites and to client sites Support of Teleworks Windows Workbench traffic (SQL*Net) ps Reliability:

7*24 support

Redundant link should be provided as necessary based on project or user specific needs Network Management:

Management should be provided by a central maintenance organization, that can provide Service Level Agreement (Slab's), rather than having management spread across multiple different organizations.

Support the Simple Network Management Protocol (SNMP)

Conceptual Design Alternatives—Benefits Comparison

This section provides a description of each of the conceptual design alternatives. It shows what are the different types of collaboration that could be envisaged. An evaluation of each scenario is provided at a high level. To achieve this high level analysis, key evaluation criteria are described in order to focus on the principal requirements of the Network Fabric.

Key Evaluation Factors

The important aspects that have to be studied for each conceptual design alternatives are described below. They are the key drivers to select the best solutions.

1. Simulator Requirements

The Network Fabric should support the following network capabilities:

Network Creation

Service & Network Provisioning/Activation

Service & Network Assurance

On top of the network capabilities, the Business Simulator may have a feature rich service platform which provides the following next generation service capabilities:

Basic IP Data Service Suite

VoIP Service Suite

IP VPN Service Suite

For non-communications industries users, the Business Simulator may demonstrate how to effectively use new business capabilities in the eEconomy. These new business capabilities can be leverage from different organizations like CST (Center of Strategic Technology) thus showing eEconomy environments like e.g.:

Davinci II (or the like) in Sophia Antipolis

SmartStore in Windsor, UK other eRetail and eBanking environments in the USA

2. Network Cost

This is a key aspect, as it will study the possibility to share the entire network infrastructure or some of the links with other groups. The Network construction and the operations costs have to be carefully investigated even at a high level of details in order to define the project strategy. The option of sharing the Network would implicate to define a method for distributing the costs.

3. Implementation Time

The time required to build the network has to be carefully studied, especially because it is very common to wait 60 working days to establish high capacity links between international sites. The delivery of hardware equipment (Network Element) could have long delays as well.

4. Security

This aspect should not be underestimated as the conceptual architecture plans interconnections with Cisco and HP's selected sites. Therefore, the Network Design must address this important issue. It also represents a key point for the selection of the scenario. Security is a major concern to many users, so the solution must be able to convince them of the secure nature of the Network, especially in the context where the goal of the network is also to enable users to run "Market Trial".

5. Traffic Mixing/Bandwidth Management

When evaluating the opportunity to share the network with a second network or to take the option of using already installed or planned infrastructure of ServiceNet, special attention must be paid to the distribution of the traffic. The traffic on the network would not be limited to the one generated by the Business Simulator applications/services, therefore reducing the ability to control, forecast and plan the network capacity.

6. Network Management

The capabilities that should be demonstrated by the Business Simulator are strongly tied to the Network Management activity. In the context where links and network elements would be shared, it should be examined how the control on the network management will be done. Effective management of the Network may require a single point of contact for management and escalation of issues for service levels.

7. Network Manageability

The manageability is more linked to the ability to take decision, i.e., make radical changes without having to find a compromise with the entities sharing the network infrastructures. It is referring to the level of freedom that the solution is providing and in the context of this project to the ability to keep a control on the network in order to meet the expectations.

8. Redundancy

Depending on which type of services and in which circumstances they will be used, the network architecture of Network Fabric should provide redundant links to guaranty a certain service level in case of failures. The need for redundancy may not be required by the prototype project but by one of the possible partner (like e.g. TWNet) and thus would need to be carefully considered. On the other hand to demonstrate the NGN Business Simulator capabilities, there might be a need for a fully meshed network.

Description Of Conceptual Design Alternatives and Benefits Comparison

Option 1: Total Ownership (Private Network)

This option involves connecting each site with private links without utilizing any of the existing networks. It implies therefore the requirement to equip all sites with the necessary network elements.

| Benefits | Disadvantages |
| --- | --- |
| Traffic would be limited to the one generated by the services defined and managed by the Business Simulator. No Bandwidth sharing except it is decided to resell part of the available capacity | Heavy investment (Leased links, Network Elements), Operation cost (Need to put a network management structure in place) Implementation Time (Delays for delivering Network Elements and installing links) |
| Manageability- The total ownership of the network gives a total freedom to take decision on the global architecture of the network, to manage the traffic and so on. (No shared decisions!) | Need to install redundant links to provide a reliable network (increased cost) |
| Network Management- Total control on the way to manage the network (NMS/MN market offering could have the perfect test lab to experiment their proposed solutions), the Service Assurance and the Service Provisioning systems could be tested in a risk-free environment. | Need to put in place security systems to protect the network (increased cost), especially if the network is interconnected with some partners and if a client is running market trial in this environment. |

-continued

| Benefits | Disadvantages |
| --- | --- |
| Resell Bandwidth through brokers like Band-X | |

Option 1(Bis): Total Ownership (Partnering with a Telecommunication Provider)

In this option an alliance with a telecommunication provider can be launched. It is assumed that in this option the telecommunication provider provides bandwidth for free.

| Benefits | Disadvantages |
| --- | --- |
| All benefits quoted above (Option 1: Total Ownership) Still huge investments in terms of Network Elements but the cost of the links is dramatically reduced by the partnership with the telecommunication provider Reduced Implementation Time for the establishing the links Redundancy (fully meshed Network) is provided at low cost | Need to establish an alliance with an international Telecommunication provider. And in return, would have to provide this Telco with valuable assets (that should be determined) Investments (Network Elements), Operation cost (Need to put a network management infrastructure in place) Implementation Time (Delays for delivering Network Elements) and time to establish the alliance Need to put in place security systems to protect the network (increased cost), especially if interconnecting the network with some partners and if users are running market trial in this environment. |

Option 2: VPN over the Public Internet

This option involves linking each of the sites via a virtual private network over the public internet. This solution would be implemented without using any of the existing or planned links.

| Benefits | Disadvantages |
| --- | --- |
| Expense would be minimized to the minimum | The main capabilities of the Business Simulator would not be demonstrated because no control on the Bandwidth and the network management would exist Security is an issue as the traffic would be sent over the public internet |

Conceptual Design Alternatives—Selection

Option 1 (bis) "Total Ownership (Partnering with a Telecommunication Provider)" is preferred, specifically because it is the one that best meets the requirements of the Business Simulator. In FIG. 72 the "Alternatives Solutions Evaluation Matrix" may be found: its purposes is to evaluate the pro's and con's of each alternative at a high level by assigning comparative ratings to each area.

As previously stated the main advantages of the "Total Ownership" solutions is its ability to meet the goals of the Business Simulator and thus to support the business capabilities developed (e.g. Network Creation, Network Assurance and Network provisioning). This solution is able to meet the goals better than any other solution because of the total control and the total freedom a Business Simulator team would have on the network: e.g. no decision sharing on the global architecture of the network infrastructure with a third party, no traffic mixing with a third party, and total control of the network management which represents a key component of the network assurance capability. Globally, it not only gives the assurance to build a risk free environment for testing the Business Simulator Capabilities, but, also provides a test bed to host eventual "Market Trials" for users. As the network infrastructure can be totally owned by the Business Simulator team, the security risk raised when interconnecting this network with non-team organizations is drastically reduced as their would be no interconnection with an outside network. It does not mean that security features can be ignored but that this requirement appears to be less important than in the alternatives where very confidential information data would have transited on a network where third party organizations could have access to it.

The main drawback of "Total Ownership" solution is its cost and the implementation time. The implementation lead-time represents a drawback for this solution.

Communications Architecture Recommendations

Purpose: To assess the conceptual network architecture in terms of the network components Methodology Link: Method NS version 4.0—Network Planning Deliverables Introduction As previously described, the "Total Ownership" solution is preferred, as it provides total freedom in the design of the Network Fabric. There are two main options in the design of the Network Fabric:

(1) Simple Connectivity Network: and (2) Carrier Grade Edge Network.

In order to better understand the context, the main Network Element categories that compose the end-to-end infrastructure of a global network are discussed below.

Figure 73:
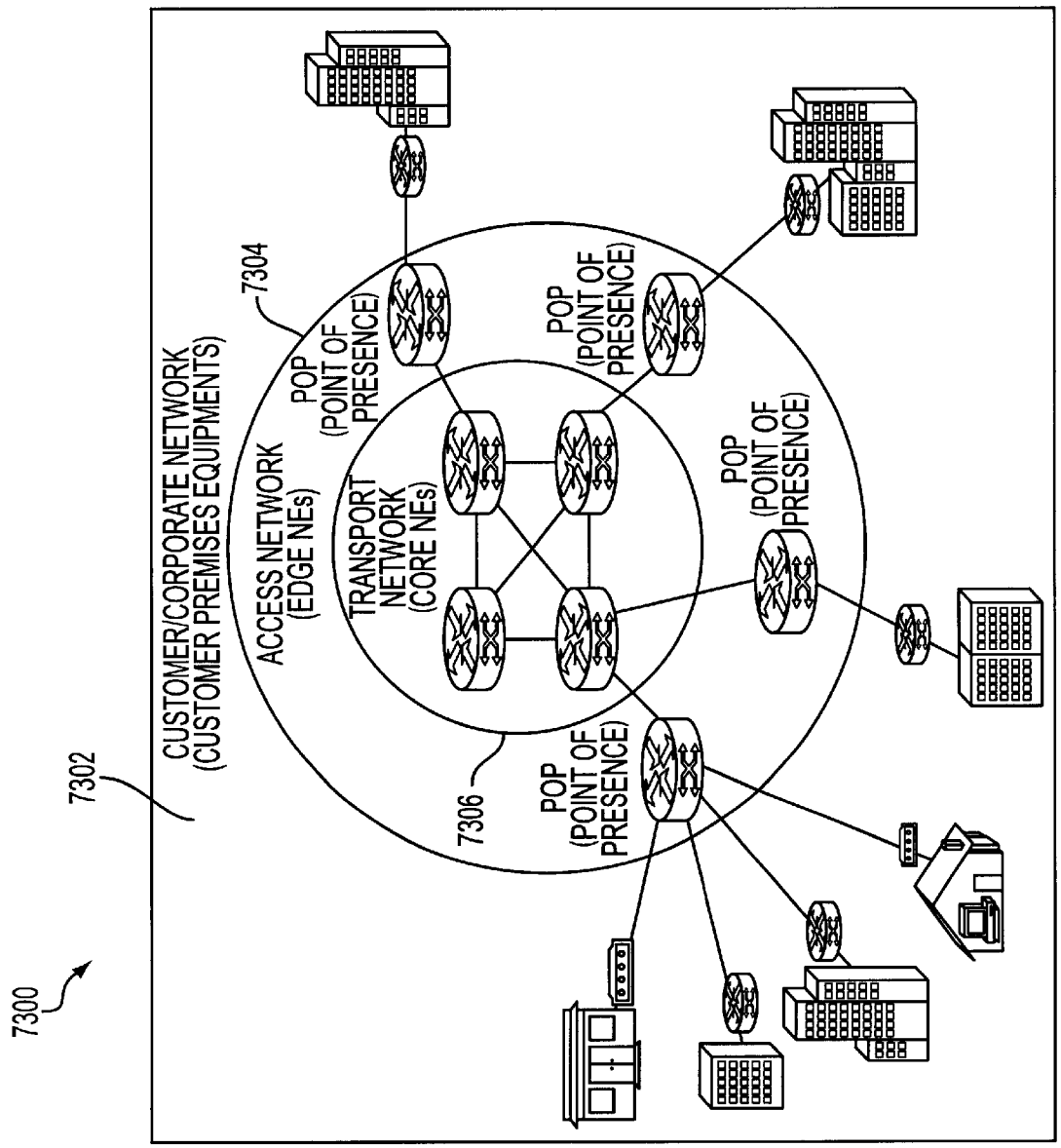
FIG. 73 is an illustration of a high speed network in accordance with one embodiment of the present invention.
Figure 74:
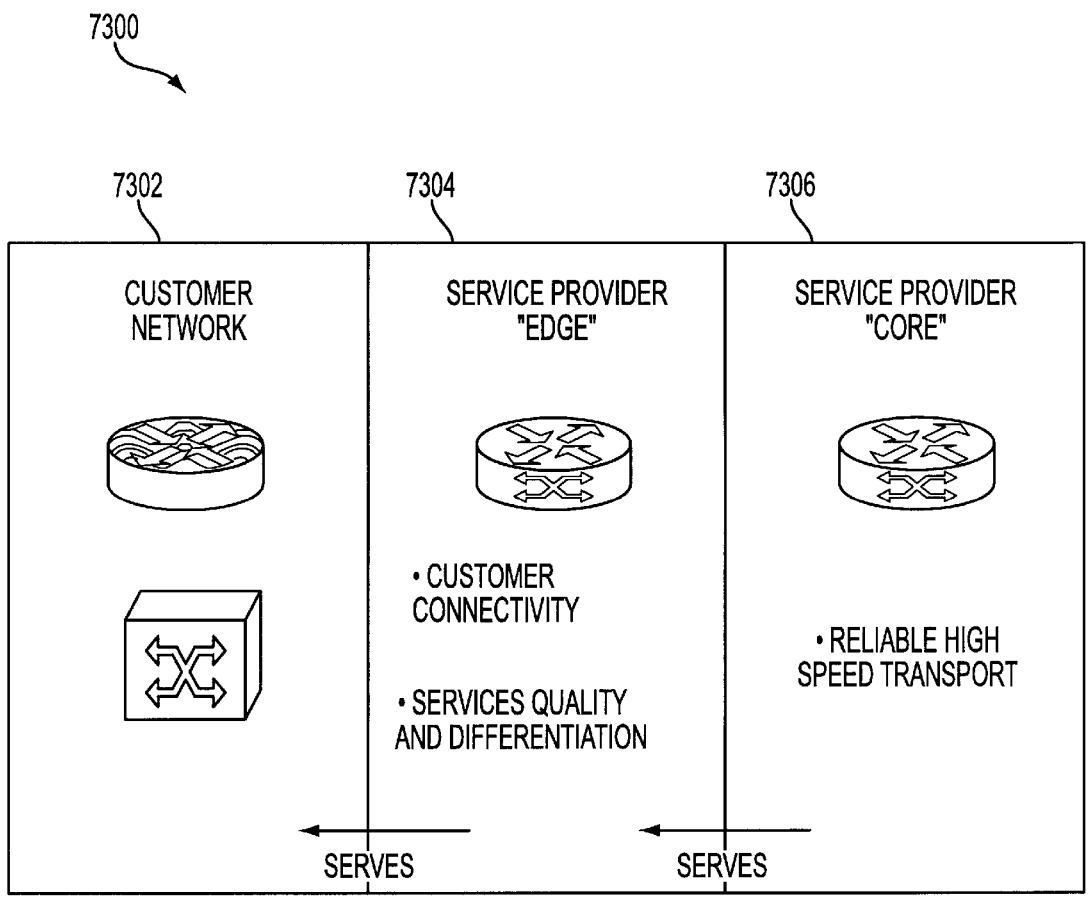
FIG. 74 illustrates the interrelation of the components of the network of FIG. 73.

As shown in FIG. 73, at the most basic level, a wide-area network (WAN) 7300 exists to interconnect individual customers or communities in a useful and cost-effective manner. The customer network 7302 is composed of local area network (LAN) equipment (not mandatory) and its hardware equipment to connect to the WAN 7300. Service providers deploy hardware, software, and people to maximize the utility of their network. The utility of the network comes from the services it enables: how well each service solves a customer problem, how quickly a service can be deployed to a customer, and how reliably the service performs. To help optimize revenue-generation capabilities and minimize network cost, service provider networks often include two layers: edge 7304 and core 7306. The "Edge" 7304 of the network is used to deploy revenue generating services. The "Core" 7306 is used to optimize cost by providing efficient transport and bandwidth optimization of edge-provided traffic. FIG. 74 illustrates the interrelation of the components of the WAN 7300 of FIG. 73.

Customer Network

The customer network 7302 is basically composed of local area network equipment to support the customer business capabilities. But the important equipment that composes the customer network 7302 is the hardware/software that provides the access to the wide area network. The Local Area Network not only carries data traffic but also voice traffic. The development of customer application is demanding more and more services and bandwidth. This demand is mainly sustained by the proliferation of IP on desktops throughout businesses and homes. The service provider must be ready to provide the quality of services, the bandwidth and the value added service that the customer is expecting (e.g. voice over IP, IP Virtual Private network and similar services).

It should be kept in mind that with releases of new data services, the customer network infrastructure should be very flexible to support this services and scalable to support the growing demand of bandwidth.

Edge Network

The network elements that make up the edge network 7304 provide services to the customers of this network. In other words, a service provider deploys a network edge to serve its customers. Retail providers serving enterprise customers may elect to use their edge networks 7304 to deploy Frame Relay, SNA migration, IP virtual private networks or managed voice/data service. Optionally, value added service enhancements may be provided by the edge network.

It is the edge 7304 that includes the interfaces that bring in end-user traffic. The edge 7304 also provides the "meet point" or Network Terminating Point (NTP) between service provider and service customer—the customer's perception of service quality largely depends on the performance of the edge platform; the time for deployment of the service depends on provisioning activity on the edge platform; and any value-added service enhancements are enabled by the edge platform. Thus, the edge platform provides the biggest opportunity for service differentiation relative to the competition. The competitive advantage is provided by the capability of the Edge platform to deploy new services.

Core Network

Whereas the edge network 7304 exists to serve customers, the network core 7306 exists to serve the edge. The core 7306 is primarily responsible for consolidating lower-speed traffic streams from edge devices into high-speed trunks, simplifying network topologies and realizing bandwidth efficiencies across the transport infrastructure.

Core nodes must transport very large amounts of traffic, requiring scalability to very high switching capacities. Availability of the core 7306 is also key to ensuring that a failure in the core does not affect the service quality provided by edge platforms. Finally, because end-user customers do not directly connect to core platforms, there is no need for the interface diversity required of an edge switch. Rather, core network elements need to offer only high-speed interfaces for aggregating edge traffic.

In many networks, the core 7306 provides resilient transport to more than one edge network. These edges may include NEs from more than one vendor. Even in single-edge networks, the edge and core NEs may be provided by different vendors. Therefore, core platforms should be standards based, to support heterogeneous deployments.

Two Options for the Network Infrastructure of the Network Fabric

As depicted in the previous paragraph, the global infrastructure that composes an end-to-end network is composed of three main parts. The ideal solution for the Simulator is to build the entire network infrastructure. The approach is to build progressively the whole network infrastructure. But given the objectives (discussed above), the network fabric infrastructure could follow two main directions to fulfil the requirements.

"Simple Connectivity" Solution

The first option is to build the network infrastructure based on the architecture and technology of a "corporate network". It would constitute a first step and would enable the basic data connectivity between sites and a risk free environment to test new data and voice services from the customer point of view.

"Carrier Grade Edge Network" Solution

The second option is more ambitious as it goes one step further by building the network infrastructure of customers (i.e. corporate network) and also building the network infrastructure of the Point of Presence (i.e. "edge" component) of the service provider or carrier. Note that the customer infrastructure would be almost the same as the "simple connectivity" solution. The added value of this solution is that it enables simulation of what happens at the service provider side and thus what is required to be able to deliver services. Another reason is that the edge infrastructure of a service provider constitute the "meeting point" with its customer; it is where value added services are deployed and where service providers tends to spend more money.

Each of these options is described in the next sections in terms of:

1. High level network architecture
2. Components conceptual design

Finally the two options are compared on terms of the objectives that the network fabric will be capable of achieving. Based on this comparison, one of these options will then be chosen to be continued into Analysis & Design and then Build & Test phases.

FIGS. 75 through 79 identify issues and options which need to be fully considered when carrying out the detailed design of the network. These FIGS. also define a framework for the specification of the main services which the network should support, and may require to be fully populated during the detail design phase.

In particular, FIGS. 75a, 75b, and 75c provide a description of services that may be supported by the Simulator. FIG. 75a illustrates services based on client requirements while FIG. 75b illustrates features of the services. FIG. 75c illustrates exemplary performance requirements for the services as well as listing exemplary service interfaces.

FIG. 76 discusses the network implications of selecting the carrier grade edge network option. FIG. 77 examines the network implications of selecting the simple connectivity network option. FIG. 78 illustrates options for various components of the network. It should be noted that there may be a requirement for the network to support the connection of Network Management Systems to the managed network elements. This may be using O+M PDU in the IP network layer, proprietary protocols or via a separate network. In addition for applications such as the management of customer networks and equipment reach-through to these elements via the delivered IP/ATM service may be required.

Option A—"Simple Connectivity"

Figure 79:
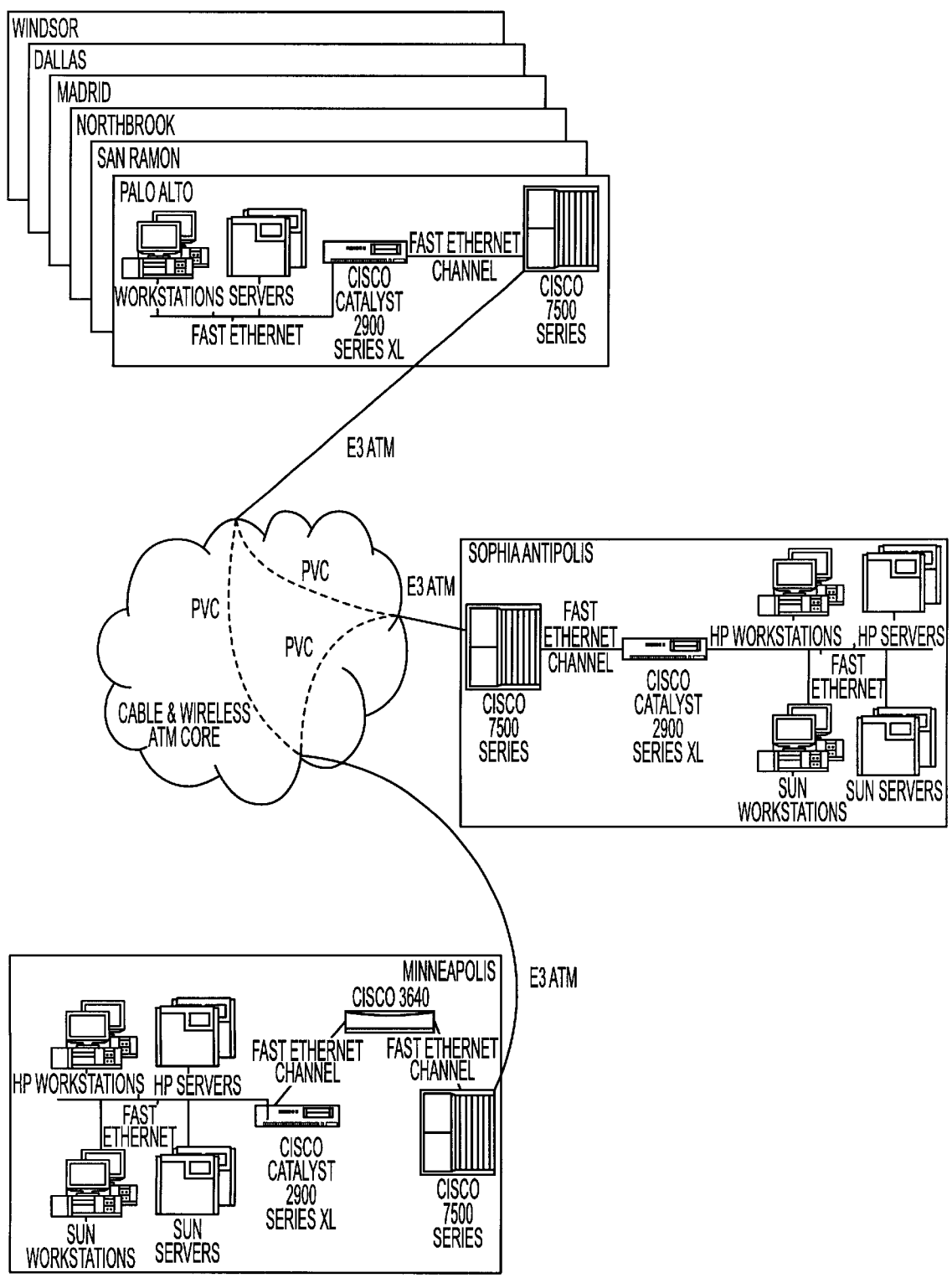
FIG. 79 illustrates a first example of a network architecture of the present invention, which provides basic IP connectivity between the sites.

Option A—"Simple Connectivity"—High-level Network Architecture Conceptual Design FIG. 79 illustrates an example of Option A, which provides basic IP connectivity between the sites. It facilitates user end applications at each site to communicate but it does not simulate the network infrastructure of a service provider or carrier.

It should be kept in mind that this solution by itself is not intended to build credibility with carrier clients. This network is designed to simulate a customer type of network (e.g. a corporate Network) that provides basic data connectivity between sites. The principles followed are to use equipment that needs to be flexible enough to have a long service life and therefore needs to be able to support the demonstration of new IP services (like e.g. VoIP or IPVPN) for the next Network Fabric Releases.

As this solution is intended to provide principally data connectivity between sites and considering the objective to use an ATM backbone, the choice of equipment for the site interconnection has been directed towards the enterprise routers that provide ATM interfaces. The Cisco Router 7500 series equipped with ATM interfaces E3/DS3 Coax satisfies the global requirements. This solution enables interconnection to each site by setting-up ATM PVC of 2 Mbit/s via the Cable & Wireless ATM core network. It should be noted that this type is not a native ATM switch but an IP router with an ATM interface. The E3/DS3 interface provides a reserve of scalability (up to 34 Mbit/s 45 Mbit/s). It has a backplane size optimized for small to medium networks. This type of router provides a large range of interfaces and thus provides flexibility for the future utilization of this equipment. The intention is to use a Fast Ethernet card for the connection to the Local Area Network of each site.

For the LAN architecture, a network product from the Cisco Catalyst 2900 XL Series may be used. Those products support Fast Ethernet switching at 100 Mbit/s. This option supports Inter Switching Link (ISL) protocol. It is a proprietary protocol from Cisco, very similar to layer 3 switching. This protocol enables enhanced VLAN capabilities when connected to a Cisco router. Only one physical connection is required between the switch and the router and the connection takes place over the 100 BaseT Inter Switching Link module. It is then possible to create and run as many subnets (logical IP network) as necessary over this configuration.

All sites are connected to the core nodes by E3/T3 ATM links over a Cable & Wireless ATM long distance networks. Connectivity between the sites is routed over ATM PVC's with Sustain Cell Rate (SCR) of 2 Mbit/s. In an exemplary first release (e.g. Minneapolis, Sophia Antipolis and Palo Alto), three PVCs can be setup: Minneapolis-Sophia Antipolis, Minneapolis-Palo Alto and Palo Alto-Minneapolis.

Option A—Architecture Components Conceptual Design

The following sections outline an exemplary minimum required network hardware and software components for each release: (Note that at this step of the analysis, it is assumed that each site has the same infrastructure.)

Release 1:
  3 Cisco Routers 7500 Series (ATM E3/DS3 Cards)
  3 Cisco Catalyst 2900 XL (option Fast Ethernet)
Release 2:
  2 Cisco Routers 7500 Series (ATM E3 Card)
  2 Cisco Catalyst 2900 XL (option Fast Ethernet)
Release 3:
  2 Cisco Routers 7500 Series (ATM E3 Card)
  2 Cisco Catalyst 2900 XL (option Fast Ethernet)
Release 4:
  1 Cisco Routers 7500 (ATM E3 card)
  1 Cisco Catalyst 2916 XL (option Fast Ethernet)

Option B—"Carrier Grade Edge Network"

Option B—High-level Network Architecture Conceptual Design

Figure 80:
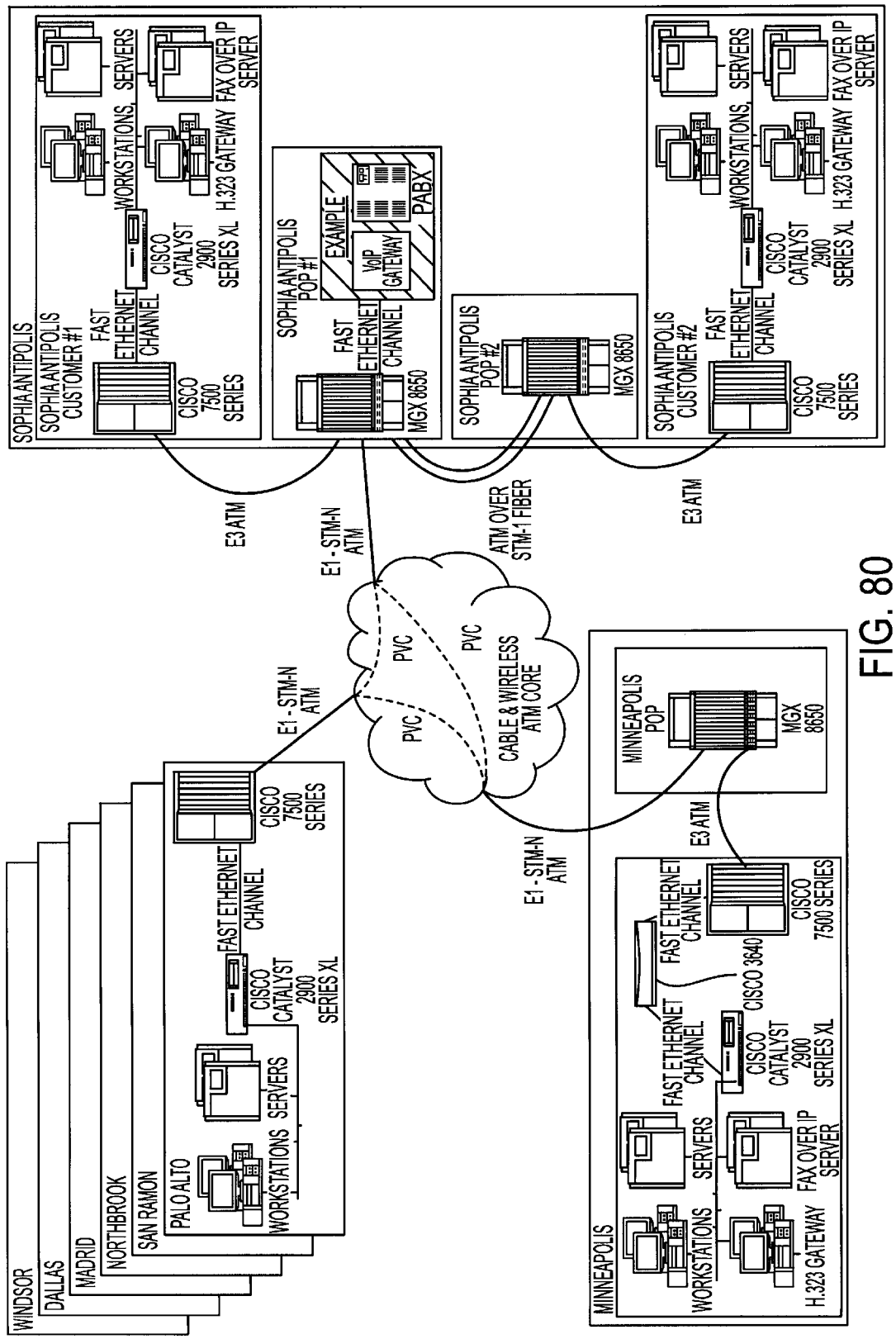
FIG. 80 illustrates a second example of a network architecture of the present invention, which is designed to form an edge network to which the "Simple Connectivity Network" already described can be connected.

FIG. 80 illustrates an exemplary network of Option B. This network is designed to form an edge network to which the "Simple Connectivity Network" already described can be connected. It would therefore be possible to deploy the "Simple Connectivity Network" network option first and then add the "Carrier Grade Edge Network" as a later phase.

This network option is designed to simulate a Service Provider or Carrier network as closely as possible within the constraints of scalability and cost. Service Provider/Carrier networks differ from customer type networks in the following generic ways:

Use of carrier grade equipment;
  Use of hierarchical architecture and routing;
  Use of network-network interface protocols;
  Widespread need for management down to the fibre level
  Use of stand-alone gateways; and
  Equipment needs to be flexible enough to have a long service life.

Use of Carrier Grade Equipment

Carrier grade equipment differs from customer premises equipment in having:
  higher availability;
  greater flexibility in application;
  a longer in-service life; and
  tailored operations and maintenance functionality.

This equipment tended to be sourced from specific suppliers focussed on this narrow market segment. The trend now is for these "traditional" suppliers to merge or form alliances with suppliers who built their customer base from the enterprise network market. There is, however, still a distinction between carrier grade equipment and enterprise equipment in the combined product ranges, which, in turn, needs to be reflected in the Business Simulator network. This assists with the building of credibility with carrier clients. In this network option the CISCO MG28850 WAN switch is preferred as the main edge switch. This is for the following reasons:

This is a carrier grade equipment and is already in use by companies deploying NGN/future core networks (Sprint ION);
  The equipment is high availability (99.995%) and supports such features as remote software download, hot card swapping and in-service upgrades which should map onto demonstrable business capabilities; and
  The equipment is scalable (1 Gbit/s–45 Gbit/s) and includes both IP and ATM switching capability.

Use of Hierarchical Architecture and Routing

It is attempted to replicate the carrier hierarchy as far is possible within the constraints of a "private network" environment. Service Provider Point Of Presence (POP) Nodes are simulated which contain the main edge switches and gateways. Simulated customer sites are connected to the core nodes by either E3/T3 ATM links or E1 ATM links from remote customer sites over the C&W provided ATM long distance networks.

There are three simulated POPa, two are co-located (in this illustration at Sophia Antipolis) and one is remotely located at Minneapolis. These physical locations are for illustration purposes only and may change before implementation begins. The co-located nodes are interconnected via protected STM fibre links to allow demonstration of management down to the fibre level and allow for a full implementation of the ATM NNI signaling protocols. The remote site is interconnected via the C&W international ATM network and is likely to have severely restricted ATM signaling capability.

The customer sites have a CPE which may be a Cisco 7500/7200 series router. The Network Termination Point (NTP) should be on the customer side of this router. Although remote Access Links are simulated in this network, a realistic self provided Access Network is not. However, it may be possible to insert access transport technologies (e.g. xDSL modems) into the network at a later date to replicate this aspect.

Use of Network-Network Interface protocols

As part of a later upgrade the implementation of Network-Network interfaces would be desirable. Network—Network interfaces are difficult to implement in a "private network" environment. The network design allows for a limited simulation of these types of interfaces:

For the ATM NNI, P-NNI signaling could be implemented between the two fibres connected edge switches;

For the PSTN interface, SS7 is not likely to be feasible, therefore asymmetric Primary Rate Signaling of symmetric DPNSS will suffice from the PSTN gateway.

Widespread Need for Management Down to the Fibre Level

Carrier networks are mostly based around fibre infrastructure and so it is important that the management capability of fibre is shown integrated in the network management system. The network may implement dual STM-1 network links with SDH protection enabled between them allowing Section Management and demonstration of alternative mechanisms for implementing network resilience along with IP level re-routing.

Stand-alone Gateways

The network preferably provides two forms of gateway for VoIP and Fax over IP:

"stand alone" located at one of the POPs; and customer located on the customer LAN or in a user workstation.

The stand-alone gateway may interface between a PABX on the corporate network simulating the local PSTN switch and the IP network connected to the MGX via either ethernet or high-speed LAN.

The customer gateways may be implemented:

On a dedicated workstation connected to the customer LAN; or

In software and hardware (e.g. expansion cards) within a user workstation.

The exact method of realization is the subject of future study following from the detailed definition of VoIP services.

Equipment Needs to be Flexible Enough to Have a Long Service Life

The MGX WAN switch has been chosen as the preferred switch because:

It incorporates both an IP router and an ATM switch;

It supports a wide range of interfaces from Ethernet through E1/T1 up to STM-16; and It supports CISCO WAN management software more suited to carriers and service providers.

Option B—Architecture Components Conceptual Design

The following sections outline exemplary minimum required network hardware and software components for each release:

Release 1:
3 Cisco MGX 8850
4 Cisco Routers 7500 Series (ATM E3/DS3 Cards)
4 Cisco Catalyst 2900 XL (option Fast Ethernet)
(Note that at this step of the analysis, each site for release 2,3 and 4 can have the same infrastructure).

Release 2:
2 Cisco Routers 7500 Series (ATM E3 Card)
2 Cisco Catalyst 2900 XL (option Fast Ethernet)

Release 3:
2 Cisco Routers 7500 Series (ATM E3 Card)
2 Cisco Catalyst 2900 XL (option Fast Ethernet)

Release 4:
1 Cisco Routers 7500 (ATM E3 card)
1 Cisco Catalyst 2916 XL (option Fast Ethernet)

FIGS. 81a through 81d are tables summarizing the extent to which various objectives are achieved by each of the solutions.

Network Management Strategy

It should be a key requirement to demonstrate the use of carrier grade network management systems with this network. A centralized network management facility should be provided (such as in Minneapolis) with a disaster recovery facility also provided (such as in Sophia Antipolis). The demonstration of disaster recovery functionality would then form a component of the service assurance capability.

Network management systems should utilize the standard CISCO Service Management System components as much as possible at the lower layers of the network management hierarchy i.e. CISCO IP Manager, CISCO WAN Manager. Above the element management layer, the selection of systems may depend on the requirements and implementation approach for each of the Business Capabilities to be demonstrated.

Communications Architecture Issues

Purpose: To highlight the issues relating to the construction of the recommended network architecture Methodology Link: Method NS version 4.0—Network Planning Deliverables Constraints In this scenario, it is to be assumed that the implementation of each of these options is heavily reliant on alliances with a hardware provider, such as Cisco, and a bandwidth provider, such as Cable & Wireless. The main impacts and concerns are listed below:

Cisco Expert Resources

Specifically for option B "Carrier Grade Edge Network", there may be a compulsory need to establish a strong communication link with Cisco Experts on the MGX 8850. The ideal solution would be to have at least one expert full time working on the detailed design of option B. Otherwise given the limited amount of information collected and the scarce skills within Cisco on this specific topic, the detail design would be only partially achieved. Therefore, it might lead to the rollout of an incomplete solution that would not match the objectives of the Network Fabric. It might seriously damage the overall NGN Business Simulator. The other important aspect is that the Cisco Expert must help to validate the conceptual design and to guide effort in order implement a valuable prototype that would be demonstrated to a client.

Cisco Lead-Time Delivery

The lead-time delivery of Cisco Equipment could be quite long. Therefore this point should be carefully considered.

Cable & Wireless Contact Point

Preferably, Cable & Wireless provides the ATM connection between sites. For the detailed design of the Network Fabric, it is required to establish a formal communication channel with them. It serves to clarify what are the technical specifications of the solution they would be able to provide. The detailed design of the Network Fabric would then be achieved with respect to these parameters and thus assures the feasibility of the solution.

Risks

The following table assesses the risks involved in deploying the Network Fabric and compares severity of the risks for Option A or Option B.

| Risk | Option A | Option B |
|---|---|---|
| The lead-time delivery for ATM links has to be considered carefully (ATM access solutions are still not ready everywhere and service providers are experiencing serious delays especially in Europe). The last-mile access from the Point-of-Presence of the ATM service providers to the US sites can be a problem (US Regulation) as it might be required to use the infrastructure of a local carrier. It implicates Technological problems as well as extra costs. | ✓✓✓✓ | ✓✓✓✓ |
| The Cable & Wireless ATM service has insufficient functionality e.g., transport of P-NNI signaling data units, inability to support control of end-to-end delay to enable the desired capabilities to be meaningfully demonstrated. | ✓✓ | ✓✓✓✓ |
| The detailed functionality of CISCO routers and WAN switches is insufficient or inconsistent preventing the end-to-end services being implemented. | ✓✓ | ✓✓✓ |
| Overall network integration is more complex that originally anticipated leading to serious interworking problems between customer, POP and C&W core equipment. | | |
| Developments of IP switching proceed such that carriers rapidly adopt a pure-IP infrastructure with IP based deterministic QoS mechanisms thus necessitating rapid upgrade or replacement of the MG28850 switches. | | ✓✓ |
| Traffic capacity for the demonstration services grows in a rapid, unpredictable way outpacing the ability of the routers and core infrastructure to handle the demand. | ✓✓ | ✓✓ |
| Network management system integration is more complex than originally anticipated undermining effort to produce end-to-end capabilities. | ✓✓ | ✓✓✓ |
| In-band solutions to the provision of Network Management Data Communications Network cannot be found resulting in the need for a separate overlay NMS DCN. | ✓ | ✓✓ |
| Equipment chosen is over-engineered for the specific applications implemented resulting in non-cost effective utilization of capital resources. | ✓✓ | ✓✓✓ |
| Redundancy of Network Elements (e.g. Routers, MGX 8650) and sites interconnection links is not provided by both options, therefore the networks present single points of failures. | ✓✓ | ✓ |
| No security features are proposed by the two options. Firewalls might be added when the network fabric is interconnected with third party. | ✓ | ✓ |
| May be unable to secure sufficient maintenance resource for the network with appropriate training and support. Agreed SLAs are essential between NT market offering staff and the designated maintenance agent. | ✓✓✓✓ | ✓✓✓✓ |

Implementation Approach

It is preferred that a two stage approach is taken to the design and implementation of the Network Fabric:

Firstly, design and implement the Network Fabric based on a "Simple Connectivity" solution; and secondly, upgrade the network to a "Carrier Grade Edge Network" solution.

The "Simple Connectivity" solution forms the Network Fabric part of the Release I capability.

Cable and Wireless (CWC) is an exemplary carrier for the Business Simulator Network Fabric.

The "Carrier Grade Edge Network" solution forms the Network Fabric part of the Release II capability.

The two stage approach has been chosen for the following reasons:

Enabling A Full Capability Demonstration

The "Simple Connectivity" solution allows the demonstration of basic capability. In order to demonstrate capabilities to potential Carrier clients, it must be replicated to the limits of available resources, the unique features which are likely to exist in a carrier/future core network. These are more completely enabled by the "Carrier Grade Edge Network" solution.

Minimizing Risk

Technical support for "Carrier Grade" equipment which forms key component of the "Carrier Grade Edge Network" solution is limited from suppliers. The detailed design of such a network mandates a strong participation of scarce "Carrier Grade" equipment specialists. The complexity of the "Carrier Grade" option detailed design is substantially more complex and hence a higher risk than a "Simple Connectivity" option.

Detailed design and implementation in a two stage approach allows appropriate resources to be mobilized on both sides within a realistic timeframe.

Material Costing

Purpose: Scheduling and costing of deliverables and detailed resource planning

Methodology Link: Method NS version 4.0—Network Planning Deliverables

Communications Organization Strategy Outline

Purpose: To outline the high level strategy for developing the appropriate organizational structure at each node to support the network Methodology Link: Method NS version 4.0—Network Planning Deliverables Organizational Requirements The following are exemplary organizational requirements at each node on the Business Simulator Network. With regards to the estimate of impact on the organization, the following scale is used:

High (H)=50% to 100% utilization of one FTE

Medium (M)=30% to 50% utilization of one FTE

Low (L)=up to 30% utilization of one FTE

| Location | Organizational Requirement | Impact |
| --- | --- | --- |
| 1. Minneapolis<br>- first tier NOC | 1 nominated person with appropriate Network Management and second tier maintenance skills. Full time position not required | H |
| 2. Sophia Antipolis<br>- second tier NOC - shadowing Minneapolis. | 1 nominated person with appropriate Network Management and second tier maintenance skills. Full time position not required | H |
| 3. Palo Alto<br>- Demonstration Location for eCommerce applications | 1 nominated person with appropriate Network Management and first tier maintenance skills. Full time position not required | M |
| 4. Northbrook<br>- Demonstration Location for eCommerce applications | 1 nominated person with appropriate Network Management and first tier maintenance skills. Full time position not required | L |
| 5. San Ramon<br>-Demonstration Location for eCommerce applications | 1 nominated person with appropriate Network Management and first tier maintenance skills. Full time position not required | L |
| 6. Dallas<br>- Demonstration location for Web-enabled call center applications | 1 nominated person with appropriate Network Management and first tier maintenance skills. Full time position not required | L |
| 7. Madrid<br>- Teleworks ELA location | 1 nominated person with appropriate Network Management and first tier maintenance skills. Full time position not required | L |
| 8. Windsor<br>- Demonstration of next generation SmartStore environment. | 1 nominated person with appropriate Network Management and first tier maintenance skills. Full time position not required | M |

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for demonstrating business capabilities in an e-commerce environment comprising the steps of:
    (a) providing data connectivity between a plurality of sites on a network located in distinct geographic locations;
    (b) receiving demonstration data from one of the sites, the demonstration data illustrating business capabilities of one of the sites;
    (c) providing user-created reusable object containers, wherein said object containers are created by defining links among instantiated objects;
    (d) organizing the demonstration data in a demonstration format using the user-created reusable object containers; and
    (e) transmitting the demonstration data over the network in the demonstration format to another of the sites.

2. A method as recited in claim 1, wherein the demonstration data is a business simulation.

3. A method as recited in claim 1, wherein the demonstration data includes a demonstration of product/service capabilities offered by one of the sites.

4. A method as recited in claim 1, wherein the demonstration data is received in real time.

5. A method as recited in claim 1, and further comprising the step of supporting internet protocol services including at least one of streaming audio, streaming video, facsimile transmission and receipt, and internet telephony.

6. A method as recited in claim 1, wherein data connectivity is provided between at least eight sites.

7. A computer program containing code segments, which when executed on a computer demonstrate business capabilities in an e-commerce environment, the computer program embodied on a computer-readable medium, the computer program comprising:
    (a) a code segment that provides data connectivity between a plurality of sites on a network located in distinct geographic locations;
    (b) a code segment that receives demonstration data from one of the sites, the demonstration data illustrating business capabilities of one of the sites;
    (c) a code segment that provides user-created reusable object containers, wherein said object containers are created by defining links among instantiated objects;
    (d) a code segment that organizes the demonstration data in a demonstration format using the user-created reusable object containers; and
    (e) a code segment that transmits the demonstration data over the network in the demonstration format to another of the sites.

8. A computer program as recited in claim 7, wherein the demonstration data is a business simulation.

9. A computer program as recited in claim 7, wherein the demonstration data includes a demonstration of product/service capabilities offered by one of the sites.

10. A computer program as recited in claim 7, wherein the demonstration data is received in real time.

11. A computer program as recited in claim 7, and further comprising a code segment that supports internet protocol services including at least one of streaming audio, streaming video, facsimile transmission and receipt, and internet telephony.

12. A computer program as recited in claim 7, wherein data connectivity is provided between at least eight sites.

13. A system for demonstrating business capabilities in an e-commerce environment comprising:
    (a) logic that provides data connectivity between a plurality of sites on a network located in distinct geographic locations;

(b) logic that receives demonstration data from one of the sites, the demonstration data illustrating business capabilities of one of the sites;
(c) logic that provides user-created reusable object containers, wherein said object containers are created by defining links among instantiated objects;
(d) logic that organizes the demonstration data in a demonstration format using tube user-created reusable object containers; and
(e) logic that transmits the demonstration data over the network in the demonstration format to another of the sites.

14. A system as recited in claim 13, wherein the demonstration data is a business simulation.

15. A system as recited in claim 13, wherein the demonstration data includes a demonstration of product/service capabilities offered by one of the sites.

16. A system as recited in claim 13, wherein the demonstration data is received in real time.

17. A system as recited in claim 13, and further comprising logic that supports internet protocol services including at least one of streaming audio, streaming video, facsimile transmission and receipt, and internet telephony.

18. A system as recited in claim 13, wherein data connectivity is provided between at least eight sites.

* * * * *